Feb. 13, 1934.　　　　J. R. PEIRCE　　　　1,946,915
PERFORATED RECORD CONTROLLED ACCOUNTING MACHINE
Filed Nov. 27, 1929　　78 Sheets-Sheet 1
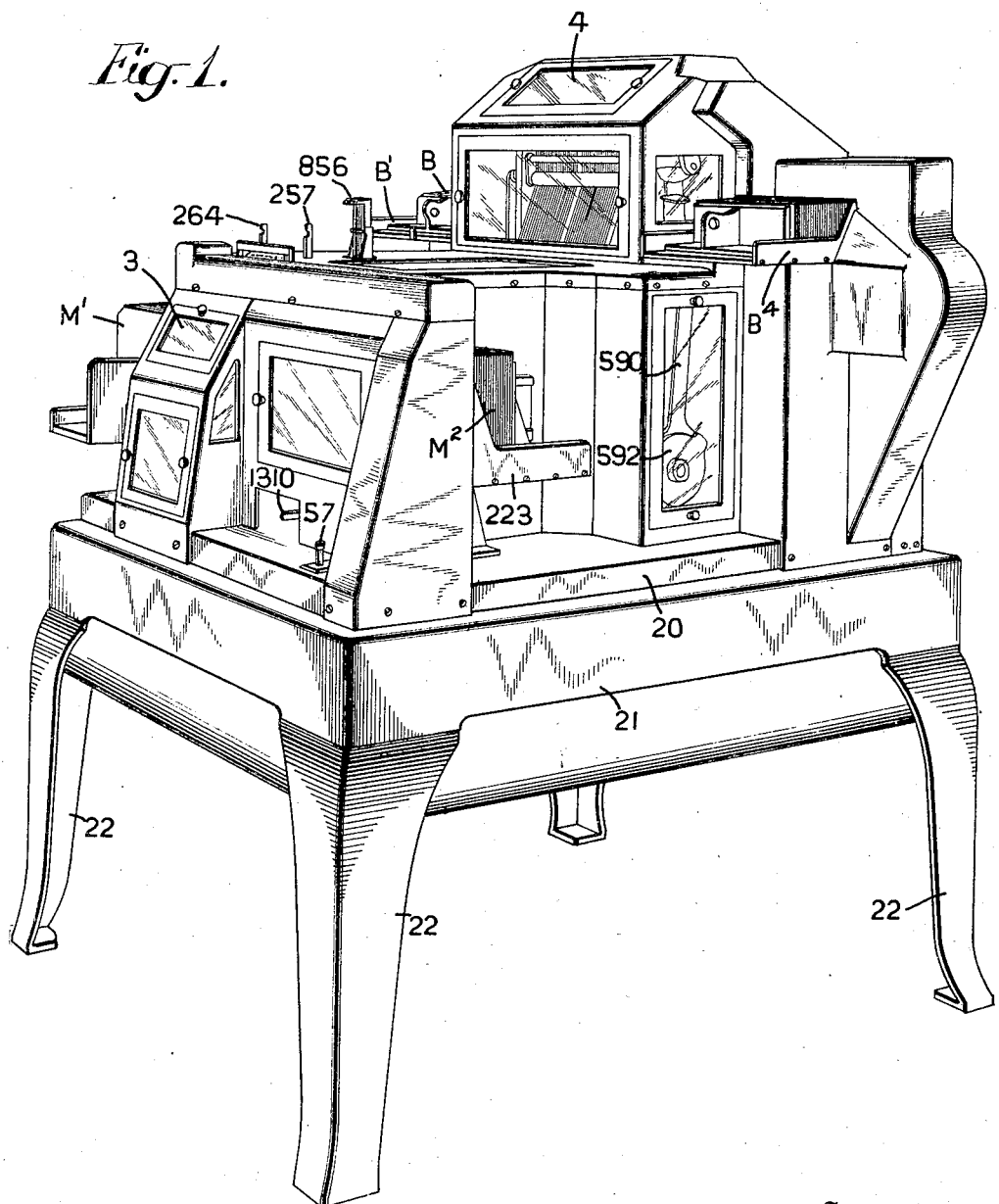

Feb. 13, 1934.    J. R. PEIRCE    1,946,915
PERFORATED RECORD CONTROLLED ACCOUNTING MACHINE
Filed Nov. 27, 1929    78 Sheets-Sheet 2
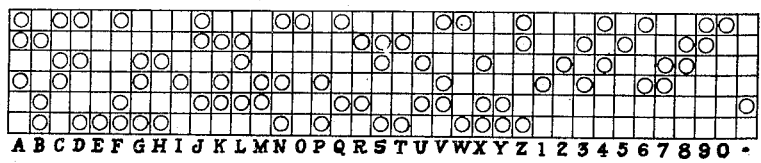

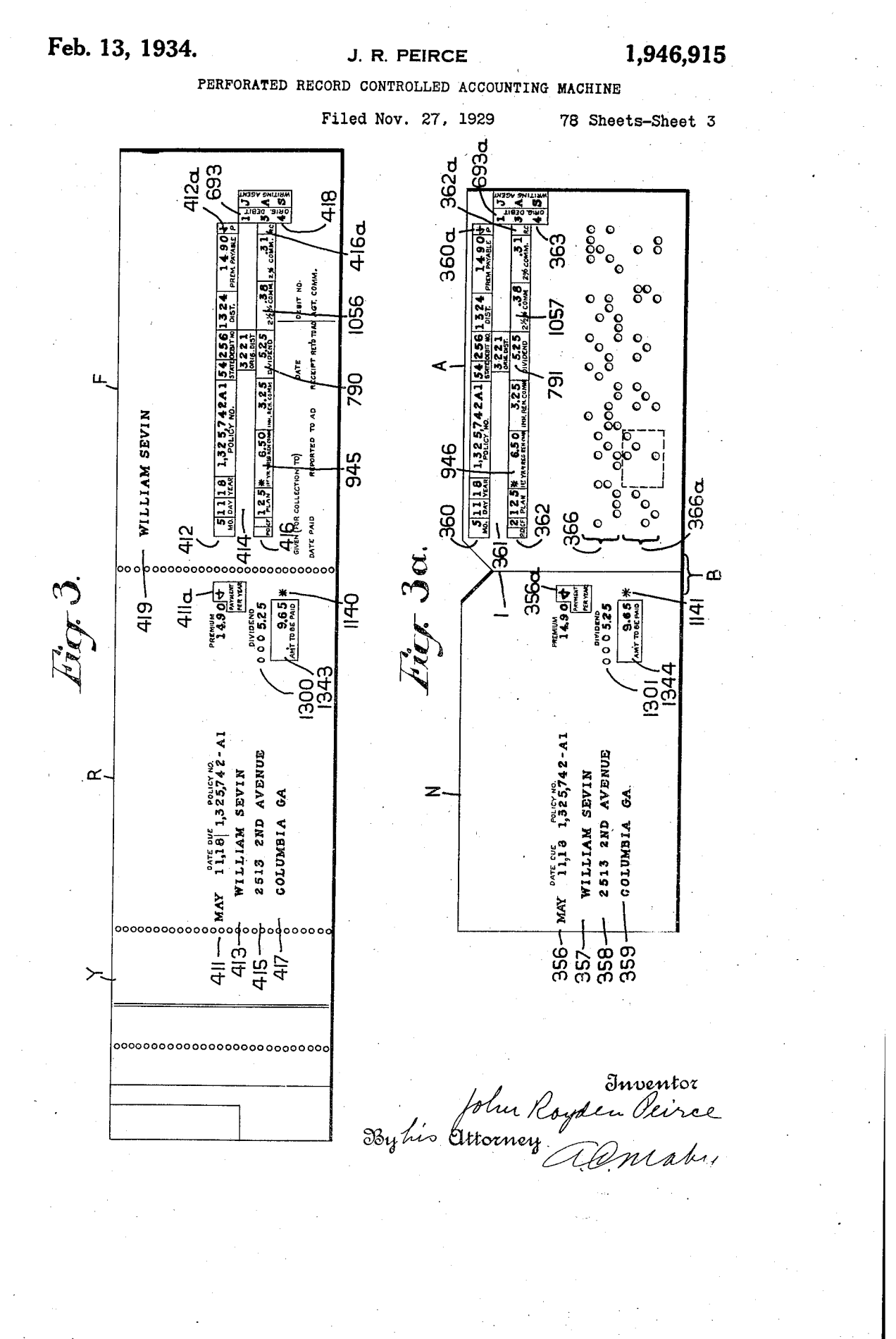

Feb. 13, 1934.     J. R. PEIRCE     1,946,915
PERFORATED RECORD CONTROLLED ACCOUNTING MACHINE
Filed Nov. 27, 1929     78 Sheets-Sheet 3

Inventor
John Royden Peirce
By his Attorney

Feb. 13, 1934. J. R. PEIRCE 1,946,915
PERFORATED RECORD CONTROLLED ACCOUNTING MACHINE
Filed Nov. 27, 1929 78 Sheets-Sheet 4
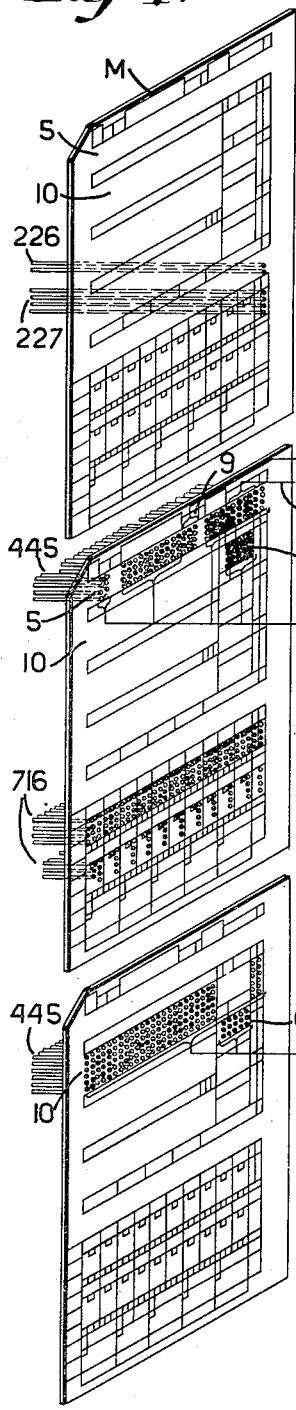
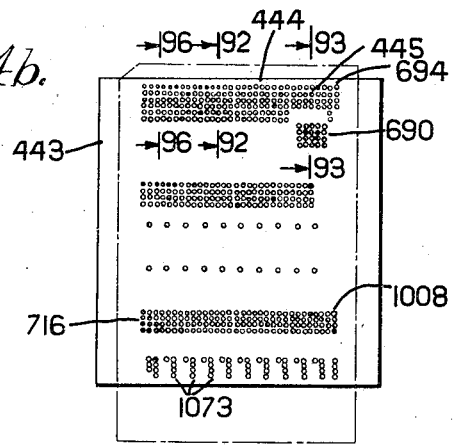
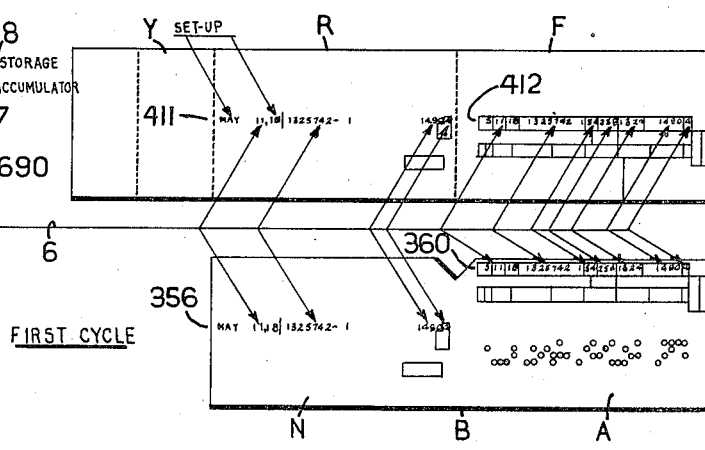
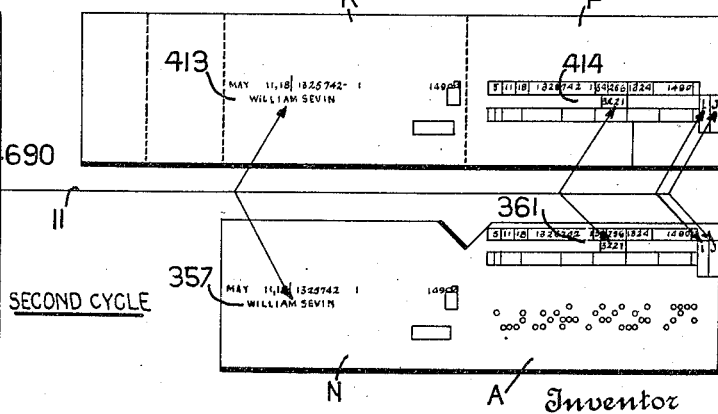

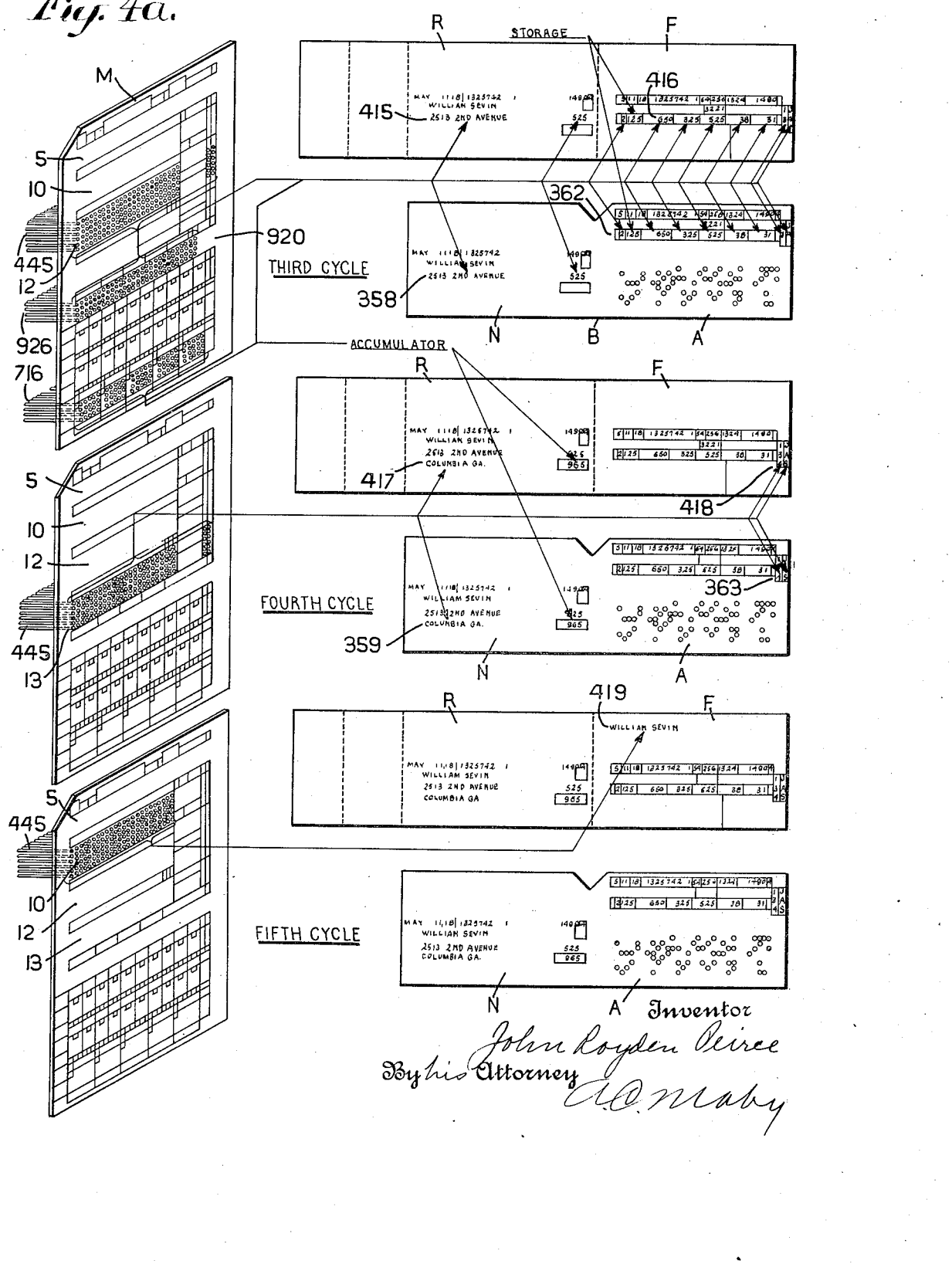

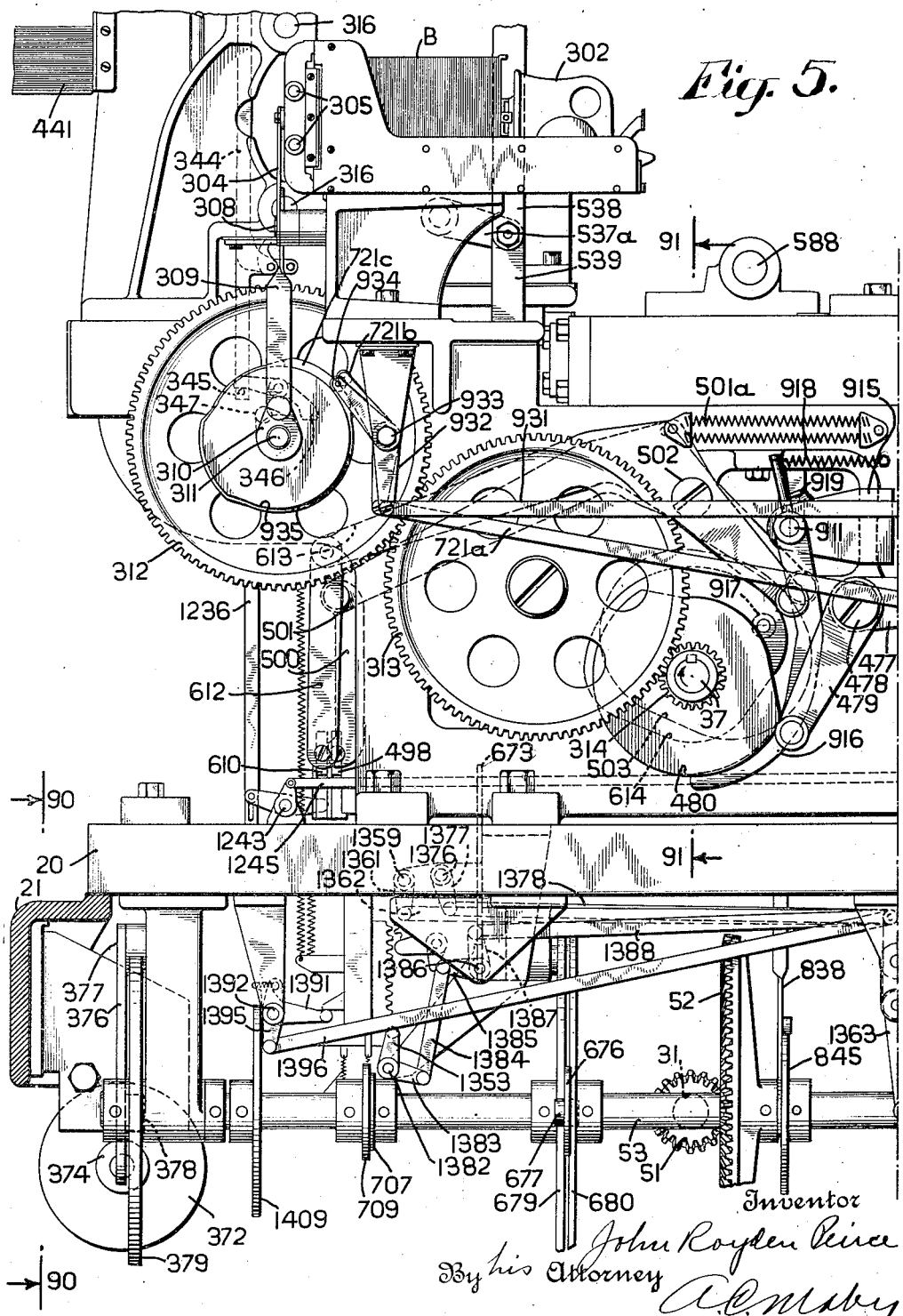

Feb. 13, 1934.  J. R. PEIRCE  1,946,915
PERFORATED RECORD CONTROLLED ACCOUNTING MACHINE
Filed Nov. 27, 1929  78 Sheets-Sheet 9

Inventor
John Royden Peirce
By his Attorney

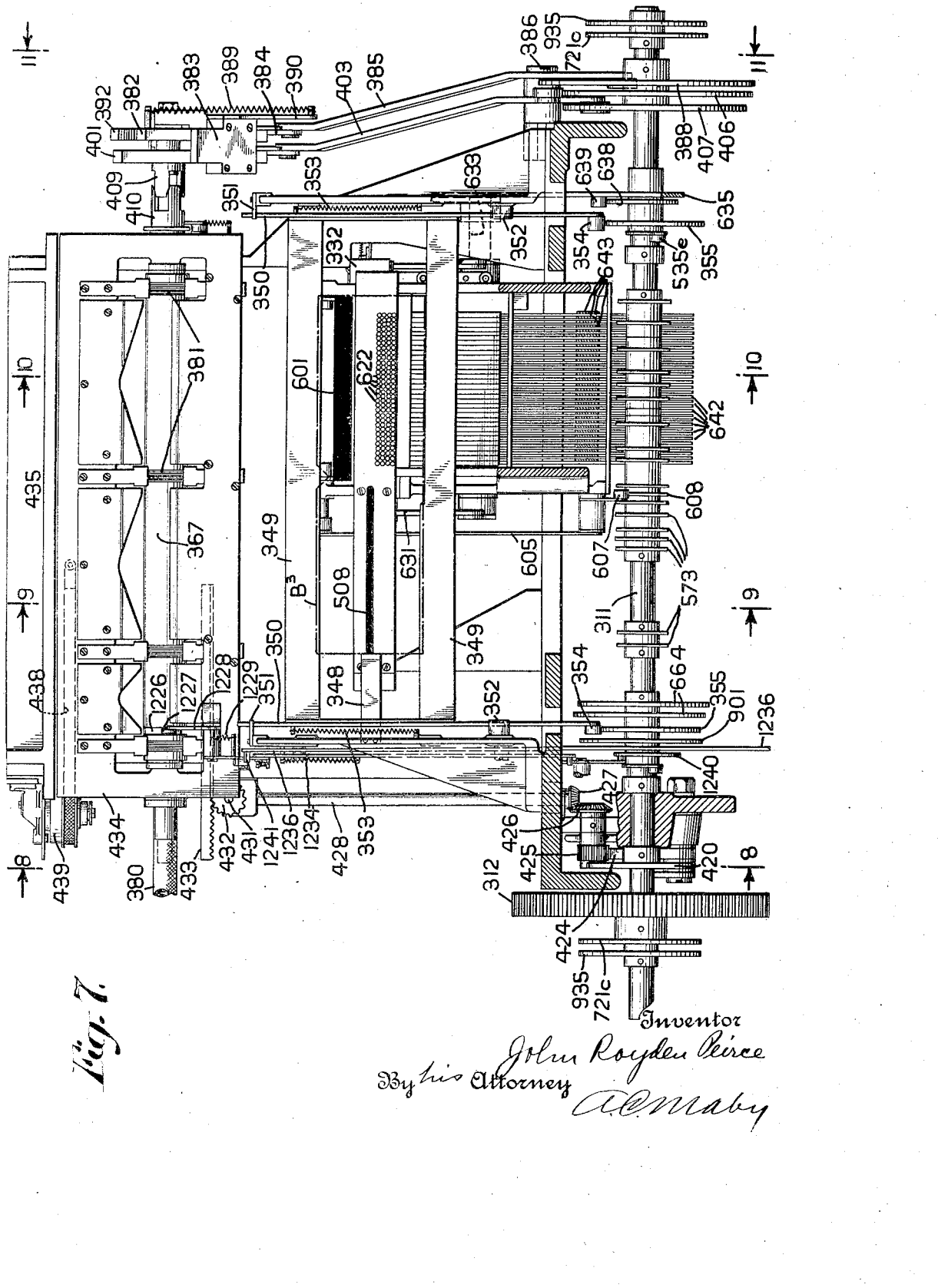

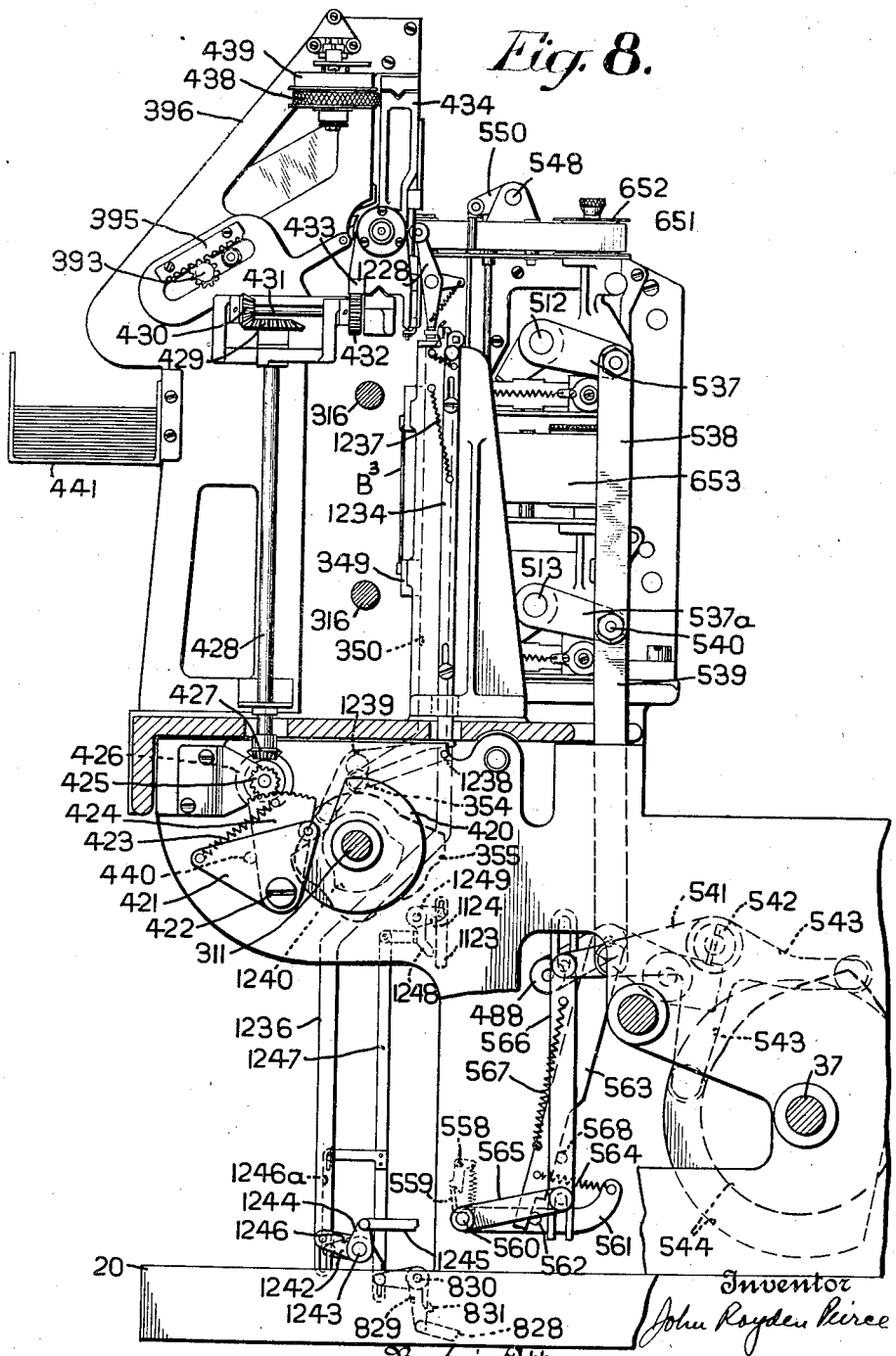

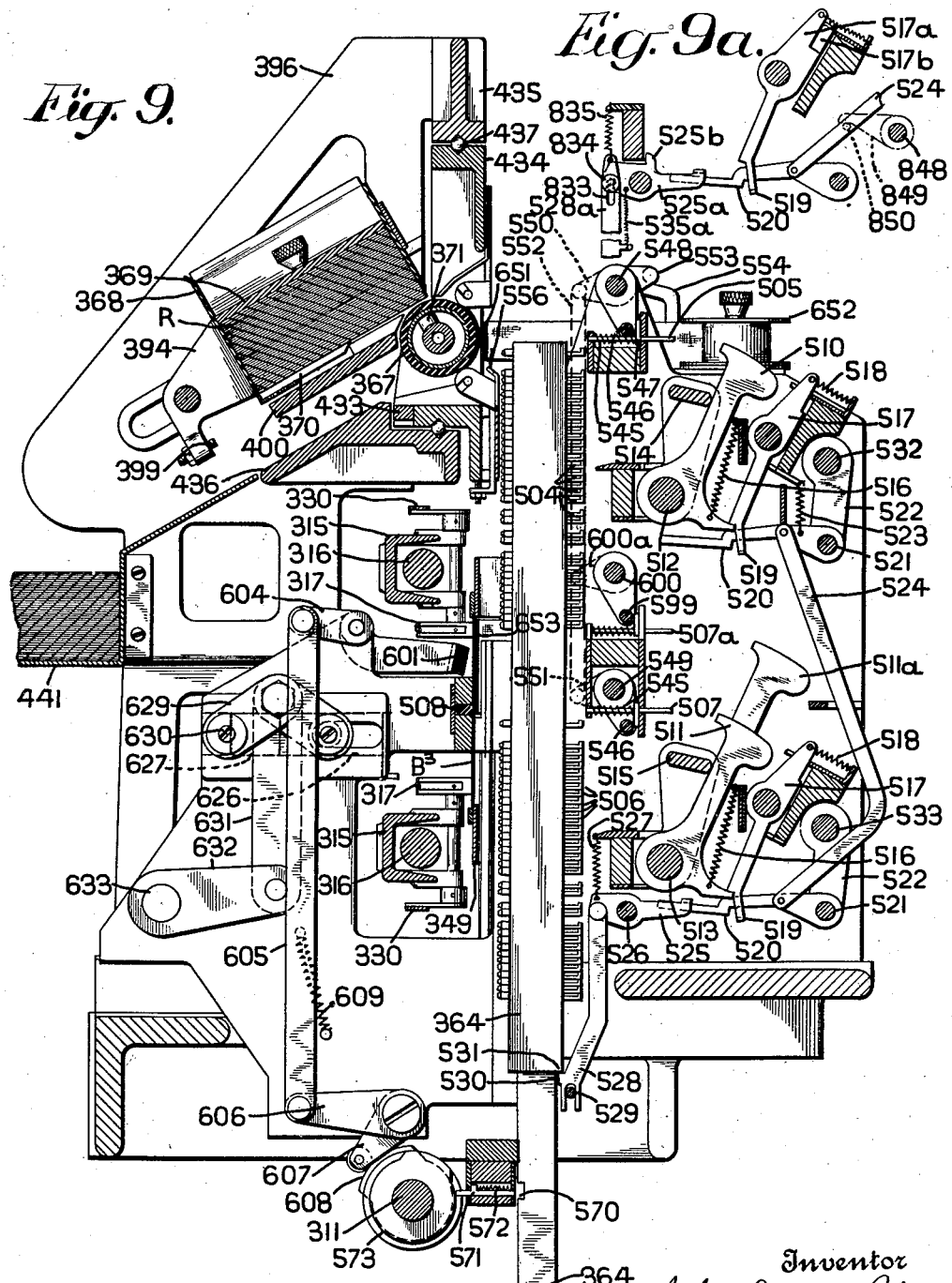

Feb. 13, 1934.   J. R. PEIRCE   1,946,915
PERFORATED RECORD CONTROLLED ACCOUNTING MACHINE
Filed Nov. 27, 1929   78 Sheets-Sheet 13

Inventor
John Royden Peirce
By his Attorney

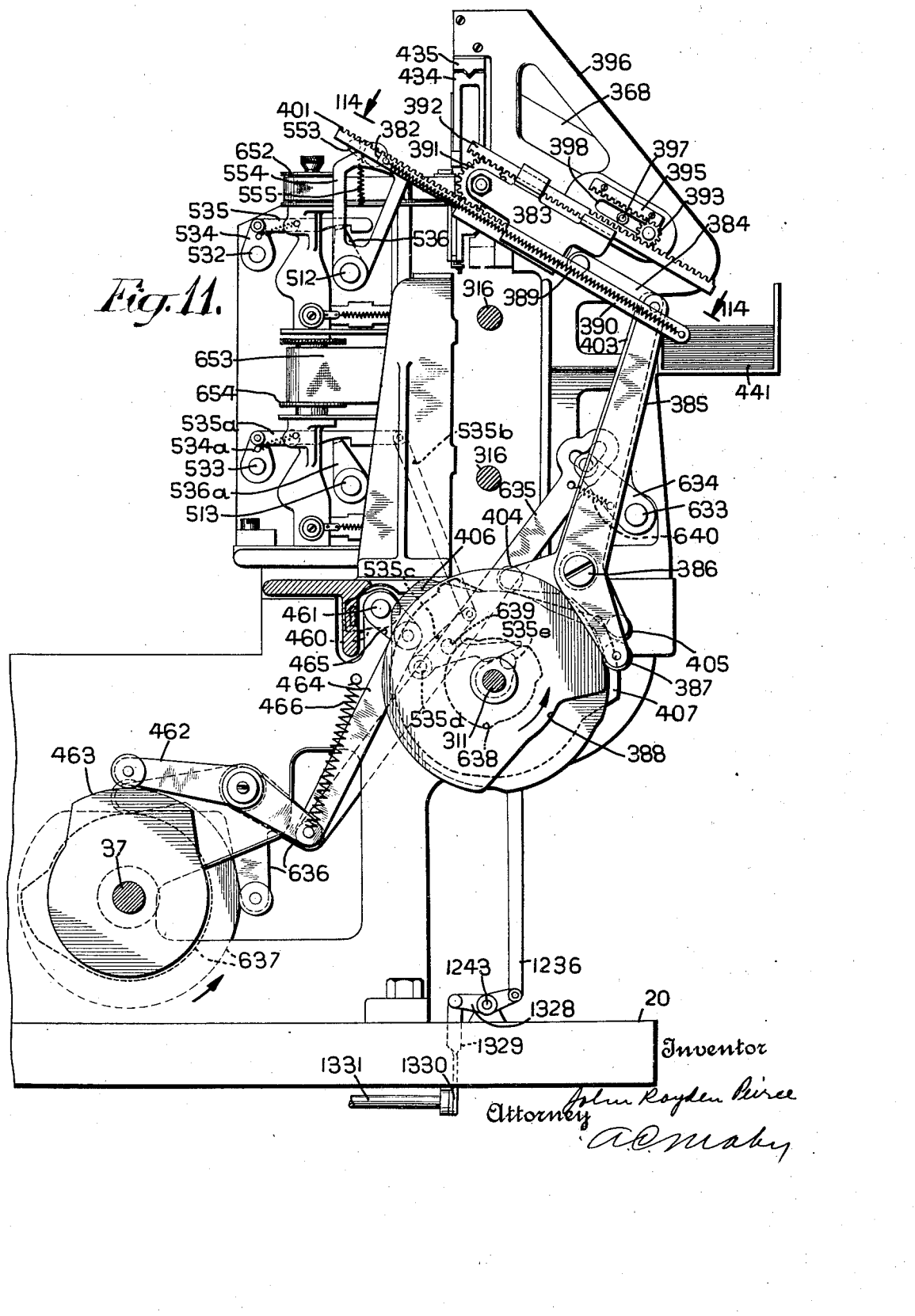

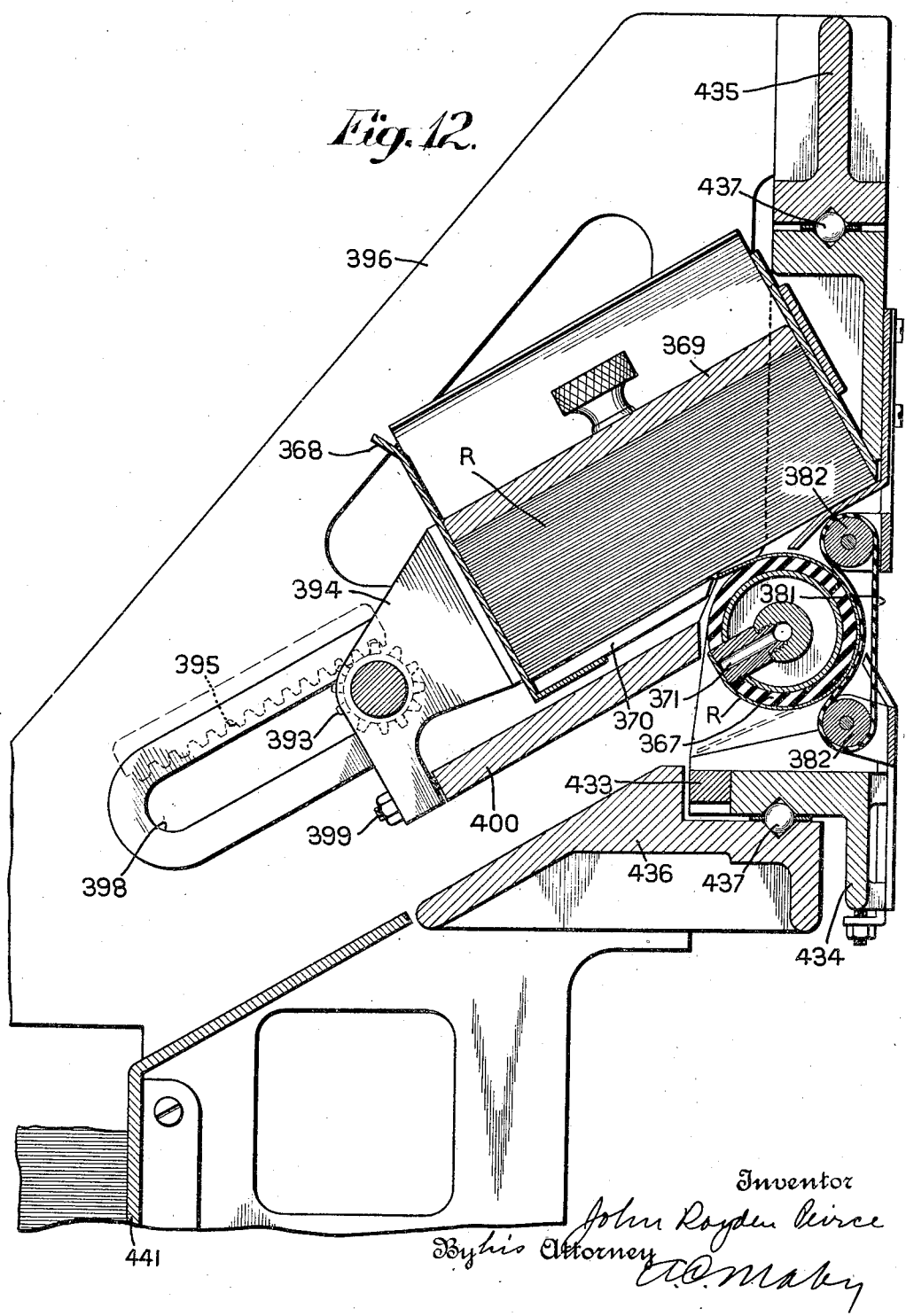

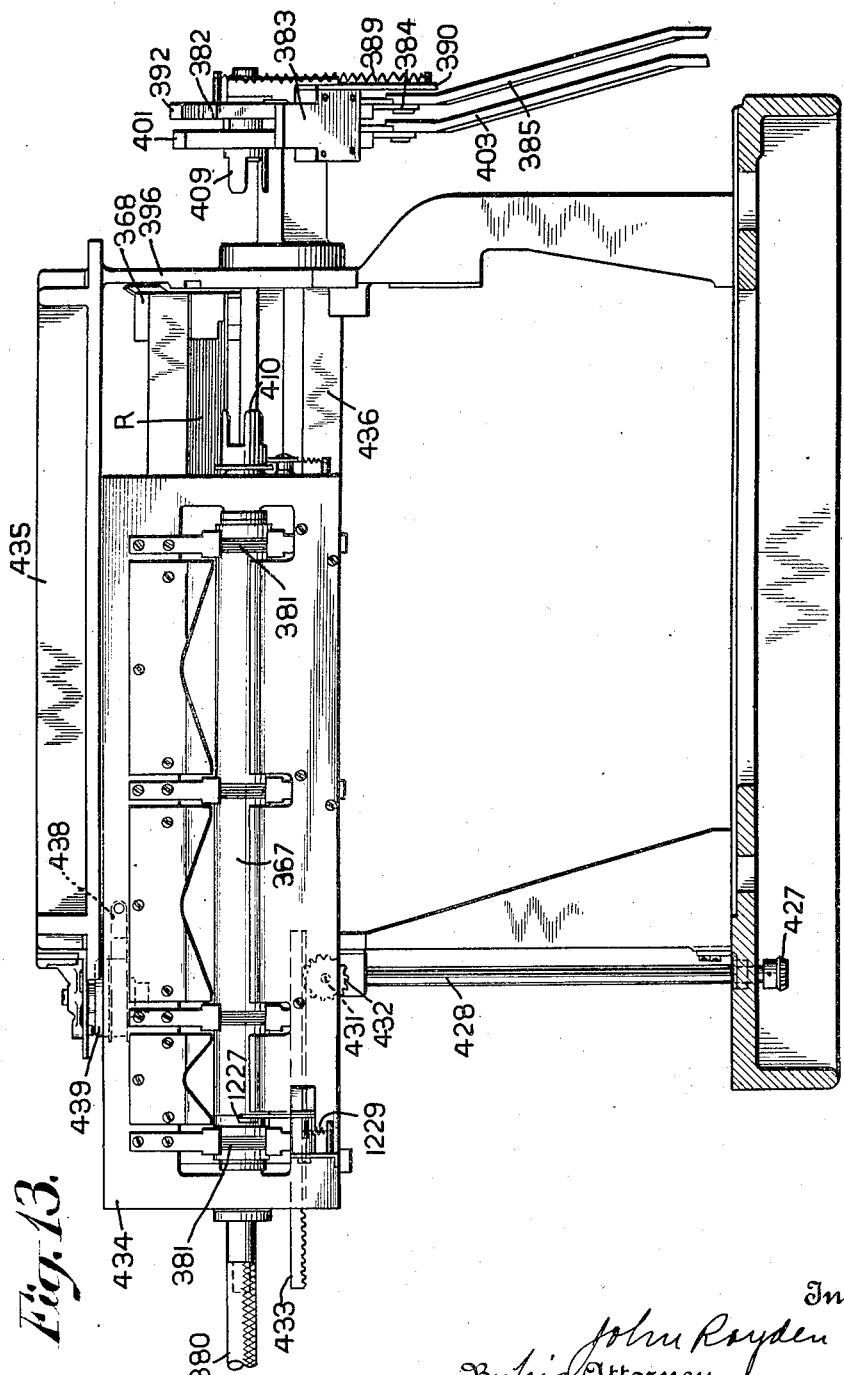

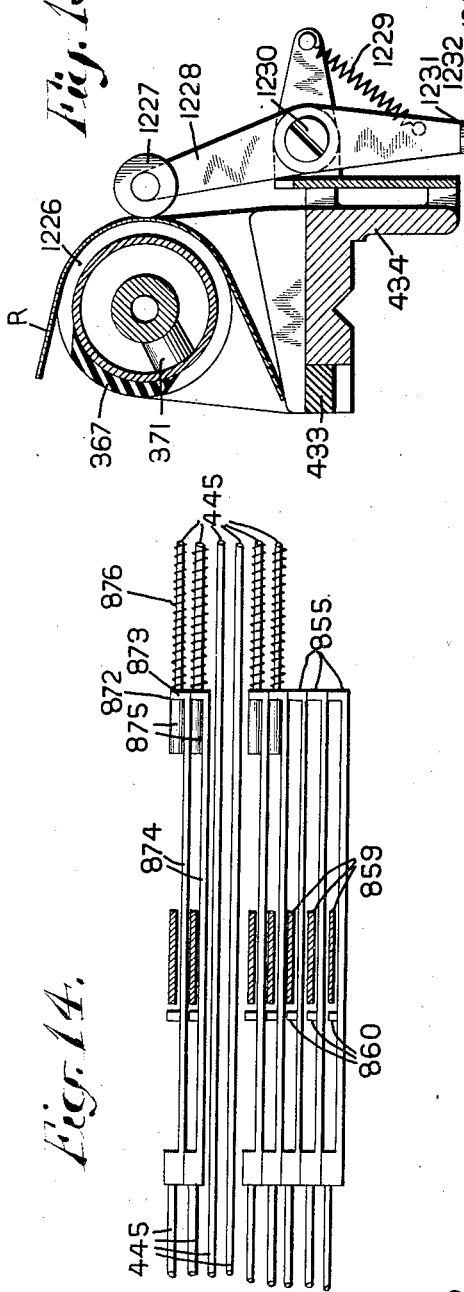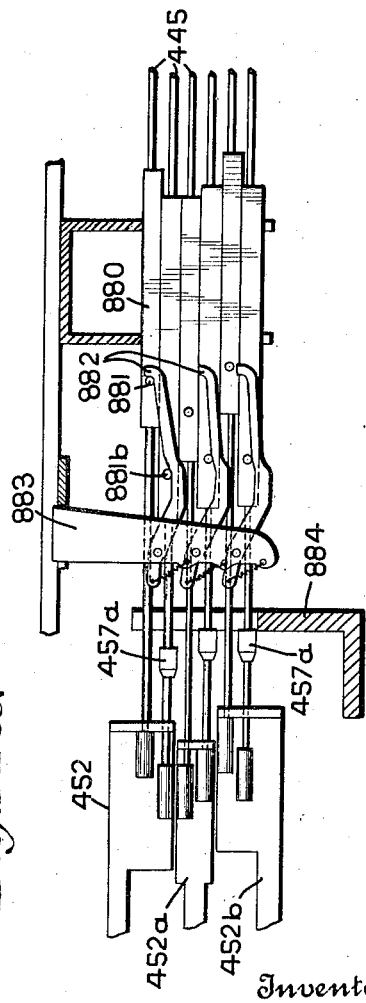

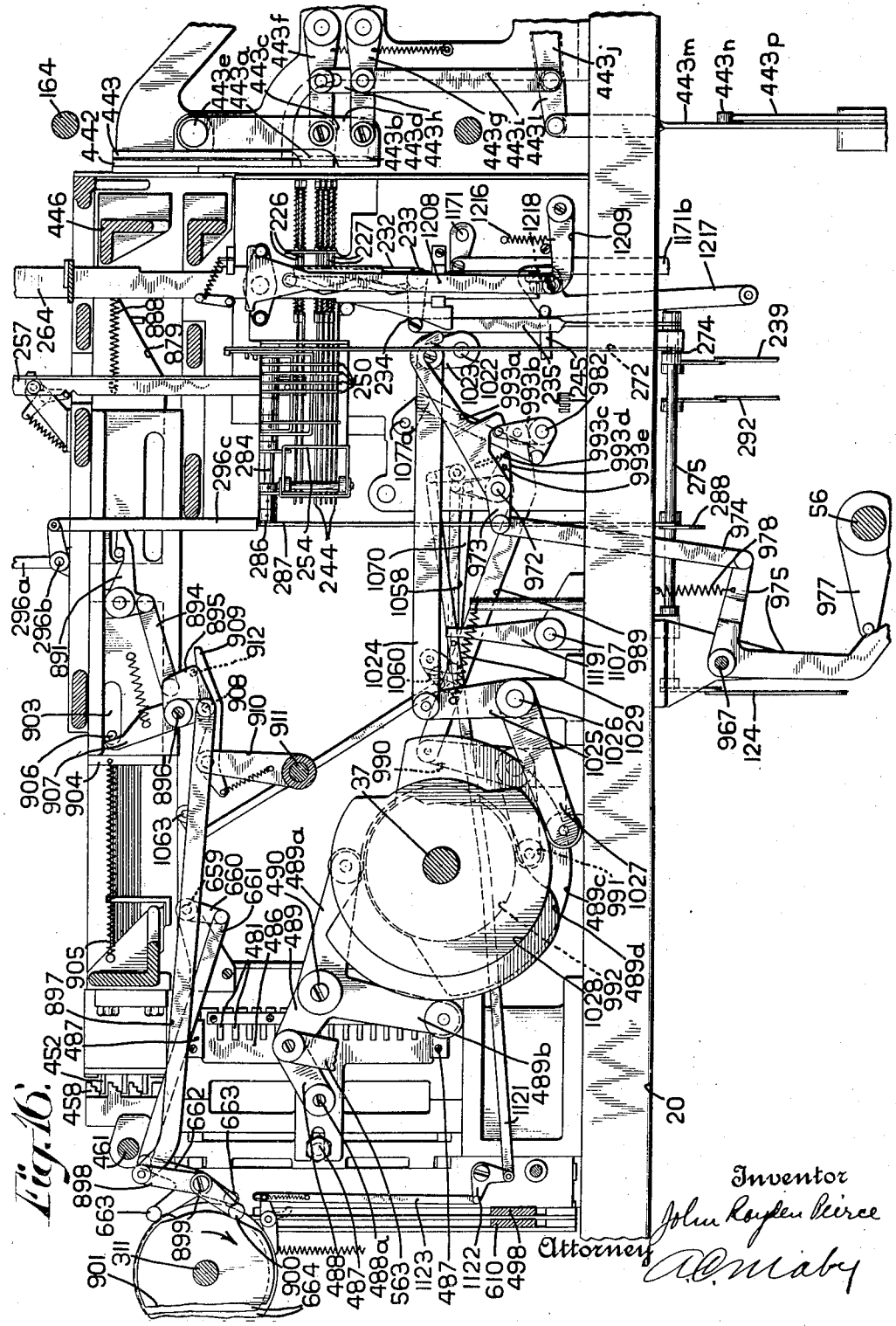

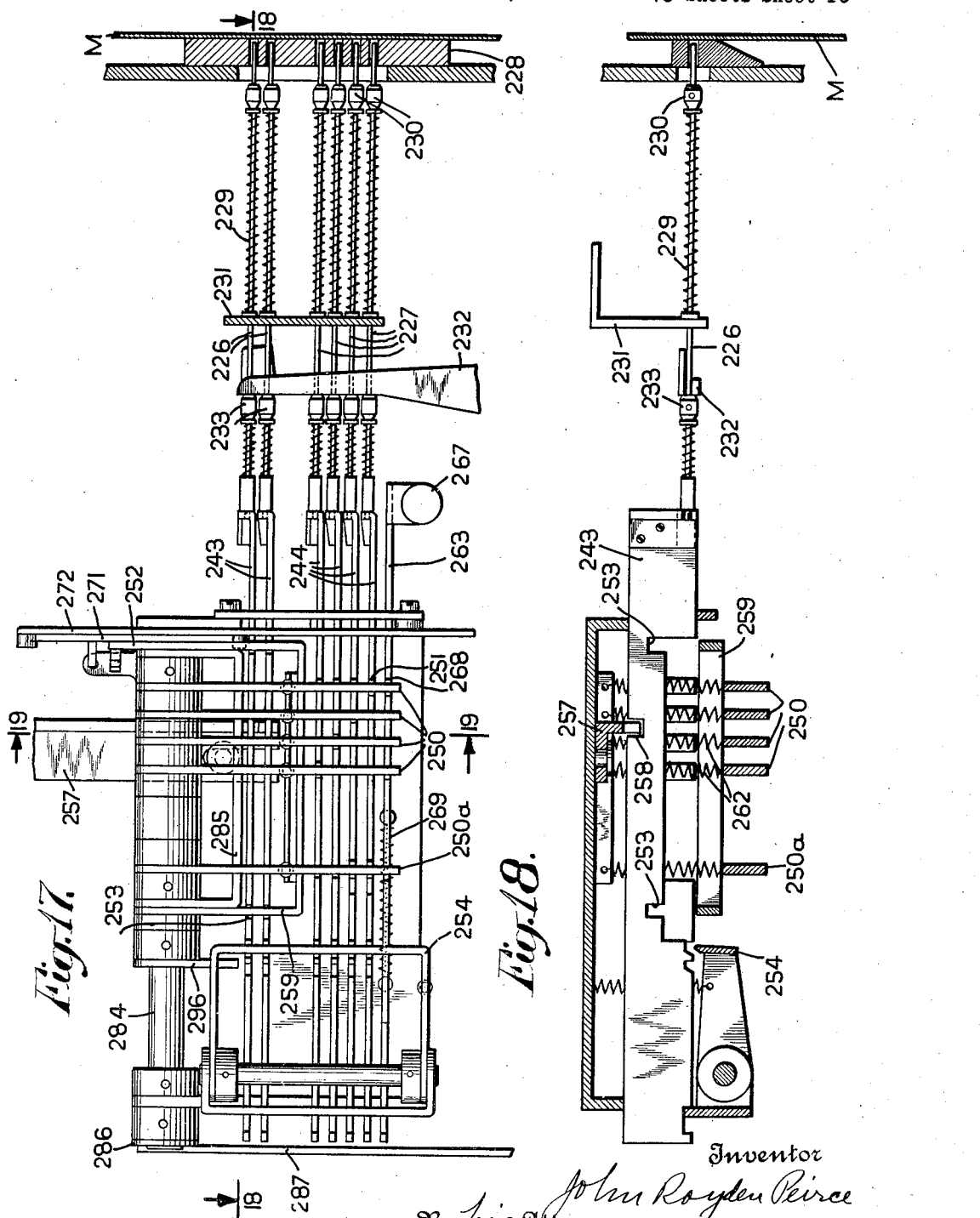

Feb. 13, 1934.   J. R. PEIRCE   1,946,915
PERFORATED RECORD CONTROLLED ACCOUNTING MACHINE
Filed Nov. 27, 1929   78 Sheets-Sheet 20

Inventor
John Royden Peirce
By his Attorney
A. C. Maby

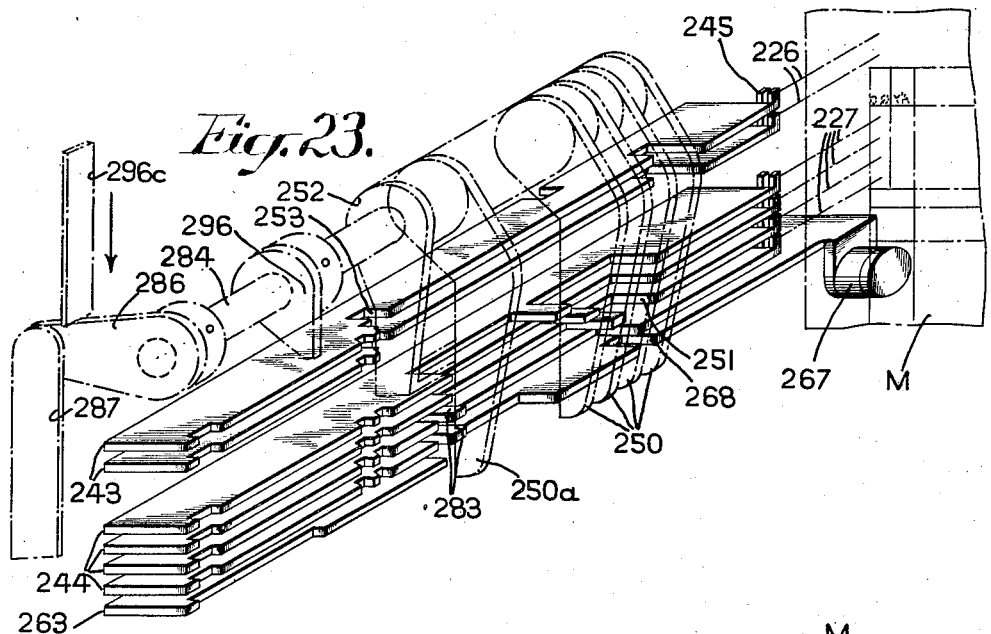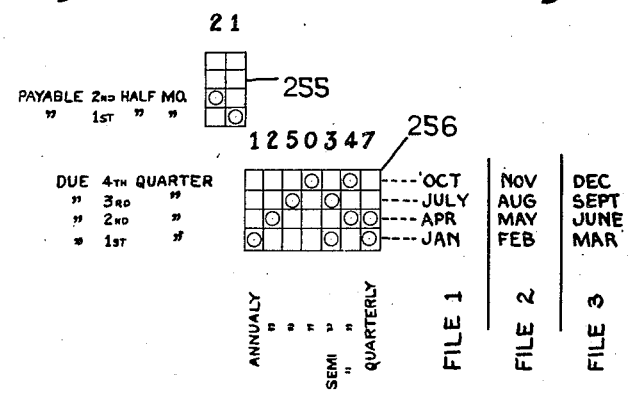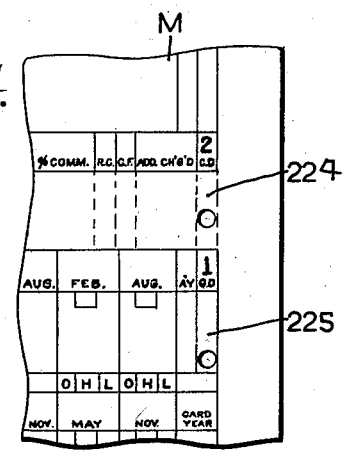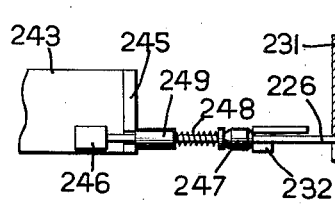

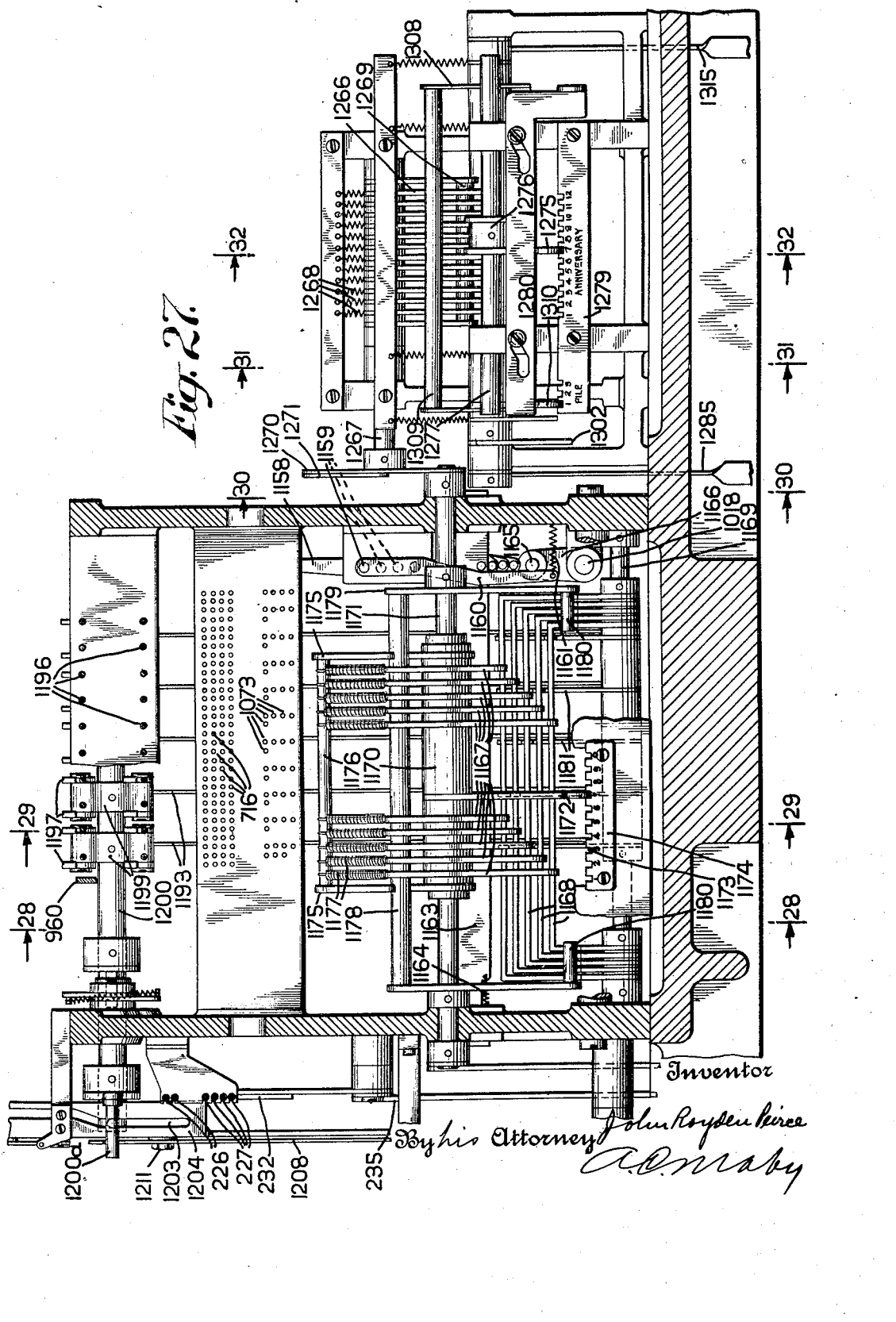

Feb. 13, 1934.   J. R. PEIRCE   1,946,915
PERFORATED RECORD CONTROLLED ACCOUNTING MACHINE
Filed Nov. 27, 1929   78 Sheets-Sheet 24

Feb. 13, 1934.    J. R. PEIRCE    1,946,915
PERFORATED RECORD CONTROLLED ACCOUNTING MACHINE
Filed Nov. 27, 1929    78 Sheets-Sheet 25

Feb. 13, 1934.   J. R. PEIRCE   1,946,915
PERFORATED RECORD CONTROLLED ACCOUNTING MACHINE
Filed Nov. 27, 1929   78 Sheets-Sheet 26

Inventor
John Royden Peirce
By his Attorney

Feb. 13, 1934. J. R. PEIRCE 1,946,915
PERFORATED RECORD CONTROLLED ACCOUNTING MACHINE
Filed Nov. 27, 1929 78 Sheets-Sheet 27

Inventor
John Royden Peirce
By his Attorney
A. C. Maby

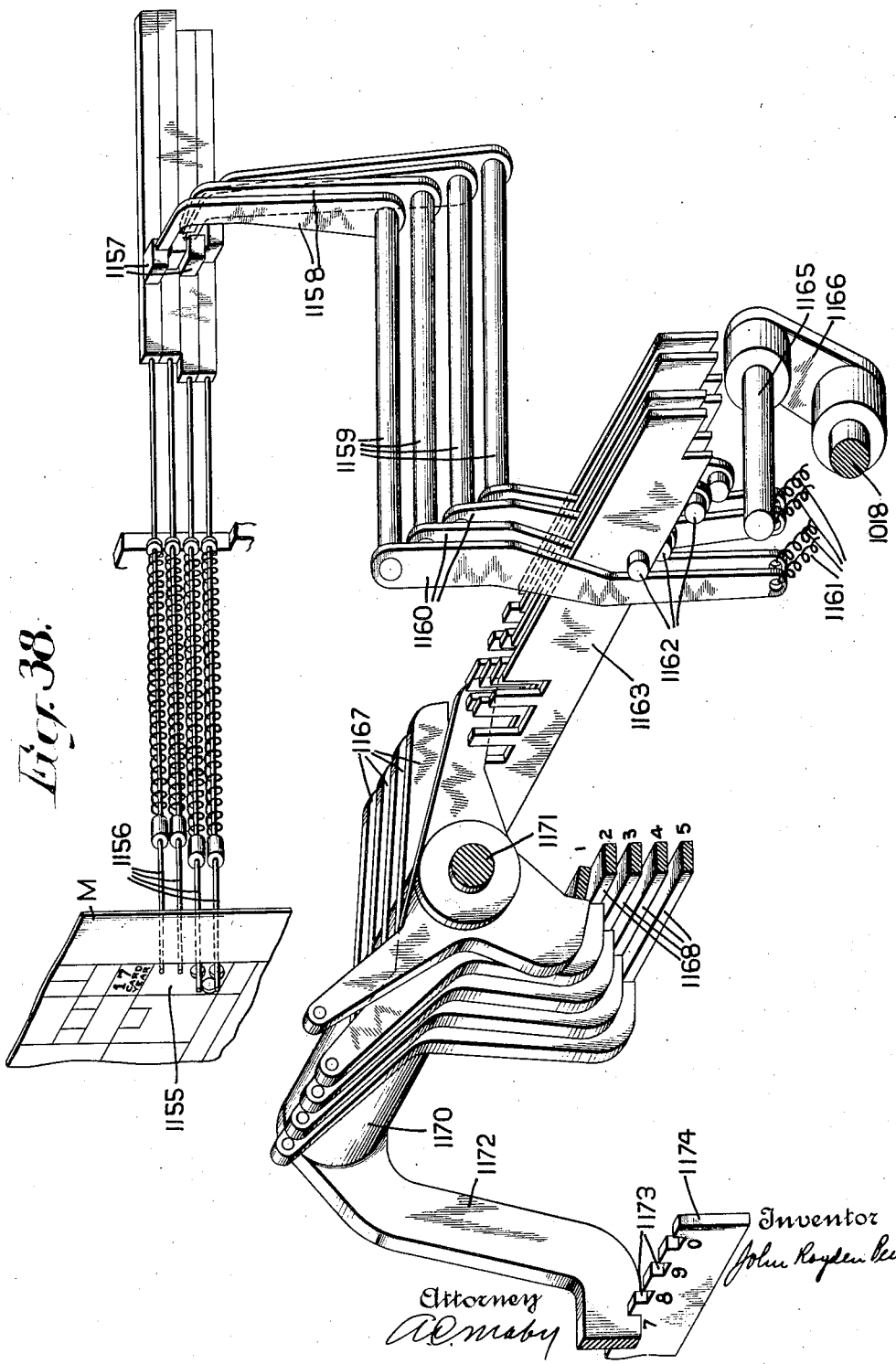

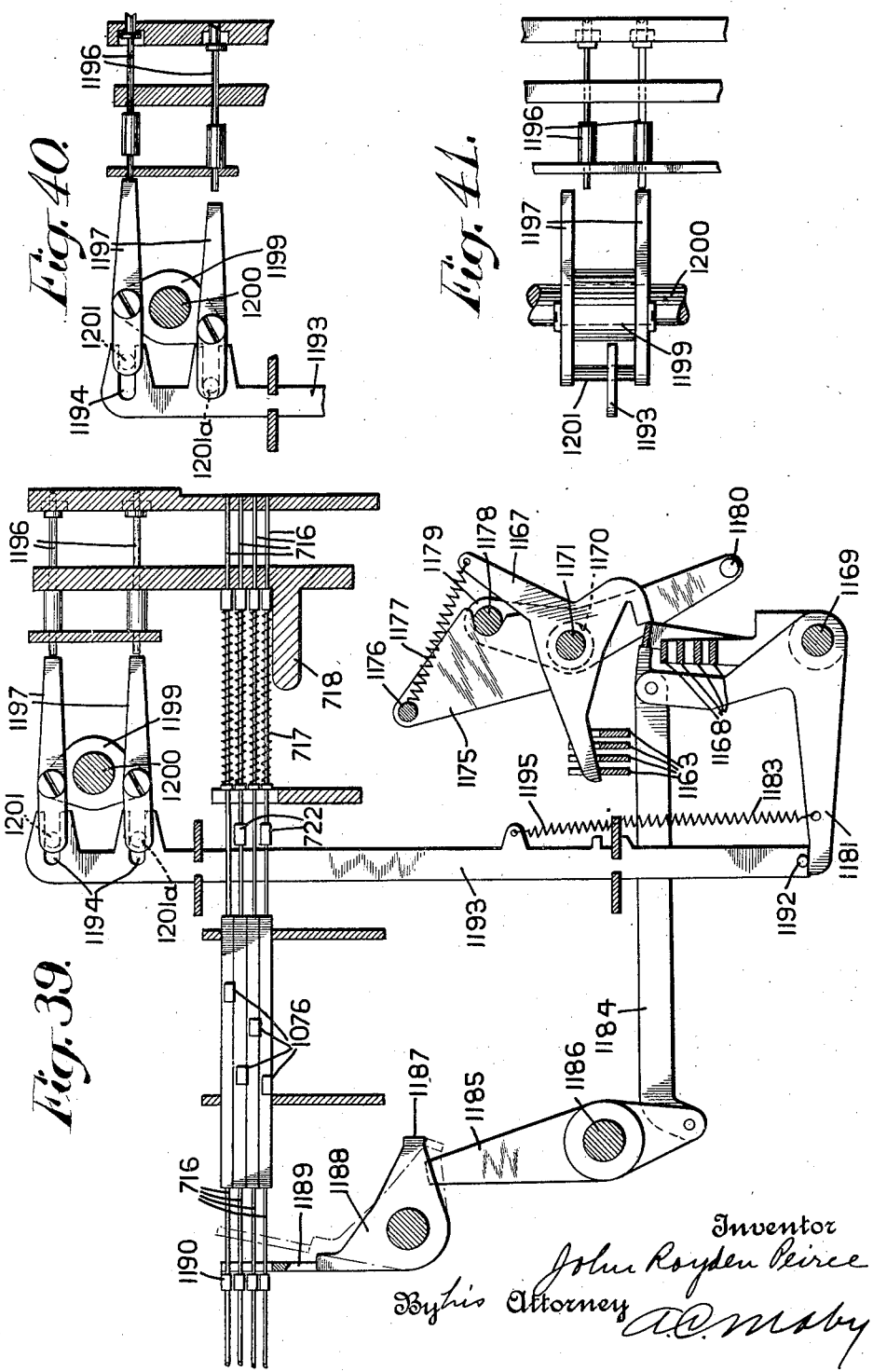

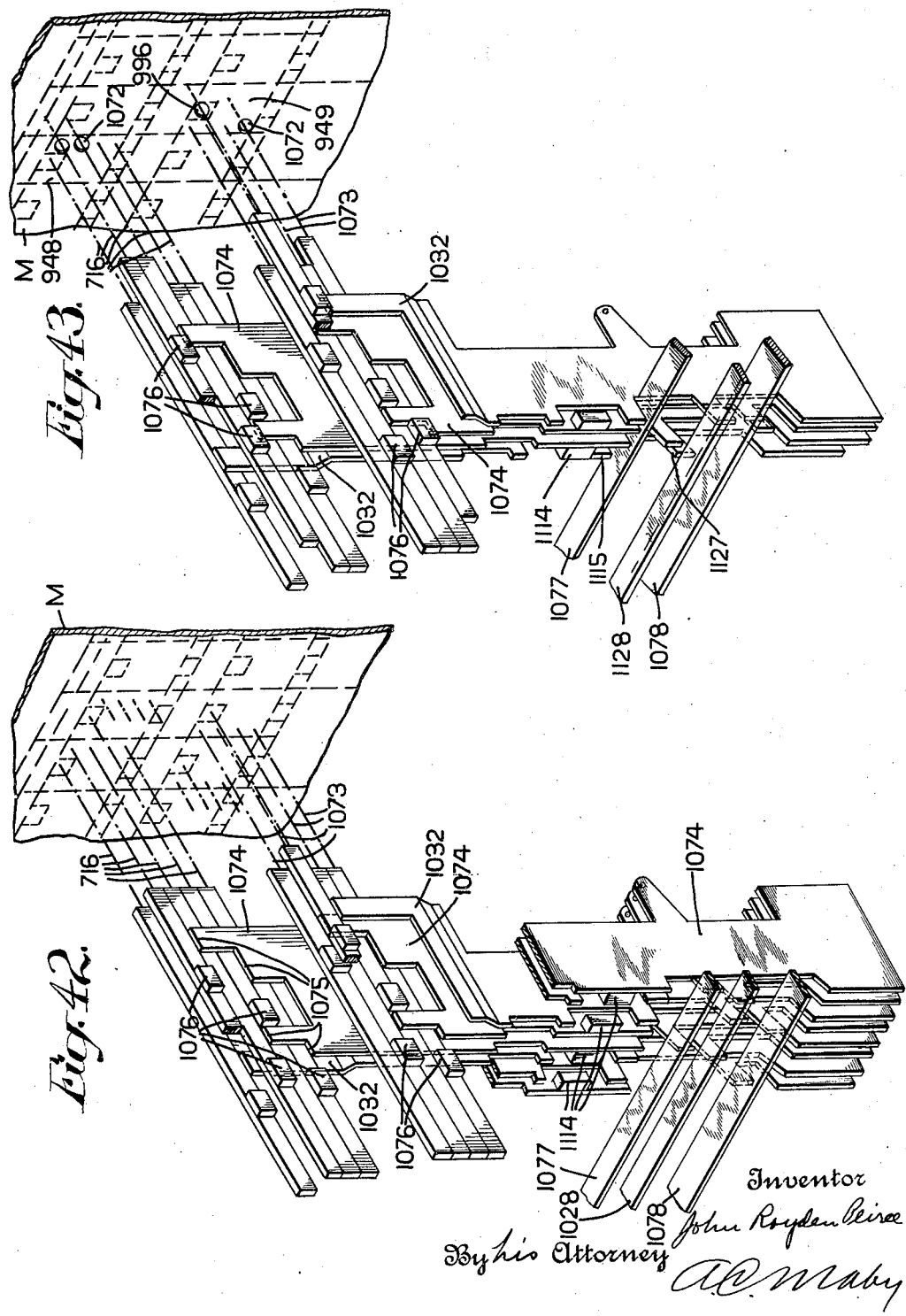

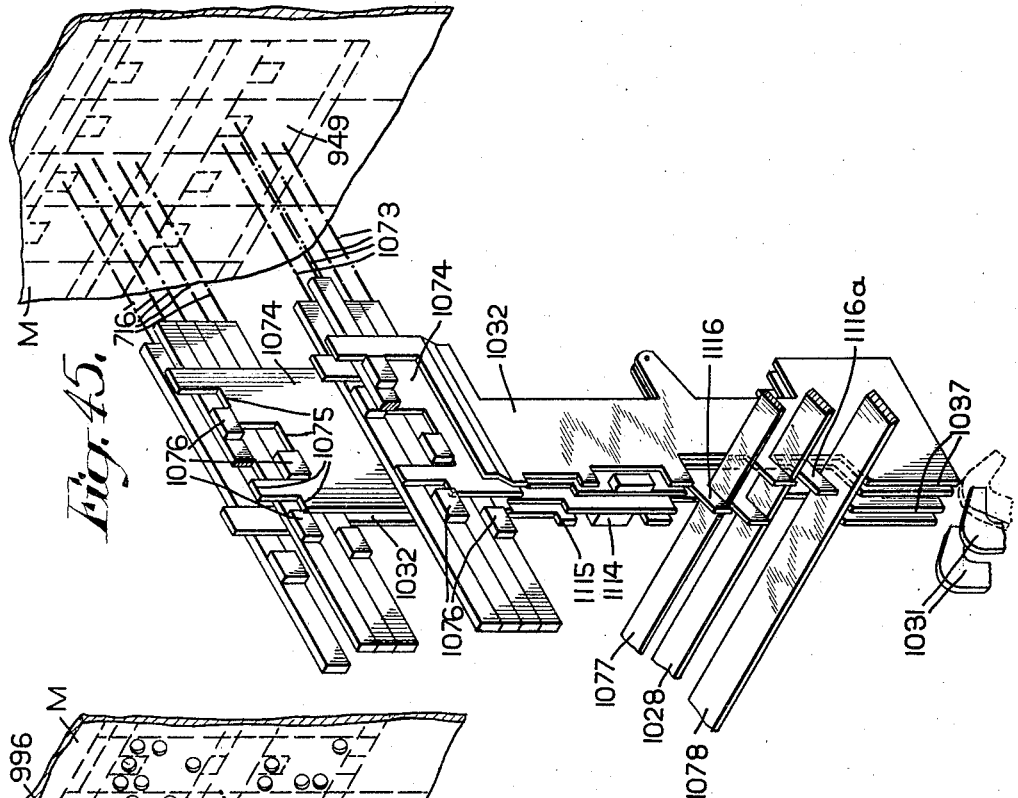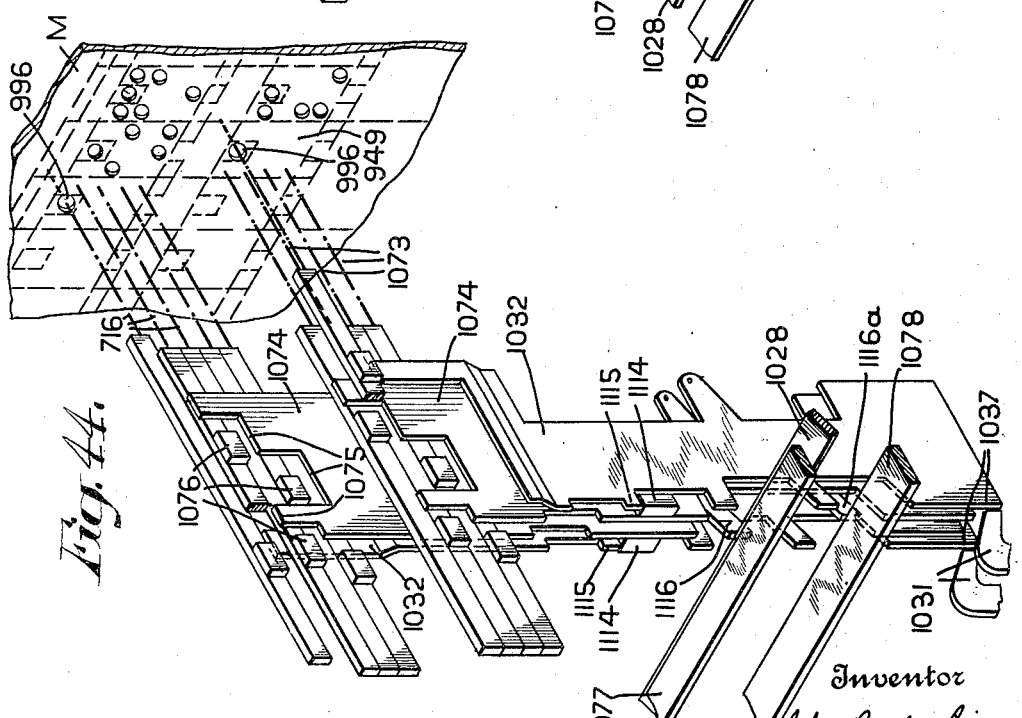

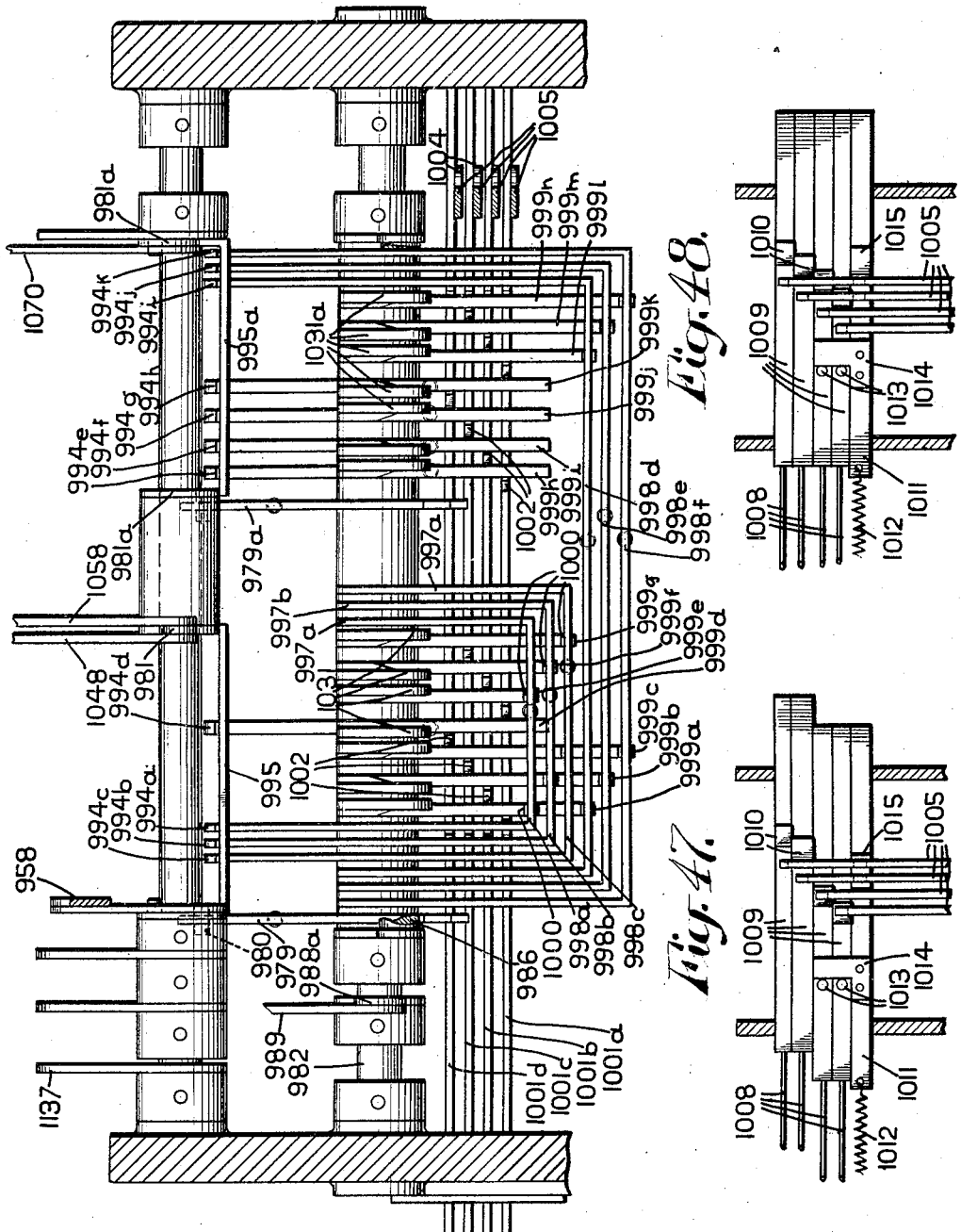

Feb. 13, 1934. J. R. PEIRCE 1,946,915
PERFORATED RECORD CONTROLLED ACCOUNTING MACHINE
Filed Nov. 27, 1929 78 Sheets-Sheet 35
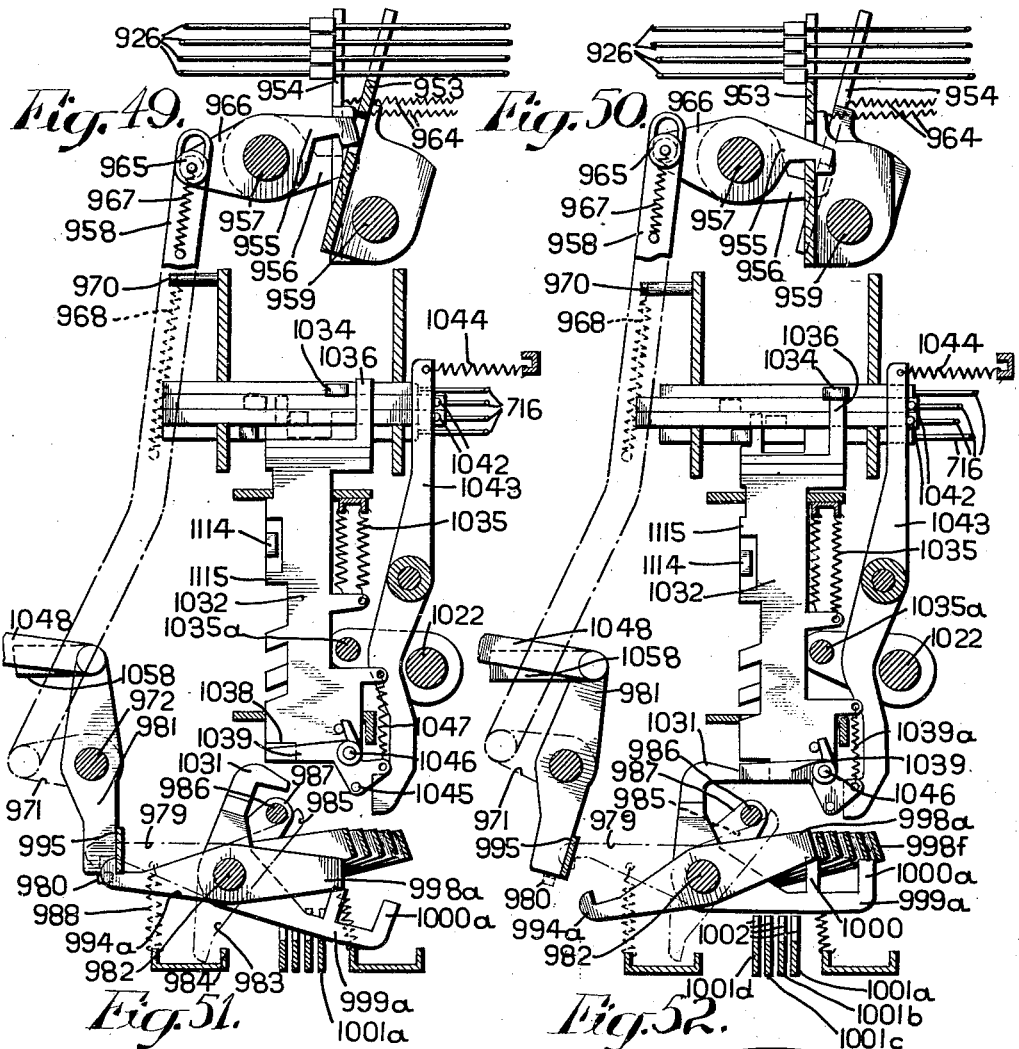
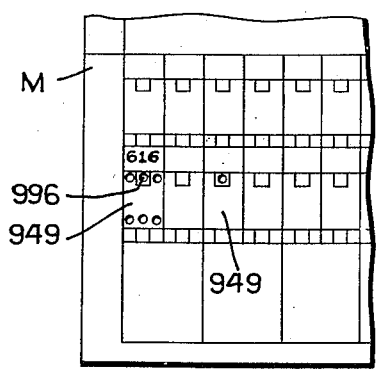
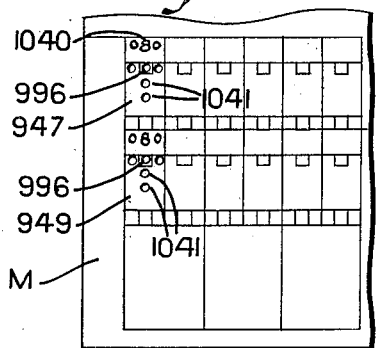
Inventor
John Royden Peirce
By his Attorney

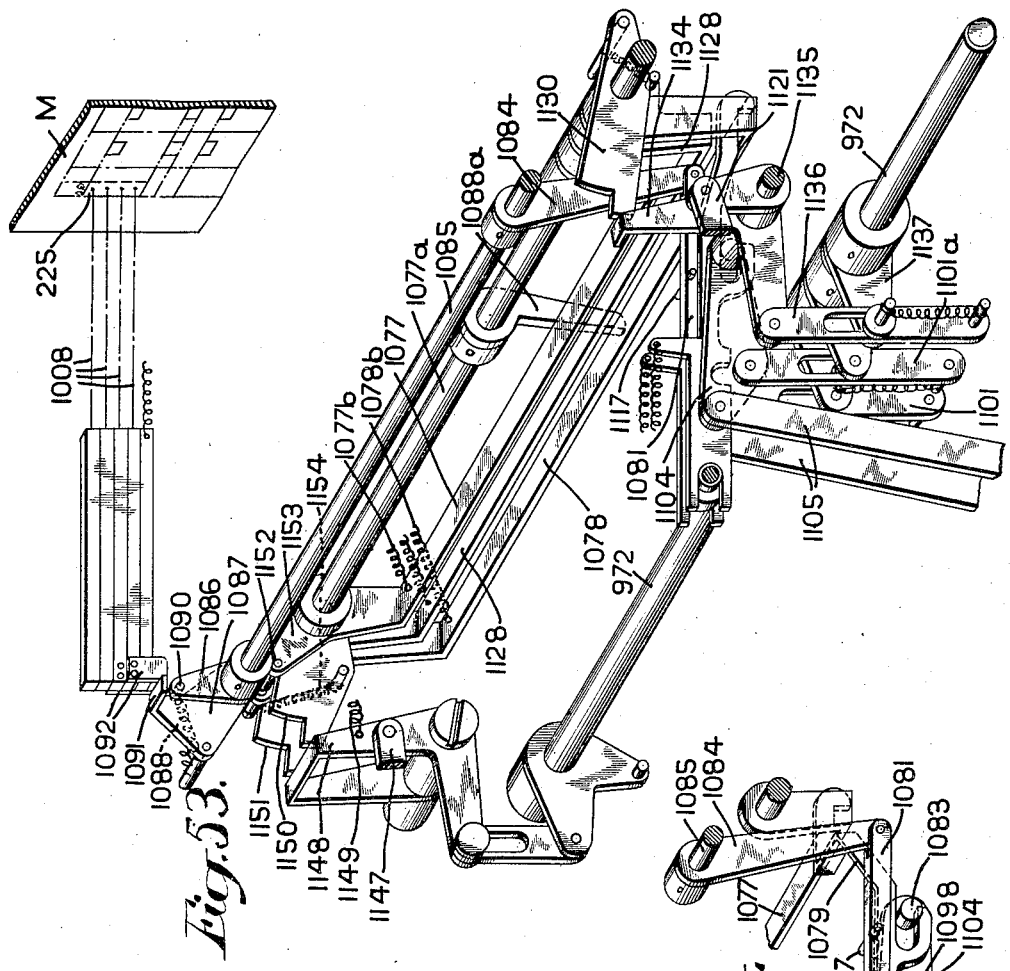

Feb. 13, 1934.  J. R. PEIRCE  1,946,915
PERFORATED RECORD CONTROLLED ACCOUNTING MACHINE
Filed Nov. 27, 1929  78 Sheets-Sheet 37
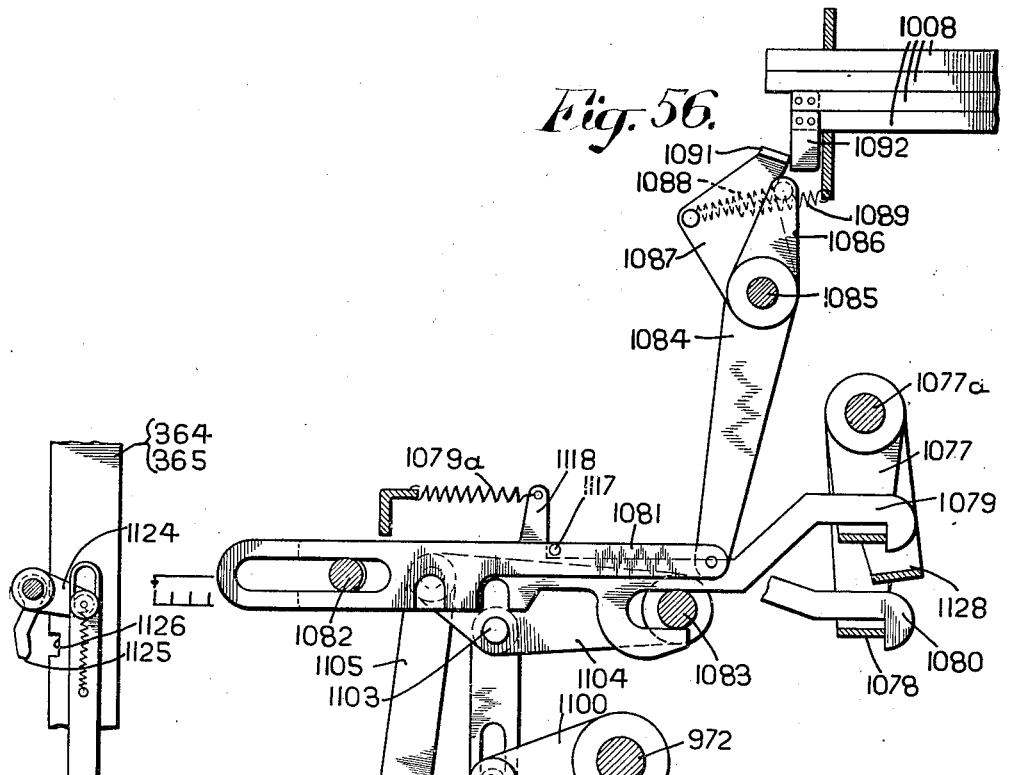
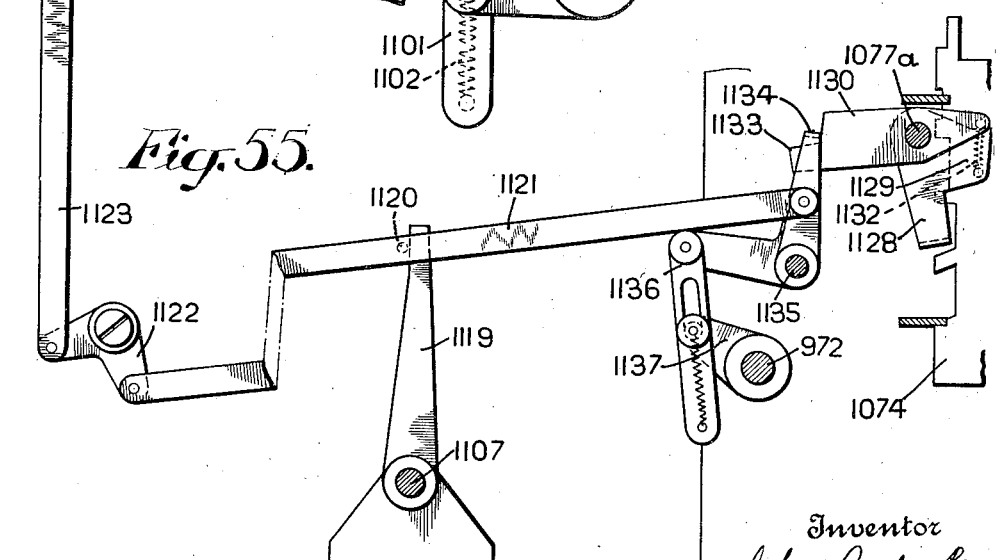

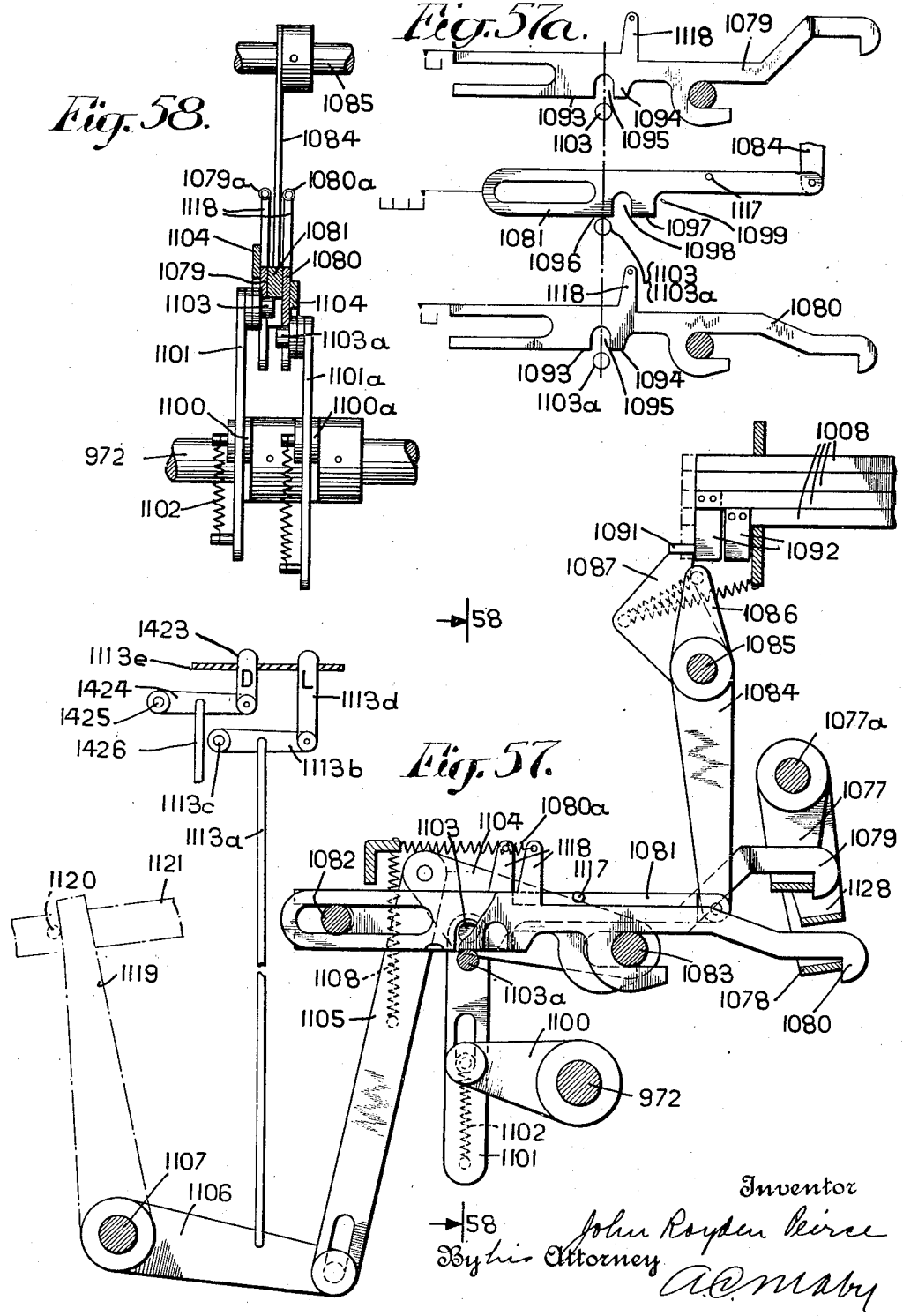

Feb. 13, 1934. J. R. PEIRCE 1,946,915
PERFORATED RECORD CONTROLLED ACCOUNTING MACHINE
Filed Nov. 27, 1929 78 Sheets-Sheet 39

Inventor
John Royden Peirce
By his Attorney

Feb. 13, 1934.                J. R. PEIRCE                 1,946,915
            PERFORATED RECORD CONTROLLED ACCOUNTING MACHINE
                 Filed Nov. 27, 1929      78 Sheets-Sheet 41
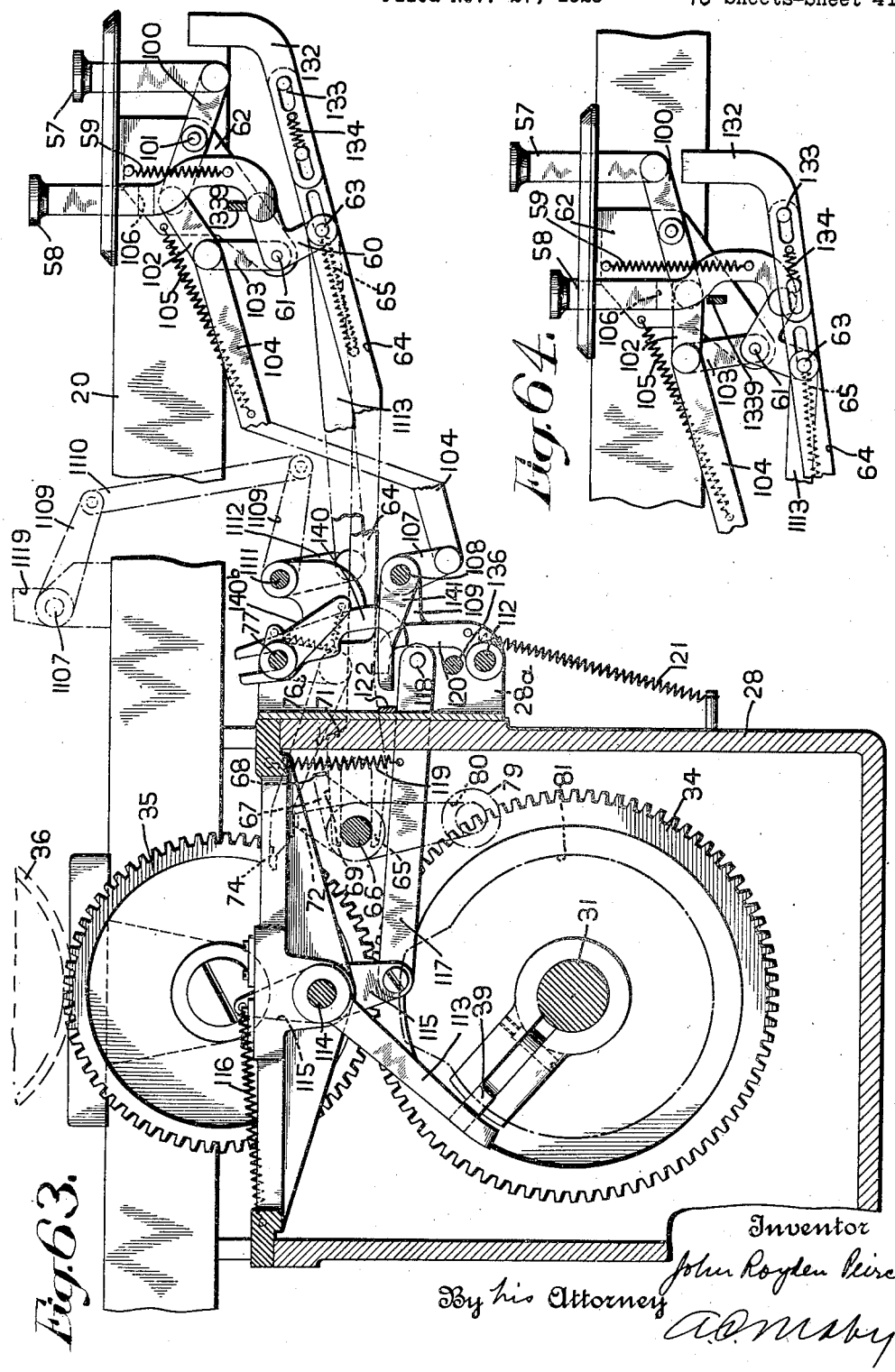

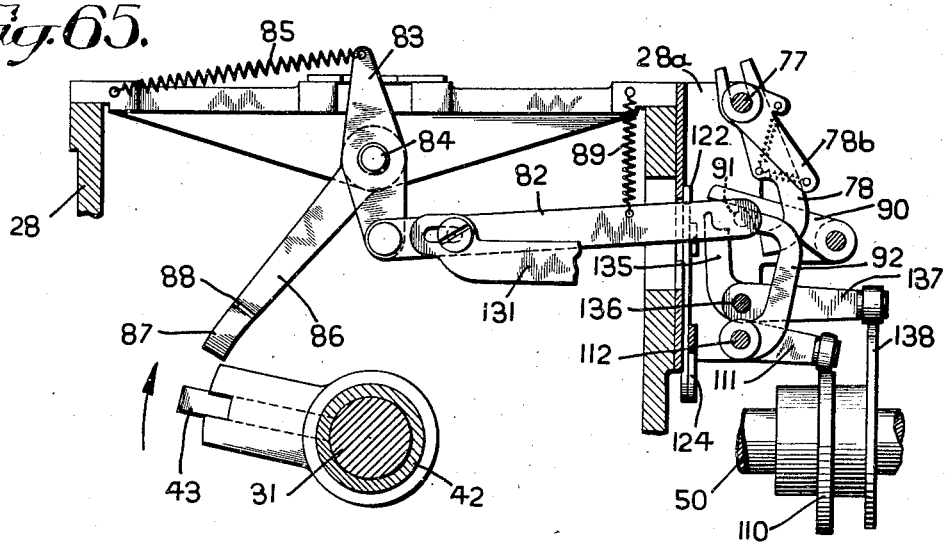

Feb. 13, 1934.    J. R. PEIRCE    1,946,915
PERFORATED RECORD CONTROLLED ACCOUNTING MACHINE
Filed Nov. 27, 1929    78 Sheets-Sheet 43
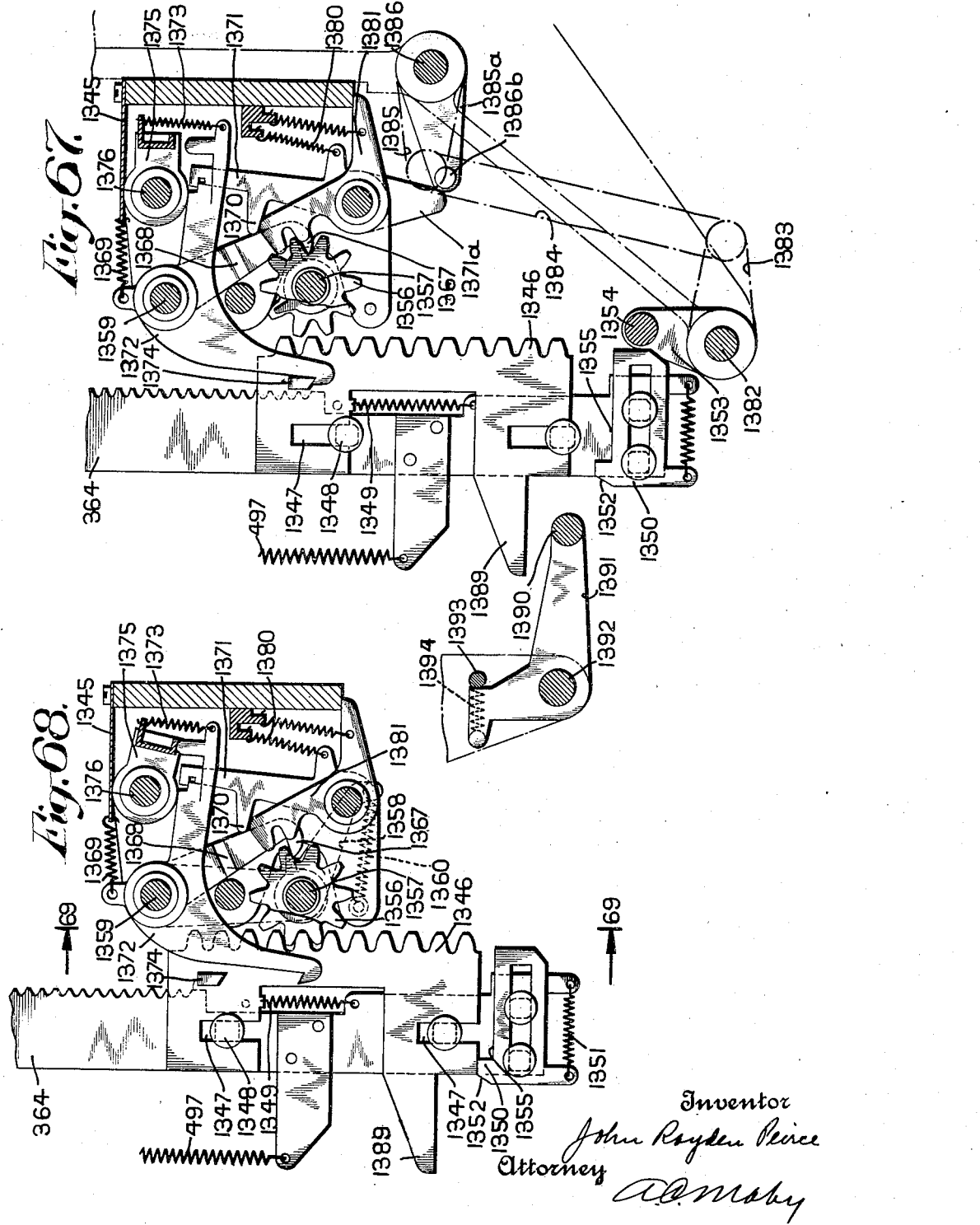
Inventor
John Royden Peirce
Attorney

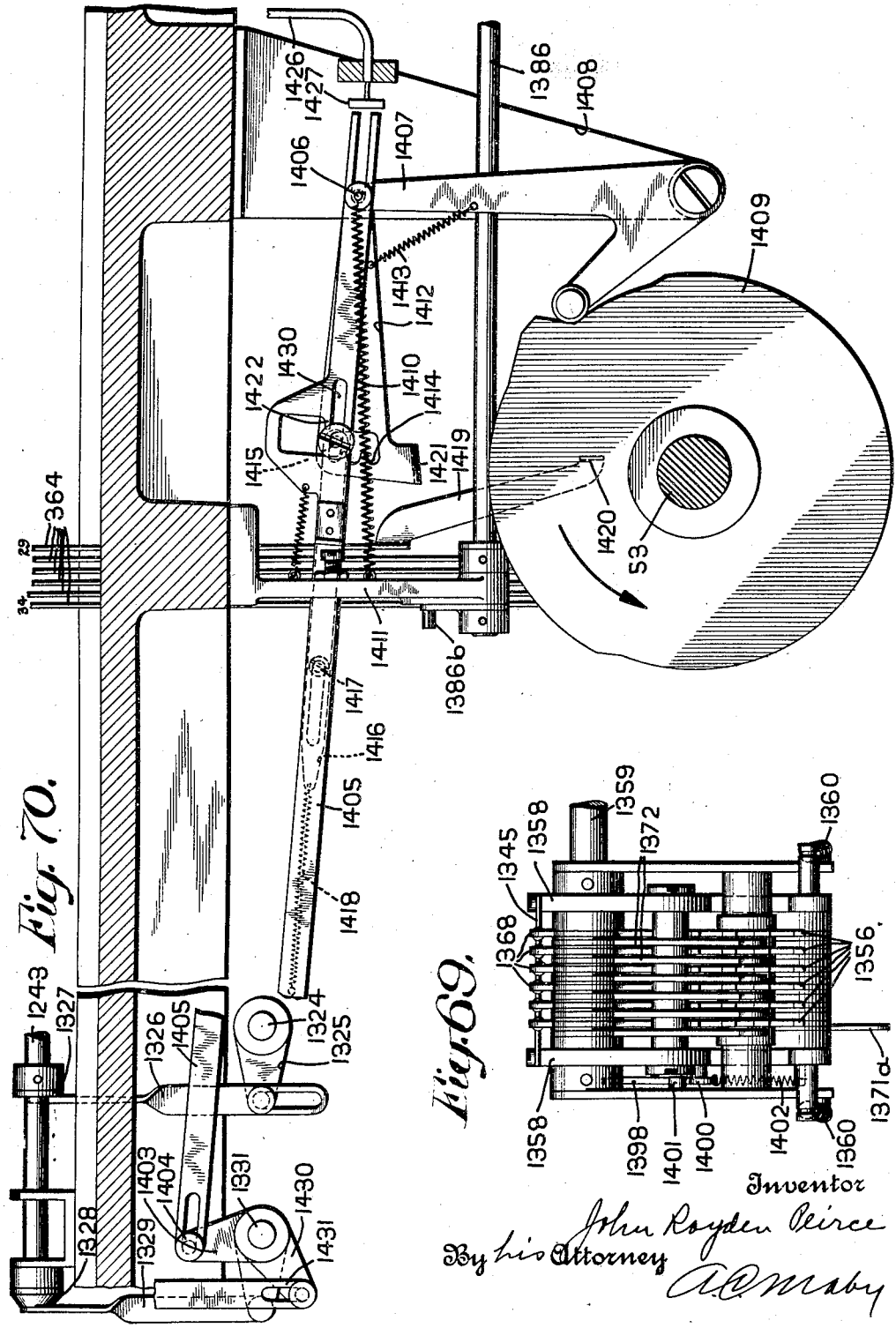

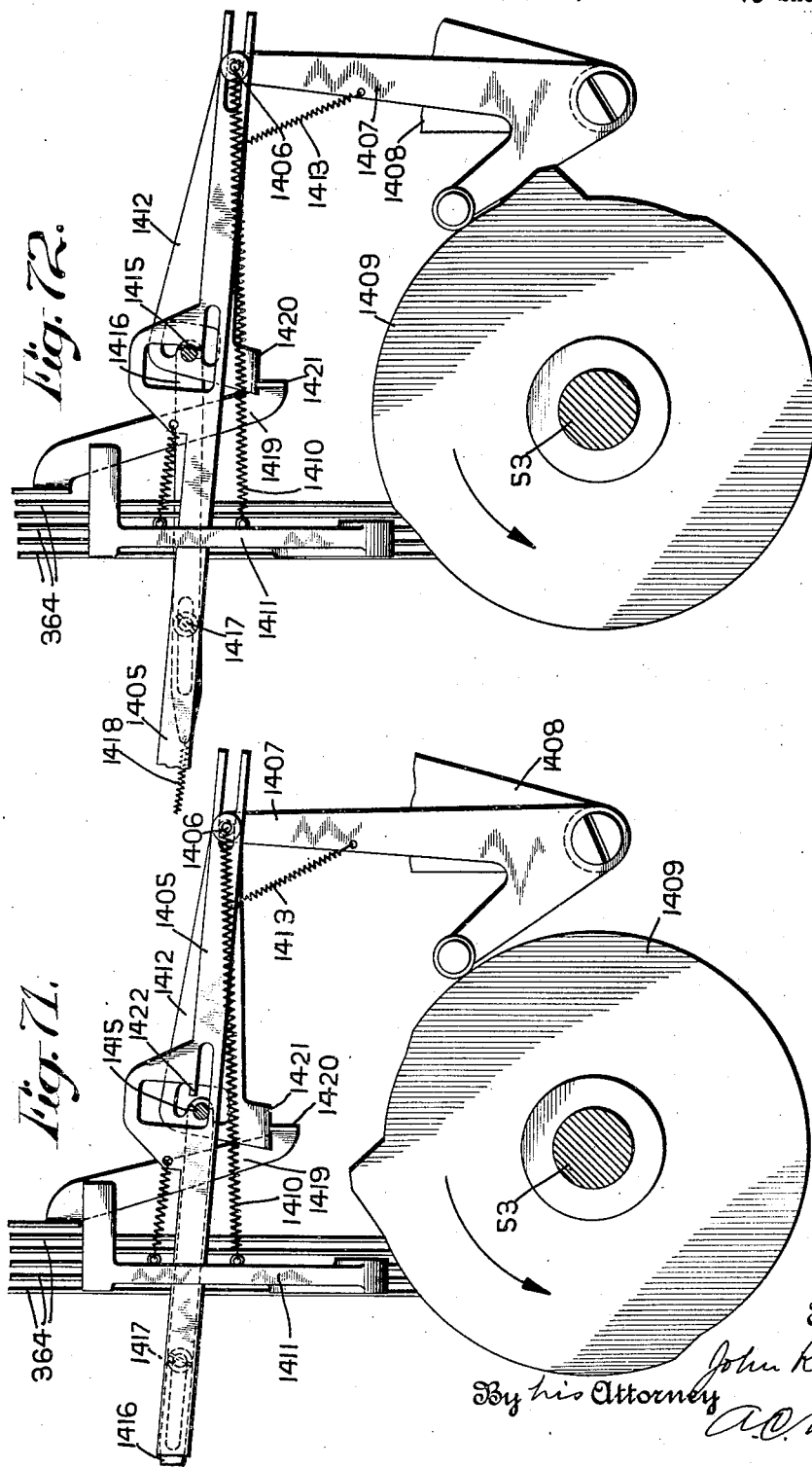

Inventor
John Royden Peirce
By his Attorney

Feb. 13, 1934. J. R. PEIRCE 1,946,915
PERFORATED RECORD CONTROLLED ACCOUNTING MACHINE
Filed Nov. 27, 1929 78 Sheets-Sheet 47
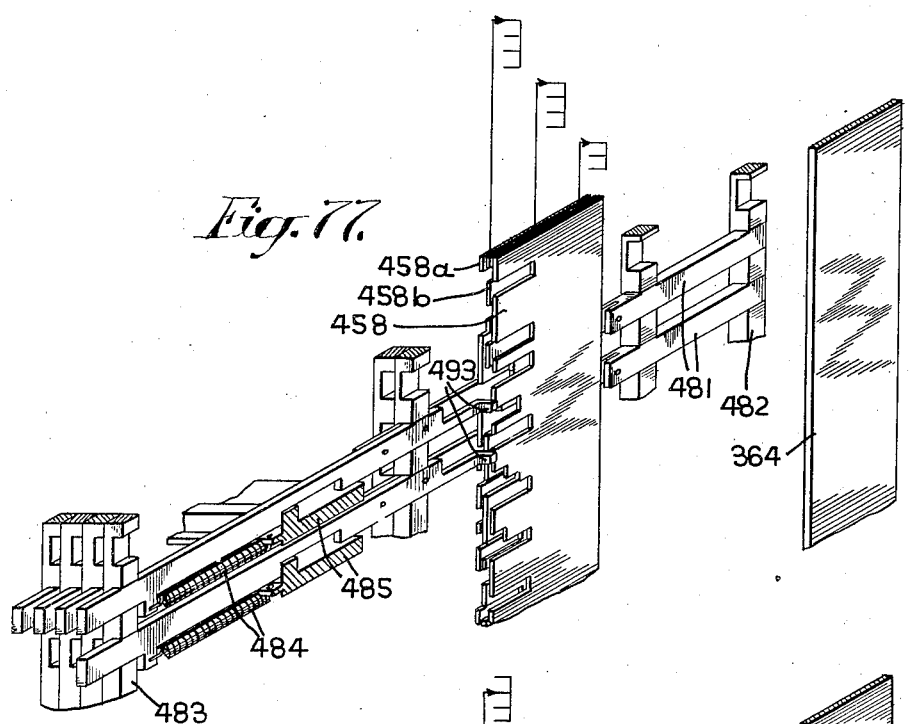
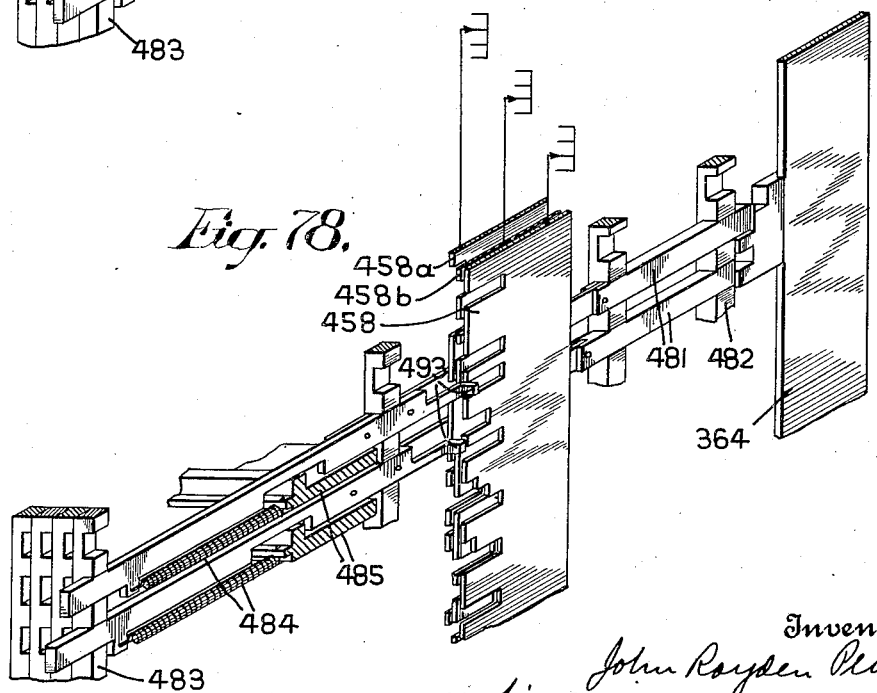

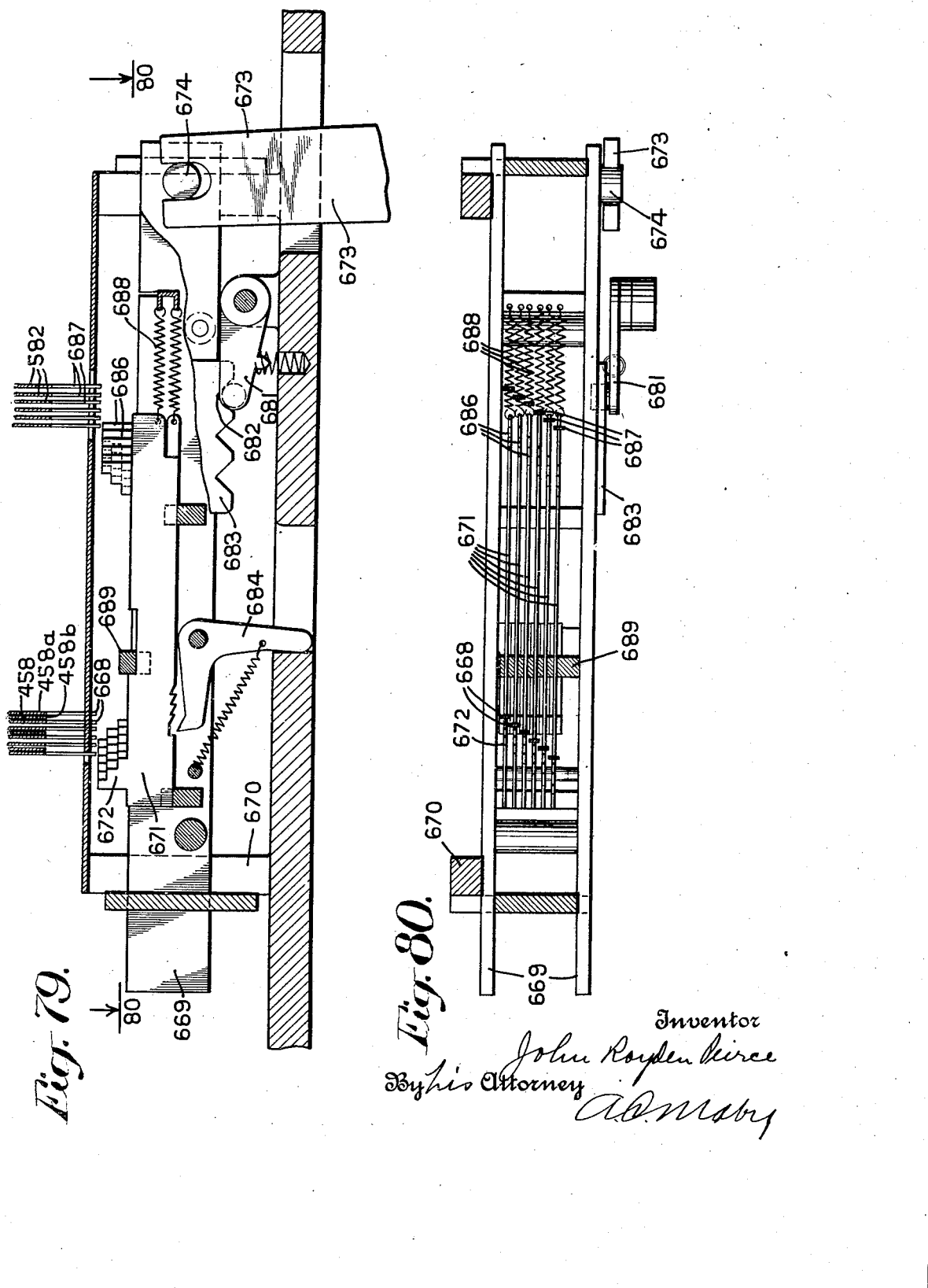

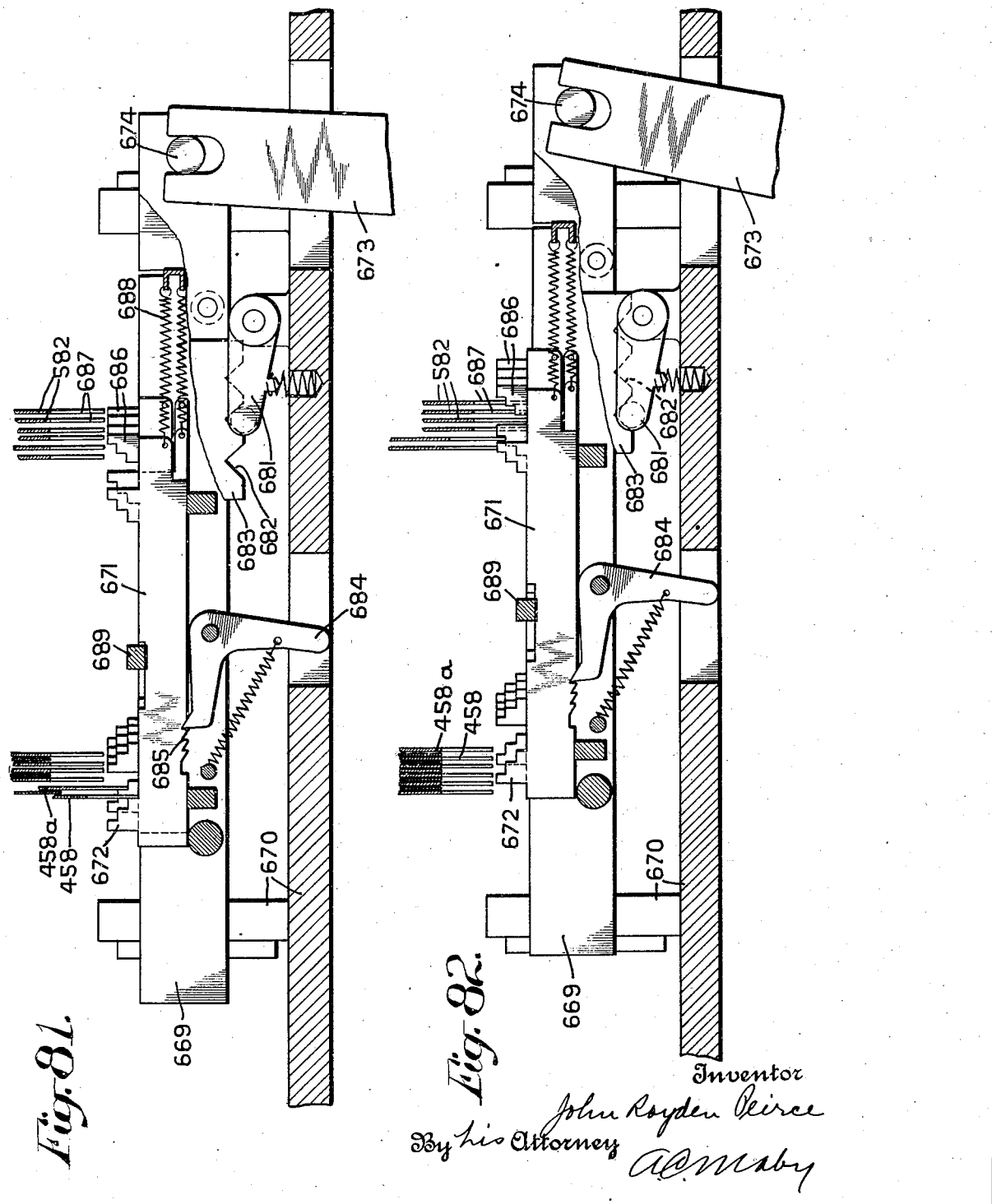

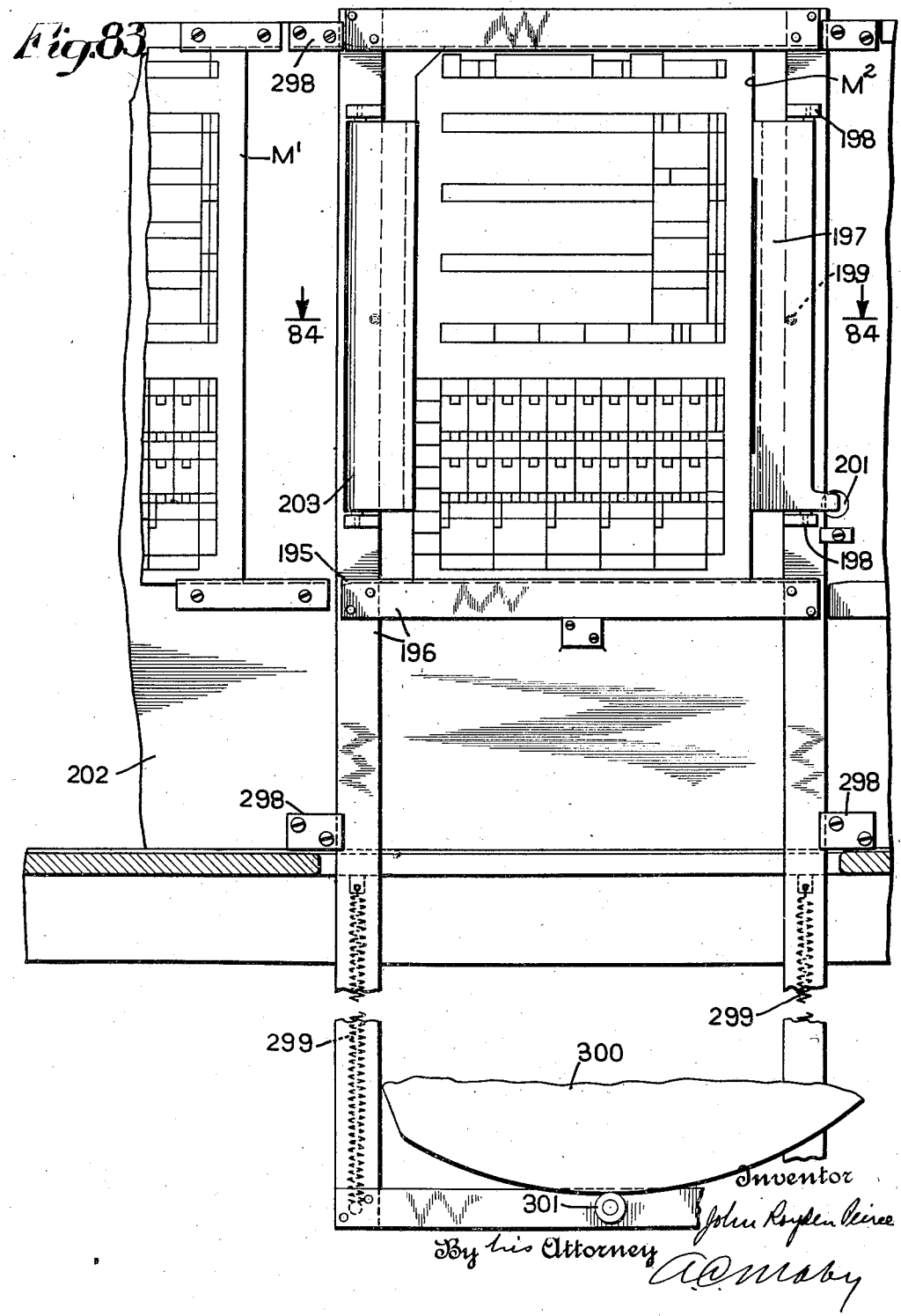

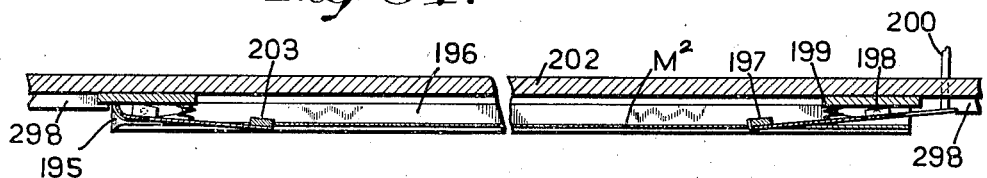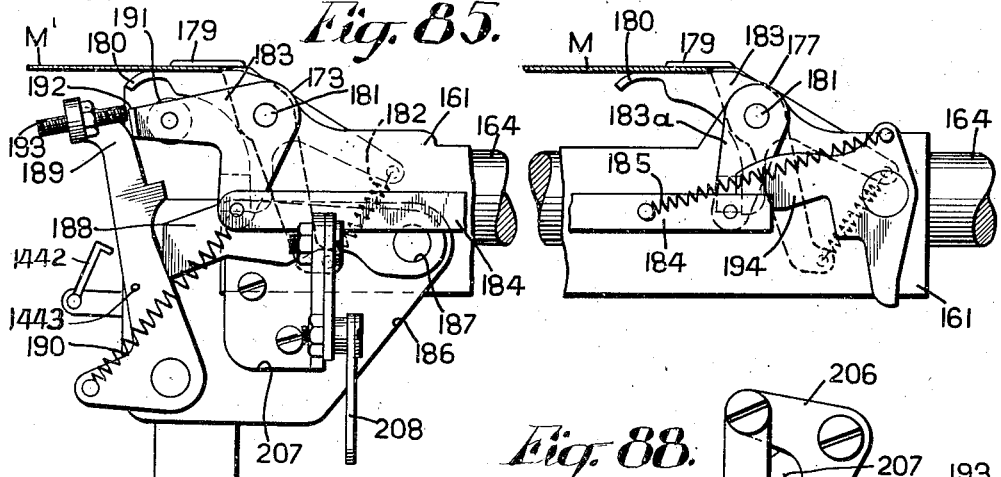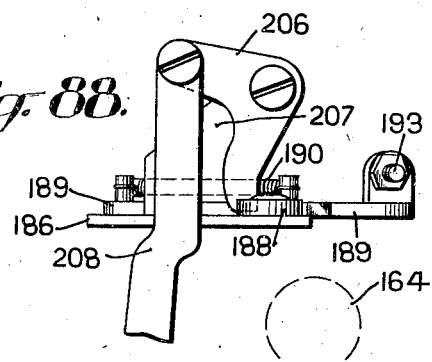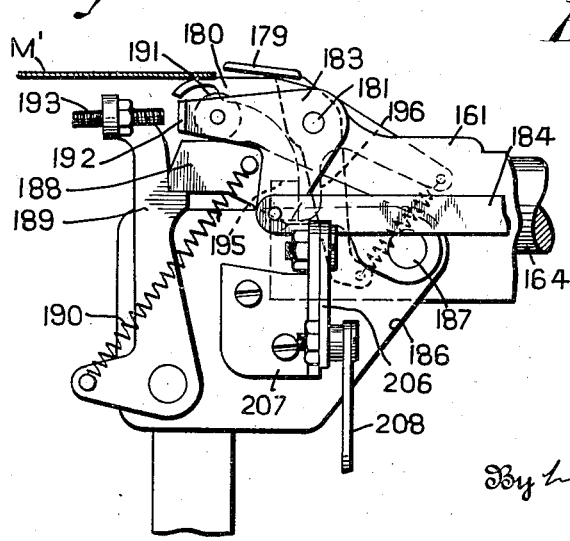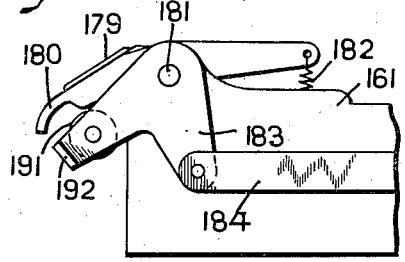

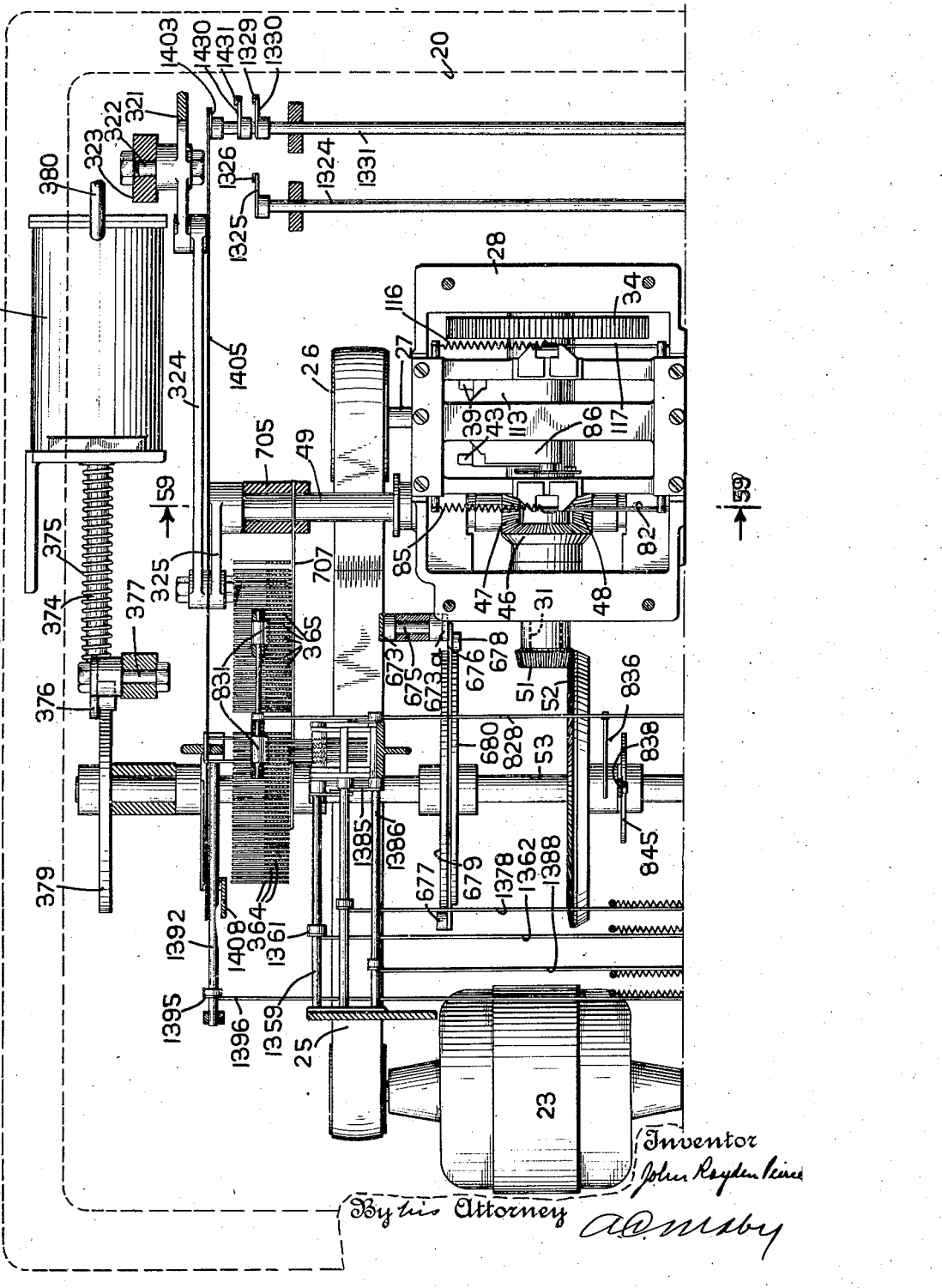

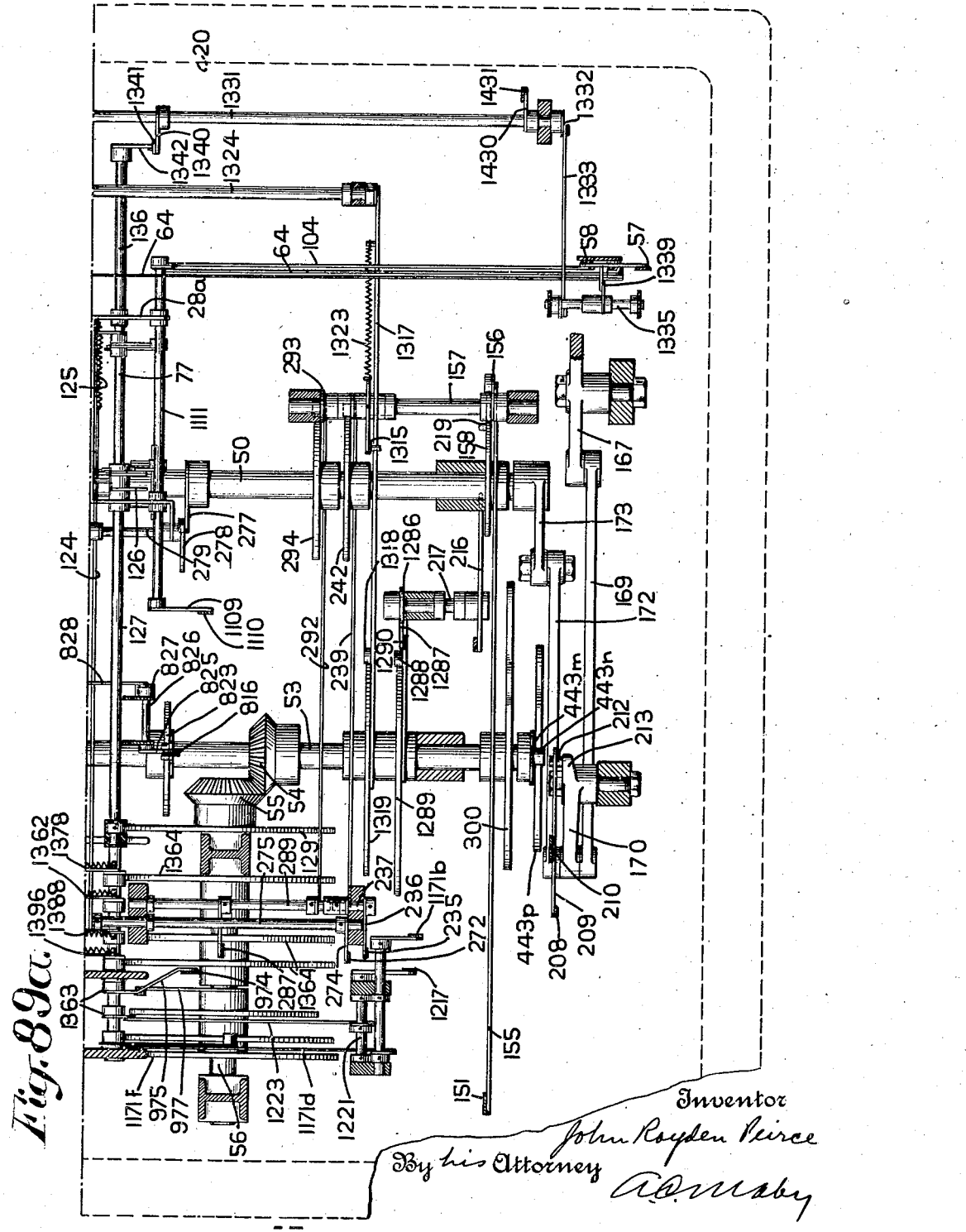

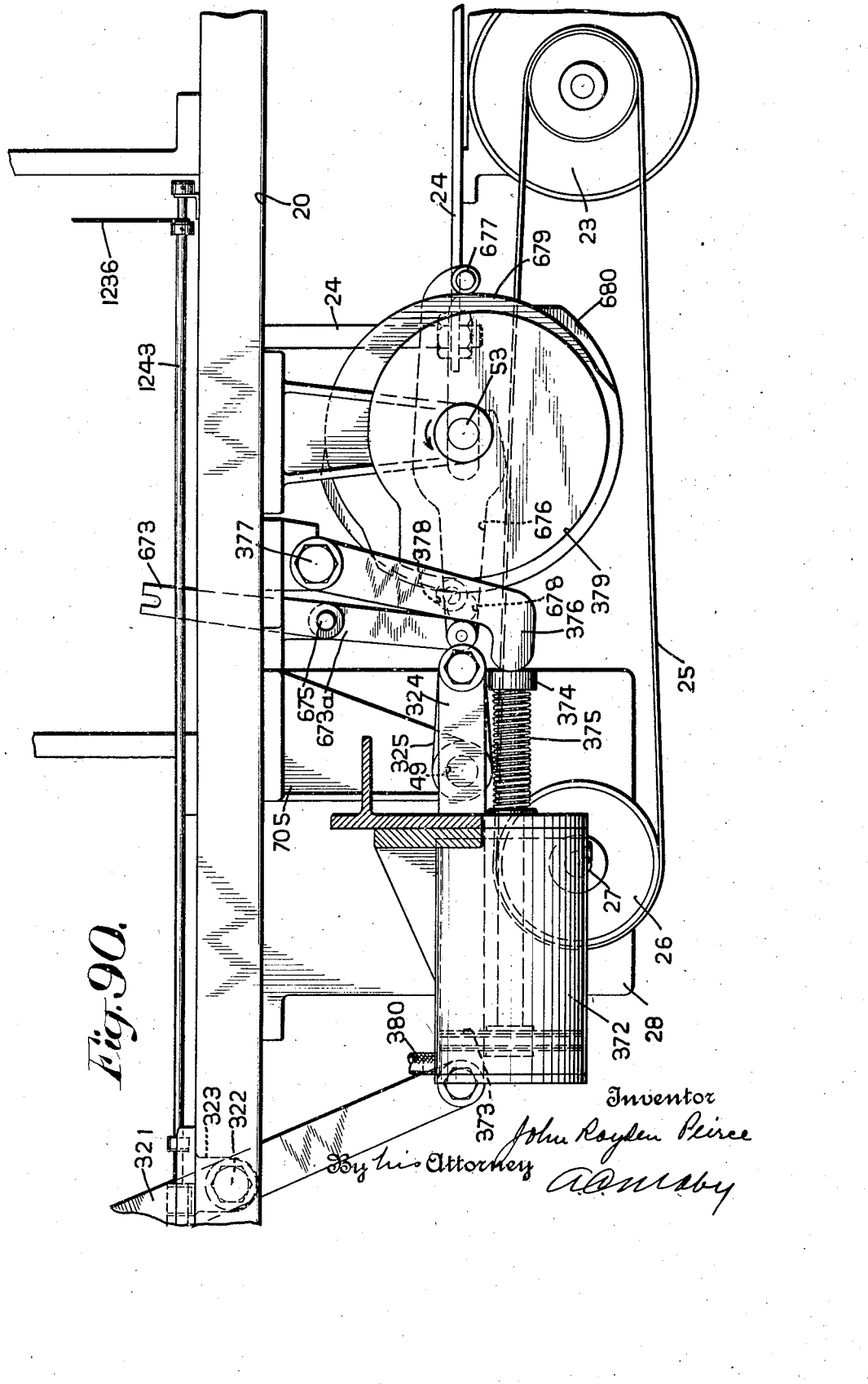

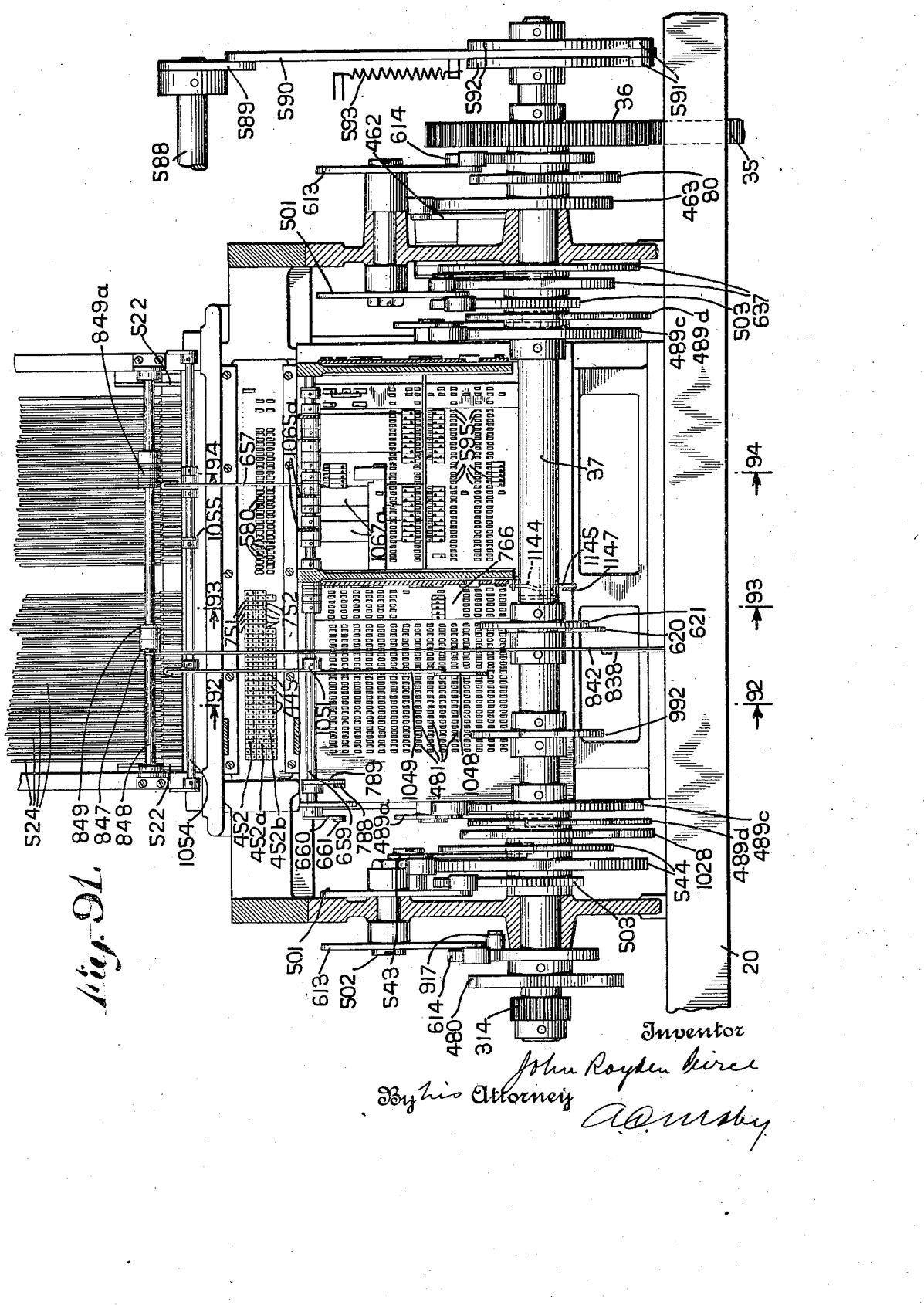

Feb. 13, 1934.   J. R. PEIRCE   1,946,915
PERFORATED RECORD CONTROLLED ACCOUNTING MACHINE
Filed Nov. 27, 1929   78 Sheets-Sheet 58

Inventor
John Royden Peirce
By his Attorney

Feb. 13, 1934.          J. R. PEIRCE          1,946,915
PERFORATED RECORD CONTROLLED ACCOUNTING MACHINE
Filed Nov. 27, 1929     78 Sheets-Sheet 59

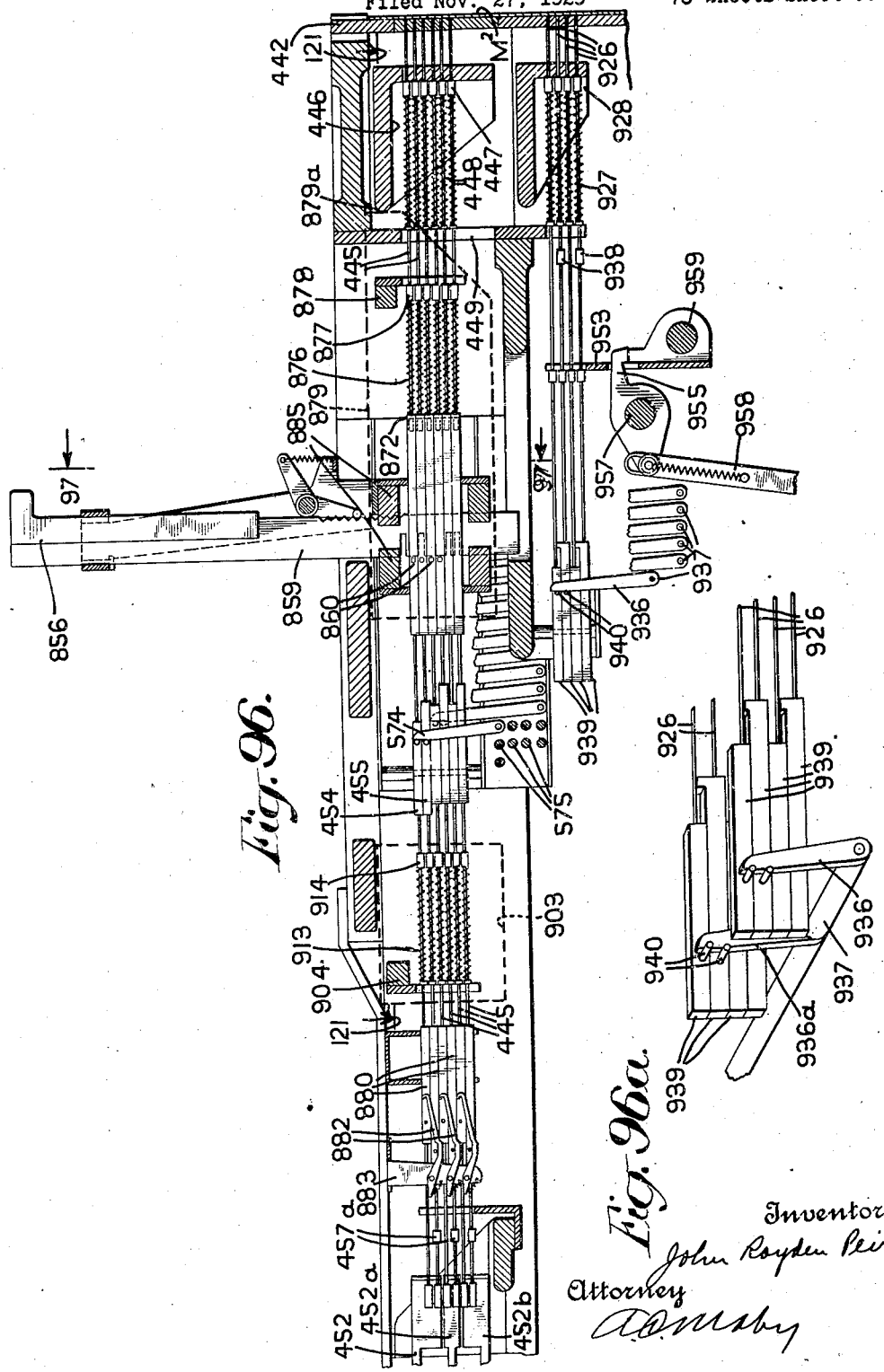

Feb. 13, 1934.  J. R. PEIRCE  1,946,915
PERFORATED RECORD CONTROLLED ACCOUNTING MACHINE
Filed Nov. 27, 1929  78 Sheets-Sheet 61
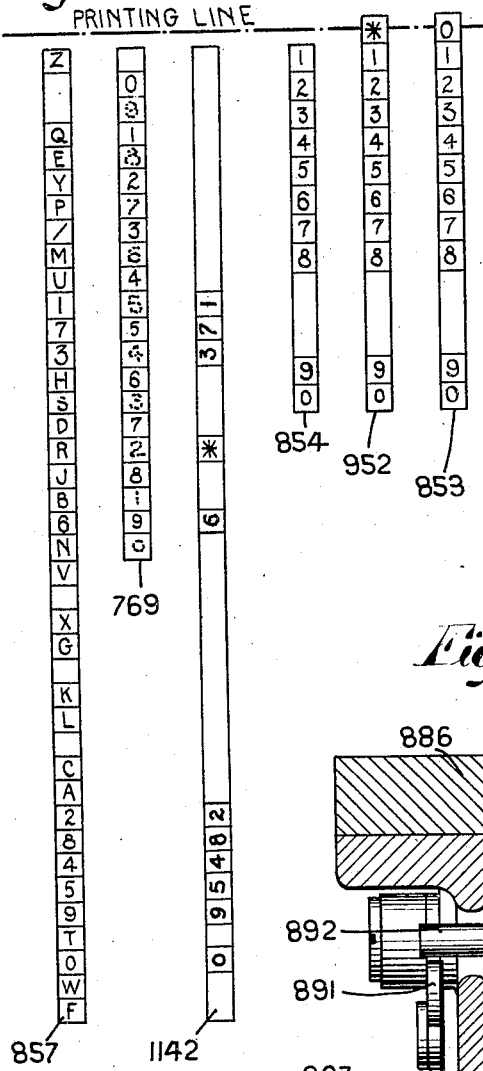
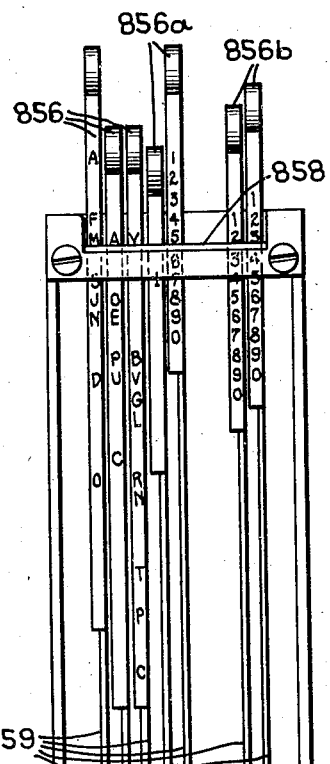
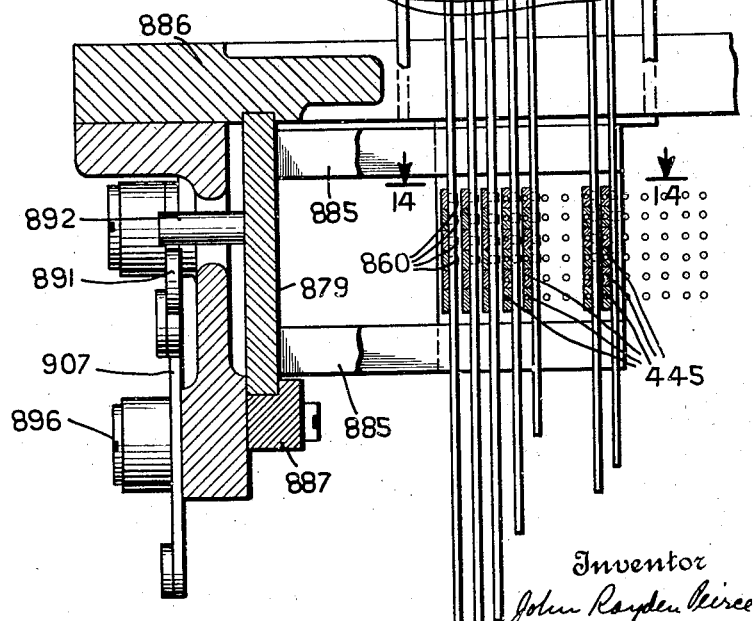
Inventor
John Royden Peirce
By his Attorney

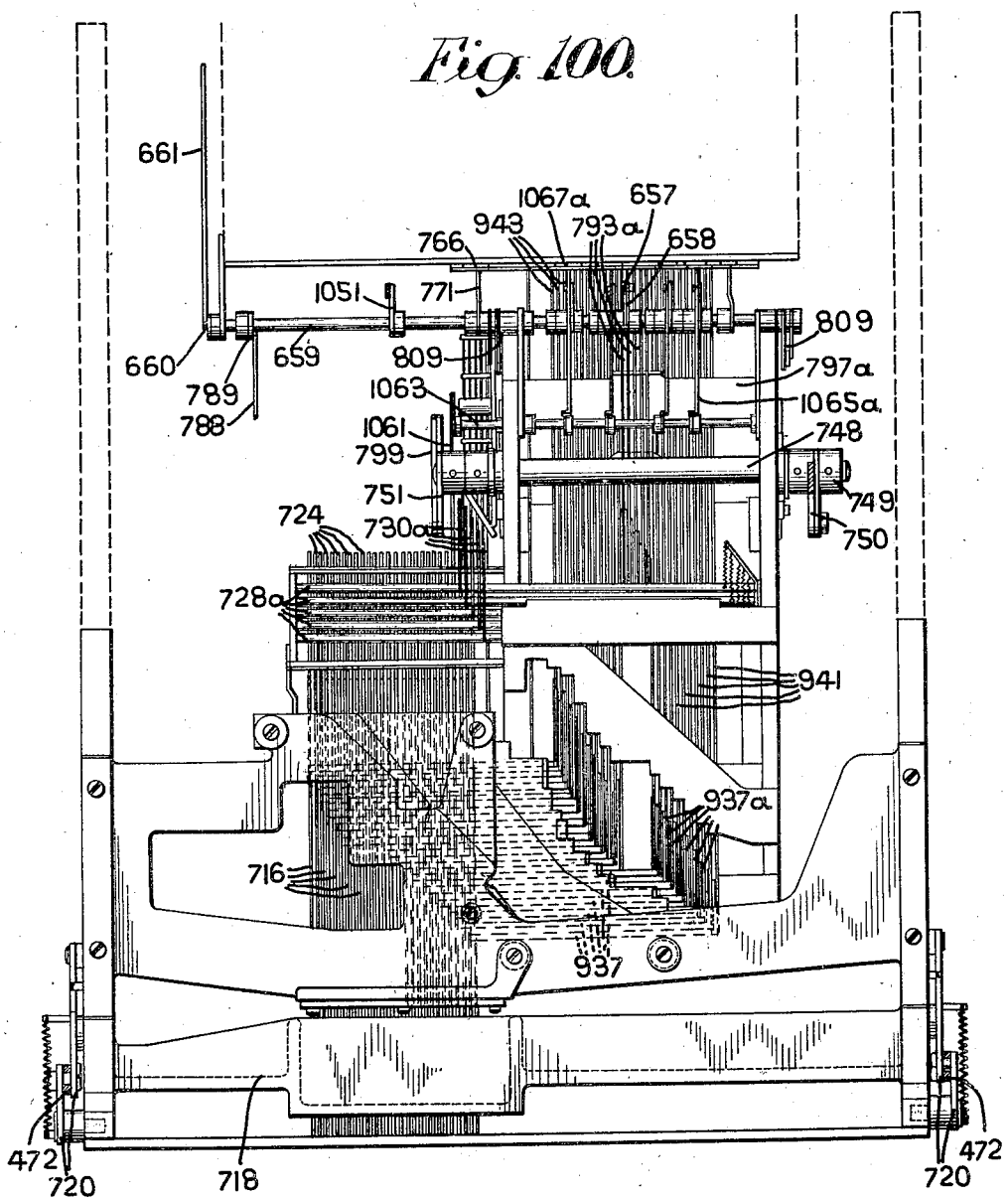

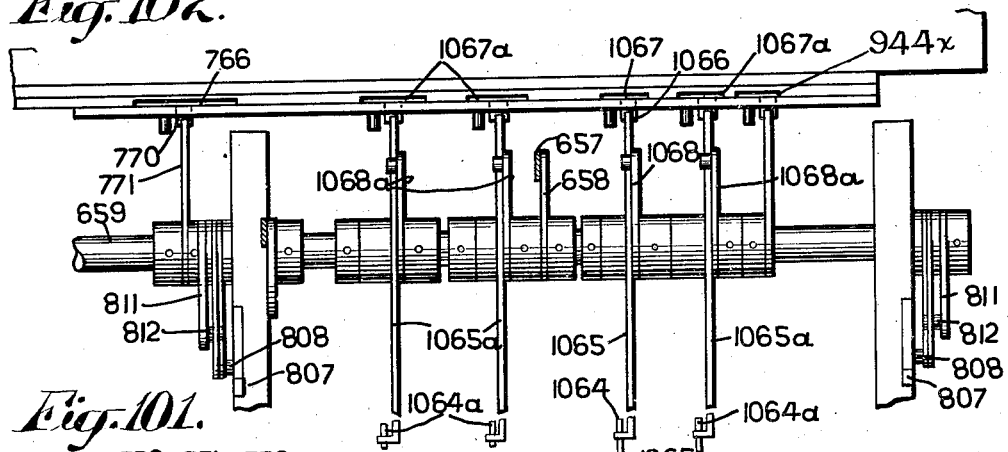
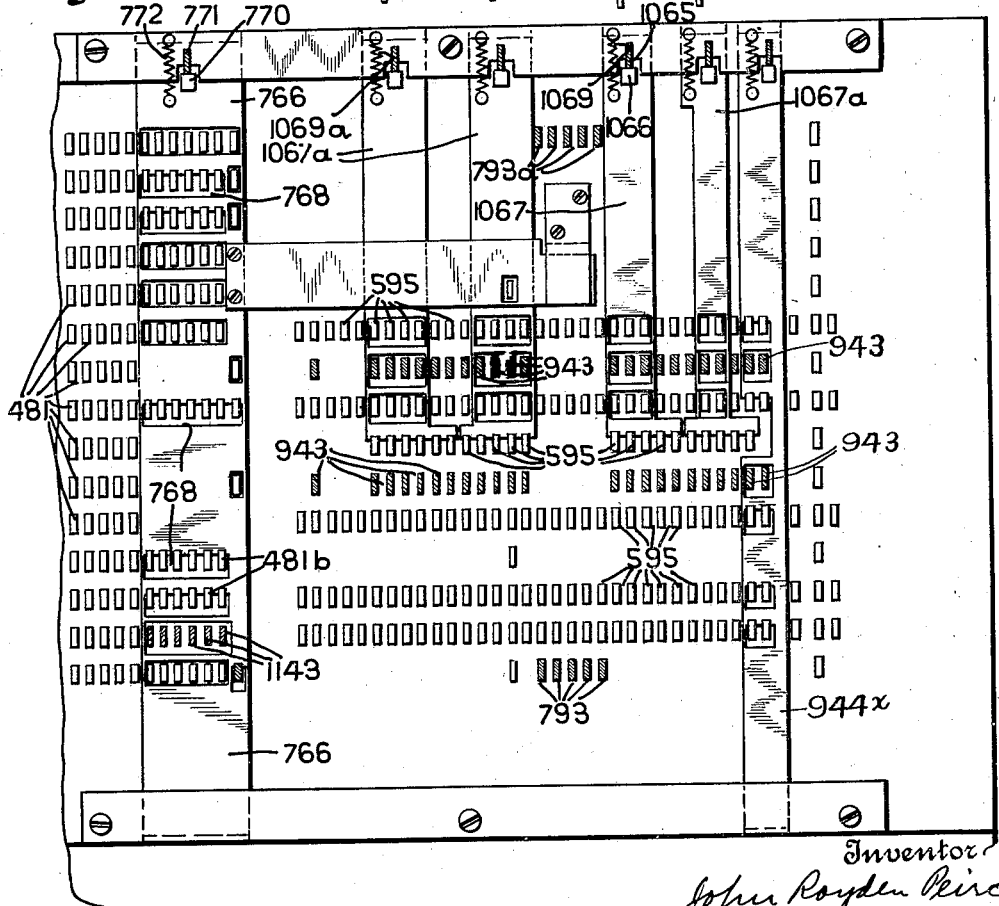

Feb. 13, 1934.  J. R. PEIRCE  1,946,915
PERFORATED RECORD CONTROLLED ACCOUNTING MACHINE
Filed Nov. 27, 1929   78 Sheets-Sheet 65
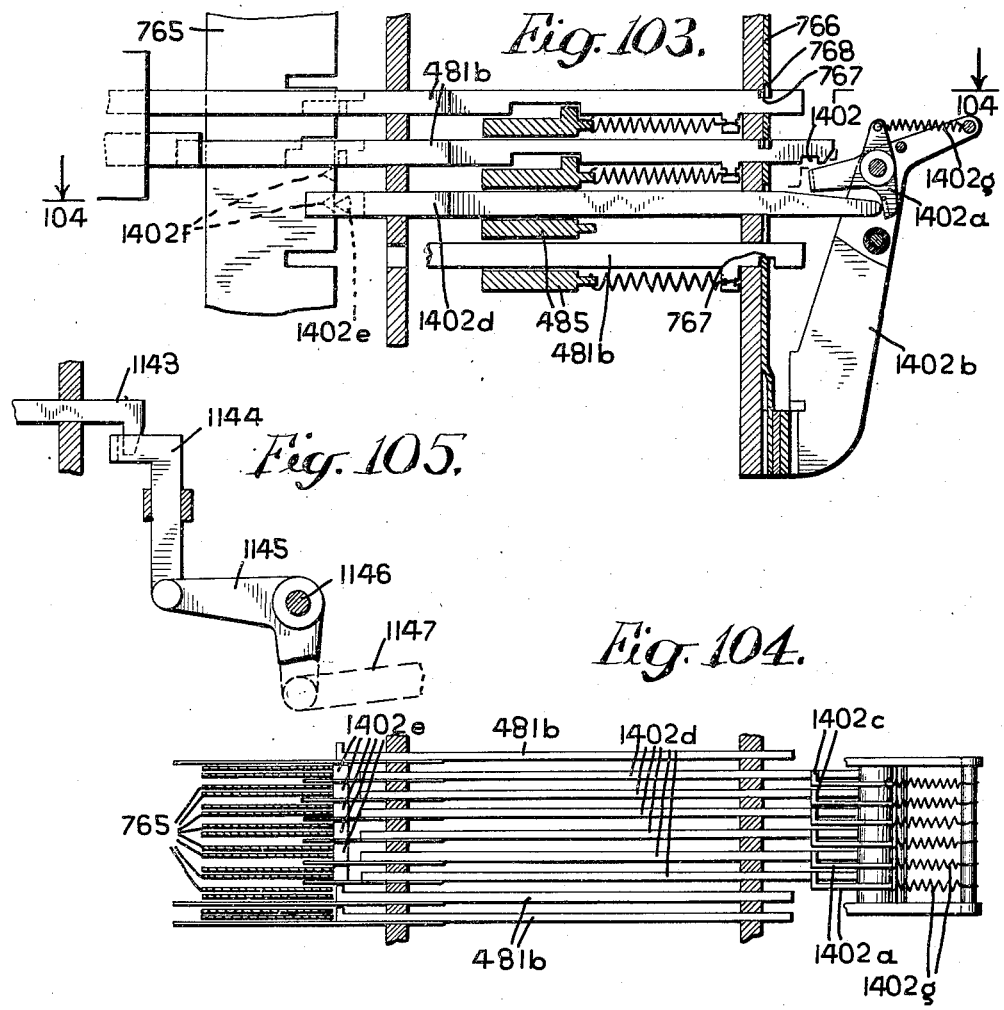
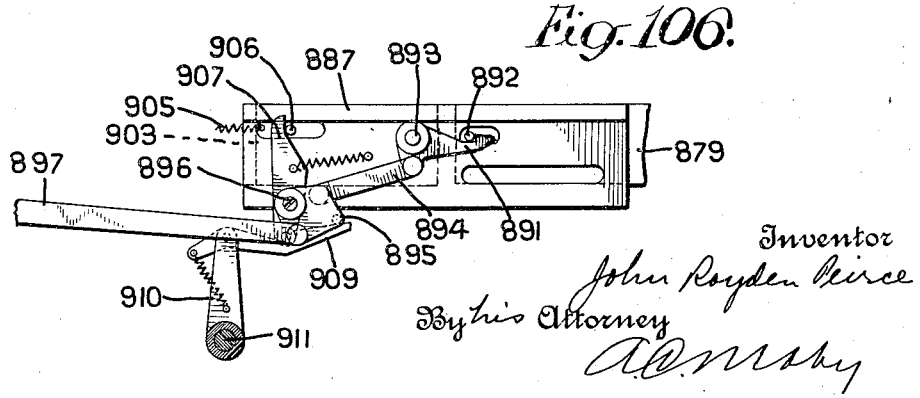

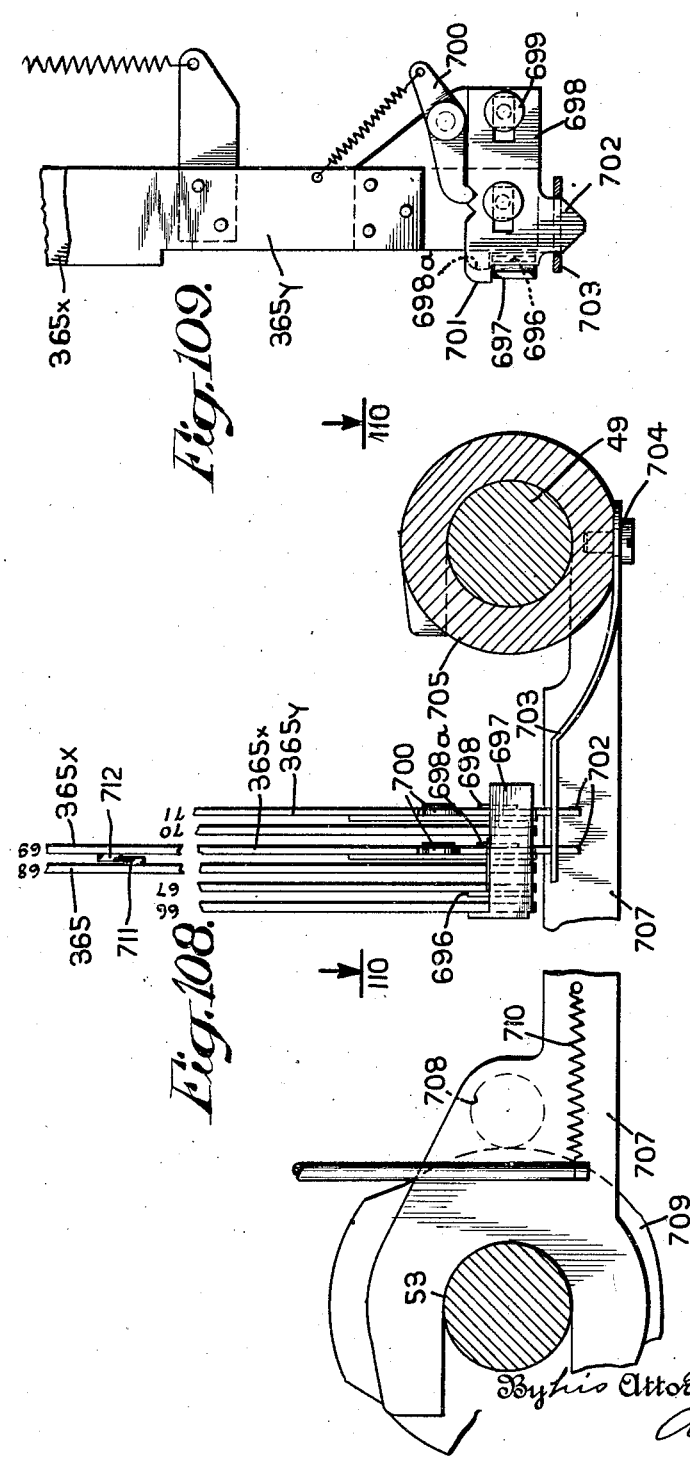
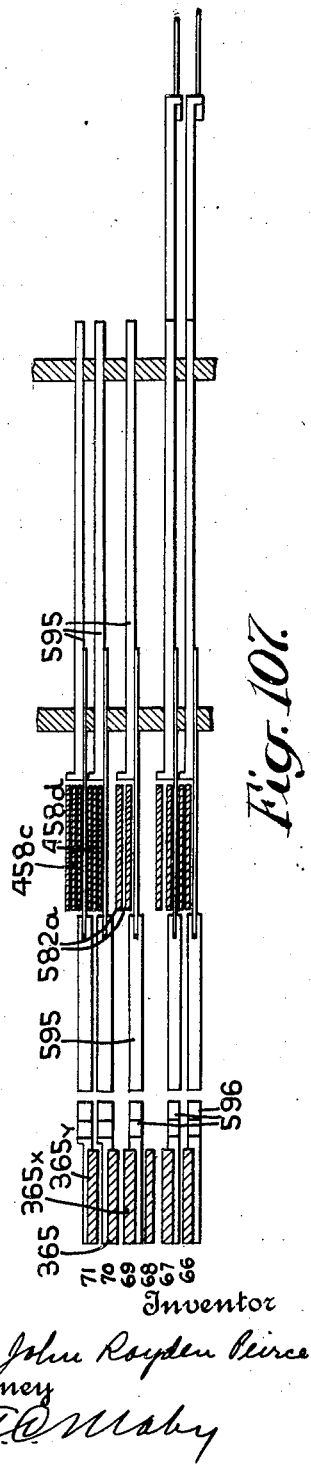

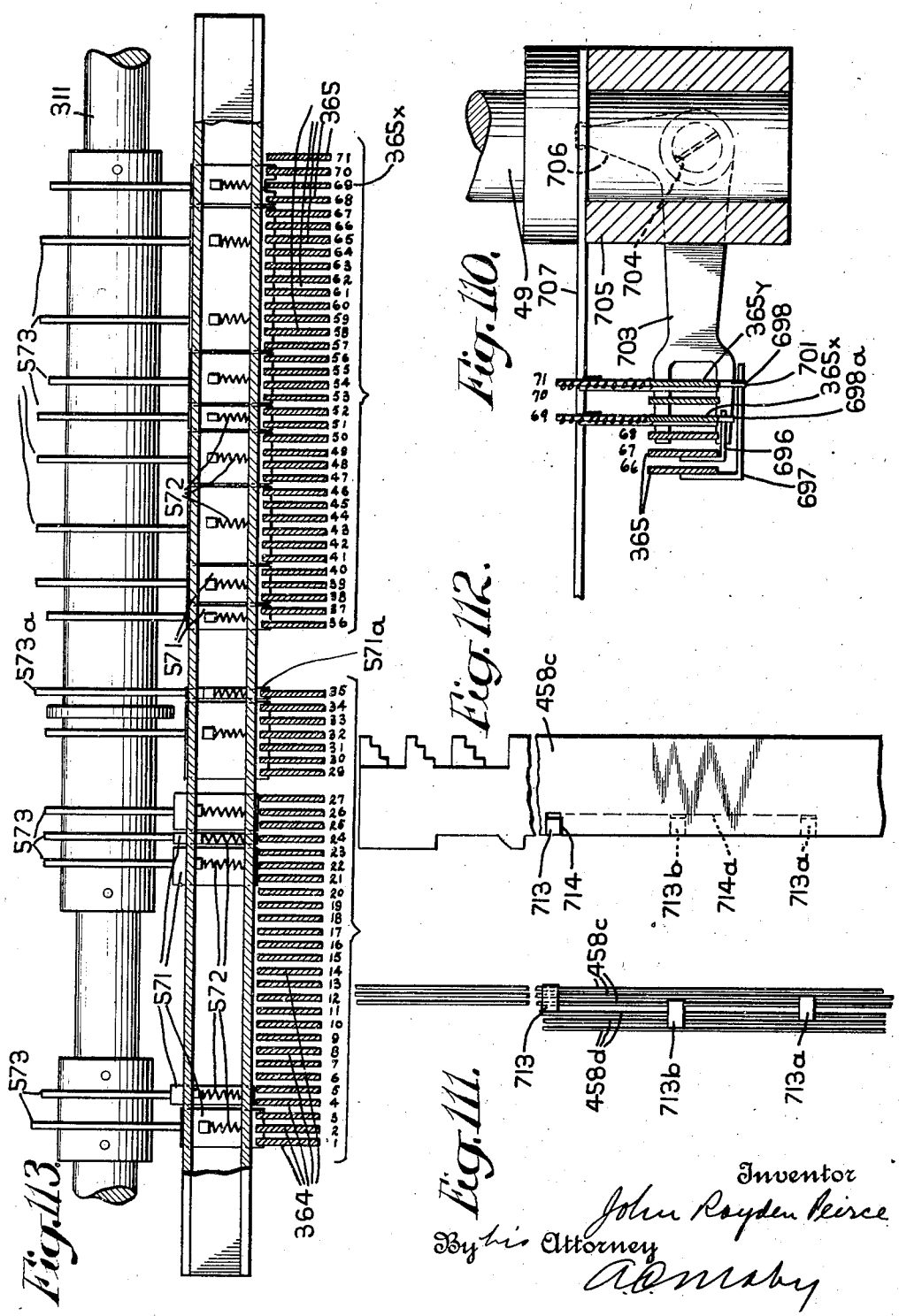

Feb. 13, 1934.   J. R. PEIRCE   1,946,915
PERFORATED RECORD CONTROLLED ACCOUNTING MACHINE
Filed Nov. 27, 1929   78 Sheets-Sheet 68
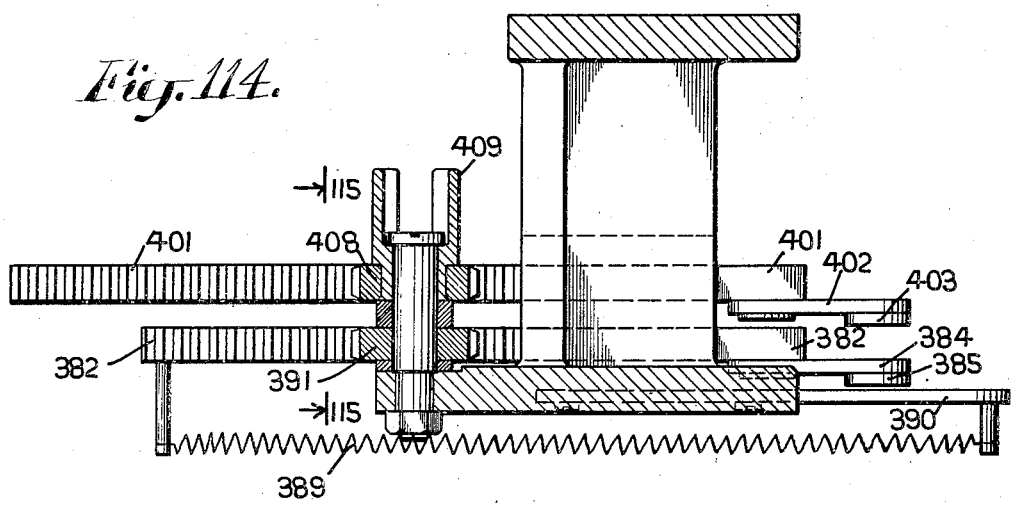
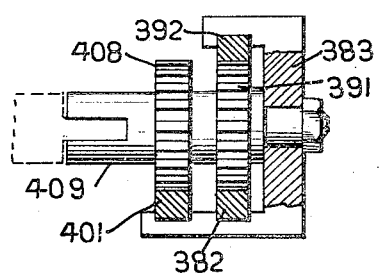
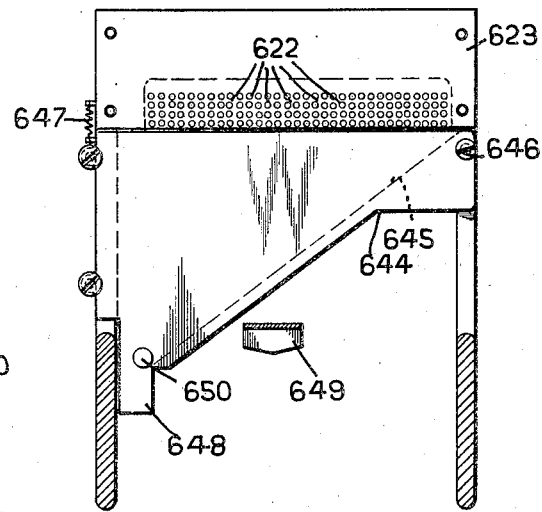
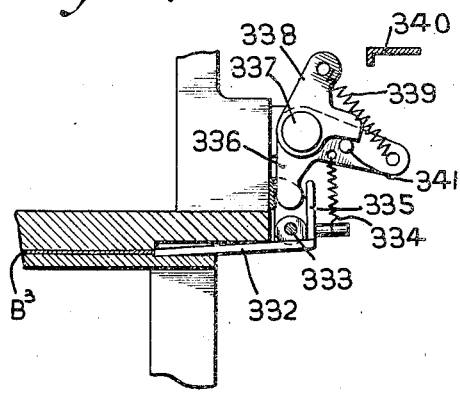
Inventor
John Royden Peirce
By his Attorney Feb. 13, 1934.  J. R. PEIRCE  1,946,915
PERFORATED RECORD CONTROLLED ACCOUNTING MACHINE
Filed Nov. 27, 1929   78 Sheets-Sheet 69
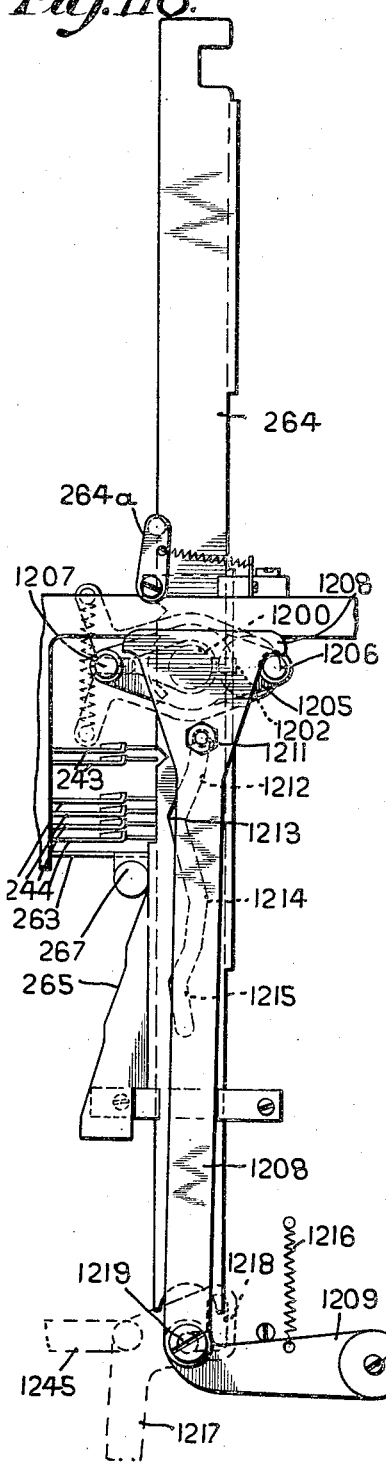
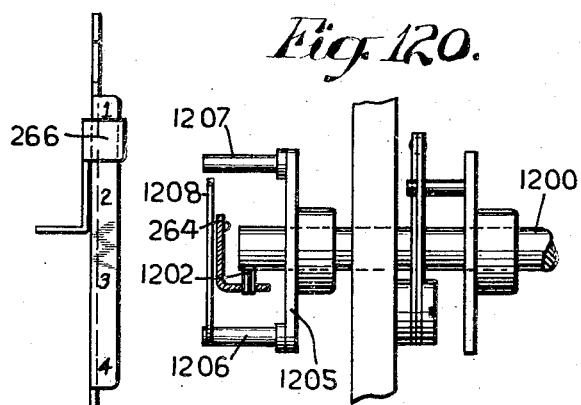
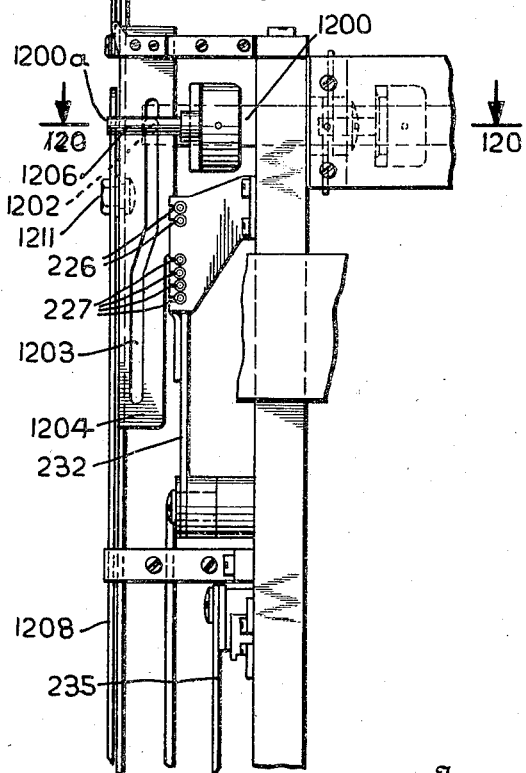

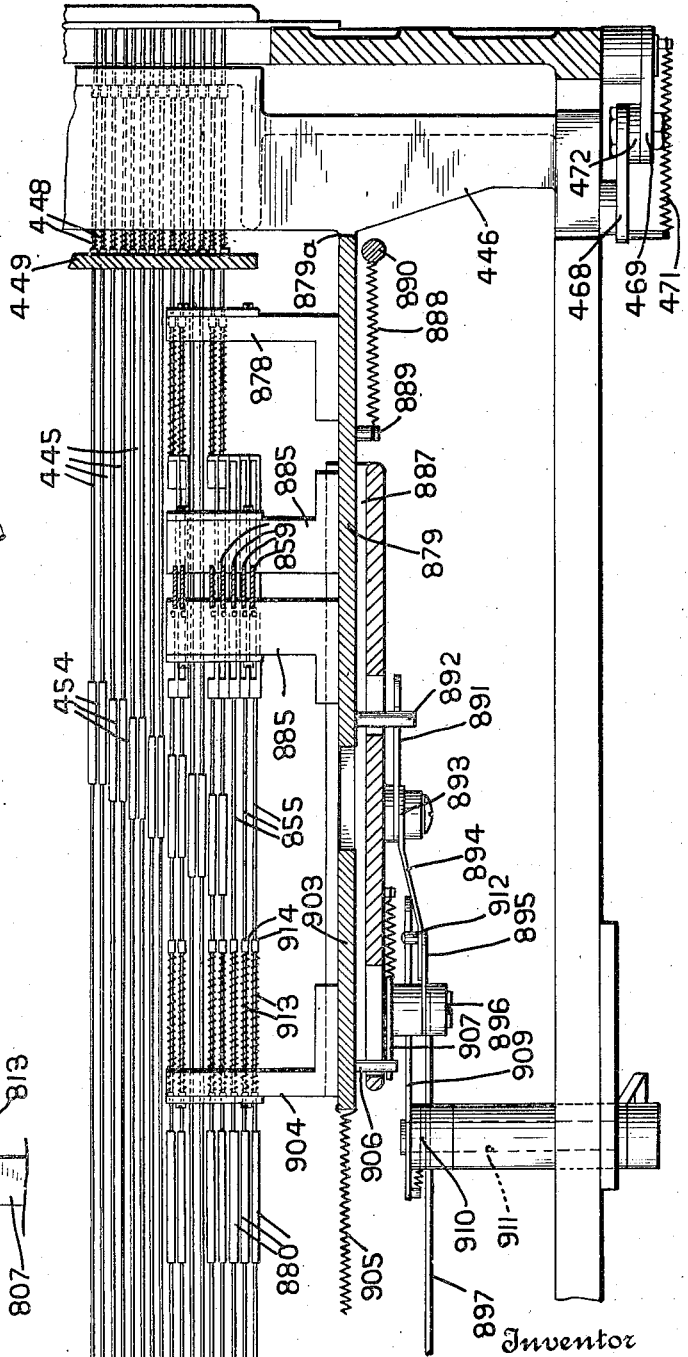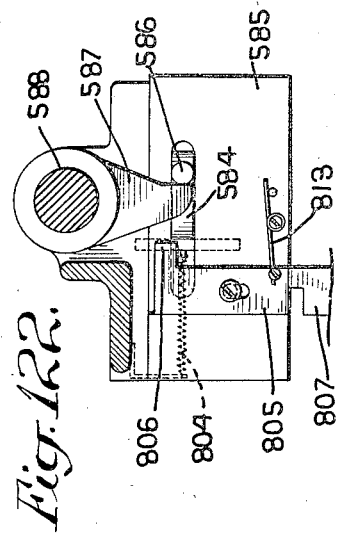

Feb. 13, 1934.  J. R. PEIRCE  1,946,915
PERFORATED RECORD CONTROLLED ACCOUNTING MACHINE
Filed Nov. 27, 1929  78 Sheets-Sheet 72
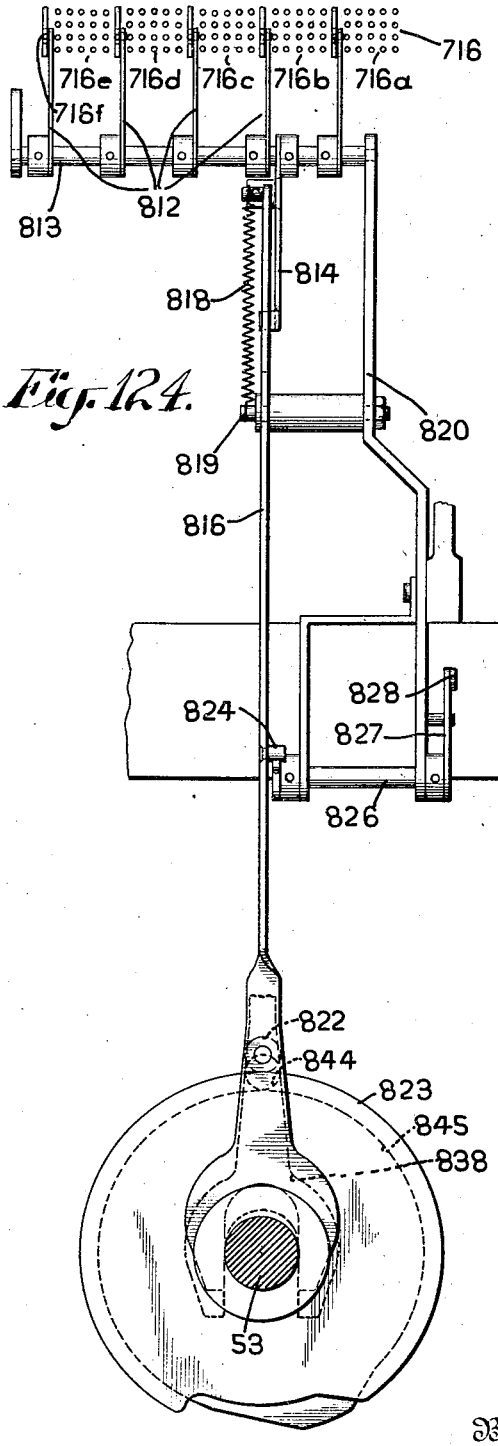
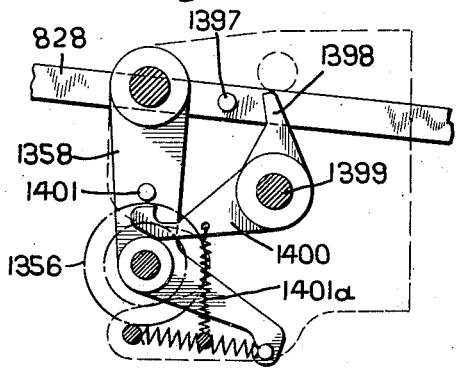
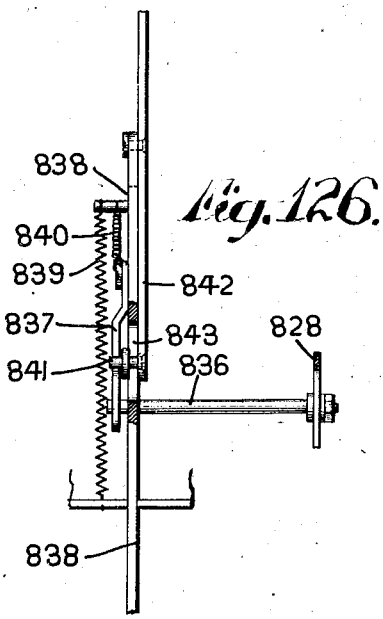

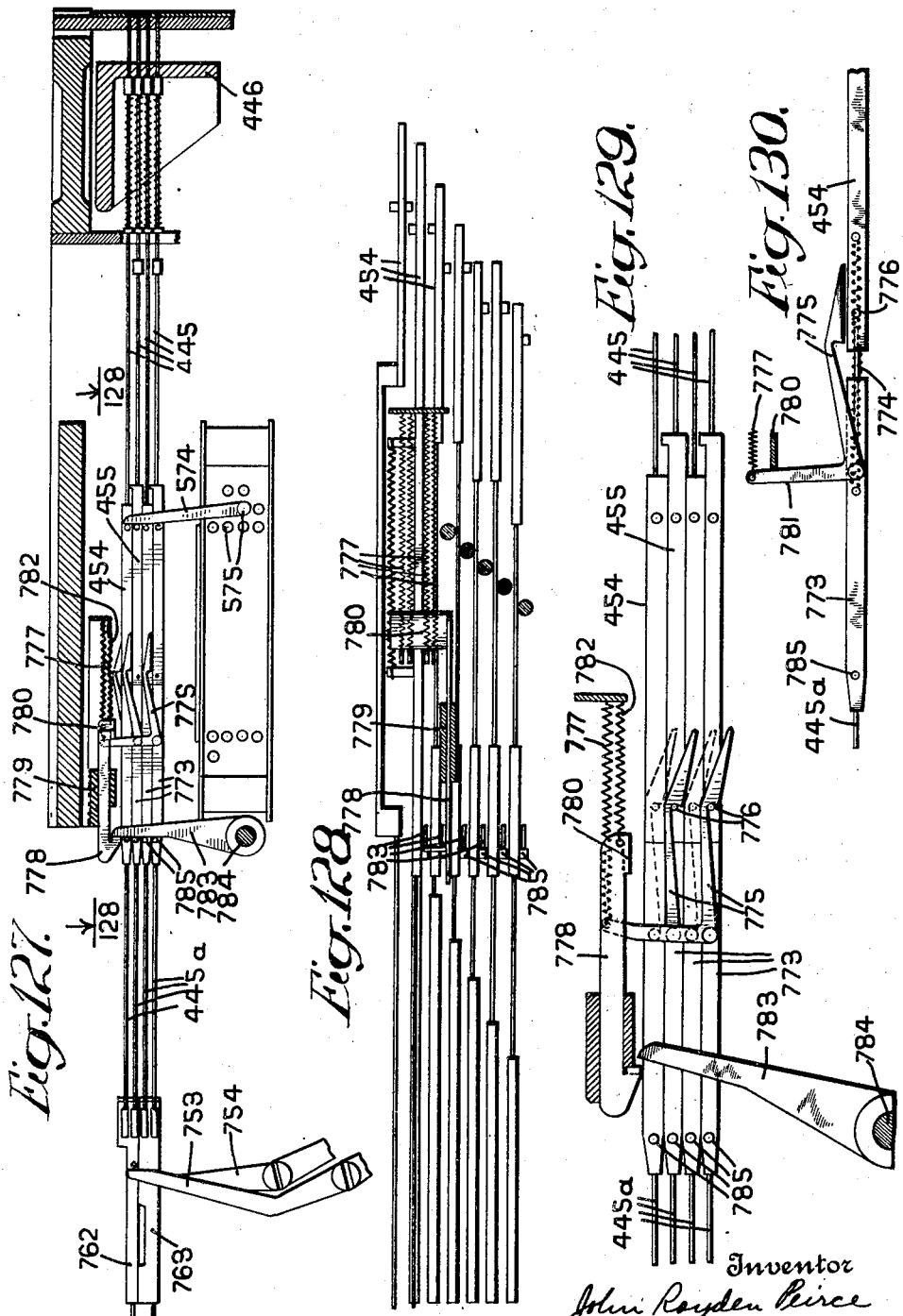

Feb. 13, 1934.   J. R. PEIRCE   1,946,915
PERFORATED RECORD CONTROLLED ACCOUNTING MACHINE
Filed Nov. 27, 1929   78 Sheets-Sheet 74
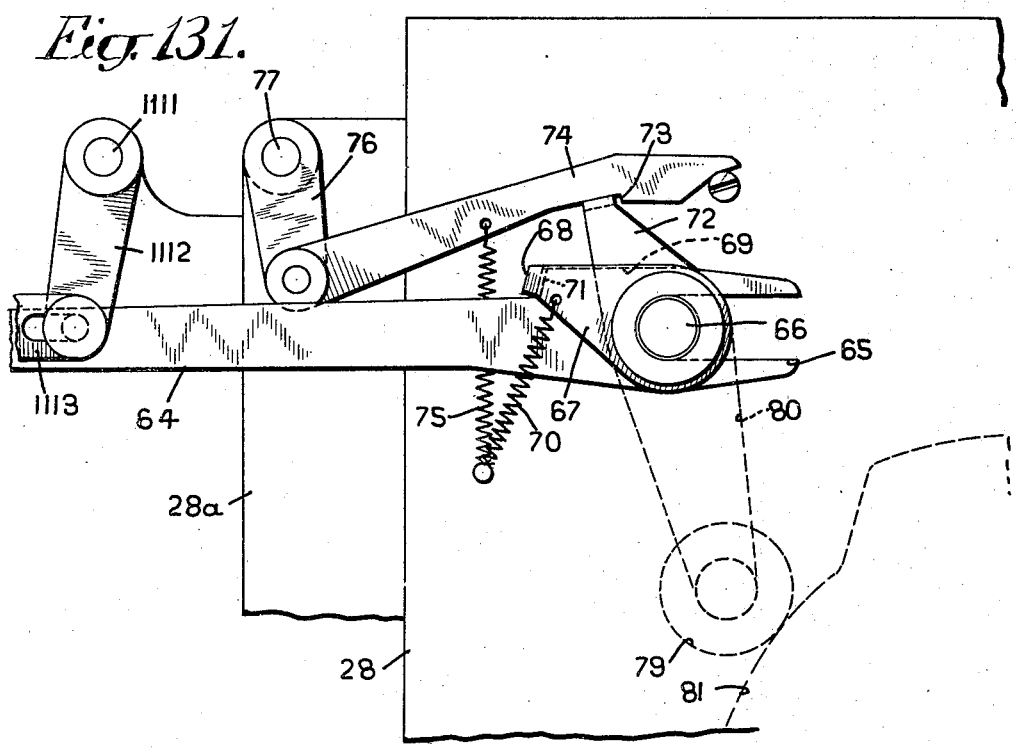
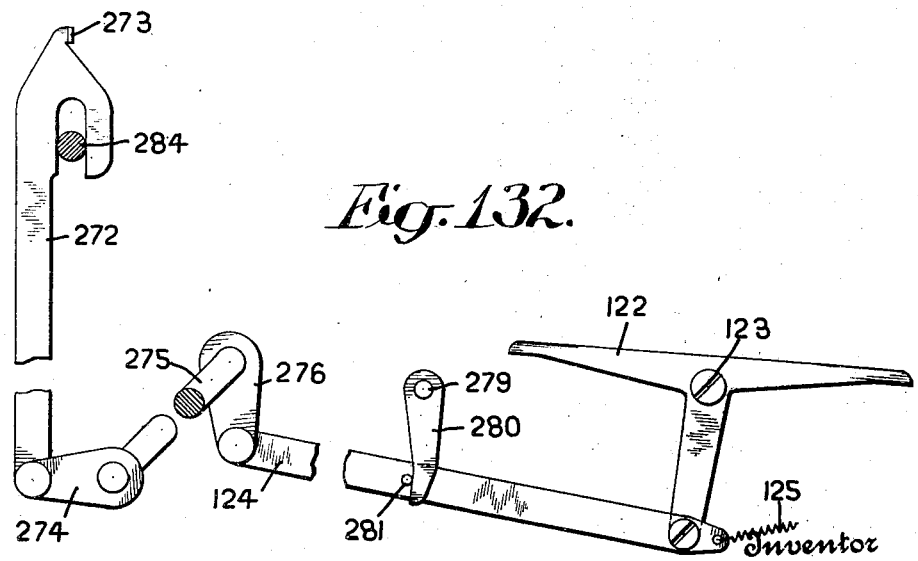

Feb. 13, 1934.  J. R. PEIRCE  1,946,915
PERFORATED RECORD CONTROLLED ACCOUNTING MACHINE
Filed Nov. 27, 1929  78 Sheets-Sheet 75

Inventor
John Royden Peirce
By his Attorney

Feb. 13, 1934.   J. R. PEIRCE   1,946,915
PERFORATED RECORD CONTROLLED ACCOUNTING MACHINE
Filed Nov. 27, 1929   78 Sheets-Sheet 76

Inventor
John Royden Peirce
By his Attorney

Patented Feb. 13, 1934

1,946,915

UNITED STATES PATENT OFFICE 1,946,915

PERFORATED RECORD-CONTROLLED ACCOUNTING MACHINE

John Royden Peirce, New York, N. Y., assignor, by mesne assignments, to International Business Machines Corporation, New York, N. Y., a corporation of New York Application November 27, 1929
Serial No. 410,057

47 Claims. (Cl. 101—93)

This invention relates to accounting machines and more particularly to machines adapted for bookkeeping purposes and for automatically making out bills. The machine is adapted to analyze record cards corresponding with ledger sheets used in bookkeeping systems to ascertain the condition of the account and whether a payment is due from the customer. If no payment is due, the ledger or master record card is passed on to the files. If payment is due, the amount thereof is ascertained from the card and a bill printed to be sent to the customer. The name and address of the customer is also taken from the master card and printed on the bill. Where the customer owes a sum of money but is also credited with a sum of money, the machine will obtain both of these sums from the master card, printing them on the bill, and subtract the amount credited to the customer from the amount due from him and render the bill for the difference, printing this amount upon the bill.

The machine is adapted for use in cases where sums of money are due periodically as in the case of dues from members of organizations, fees due from subscribers to periodicals, and the like, taxes or other sums due from property holders, interest due on debts, premiums due on insurance policies and innumerable other uses.

The machine is adapted when analyzing a master card to ascertain whether money is due from a customer, to note whether bills have been rendered on previous occasions but remain unpaid. In some instances where a bill has been rendered but has not yet been paid, the machine will stop or otherwise direct attention to this fact so that the account may be given personal attention. Under some conditions, a single lapse of payment is ignored and a new bill is rendered even though the previous bill has not yet been paid. In such instances, however, where a plurality of successively due payments have not been made, attention will be directed to the account so that it may be given personal attention. Also where the amount credited to the customer is greater than the amount due from him, the machine is adapted to stop or to otherwise direct attention to the account so that it may be given individual attention. In some instances amounts credited to the customer are not to be taken into consideration when rendering bills, the credit being given to the customer in other forms. In such instances the machine is adapted to ascertain this fact and to ignore the credit amount and to render the bill for the full debit amount. When analyzing the record cards to ascertain whether payments are due, it may be necessary for the machine to ascertain from the cards when the payments are due and to compare such date with the current date. In such instances the current date is set up by appropriate mechanisms in the machine, the machine thus reading the current date from the set-up to ascertain whether the due date contained on the card corresponds. Numerous other set-ups in the machine are effected to control the operation of the machine.

In my Patent No. 1,506,382, dated August 26, 1924 for Record sheet and apparatus controlled thereby I disclosed a machine adapted to issue bills or notices to holders of insurance policies. In the present embodiment of my invention I have shown a machine of this same general character but which is adapted to perform numerous functions not disclosed in the machine of said patent. In the aforesaid patent the master record card is shown as adapted to contain records for successive periods in several separate fields. In that case the record for any given period is contained in a given field on the card and all cards in the files contain the record for such period in the same field. According to the present invention several such fields are employed for the records of successive periods but whenever an account comes into being the record for the first period in connection therewith is contained in the first of the several fields.

The invention disclosed in this application is related to the inventions of my copending applications Serial No. 611,491 filed January 8, 1923 and Serial No. 144,661 filed October 28, 1926 and is as to certain features a continuation of those cases.

One of the objects of the present invention is to devise mechanisms adapted to ascertain when the account came into being and to deduce from this fact where the account for any given period is contained on the master record card, the machine then being automatically set to analyze the appropriate field in the card to ascertain the necessary data in rendering the bill.

Another object is to devise a machine which upon ascertaining that a payment is due from the customer will print a bill to the customer and also print and perforate a record of the bill for use in connection with subsequent accounting, also to print a receipt slip which may be signed and sent to the customer when payment is made and also to print a record slip which may be kept by the home or district office for record purposes.

Another object is to devise mechanism for ascertaining when amounts are due to the customer and to ascertain whether the amount is to be subtracted from the debit amount or not and to print the bill for the difference or for the full amount of the debit.

Another object is to devise means for analyzing a master record card before it is fed into the machine and to pre-ascertain whether or not a bill is to be rendered and to set the machine to perform the bill printing operations if a bill is to be rendered and if no bill is to be rendered, to set the machine to pass the card through without the printing of the bill and to cause the machine to proceed immediately with the pre-analyzing of the next master card which is about to be fed to the machine.

Numerous other objects will appear in the description which follows.

Referring to the drawings wherein I have shown what I now consider to be the preferred form of my invention, Fig. 1 is a perspective view of the machine embodying my invention;

Fig. 2 is a representation of a master record card adapted to control the operation of the machine;

Fig. 2a is a chart of the combinations of perforations used to designate numerals, aplhabetical characters or other data on the record card;

Fig. 3 is a representation of a record slip adapted to be printed on the machine under control of the master card, the slip including the receipt which is to be subsequently signed and delivered to the customer, also a record to be kept in the files of the office and a space or slip for notes by the clerk having charge of the accounting;

Fig. 3a is a representation of the bill or notice of payment due and also attached thereto the audit card or record containing printed and perforated data relating to the account which may be used in other machines for subsequent accounting;

Figs. 4 and 4a are diagrammatic representations of the step by step operations performed by the machine under control of a master card;

Fig. 4b is a diagram of the arrangement of the card-sensing pins;

Figure 5A:
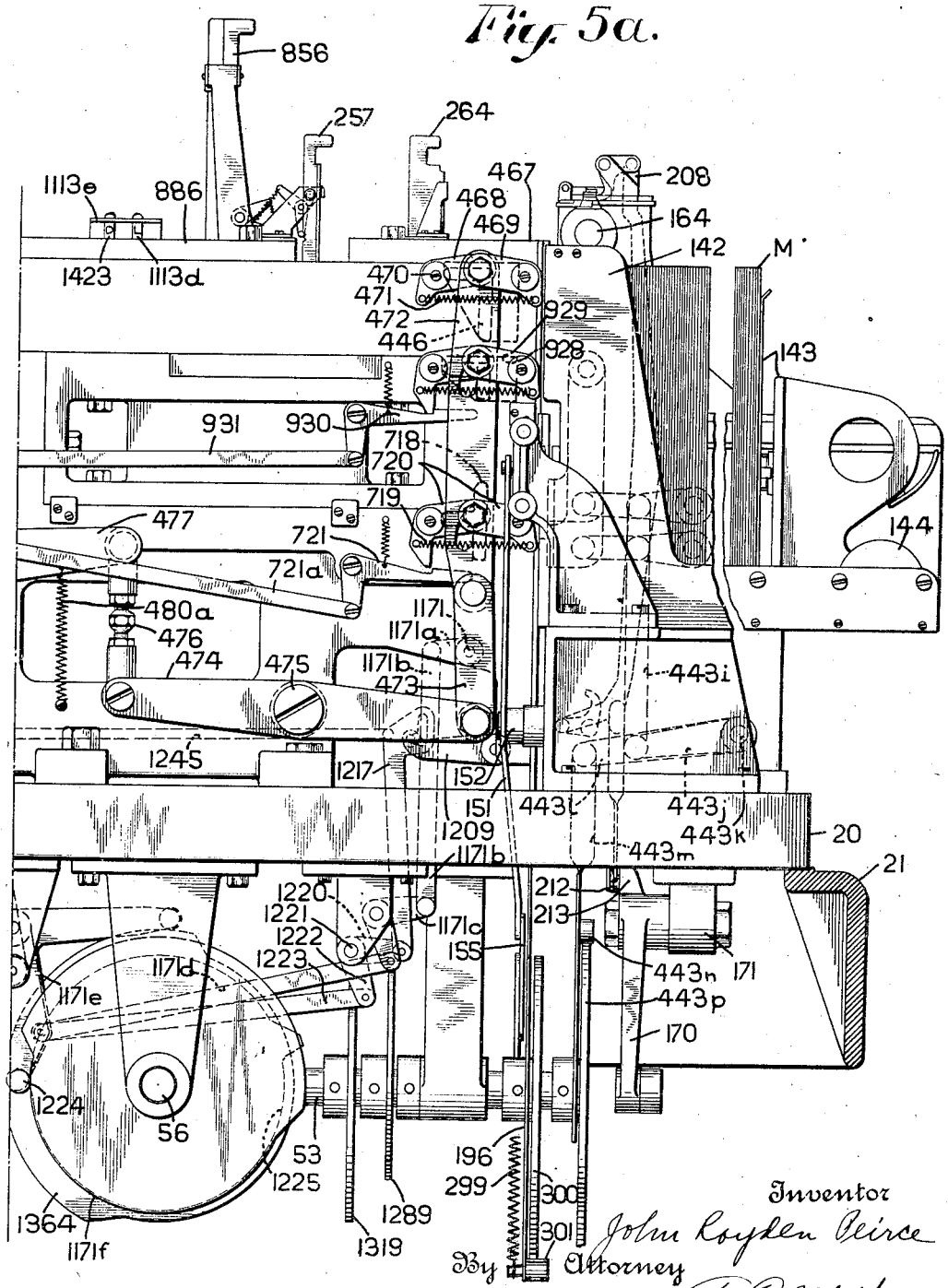
Figure 6:
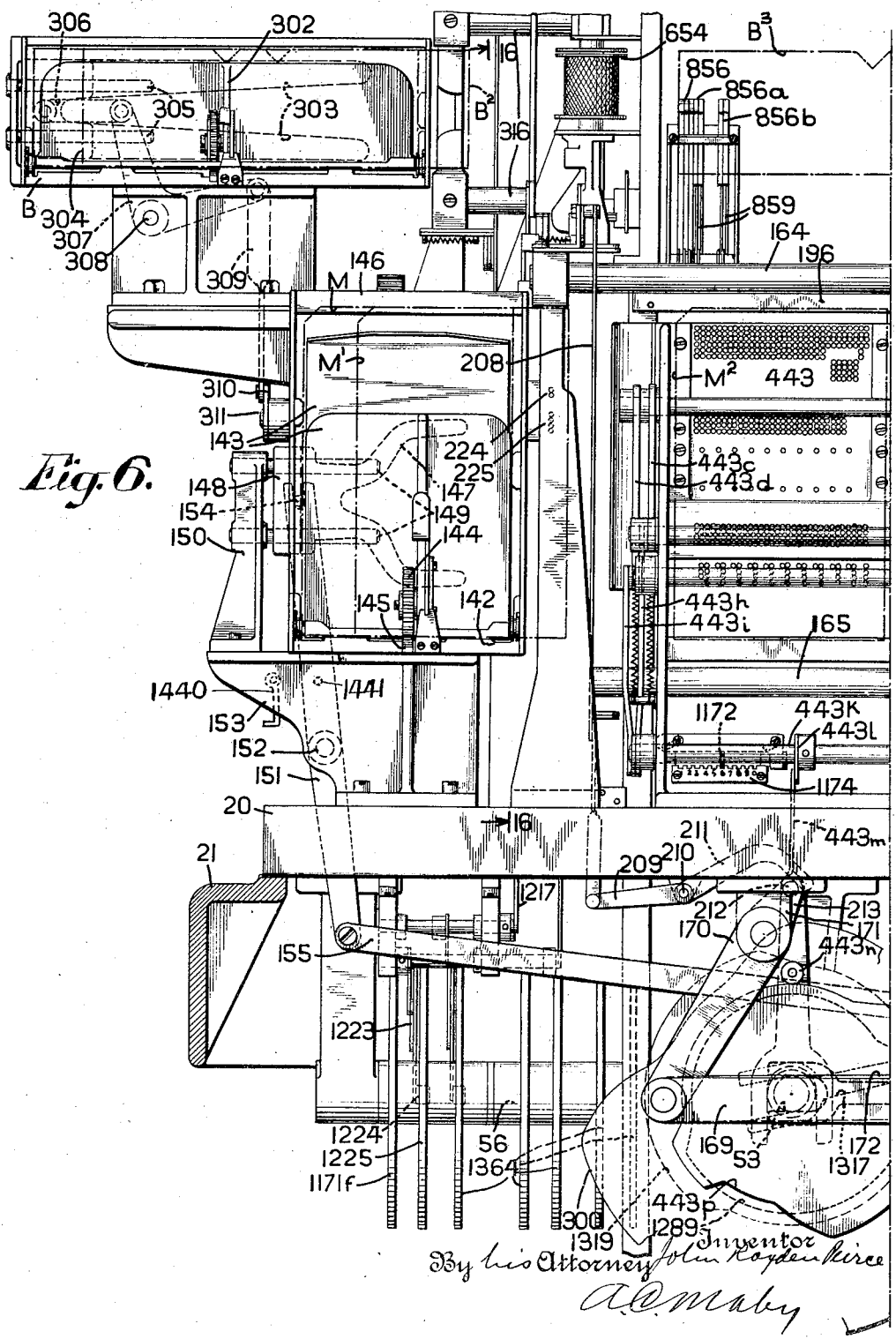
Figure 6A:
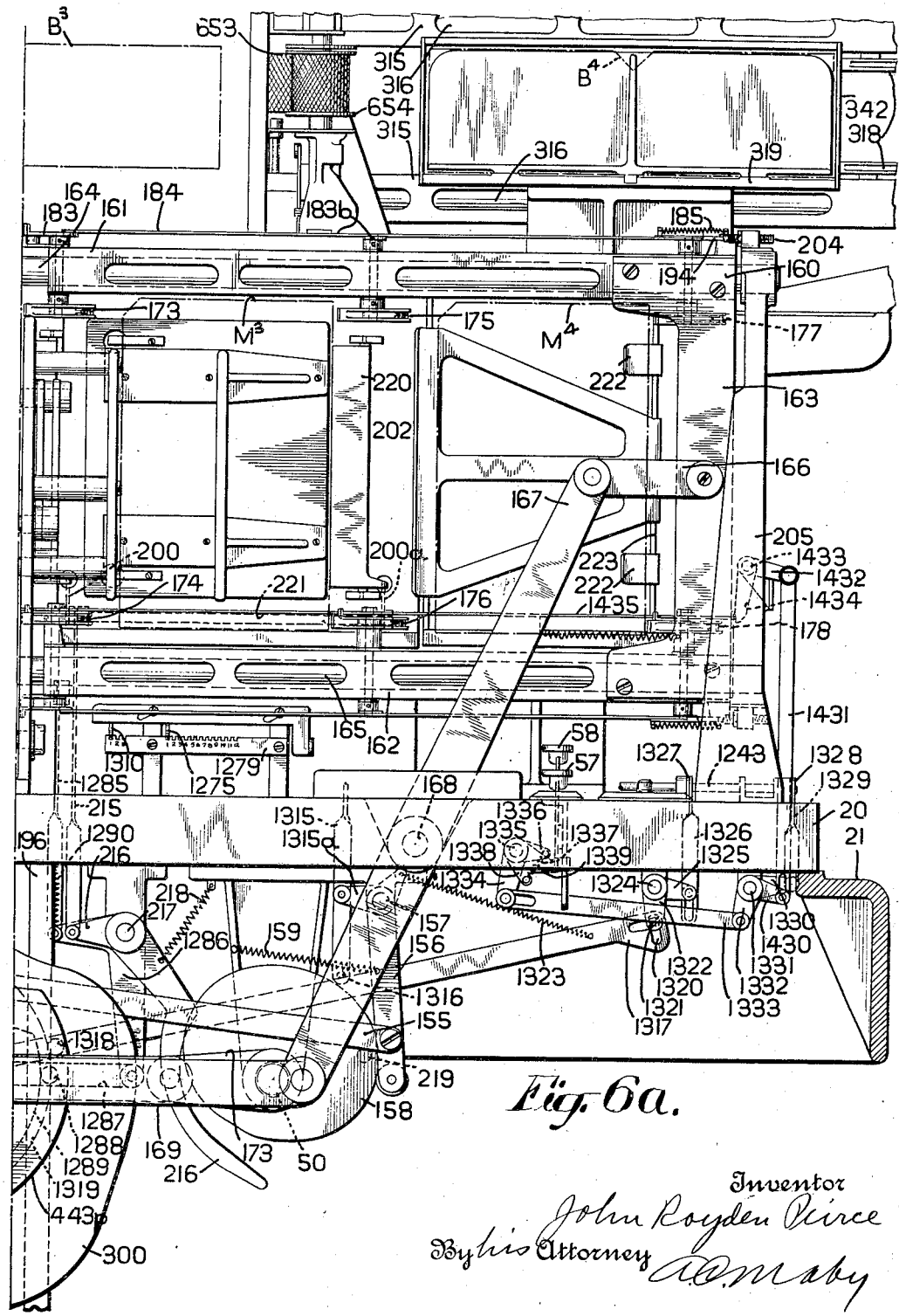

Figs. 5 and 5a taken together constitute a side elevation of the machine partly in section and parts being omitted, the view being taken looking at the machine from the left side thereof and showing various operating linkages, etc.;

Figs. 6 and 6a taken together constitute a front elevation of the machine partly in section and parts being omitted, showing the relative positions of the master card feeding mechanisms, the pocket from which said cards are fed and the pockets to which they are fed, also the analyzing position of the card, and also showing the pocket from which the bill and audit card sheet is fed and the pocket to which it is fed and including part of the feeding mechanism therefor and indicating the position in which the bill or notice card and the audit card are printed and perforated.

Figure 10:
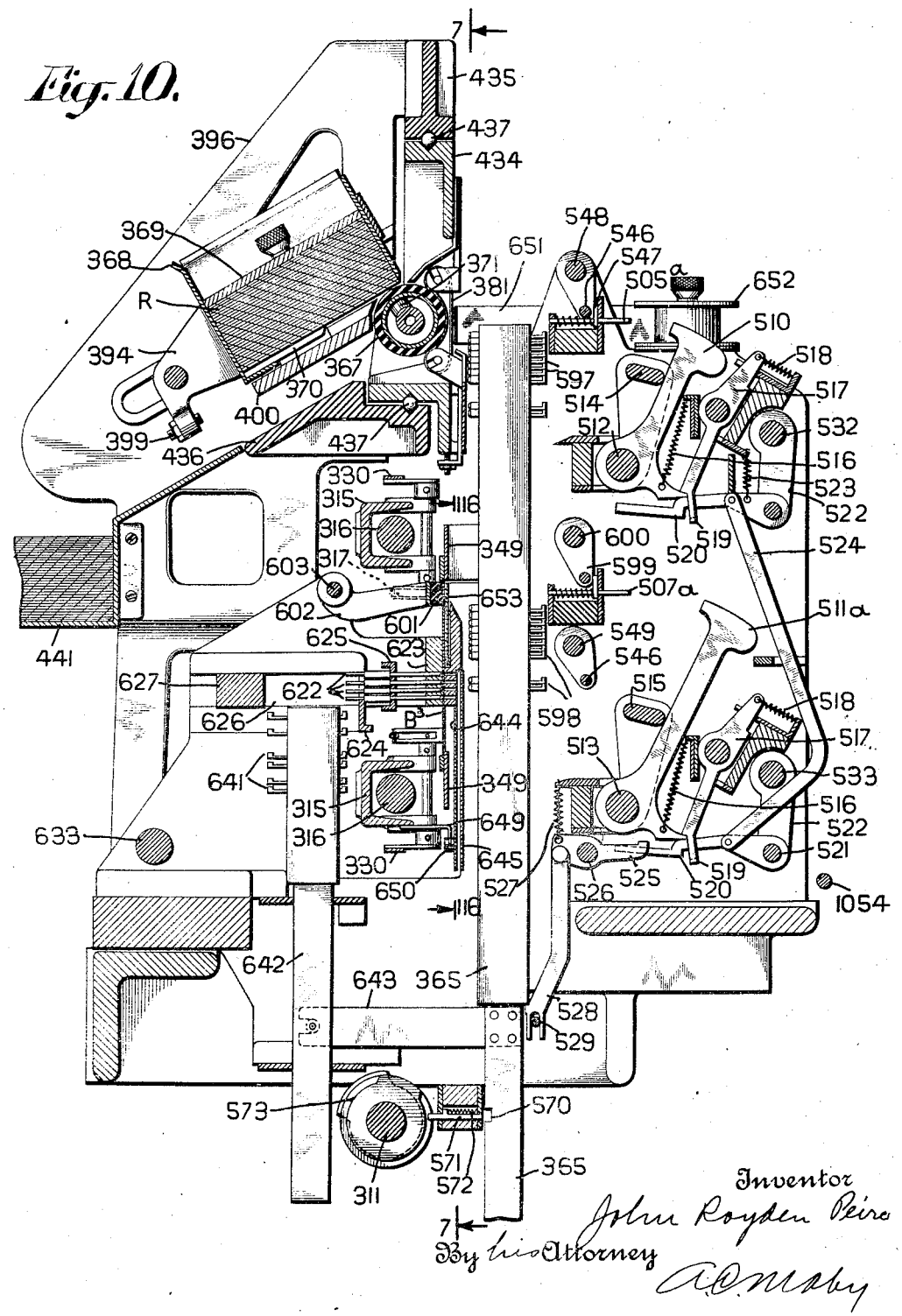
Figure 19:
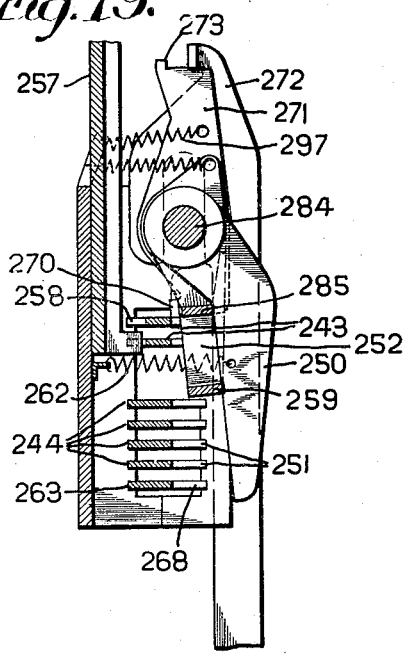
Figure 20:
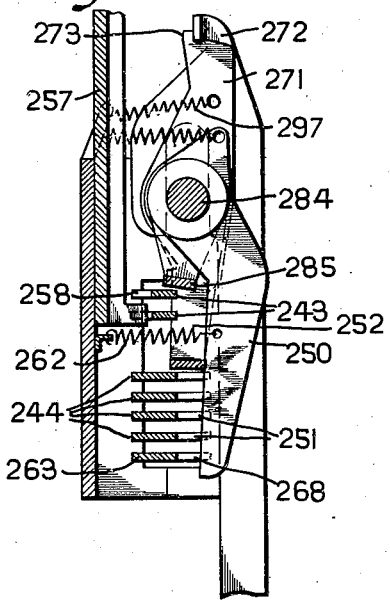
Figure 21:
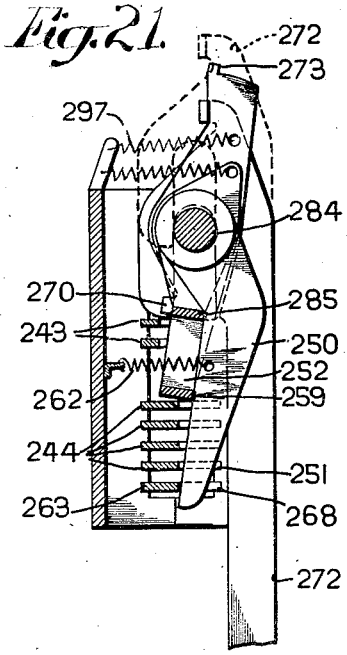
Figure 22:
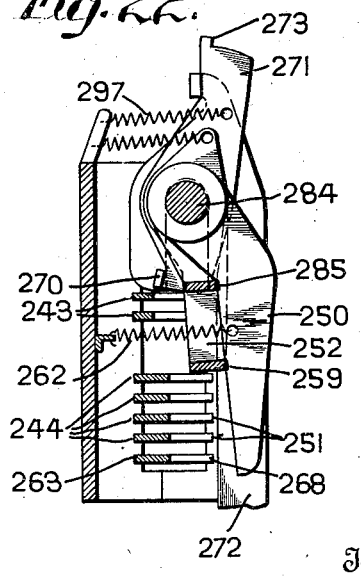
Figure 28:
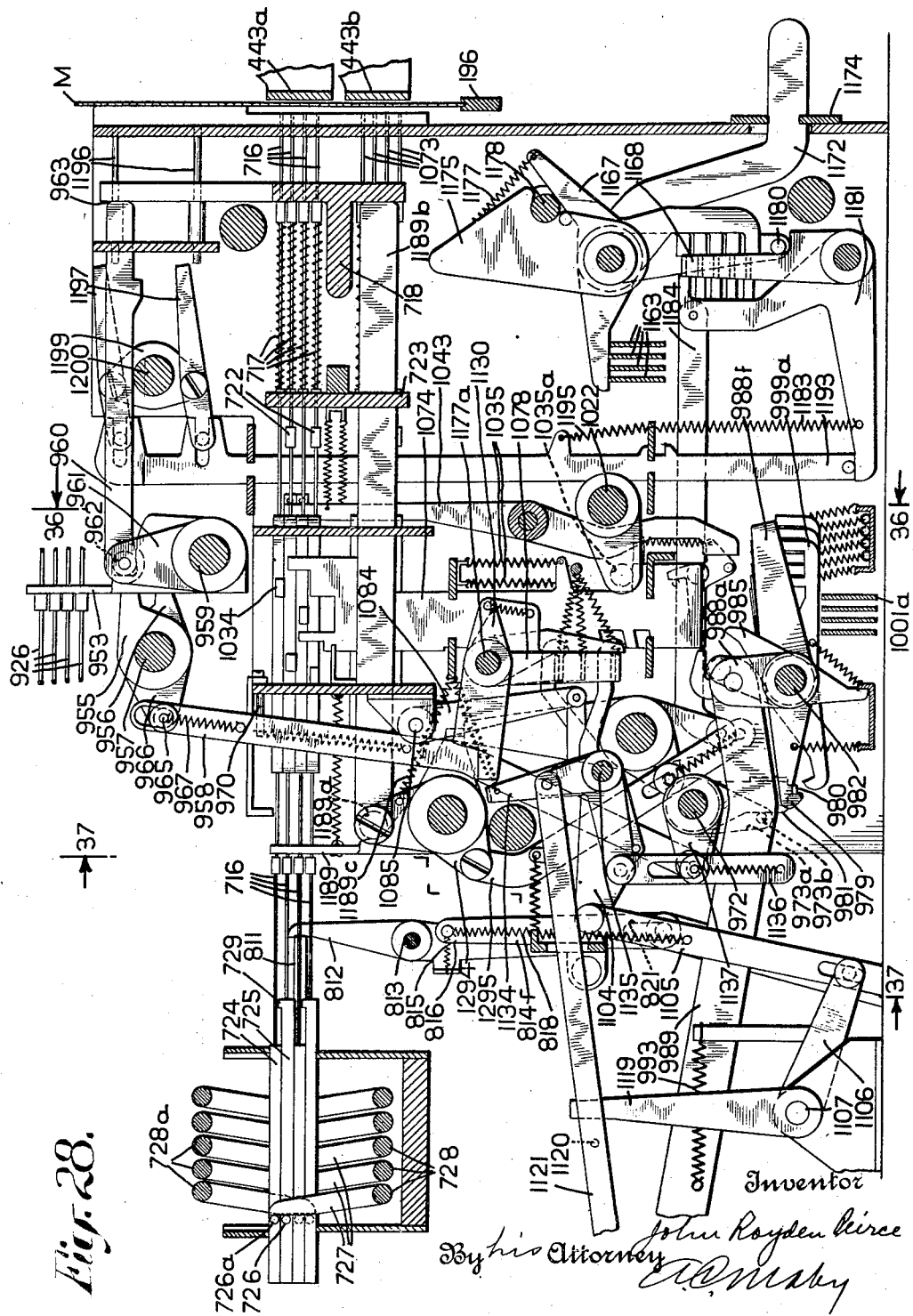
Figure 29:
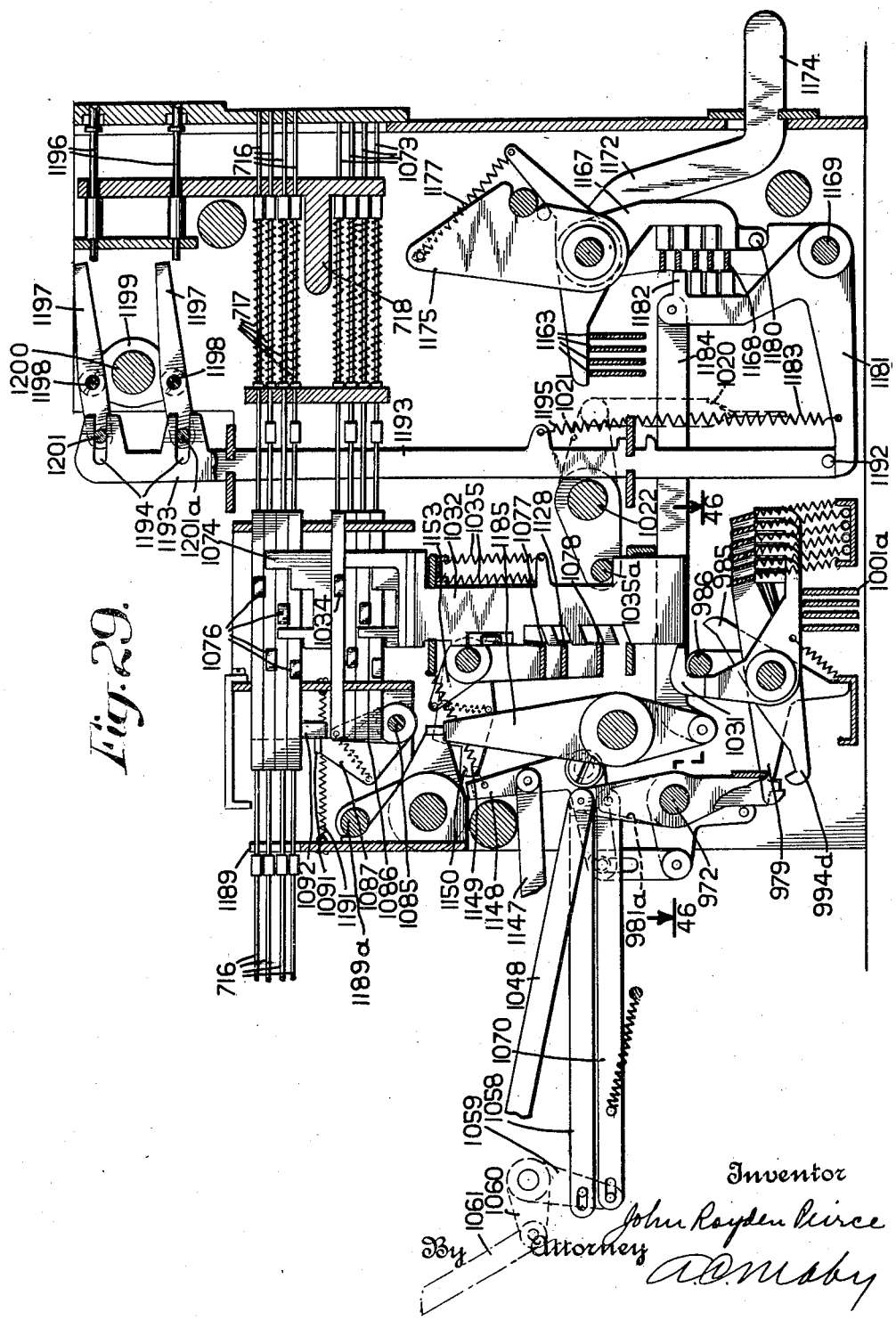
Figure 30:
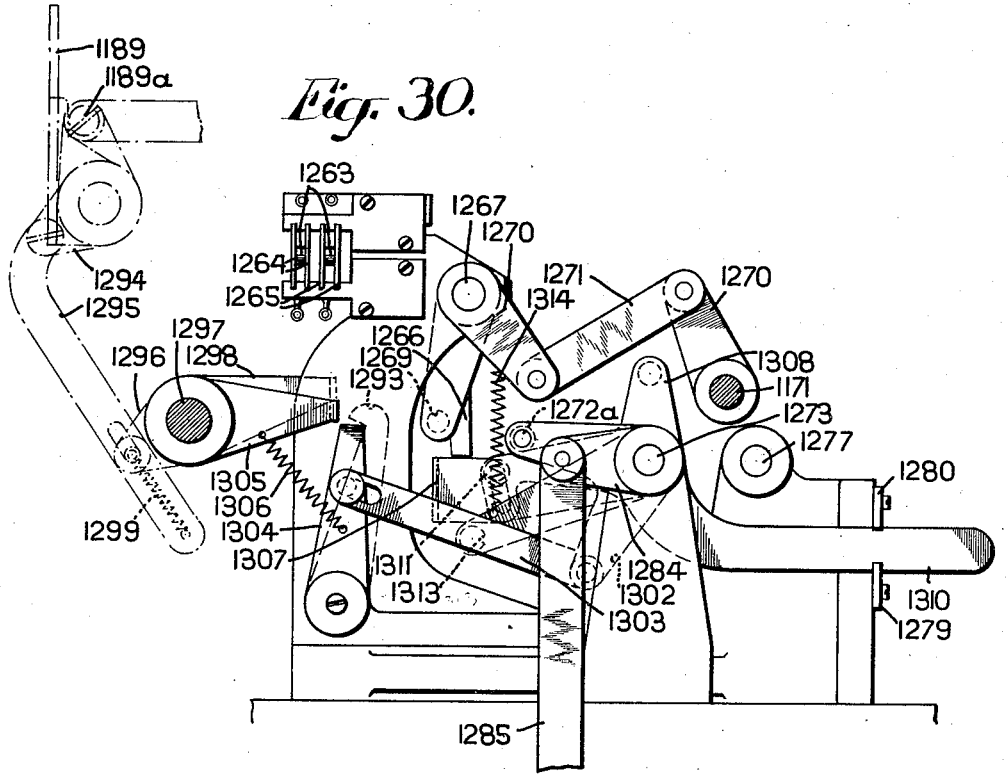
Figure 31:
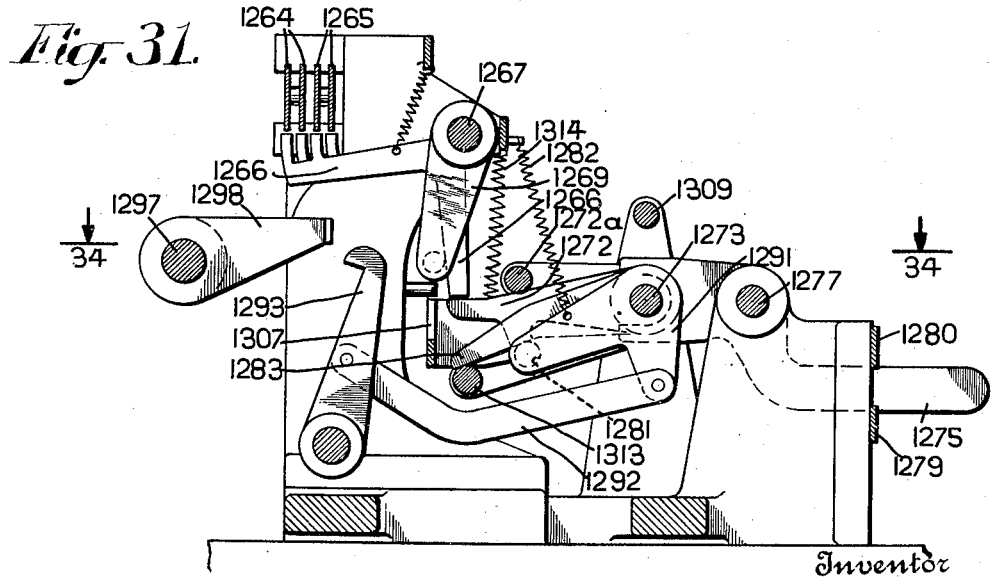

Fig. 7 is a section taken on line 7—7 of Fig. 10 showing mechanism for handling the receipts;

Fig. 8 is a section taken on line 8—8 of Fig. 7 showing the bill and receipt printing section of the machine from the left side;

Fig. 9 is a section taken on line 9—9 of Fig. 7 showing the magazine from which the receipt slips are fed, also the double type bars adapted to print upon the receipt slip and simultaneously upon the bill or notice card and the mechanism for effecting printing;

Fig. 9a is a detail of mechanism in Fig. 9;

Fig. 10 is a section taken on line 10—10 of Fig. 7 showing the receipt magazine and platen, also showing the type bars for printing data on the record end of the receipt sheet and upon the audit card, and also the punches and the plungers connected to the type bars for actuating the punches to perforate the combinations of holes representing the value which is printed;

Fig. 11 is a section taken on line 11—11 of Fig. 7 showing the receipt feeding mechanism viewed from the right side of the machine;

Fig. 12 is an enlarged sectional detail of the receipt feeding mechanism, the parts being in position with the receipt sheet in readiness to be printed upon;

Fig. 13 is an enlarged detail of a part of the mechanism shown in Fig. 7 of the receipt slip mechanism;

Fig. 14 is a detail of sensing pins adapted to sense the date in the record card or in the machine;

Fig. 14a is a fragmentary detail of pins shown in Fig. 97;

Fig. 15 is a detail of mechanism for causing the machine to stop if the receipt slip is not properly fed;

Fig. 16 is a section taken on line 16—16 of Fig. 6 showing the sensing elements for pre-reading the record card and certain comparing elements;

Fig. 17 is an enlarged detail of the pre-reading pins disclosed in Fig. 16;

Fig. 18 is a section taken on line 18—18 of Fig. 17;

Fig. 19 is a section taken on line 19—19 of Fig. 17, with the parts in their normal position;

Figs. 20, 21 and 22 show the mechanism of Fig. 19 in various operating positions;

Fig. 23 is a perspective view of combination slot combs controlled by the pre-reading pins for controlling the subsequent operations of the machine;

Fig. 24 is a fragment of the card showing the fields which are pre-read and which control the operation of the mechanism of Fig. 23;

Fig. 25 shows the combinations of perforations used in the pre-reading control fields;

Fig. 26 is a detail of the construction of the pins showing a flexible connection with the combs whereby the pins may be restored to normal position without restoring the combs;

Fig. 27 is a front elevation of a portion of the machine showing some of the manual set up mechanisms for controlling the operation of the machine;

Fig. 28 is a section taken on line 28—28 of Fig. 27 showing record card analyzing pins and mechanism controlled thereby;

Fig. 29 is a section taken on line 29—29 of Fig. 27 also showing the sensing pins for reading the perforations in the record card;

Fig. 30 is a section taken on line 30—30 of Fig. 27 showing mechanism for controlling the amount due sensing pins;

Fig. 31 is a section taken on line 31—31 of

Figure 32:
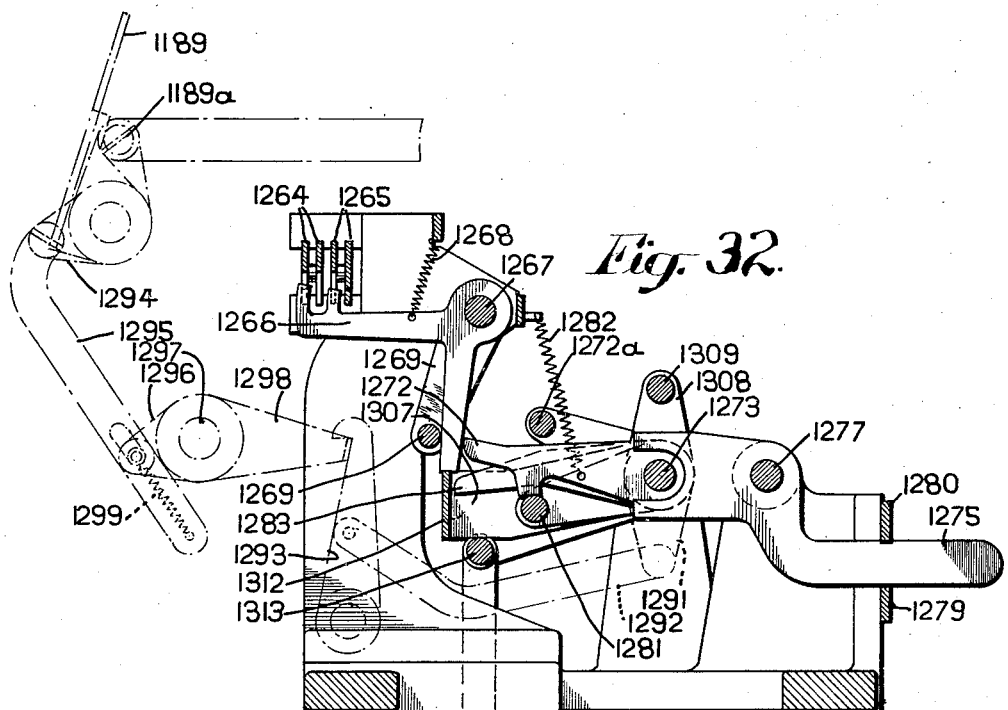
Figure 33:
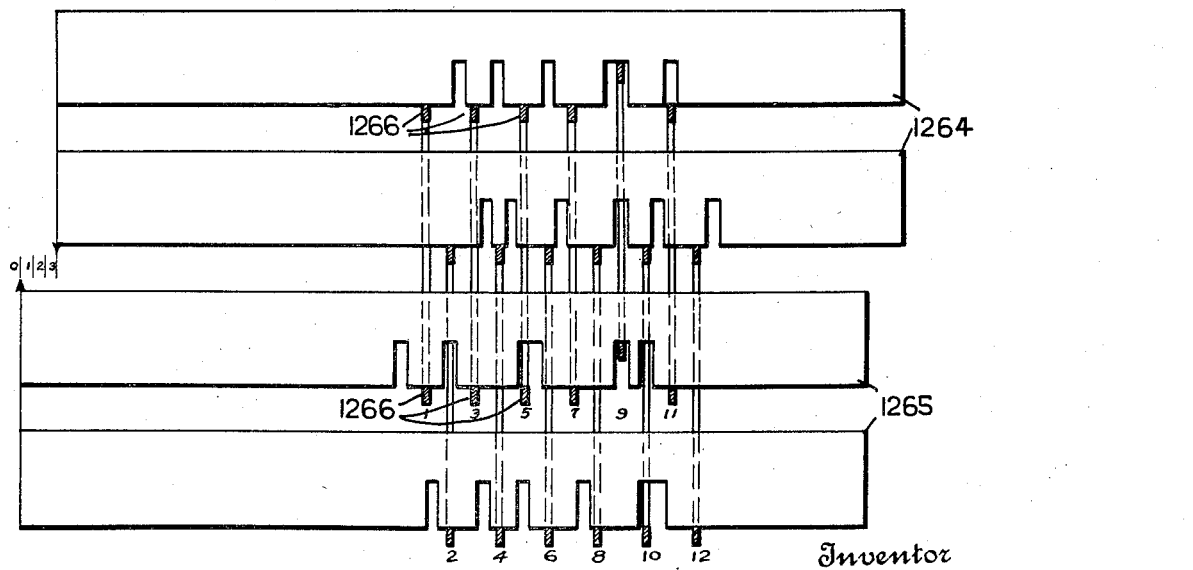
Figure 34:
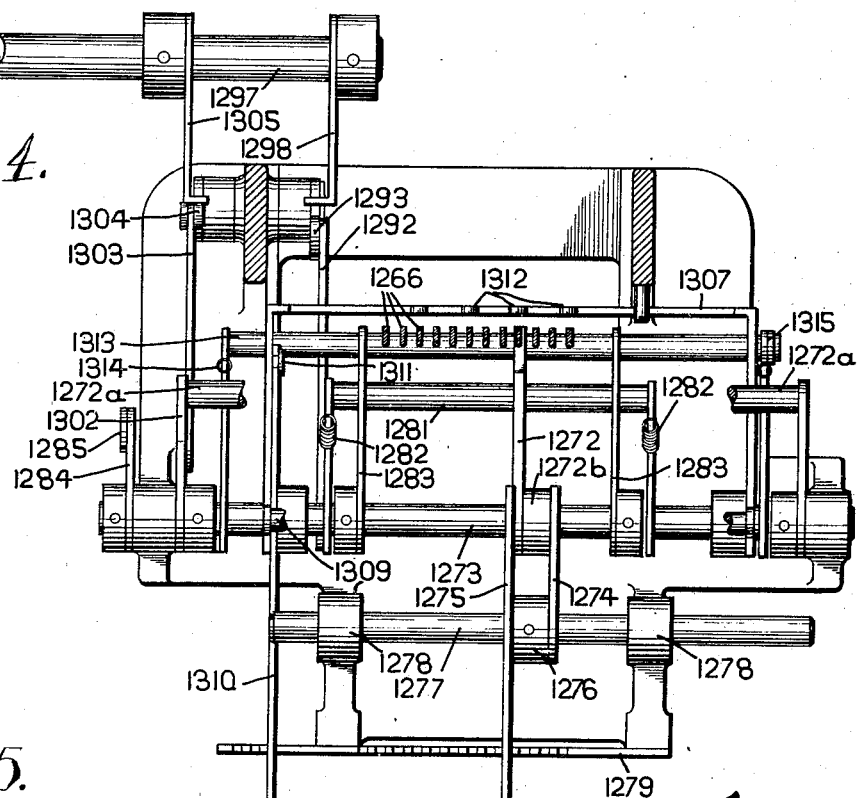
Figure 35:
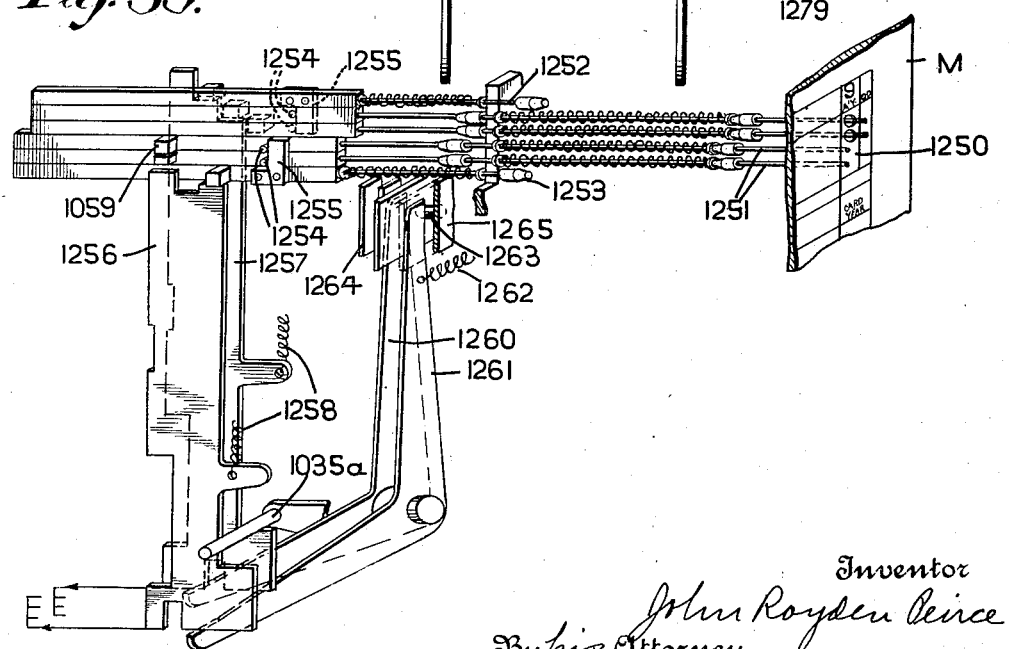
Figure 36:
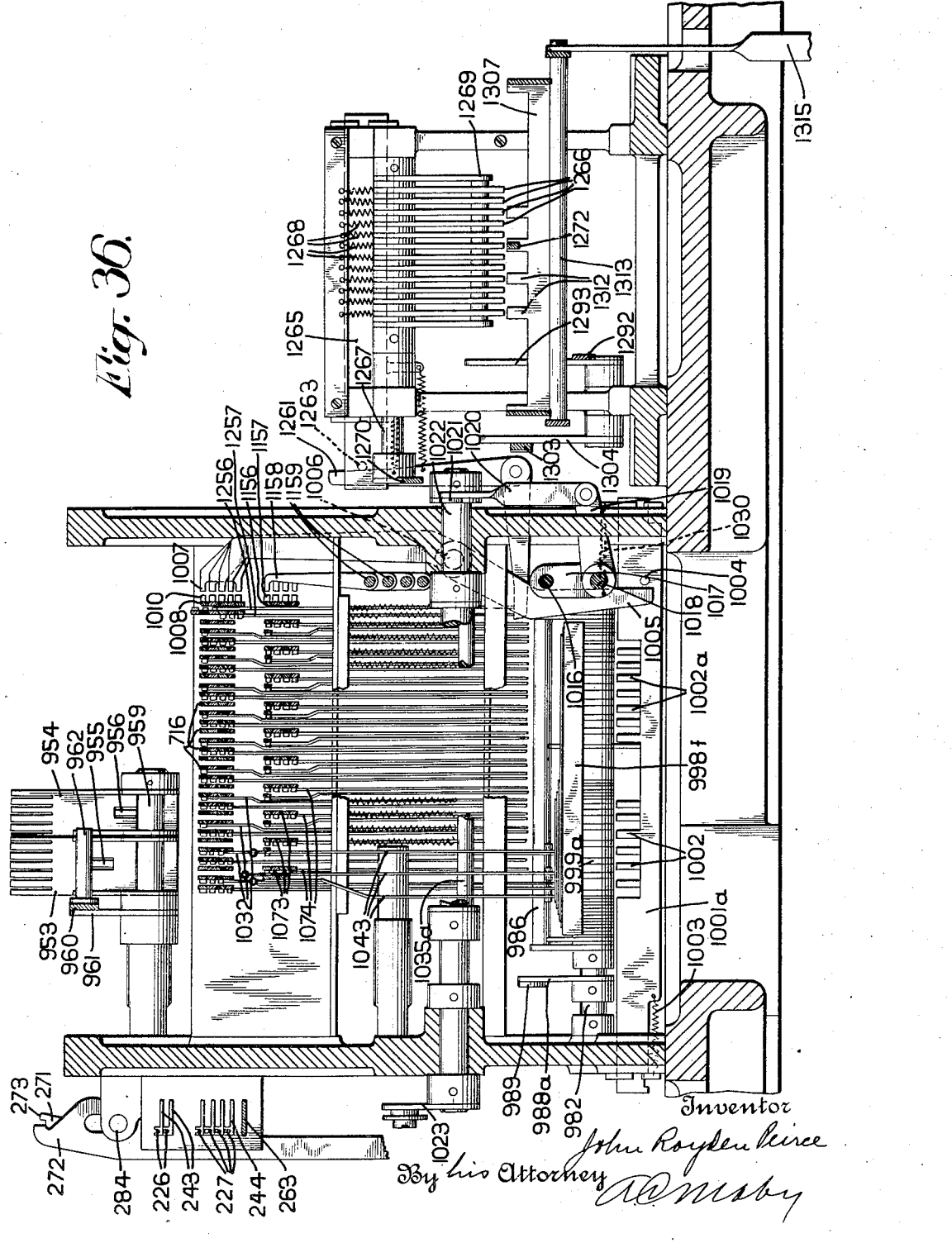
Figure 37:
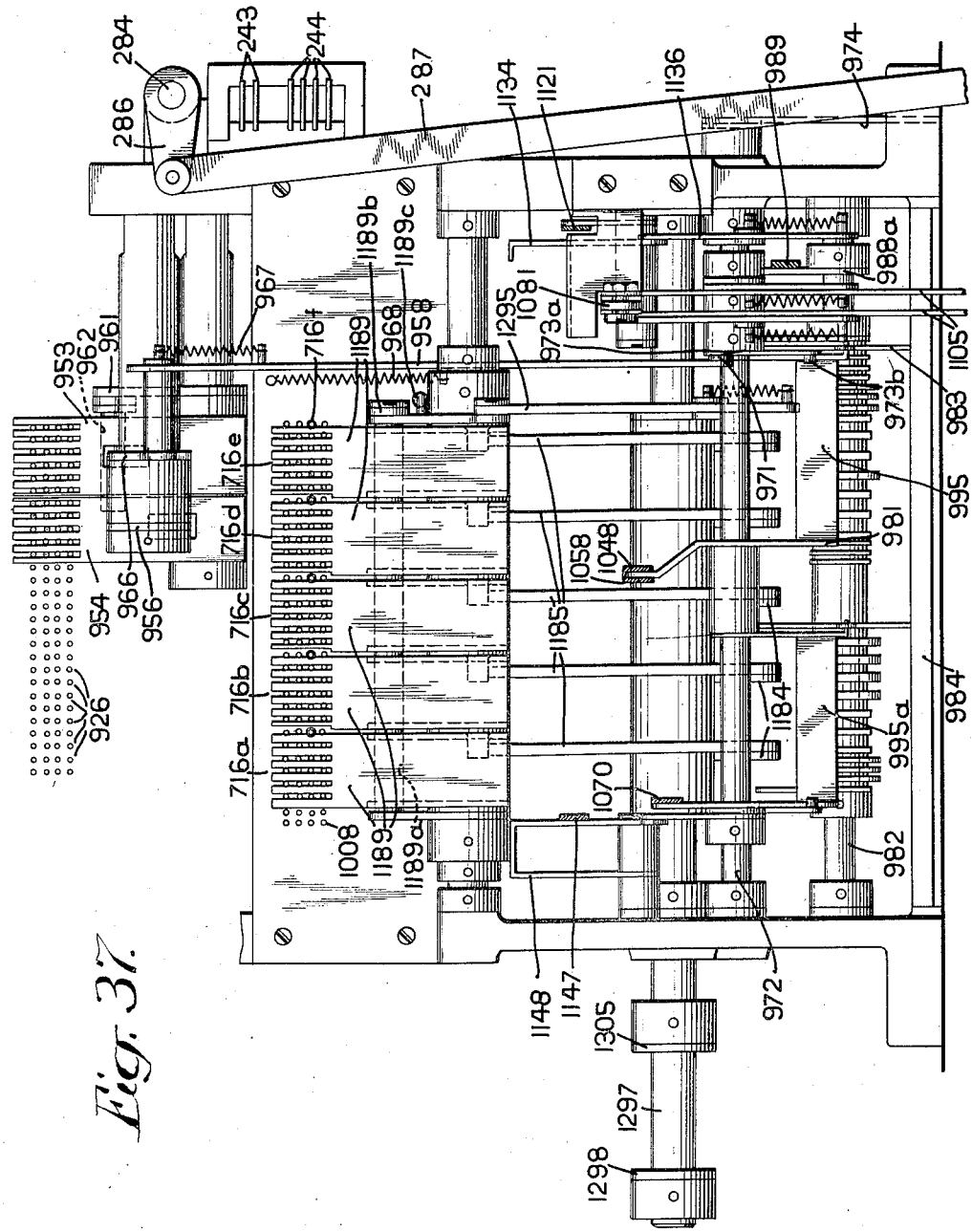
Figure 60:
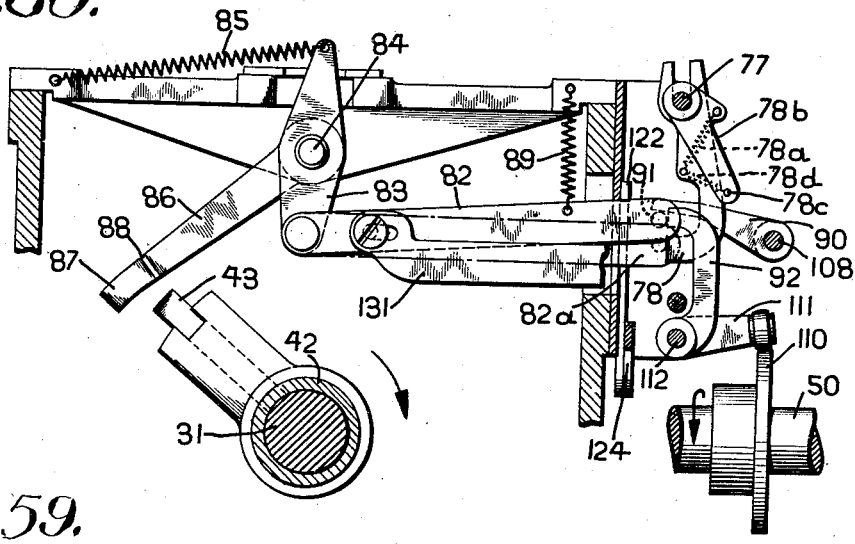
Figure 59:
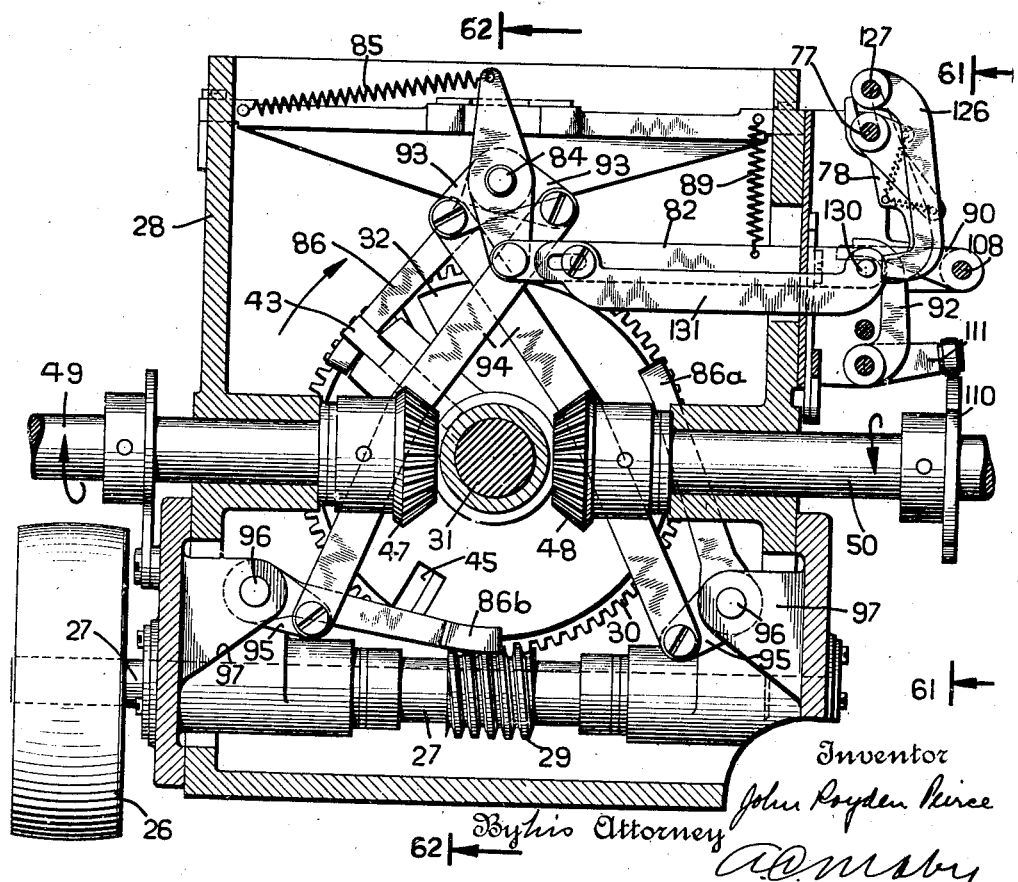
Figure 61:
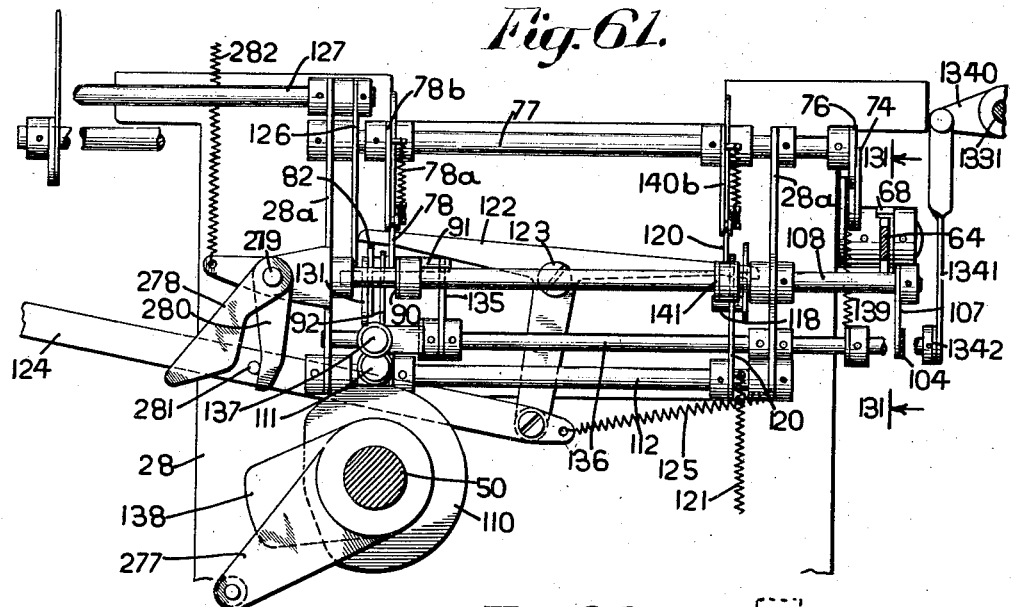
Figure 62:
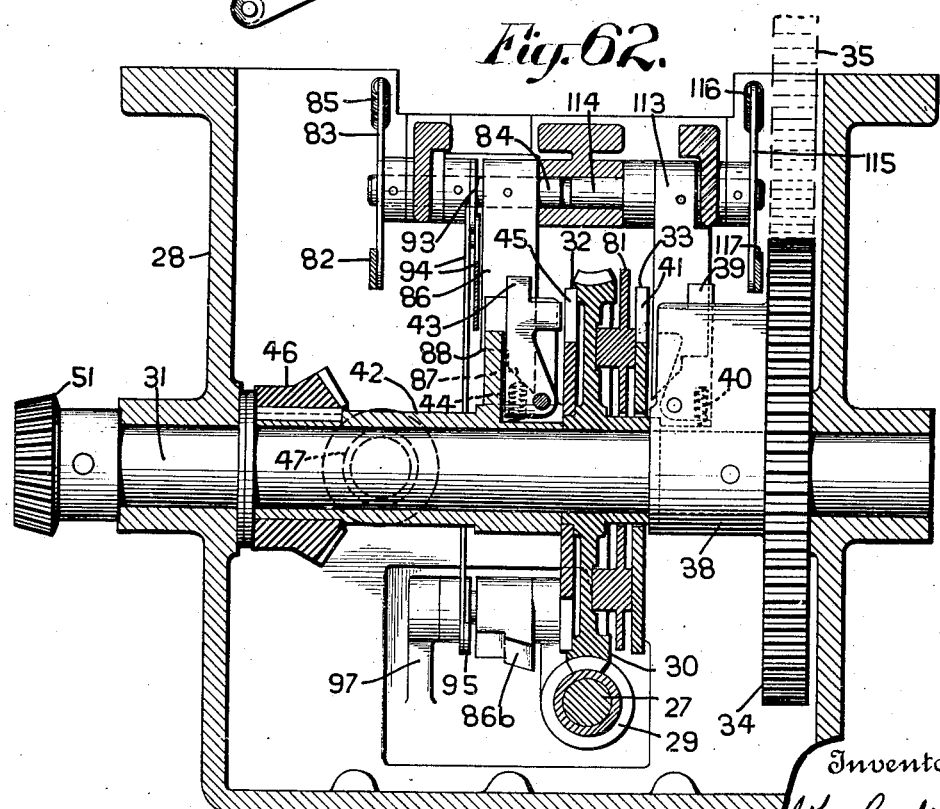
Figures 92, 92A:
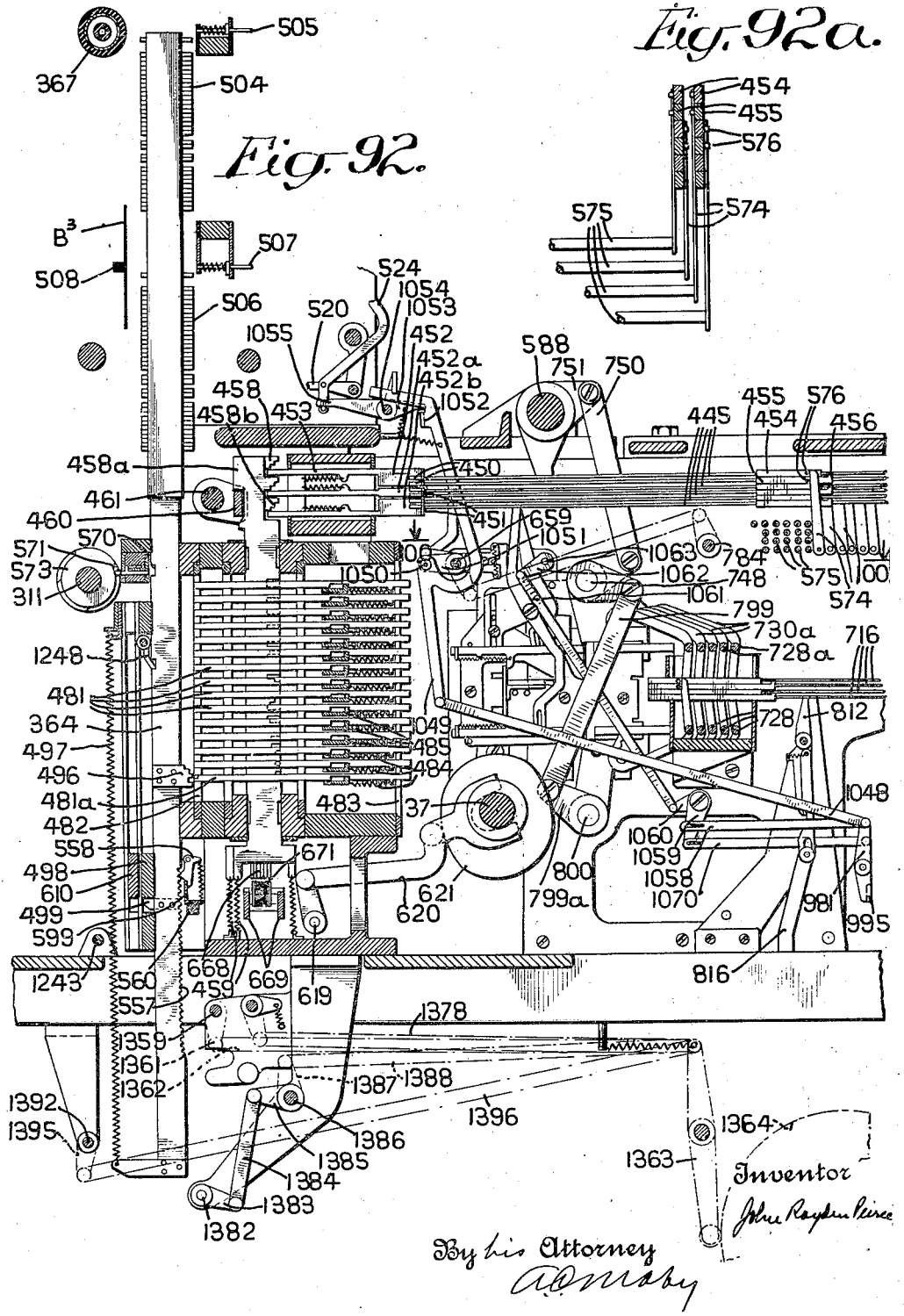
Figure 93:
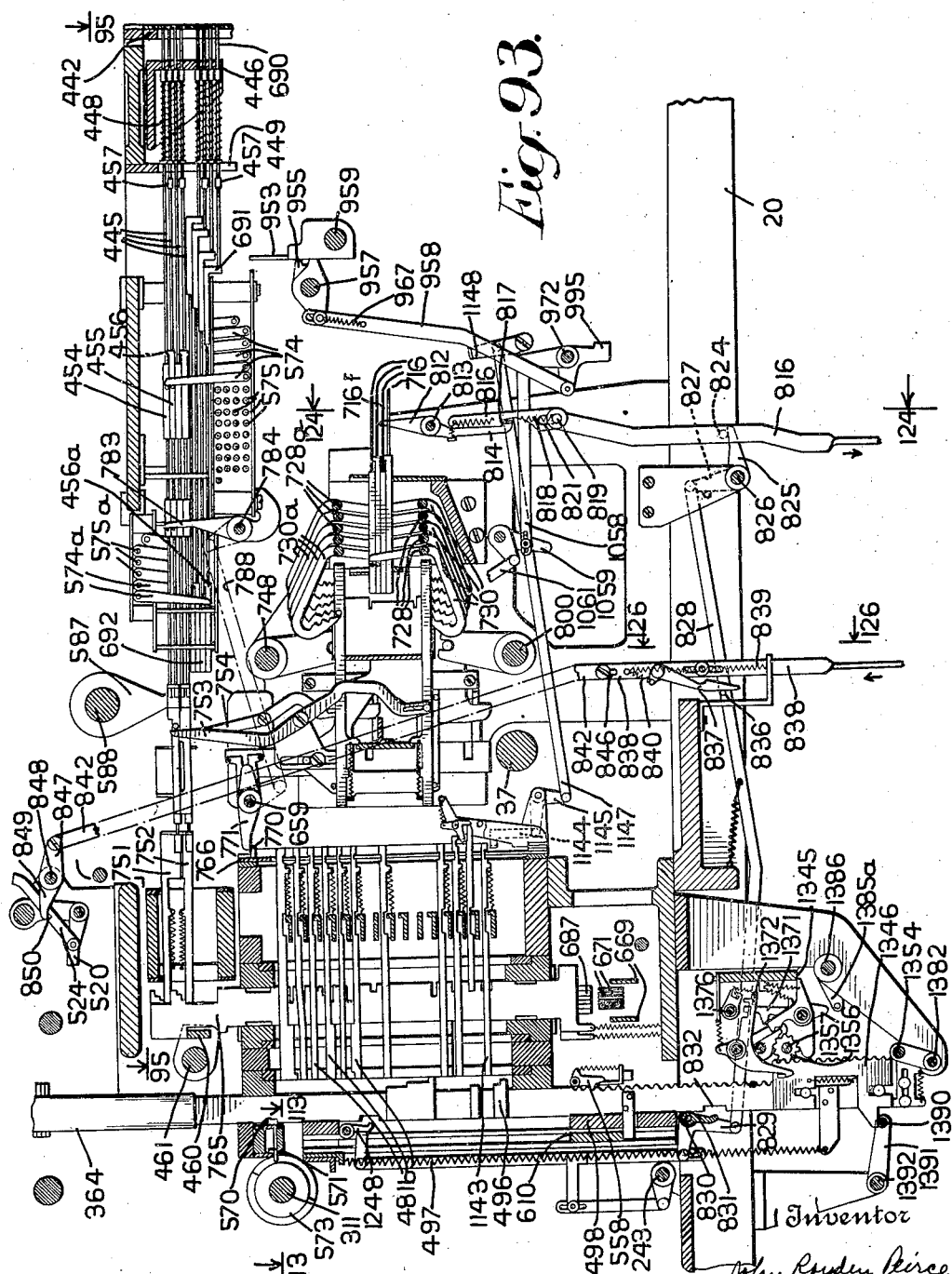
Figure 94:
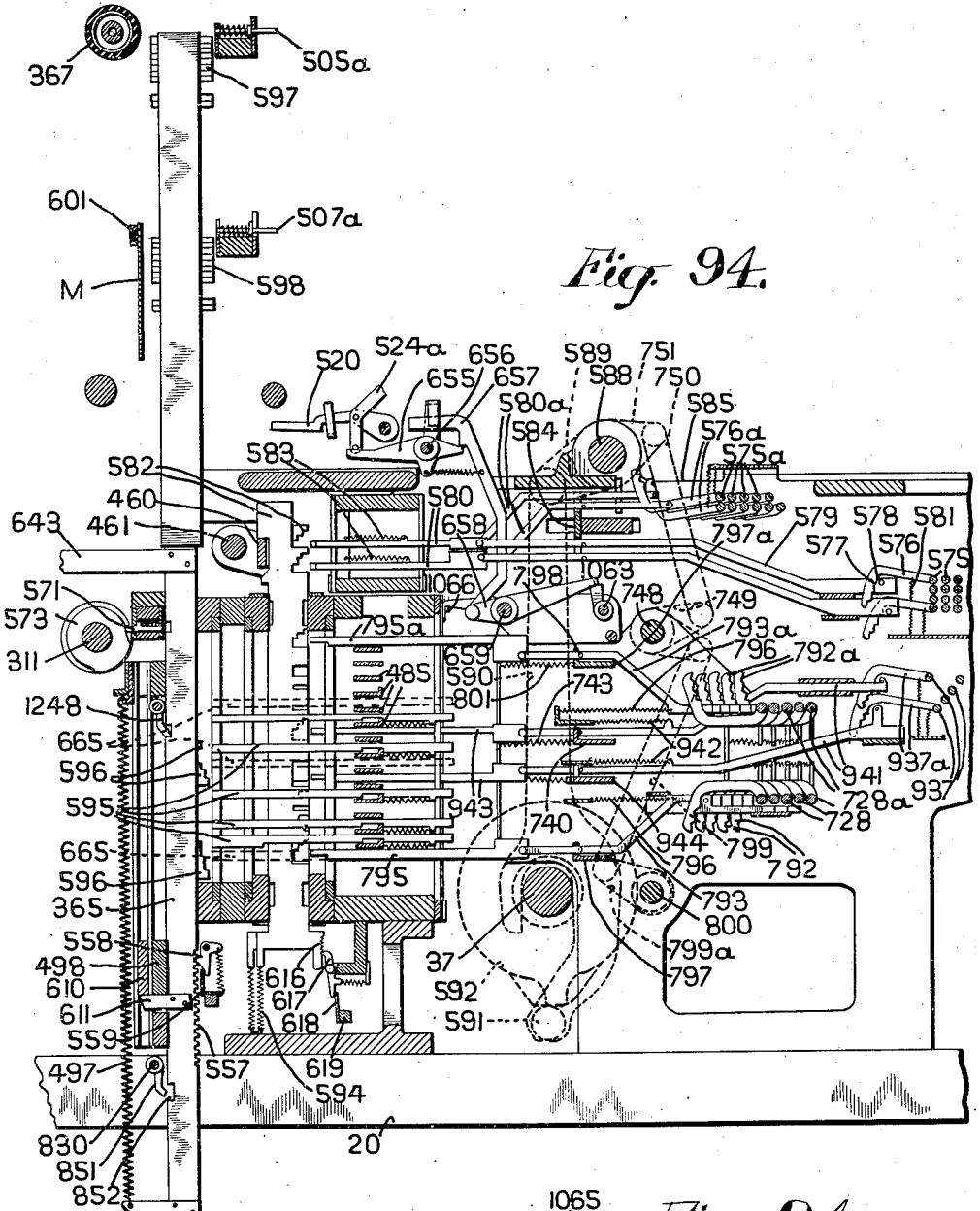
Figure 94A:
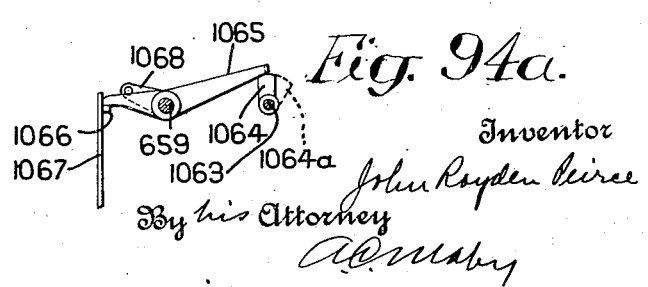
Figure 95:
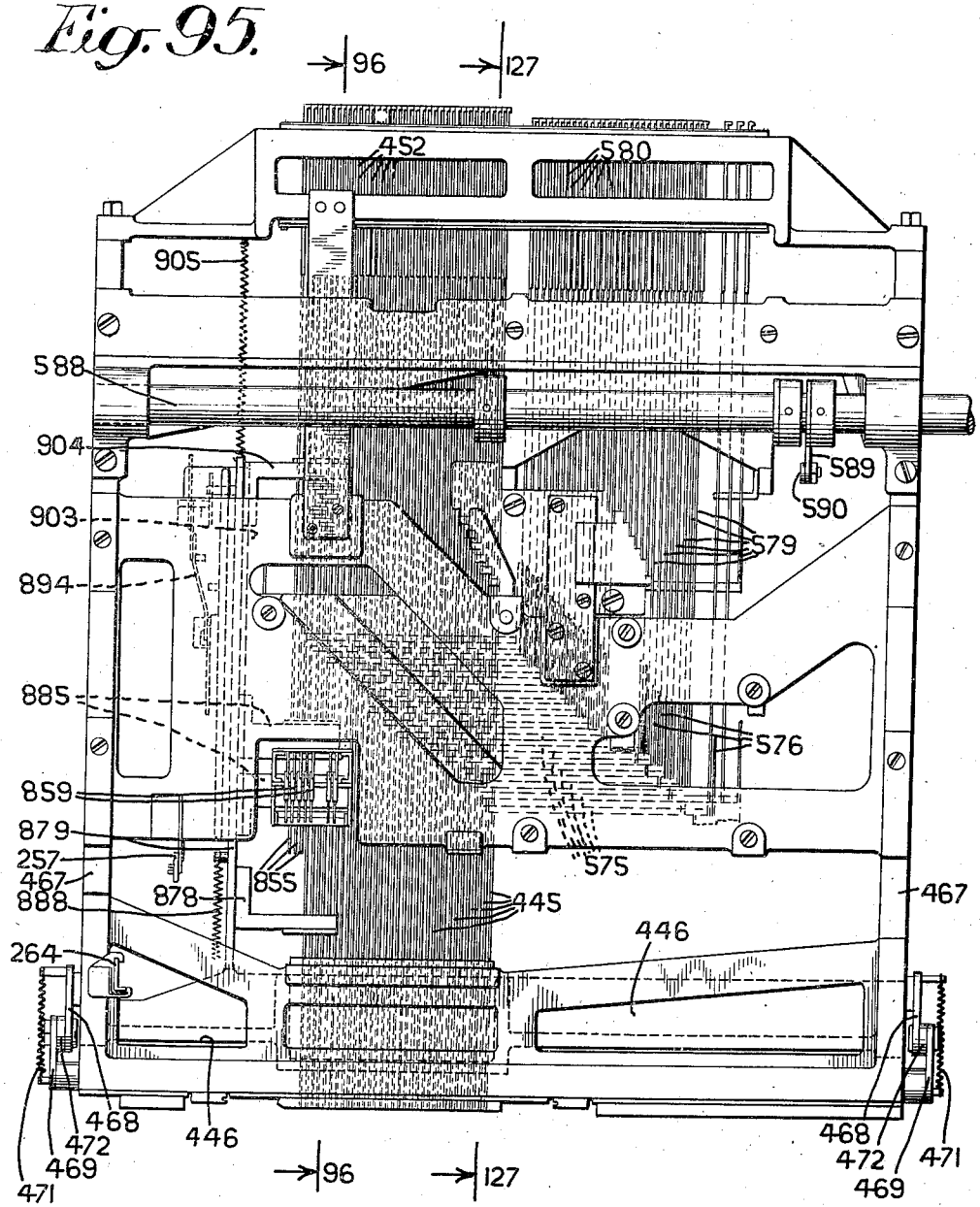
Figure 99:
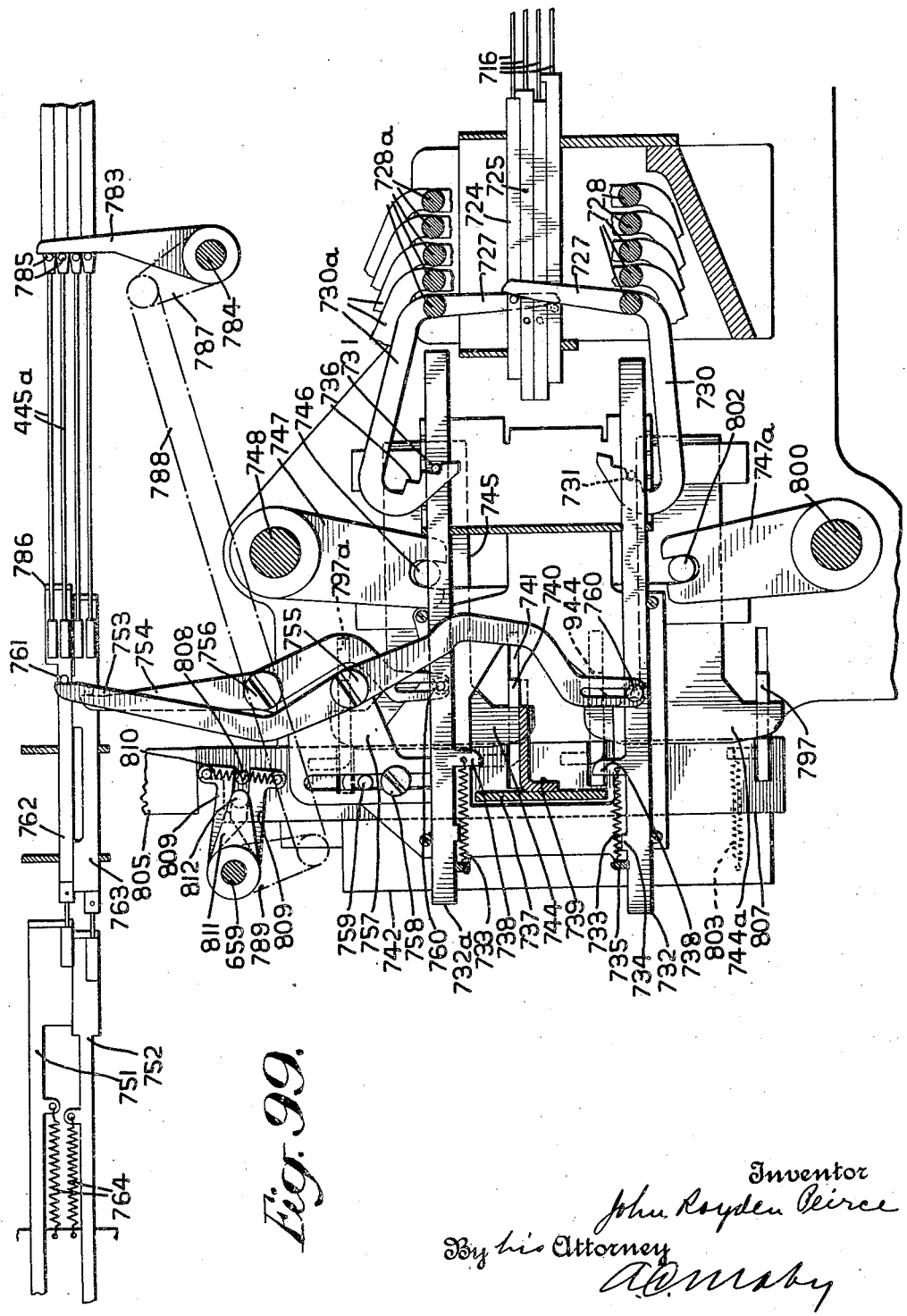
Figure 123:
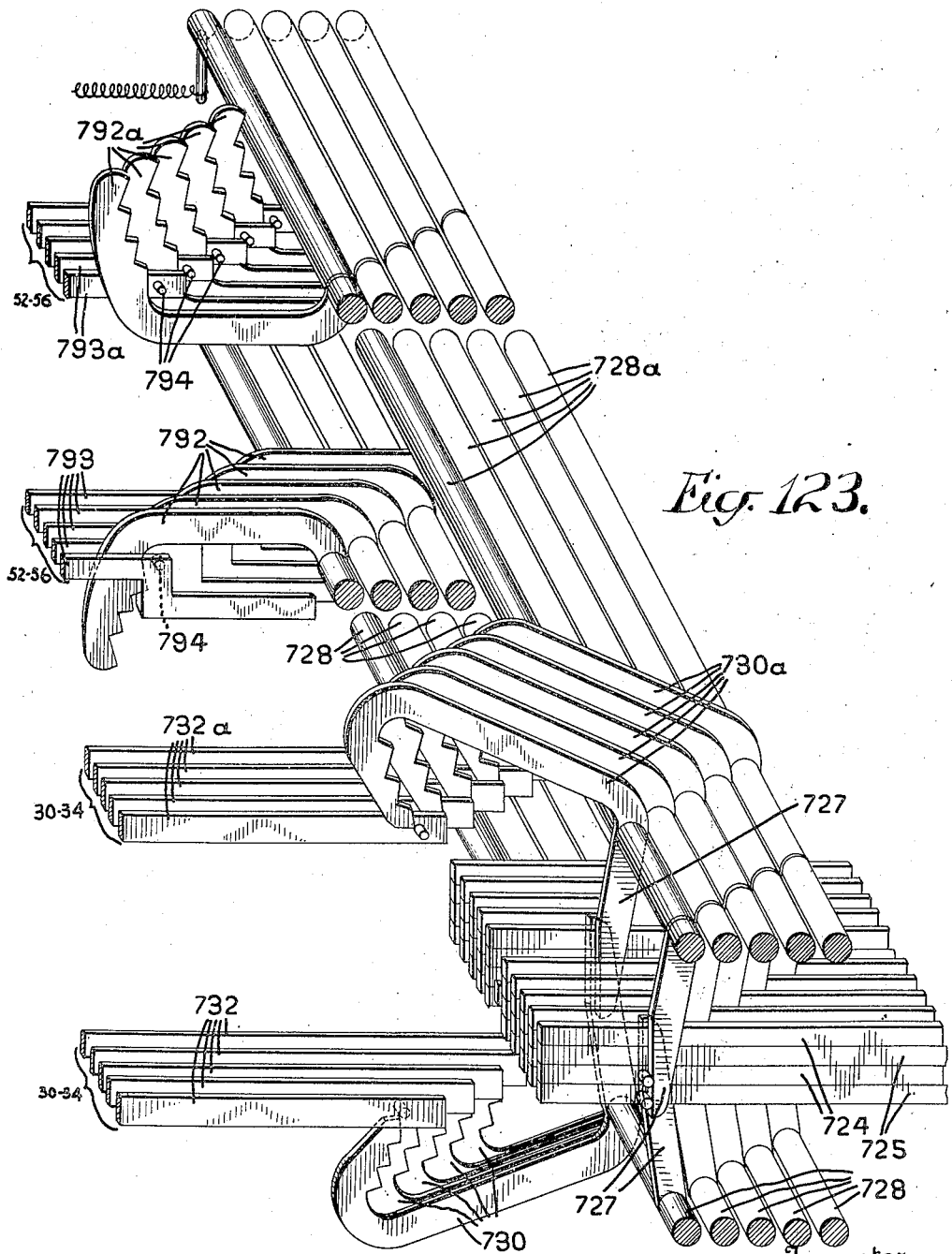
Figure 133:
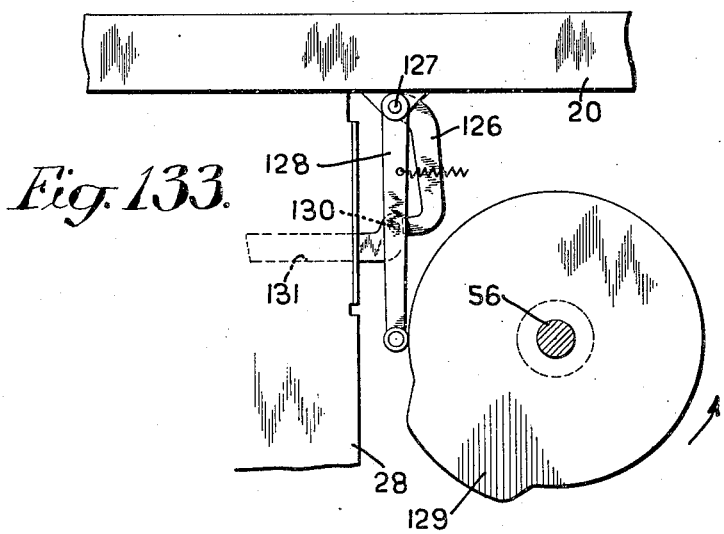
Figure 134:
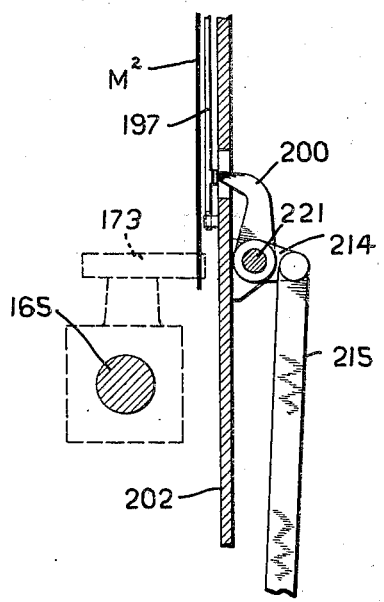
Figure 135:
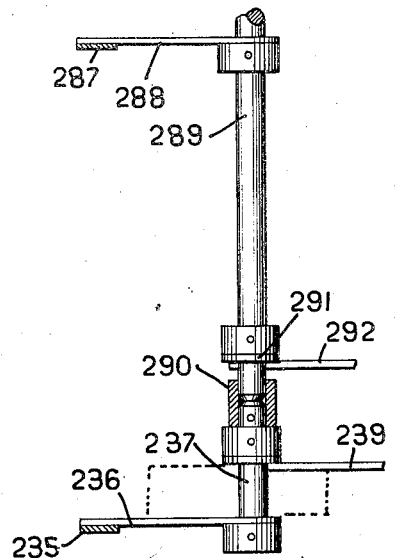
Figure 136:
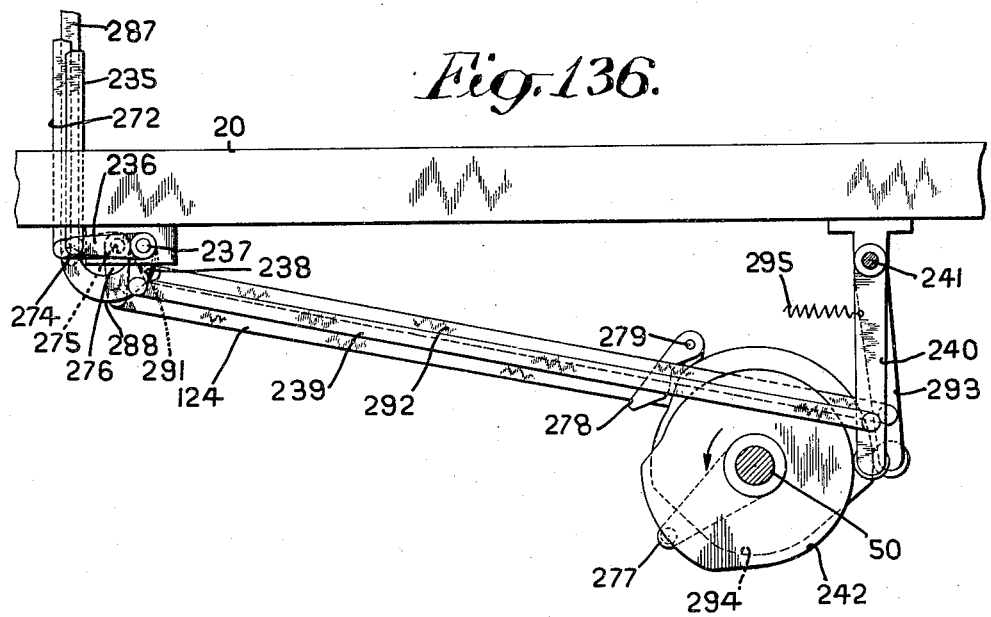
Figure 137:
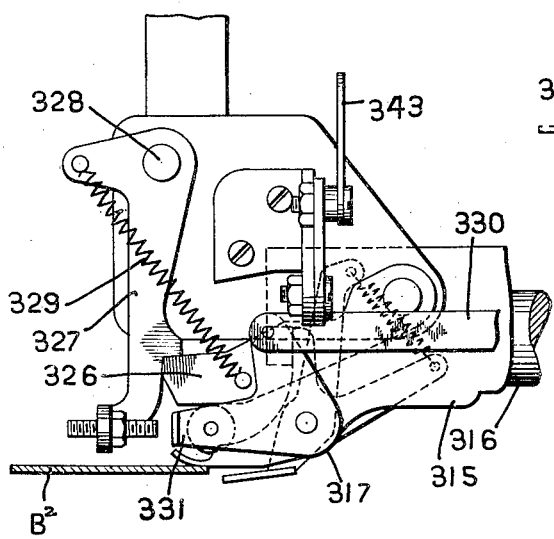
Figure 138:
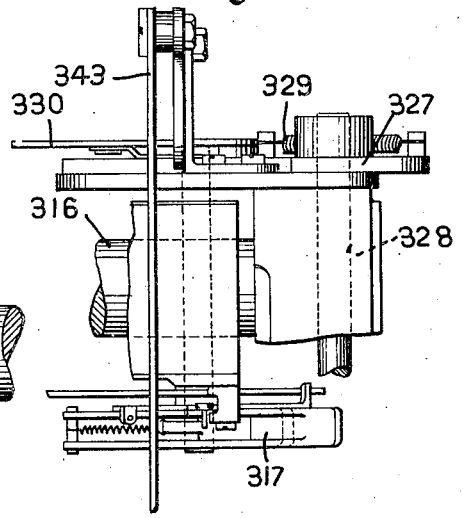
Figure 139:
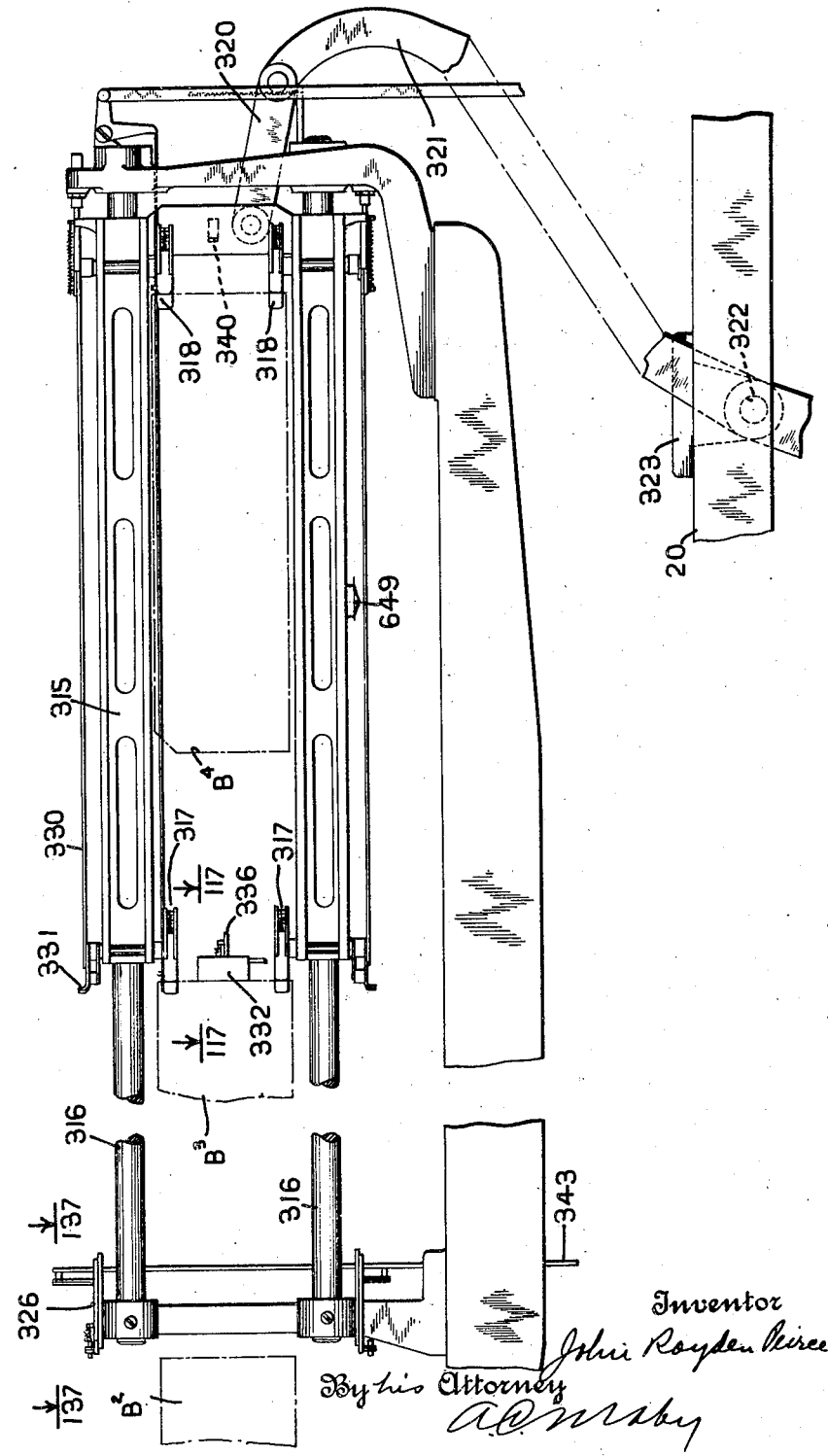
Figure 140:
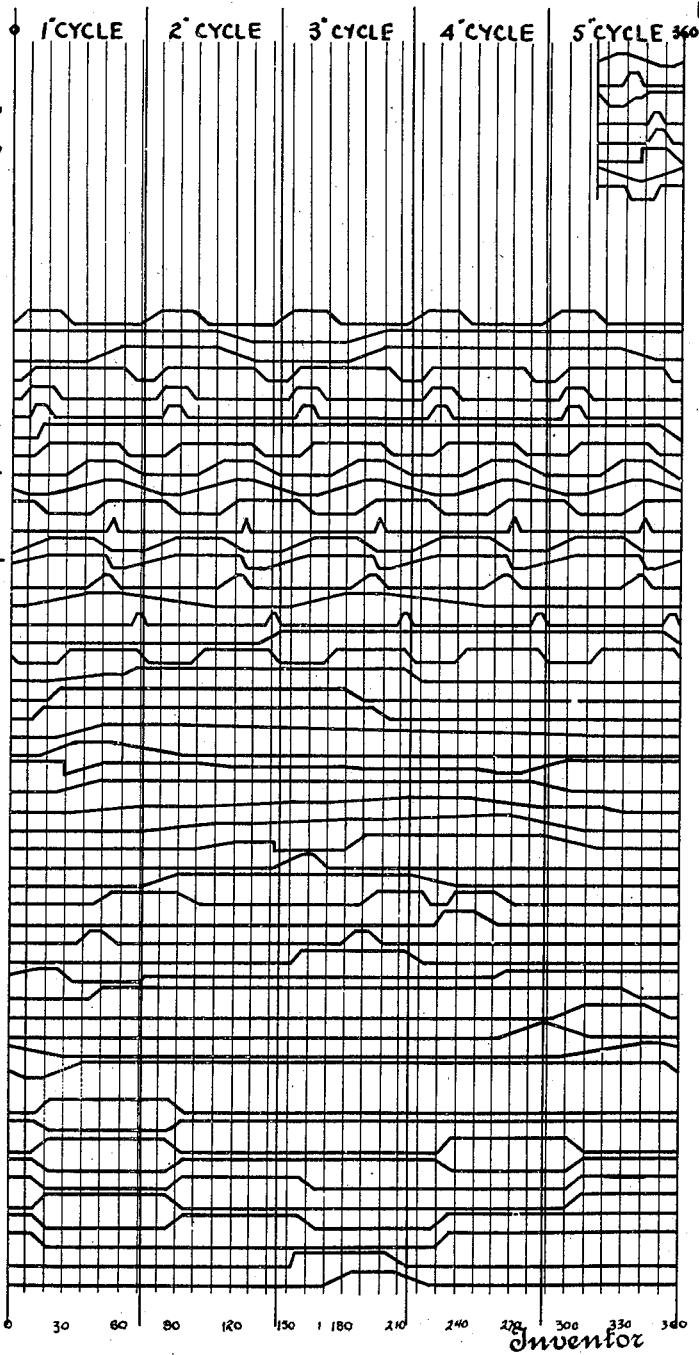

Fig. 27 showing mechanism for controlling the amount due sensing mechanisms;

Fig. 32 is a section taken on line 32—32 of Fig. 27 showing the parts of Figs. 30, 31 in moved position;

Fig. 33 is a diagrammatic representation of slotted combs and means associated therewith for ascertaining the value represented by the combined positions of the combs, the combs being in position to represent the ninth month of the year;

Fig. 34 is a section taken on line 34—34 of Fig. 31;

Fig. 35 is a detail of sensing pins for analyzing a field in the master card showing an arbitrary condition of the account indicating when certain periodical credit payments are due to the customer, and including mechanisms for ascertaining the amount of the credit;

Fig. 36 is a section taken on line 36—36 of Fig. 28 showing mechanism for analyzing the record cards and for ascertaining when a card belonging to a wrong file is mixed in with the cards being analyzed;

Fig. 37 is a section taken on line 37—37 of Fig. 28;

Fig. 38 is a perspective view of record card analyzing pins and mechanism associated therewith cooperating with a current date set up in the machine for ascertaining which of several fields in the card contains the record for the current year or other current period;

Fig. 39 is a detail of parts of the mechanism shown in Fig. 29 including punch actuating mechanism;

Fig. 40 is a detail of part of the mechanism of Fig. 39 in an operating position in which a punch of one of two horizontal rows of punches is being actuated;

Fig. 41 is a top plan view of the mechanism of Fig. 40 showing the punch actuating mechanism stepped to one side to cause a particular one of the punches in a horizontal row to be actuated;

Fig. 42 is a perspective view of card sensing pins adapted to analyze different fields in a card representing different periods, the parts being in normal position;

Fig. 43 shows the mechanisms of Fig. 42 in moved positions controlled by the status of the account;

Figs. 44 and 45 show the parts in other moved positions representing other conditions of the account;

Fig. 46 is a section upon line 46—46 of Fig. 29 showing mechanism adapted to sense on the record card data representing commissions due from year to year to selling agents identified with the transaction;

Fig. 47 is a detail of card sensing pins adapted to analyze the perforations to indicate when payments are due and to control mechanism disclosed in Fig. 46;

Fig. 48 shows the elements of Fig. 47 in their normal positions;

Figs. 49 and 50 show the card sensing pins in normal and reading positions respectively;

Fig. 51 shows the field in the card which is analyzed by the sensing pins of Figs. 49 and 50 showing perforations causing the parts to assume the positions of Fig. 50;

Fig. 52 is a view similar to Fig. 51 showing a different combination of perforations for controlling the sensing pins of Figs. 49 and 50;

Fig. 53 is a detail perspective view of card analyzing means for sensing a lapsed condition of an account and for controlling the machine according to the condition of the account;

Fig. 54 is a detail of mechanism shown in Fig. 53;

Fig. 55 is a detail of mechanisms controlled in accordance with the condition of the account for controlling the printing type bars;

Fig. 56 is a detail of mechanism for causing stoppage of the machine under control of the condition of the account;

Fig. 57 is a view of the mechanism shown in Fig. 56 in position adapted to cause stoppage of the machine;

Fig. 57a shows parts of Fig. 57 separated in order that the operation may be more clearly understood;

Fig. 58 is a section taken on line 58—58 of Fig. 57;

Fig. 59 is a section on line 59—59 of Fig. 89 showing the clutch mechanism for clutching the machine drive elements to the main driving shaft;

Fig. 60 is a detail of part of the mechanism shown in Fig. 59 and in operating position;

Fig. 61 is a section on line 61—61 of Fig. 59;

Fig. 62 is a section on line 62—62 of Fig. 59;

Fig. 63 is a detail of the clutch mechanism and the manually actuated keys for controlling the same;

Fig. 64 is a detail of the starting and stopping of the keys;

Fig. 65 is a view of the mechanism shown in Fig. 60 in different positions;

Fig. 66 is a perspective view of mechanism for controlling the clutches;

Figs. 67 and 68 are detail views of accumulating mechanism adapted to ascertain the difference between a debit and a credit amount to control the printing of such difference;

Fig. 69 is a section taken on line 69—69 of Fig. 68;

Fig. 70 is a detail of mechanism controlled by the accumulator for stopping the machine when the credit amount is greater than the debit amount;

Figs. 71 and 72 are details of parts of the mechanism of Fig. 70 in moved positions;

Figs. 73, 74, 75, and 76 are diagrammatic views of combination slot combs adapted to be controlled by the card sensing pins and adapted in turn to control the positioning of printing type bars;

Figs. 77 and 78 are perspective views of the combs and the feeler bars for ascertaining the relative positions of the combs and for controlling the setting of the type bars;

Fig. 79 is a detail of mechanism for taking a reading from the combination combs and for preserving such reading to cause printing of the data represented thereby during a subsequent cycle of operation of the machine;

Fig. 80 is a section on line 80—80 of Fig. 79;

Figs. 81 and 82 are views of the mechanism of Fig. 79 in different operating positions;

Fig. 83 is a detail of the master record card supporting frame and means for moving the card step by step to present different fields thereof to the sensing pins;

Fig. 84 is a section on line 84—84 of Fig. 83;

Figs. 85, 86, 87 and 88 are detail views of card feeding clips in advance positions;

Figs. 89 and 89a taken together constitute a section of the machine showing the mechanisms below the supporting base;

Fig. 90 is a section on line 90—90 of Fig. 5 showing mechanisms below the base line of the machine;

Fig. 91 is a section on line 91—91 of Fig. 5 showing driving mechanisms and certain card sensing pins and associated mechanisms;

Fig. 92 is a section on line 92—92 of Fig. 91 showing the alphabetical type bars;

Fig. 92a is a detail of parts shown in Fig. 92;

Fig. 93 is a section on line 93—93 of Fig. 91 showing card sensing pins and certain type bars controlled thereby;

Fig. 94 is a section taken on line 94—94 of Fig. 91 showing the type bars for printing debit amounts;

Fig. 94a is a detail of parts shown in Fig. 94;

Fig. 95 is a section taken on line 95—95 of Fig. 93 showing certain card sensing pins and means for transferring their reading thereof to a different portion of the machine;

Fig. 96 is a section on line 96—96 of Fig. 95 showing details of certain card sensing pins;

Fig. 96a is a fragmentary view of parts of Fig. 96;

Fig. 97 is a section taken on line 97—97 of Fig. 96 showing mechanisms for manually effecting control set ups for the machine;

Fig. 98 is a diagrammatic view showing the arrangement of characters on the various type bars;

Fig. 99 is a detail of debit sensing pins;

Fig. 100 is a section on line 100—100 of Fig. 92 showing certain of master record card sensing pins and mechanisms associated therewith;

Fig. 101 is an enlarged detail of part of the mechanism shown in Fig. 91;

Fig. 102 is a detail plan view of the mechanism shown in Fig. 101;

Fig. 103 is a detail of certain of the type bar stops;

Fig. 104 is a section taken on line 104—104 of Fig. 103;

Fig. 105 is a detail of part of the mechanism shown in Fig. 93;

Fig. 106 is a detail of part of the mechanism shown in Fig. 16 in a different position;

Fig. 107 is a detail of certain card sensing pins, the combination combs controlled thereby and the type bars in turn controlled by the combs;

Fig. 108 is a detail of mechanisms associated with such type bars;

Fig. 109 is a side view of mechanisms shown in Fig. 108;

Fig. 110 is a section on line 110—110 of Fig. 108;

Fig. 111 is a detail showing interconnections between certain of the combination combs disclosed in Fig. 107;

Fig. 112 is an end view of the combs shown in Fig. 111;

Fig. 113 is a sectional plan view taken on the line 113—113 of Fig. 93 showing certain details of the type bars and means for locking some of the type bars against operation;

Figs. 114 and 115 are details of the receipt slip feeding mechanism, Fig. 115 being taken on line 115—115 of Fig. 114;

Fig. 116 is a section taken on line 116—116 of Fig. 10 showing mechanisms for disposing of the particles punched out of the cards;

Fig. 117 is a detail of mechanism for controlling the positioning of the audit card and bill or notice card in the machine;

Fig. 118 is a detail of the manually set up device for controlling the machine to operate under control of a predetermined section of the card;

Fig. 119 is a front view of the mechanism shown in Fig. 118;

Fig. 120 is a section on line 120—120 of Fig. 119;

Fig. 121 is a section taken on line 121—121 of Fig. 96;

Fig. 122 is a detail of mechanism partly shown in Fig. 99;

Fig. 123 is a perspective view of mechanism for controlling the entering of the debit amount on the audit card;

Fig. 124 is a section on line 124—124 of Fig. 93 showing mechanism controlled by the debit amount sensing pins;

Fig. 125 is a detail of mechanism for controlling the accumulator wheels, the same being in turn controlled by the pins disclosed in Fig. 124;

Fig. 126 is a section on line 126—126 of Fig. 93;

Fig. 127 is a section on line 127—127 of Fig. 95;

Fig. 128 is an enlarged detail of part of the mechanism shown in Fig. 127 taken on line 128—128;

Fig. 129 is a detail of parts of the mechanism shown in Fig. 127 in different positions;

Fig. 130 is a detail of parts of the mechanism shown in Fig. 127;

Fig. 131 is a sectional detail taken on line 131—131 of Fig. 61 of the clutch mechanism;

Fig. 132 is a detail of clutch control mechanism of Fig. 61 actuated by mechanism of Figs. 19 to 22;

Fig. 133 is a detail of clutch mechanism of Figs. 59 to 61;

Fig. 134 is a detail of card control means of Figs. 84 and 6a;

Fig. 135 is a detail of card pre-reading mechanism shown in Fig. 89a;

Fig. 136 is a detail of mechanism associated with the pre-reading device;

Fig. 137 is a sectional detail taken on line 137—137 of Fig. 139;

Fig. 138 is a detail of the mechanism of Fig. 137;

Fig. 139 is a detail of card feeding mechanism;

Fig. 140 is a timing diagram indicating the times of operation of the various parts of the machine.

While my invention is adapted for use in connection with various kinds of bookkeeping and billing systems I will describe the manner in which it may be used in connection with insurance records. From the description it will readily be seen that the invention may be employed for the keeping of other kinds of records and for the making of bills in connection with other types of accounts. Also the form of record disclosed may be varied in numerous ways in order to place the various items of the account in other positions upon the record card or to provide more space for some of the items of the record. These changes may be made whether the invention is employed in connection with insurance accounts or other accounts. When applied to the keeping of records and the making of bills in connection with insurance policies the ledger account or master record may be entered upon the master record card M shown in Fig. 2.

Briefly, the items contained on this card along the upper edge of the card are the date, the policy number, the plan or kind of insurance, the district in which the account arose, the premium or debit amount due from the customer or policy holder and the number or times of payments due from the customer. Directly below this data are perforations representing such data and adapted to be analyzed by the machine to control the operation thereof. The next printed line of data includes the name of the customer or insured, also the State in which the insured resides, etc.

Below this line of printed data are the perforations representing the same for controlling the machine. The next printed line includes the street and number. Beneath are the perforations representing this data. Next comes the town and State in which the insured lives and below this the perforations. The next printed line relates to commissions payable to the selling agents and other data. Below this are the perforations representing the printed data. The lower portion of the card is divided principally into five fields included in parallel vertical columns. These may be used to enter records for five successive years or other periods. Each of these fields is divided into several small fields including four quarterly fields. Where premiums are payable quarterly the record for each of the quarters will be kept in one of the four fields. If premiums are payable semi-annually the record will be kept in two of the quarterly fields and where the premiums is payable annually the record will be kept in one of these quarterly fields. The lower portion of the annual fields is employed to indicate credit amounts or dividends due to the customer or policy holder. In Fig. 3a the card B is shown as comprising two portions, one representing the bill or notice N and the other representing the audit card A. The card may be provided with perforations along the dividing line 1 so that it may be torn apart after it is printed or it may be cut apart along this line. The audit card A may be retained by the home office to be subsequently used in making posting entries upon the master card in a machine such as that disclosed in my copending application Serial No. 144,661, filed October 28, 1926 for Record analyzing and posting machines. The card N will, of course, be sent to the customer.

The slip shown in Fig. 3 may comprise several portions including a receipt R and file record F; the portion F may be retained in the files of the district office attending to the collection of the amount due. The portion R may be used as a receipt which may be signed and delivered to the customer after payment has been made. To the left is a portion Y which may be employed for notes made by the collecting agent for his own records. The upper edge of the master card may have a portion cut out as at 2 and 2a or 2b to indicate which of several general files the record belongs in. The records for the four quarters of the years may be kept in separate files and these files in turn may be subdivided into the three separate months included in each quarter. The cut at 2a may then be used to represent the month of January, if it is in the first quarter, April if it is in the second quarter, July if it is in the third quarter, and October if it is in the fourth quarter. The cut at 2 will then represent February or May or August or November of the first, second, third, or fourth quarters respectively, and a cut at 2b will represent the months of March, June, September or December, i. e. the third month of each quarter.

In operating the machine to issue notices to policy holders, all cards on which premiums are payable in a given month of a given quarter may be placed in a hopper at M' in the machine Fig. 1. Cards similar to that shown in Fig. 3a may be placed in a hopper at B'. Sheets similar to that shown in Fig. 3 are placed in the rear of the machine and are not visible in Fig. 1. The master card will be advanced slightly from the stack M' by a card picker.

It will then be taken from this advanced position by card feeding clips and advanced to an analyzing section 3 of the machine. The card will remain in this analyzing section of the machine for five cycles of operation of the machine if a notice or bill is to be issued in connection with the record. If no notice or bill is to be issued, the card remains for only one cycle in this section after which it is fed out to the discharge hopper. Whether a card is to remain in the analyzing section 3 to control the printing of a bill or notice card is determined by pre-reading devices which analyze the card after it has been advanced slightly by the card picker from the stack M'. The strip including the notice and audit cards is fed from the stack B' into a printing and punching section 4 where data taken from this master card will be entered upon the notice and audit cards after which the strip will be fed to the discharge stack B4. Whether cards are to be fed from the stack B' or not is also controlled by the pre-reading devices which analyze the master card in its slightly advanced position. The feeding of the receipt slip of Fig. 3 is also controlled by the pre-reading devices.

Figs. 4 and 4a represent the card in its slightly advanced or pre-reading position and in each of the five subsequent cycles of operation of the machine in which a bill is to be made out. In the pre-reading position certain analyzer pins are shown cooperating with the card to analyze perforations therein to determine whether a bill is to be sent and to set the machine for the appropriate subsequent operations. The card in the first cycle shows analyzer pins reading the perforations on the master card in the horizontal field 5. During this cycle of operation data analyzed in the master card is entered upon the receipt and file slips and also upon the notice card and the audit card and the audit card is perforated in combinations of perforations representing the data printed thereon.

The arrow head lines 6 leading from the master card show the disposition on the receipt, file, notice and audit slips of the items taken from the master card. The line 7 indicates that the premium or amount payable which is taken by certain of the analyzing pins is transmitted to an accumulator. The accumulator will control the subsequent printing of this amount or the difference between such amount and a credit amount which the machine may later find due to the customer. The line 8 indicates that the information contained in the upper sub-field 9, which data represents the plan or the nature of the account, is transmitted to storage devices where it is retained to be entered upon the file slip and audit card during a subsequent cycle of operation of the machine. In the second cycle position the master card is shown after it has been raised so that the analyzing pins cooperate with the perforations in the horizonal field 10. These are the same analyzing pins that analyze the field 5 in the first cycle of operation and are adapted to control the type bars and punches. For this cycle of operation the receipt and notice slips are both moved the equivalent of one line space so that entries may now be made upon the second line. The arrow lines 11 leading from the master card indicate that the data taken from the horizontal field 10 is printed in the various positions indicated by the arrow heads. Thus the name of the insured is entered upon the receipt slip and notice card, other data taken from the master card being printed in the positions indicated.

In the third cycle of the machine the master card has been raised another step so that the sensing pins analyze the horizontal field 12. The receipt slip and audit slip have also been fed the equivalent of one line space and the street and number in the address taken from the master card are printed upon these slips. Other data is also printed upon the slips as indicated by the arrow heads. This data includes the credit or dividend amount which is printed on the receipt and notice slips on the same lines with the street and number and directly below the debit or premium amount. The amount is also printed on the file slip and audit card and perforated in the audit card. This credit or dividend amount, as indicated, is also entered in the accumulator so that the amount is subtracted from the debit amount which is already contained in the accumulator. During this cycle the data which was transmitted to storage devices during the first cycle is printed on the file slip and the audit card. The perforations representing the data printed on the audit card during this cycle are also made during such cycle.

The fourth cycle shows the master card raised one more step so that the horizontal field 13 is analyzed by the sensing pins. The receipt and notice slips have been advanced one line space and the town and State taken from the master card is printed upon these slips, also other data as indicated by the arrow heads. During this fourth cycle the town and State are taken from the master card and printed on the receipt and notice slips, other data also being entered during this cycle. Also the total now standing in the accumulator which represents the debit or premium amount of the difference between the debit and credit amounts where there is a credit amount is printed under control of the accumulator on the receipt and notice slips on the same line with the State and town and directly below the credit and debit amounts previously printed as indicated.

The fifth cycle shows the master card shifted so as to again present the field 10 which was analyzed during the second cycle, in position to be analyzed so as to read the name of the customer or policy holder. During this cycle the name is printed on the file slip as indicated by the arrow. No data is entered upon the notice card or audit card during this cycle.

Main drive and clutches

In Fig. 1 a bed plate 20 is shown mounted on a frame 21 provided with legs 22. The plate 20 carries all of the mechanism of the machine, some being mounted above the plate and some below. In Figs. 89 and 90 an electric motor 23 is shown carried by bracket 24 attached to plate 20. A belt 25 is connected from the motor to a pulley 26 mounted on a shaft 27 reaching into a clutch and gear box 28 also carried by the bed plate 20. In Fig. 59 shaft 27 is shown as provided with a worm 29 meshing with a worm wheel 30 loose on a shaft 31. Fixed to the sides of the worm wheel 30 are plates 32, 33 (Fig. 62) adapted to cooperate with clutch dogs to drive the cam shafts of the machine. Fixed on the shaft 31 is a gear wheel 34 meshing with an idler gear 35 (see also Fig. 63) which in turn meshes with a gear 36 fixed on the upper cam shaft 37 (Figs. 91 and 5). A hub member 38 (Fig. 62) fixed to shaft 31 and gear 34 carries a clutch dog 39 actuated by a spring 40 tending to cause it to reach into slots 41 in the clutch plate 33 to cause the shaft 31 to turn with the worm wheel 30. Loosely mounted on the shaft 31 in a sleeve 42 carrying a clutch dog 43 actuated by a spring 44 into cooperation with slots 45 in the clutch plate 32 to cause the sleeve to rotate with the worm wheel 30. Fixed on the sleeve 42 is a bevel pinion 46 meshing with bevel pinions 47, 48, (see Figs. 89 and 89a).

Pinion 47 is mounted on a shaft 49 and pinion 48 is mounted on a shaft 50. These two shafts serve to drive the card feeding shuttles of the machine. Also fixed on the shaft 31 on the outside of the clutch gear box 28 is a bevel pinion 51 (Figs. 62 and 89) meshing with a crown gear 52 fixed on the lower cam shaft 53 (see also Figs. 5 and 5a). Bevel pinion 54 fixed on shaft 53 meshes with a bevel pinion 55 fixed on a counter shaft 56. When the clutch dog 39 of Fig. 62 engages the disk 33 the upper cam shaft 37 of Figs. 91 and 5 and the lower cam shafts 53, 56 of Figs. 5, 89 and 89a will all rotate.

Start and stop keys and clutch control

The stop key 57 is shown in the front of the machine in Fig. 1. The start key is directly back of the stop key but is not visible in this view. Both keys, however, are shown in Figs. 63, 64, the start key being designated 58. Fig. 63 shows the keys in normal position. To start the machine the key 58 is depressed against the action of its spring 59. This will rock a bell crank 60 pivoted at 61 on a bracket 62 supported by the bed plate 20. Bell crank 60 has pin and slot connection at 63 with a link 64. A spring 65 tends to hold the pin 63 in the position shown in Fig. 63 with respect to the slot in the link 64. Link 64 is bifurcated at its inner end as at 65 and straddles a shaft 66 (see also Fig. 131). An arm 67 fixed on shaft 66 is provided with a lateral projection or flange 68 riding on the upper edge 69 of the link 64. A spring 70 tends to rock the arm 67 downwardly. When the start key 58 is depressed and the link 64 is moved to the left, the arm 67 drops down over the shoulder 71 as shown in Fig. 131 causing shaft 66 to rock counterclockwise in Fig. 131 and clockwise in Fig. 63.

A second arm 72 also fixed on shaft 66 moves from the position of Fig. 63 to that of Fig. 131 so as to cooperate with a shoulder 73 on a latch 74 which is pulled downwardly by spring 75. Latch 74 is connected to an arm 76 fixed on a shaft 77 bearing in side plates 28a carried by the gear box 28. An arm or finger 78 is loosely mounted on shaft 77 (Figs. 59, 60, 61, 65), being forked at its upper end and straddling shaft 77. It is normally held in its upper position by a spring 78a. An arm 78b fixed on shaft 77 has a pin 78c reaching over the edge of arm 78 to move the latter to the left. A spring 78d tends to hold the arm 78 against the pin 78c. When the start key is depressed causing the shaft 66 to rock from the position of Fig. 63 to that of Fig. 131 a cam follower 79 carried by an arm 80 fixed on the shaft 66 moves into cooperation with a cam 81 fixed to the worm wheel 30 (see also Fig. 62) which is constantly running while the motor is in operation. When the raised portion of the cam engages the follower 79 the shaft 66 will be rocked clockwise in Fig. 131 and counterclockwise in Fig. 63. This will pull the latch 74 to the right in Fig. 131 or to the left in Fig. 63 rocking the shaft 77 clockwise in Figs. 59, 60, 63.

In Fig. 60 a link 82 is shown connected to the lower end of a lever arm 83 fixed on a short shaft 84 (see also Fig. 62). A spring 85 connected between the upper end of arm 83 and a fixed point of the machine tends to rock shaft 84 to move the clutch cam stop 86 which is also fixed on shaft 84, from the position of Fig. 60 to that of Figs. 59 and 65 where it will lie in the path of the cluth dog 43. As the dog travels from the position of Fig. 65 to that of Fig. 59, it will ride up the incline 87 and be lifted out of engagement with notches 45 of disc 32.

When the dog strikes the shoulder 88 it will be stopped along with the parts that it operates while the disc 32 continues to turn. In Fig. 60 the link 82 is in its upper position, being raised to such position from its lower or dotted line position 82a by a spring 89. In Figs. 59 and 66 the link 82 is shown in its lower position where it is held by a finger 92 reaching over a pin 91 fixed in the end of link 82. The link 82 was lowered to this position when the machine was last stopped, by an arm 90 pressing down upon the pin 91 as will be shown later. With link 82 in this position the pin 91 lies adjacent to the end of the actuating arm or finger 78. Thus, when shaft 77 is rocked clockwise by the depression of the start key, the finger 78 engages pin 91 and moves link 82 to the left. This moves the clutch cam arm 86 out of engagement with the dog 43 permitting the latter to drop into engagement with disc 32 which is turning. Now, as one of the notches passes under the dog the latter will drop into the notch and be carried around by the disc.

As the clutch dog 43 turns it will cause bevel gears 46, 47, 48 and shaft 49, 50 to turn.

Fixed on shaft 84 with the clutch cam 86 are arms 93 (Figs. 59, 62). Links 94 are connected from arms 93 to arms 95 pivoted at 96 to brackets 97. Fixed with respect to arms 95 are additional clutch cams 86a and 86b. The three clutch cams 86, 86a and 86b are located substantially one hundred and twenty degrees apart so that the clutch dog 43 may be stopped at any of three points.

When the start key is depressed all of the clutch cams are moved to releasing position out of the path of the dog 43.

When the machine is started from the position assumed the clutch dog 43 and associated parts are adapted to turn with shaft 31 approximately two thirds of a revolution to feed cards to analyzing and printing position and to then stop so that the feeding mechanism will be idle while the master card reading devices operate. This effects one cycle of operation of shafts 49, 50 and the card feeding mechanism.

Referring to Fig. 59 it will be seen that in order that the clutch dog 43 may turn two thirds of a revolution and then stop the clutch cam stop 86a which was moved out of the path of the dog along with stop 86 in response to the depression of the start key must remain out until after the dog passes that point and that the stops must then move in before the dog reaches the stop 86b. This is accomplished by mechanism which will now be described. The stop key 57 (Figs. 63, 64) is attached to a lever arm 100 pivoted at 101 to the bracket 62. The other end of lever 100 is connected to a link 102 to form a toggle. Link 102 is connected at its left end to an arm 103 and a link 104. The arm 103 is pivoted at 61 and forms a support for the links 102, 104. A spring 105 connected between the link 104 and bracket 62 serves to hold the toggle in the position of Fig. 63 when it is moved to such position and in the position of Fig. 64 when the parts are moved to the latter position. A lug 106 on the side of the start key reaches over the point of intersection of lever 100 and link 102 so that depression of the start key moves the toggle parts from the position of Fig. 63 to that of Fig. 64. This also raises the stop key 57.

Depression of the stop key will break the toggle and restore the parts to the position of Fig. 63. The link 104 is connected at its left end to an arm 107 fixed to shaft 108 bearing in brackets 109. The arm 90 is fixed on shaft 108. When the machine is stopped by depression of the stop key the arm 90 is rocked downwardly from the position of Figs. 60 and 65 to that of Fig. 59. Just before the machine stops the finger 92 is rocked from the position of Fig. 60 to the position of Fig. 59 so as to reach over the top of the pin 91. When the start key is depressed the link 104 raises arm 90 but the finger 92 continues to hold pin 91 and link 82 down until the arm or finger 78 moves the link to the left. At this time pin 91 passes beyond the end of finger 92 and spring 89 raises link 82 so that the pin 91 rests against the end of the finger 92 which now serves to hold the parts in position against the action of spring 85.

The movement of finger 92 to the left is effected by a cam 110 fixed on shaft 50 and cooperating with a follower arm 111 fixed on rod 112 on which finger 92 is also fixed. When the start key is depressed the cam 110 is in approximately the position of Figs. 59 and 61. Shaft 31 turns more than one third of a revolution before follower 111 is lowered but less than two thirds of a revolution. Thus the clutch cam stops will be held out until after the dog 43 passes the stop 86a but will be pulled in by spring 85 before the dog reaches stop 86b and the latter will stop the dog 43 and also shafts 49, 50 and the card feeding mechanism.

The operation of the card feeding mechanism will be described under that heading.

The clutch dog 39 which controls the operation of the machine if a bill is to be made out under control of the master card is controlled by a clutch cam stop 113 fixed on a short shaft 114. A lever 115 fixed on the shaft is actuated by a spring 116 to move the stop 113 to declutching position as in Fig. 63 and to hold it there. An actuating link 117 is connected to lever 115 and has a pin 118 near its outer end. A spring 119 tends to hold link 117 in its upper position so that the pin 118 will be adjacent to the end of an actuating finger 120 fixed on the rod 112 which carries the finger 92. Spring 121 attached to finger 120 tends to rock both fingers to inoperative position and to hold the follower 111 in the cam 110. A T-shaped arm 122 pivoted at 123 reaches over the connecting links 82 and 117 and is adapted when rocked to lower one or the other of the links away from its actuating finger 92 or 120 and to permit the other link to rise so that it may be actuated by its finger. The lower extremity of arm 122 is connected to a link 124 which actuates the arm. A spring 125 connected to link 124 tends to rock arm 122 to depress link 82 and to permit link 117 to rise. The link 124 is controlled by pre-reading mechanism which analyzes a certain field in the master card before the card reaches the normal reading position.

If no bill is to be made out the link 124 rocks arm 122 to the position of Fig. 61 so that the pin 91 on link 82 will be in the position of Fig. 65 with respect to finger 92. Shortly before the dog 43 reaches the stop 86b (Fig. 59) the cam 110 in approaching its normal or resting position of Figs. 59, 61, raises the follower 111 and rocks the fingers 92 and 120 inwardly. Finger 92 then engages pin 91 and moves link 82 inwardly and moves the stops 86, 86a, 86b out of the path of dog 43 so that the card feed will continue for another card feed cycle.

If a bill is to be made out link 124 rocks arm 122 in the opposite direction to the position of Fig. 66. This lowers link 82 so that the finger 92 will not actuate it and permits link 117 to rise. Now, when cam 110 rocks rod 112 near the end of a card feeding cycle finger 120 will engage pin 118 and push link 117 inwardly, rocking the shaft 114 and stop 113 (Figs. 63, 66) to release dog 39. The dog will then drop into a slot 41 in disc 33. This will cause shaft 31 with gears 51 and 34 to turn to drive the mechanism for reading the data on the master card; printing the bill or notice card; printing and perforating the audit card and for performing other functions. These functions require five cycles of operation of the shaft 31. At the end of these operations the card feed devices will be brought into action again to remove the cards from sensing and printing and punching positions and other cards will be fed in. The control of the card feed clutch in this instance is effected by a finger 126 fixed on shaft 127 (Figs. 59, 61, 89a and 133). The shaft 127 is provided with a cam follower arm 128 cooperating with a cam 129 on shaft 56. The ratio of the gears 51 and 52 (Fig. 89) is one to five, so that cam 129 turns one revolution while shaft 31 turns five.

Near the end of the fifth revolution of shaft 31 the cam 129 rocks shaft 127 clockwise in Figs. 59 and 133 and finger 126 engages a pin 130 on link 131 and moves the link to the left. Link 131 is attached to link 82 and thus actuates the latter to cause clutch dog 43 to function to drive the card feed mechanism.

As shown on the upper portion of the timing diagram (Fig. 140) the card feeding cycle overlaps approximately the last two thirds of the fifth bill making cycle. During this period the master card pusher or picker advances a card from the supply stack; the pre-reading pins and combs read the card to control the setting of the T-shaped arm 122 and the clutch controls operate. During this period also then, the finger 120 releases link 117 and cam stop 113. If the next cycle, as determined by the pre-reading is to be a card feed cycle, the finger 92 will actuate link 82 before the end of the cycle, and the clutch dog 39 which operates the billing mechanism declutches at the end of the cycle. But if the T-shaped arm 122 is set for billing operations, the finger 120 will actuate link 117 to throw out the stop 87 before the end of the then operating cycle, and the billing mechanism will enter a new series of operations without stopping.

In order to prevent an operator from depressing the stop key immediately after depressing the start key, and thus stop the machine in an improper position, the link 64 (Figs. 63, 64) is provided with an extension 132 attached thereto by pins and slots 133 and a spring 134 to hold the part 132 in the position shown with respect to link 64. When the start key is depressed and the link 64 moves toward the left (Fig. 63), the extension member 132 will strike the lower part of the stop key and spring 134 will stretch until the stop key rises above the end of member 132.

Spring 134 will then cause member 132 to snap under the stop key as in Fig. 64. It will then be impossible to depress the stop key until the link 64 returns to the right.

Means are provided to control the time of stopping when the stop key is depressed during a card feeding cycle. This includes a latch 135 (Figs. 61, 65, 66) mounted on rod 136 having a cam follower arm 137 cooperating with a cam 138 on shaft 50. A spring 139 rocks shaft 136 to place the latch under pin 91 so that when the stop key is depressed the finger 90 cannot lower link 82 until at the proper point in the turning of shaft 50, cam 138 rocks latch 135 out from under the pin. This takes place at about the time finger 92 moves back to let the clutch cam stops assume stopping position. Arm 90 then lowers pin 91 so that as finger 92 rocks to the left just before declutching takes place, it will not actuate link 82 to keep the parts running.

The link 117 (Figs. 63, 66) has three positions in elevation. In Fig. 66 it is in its upper position where it will be actuated by finger 120. In Fig. 63 it is in its lowest position, having been lowered to this position by the T-shaped arm 122 which has rocked from the position of Fig. 66 to that of Figs. 61, 63. In this position the link 117 cannot be actuated. The third position is an intermediate position where the pin 118 lies adjacent to the end of a finger 140 similar to finger 78 and mounted on the same shaft 77. The finger is forked to permit up and down movement on the shaft and is actuated by an arm 140b similar to arm 78b. If the machine is stopped in the midst of a bill making series of operations the T-shaped arm 122 will be in the position of Fig. 66; the link 117 will have been moved to the left by finger 120. The cam 110 will be at rest so that finger 120 will be held in such position.

In stopping the machine by depressing the stop key the rocking of rod 108 will cause arm 141 to lower the pin 118 until it is free from the end of finger 120. Link 117 will then snap over to the right under the action of spring 116. The spring 119 will hold the pin 118 up against arm 141 and in the plane of the end of finger 140. Now if the machine is restarted by depression of the start key the rocking of rod 77 will cause finger 140 to move link 117 to the left. The arm 141 is raised by the start key and the finger 120 holds pin 118 down until it passes the end of the finger. The pin is then raised by spring 119 and is held set by finger 120. The clutch dog 39 will now operate and the billing operations will resume at the point where they were stopped. The depression of the start key under the conditions here assumed does not affect the card feed clutch as the arm 122 when in the position of Fig. 66 holds link 82 in its lowermost position where the pin 91 is below the end of finger 78.

Master card picker

In Figs. 5a and 6 the master cards M are placed in a supply pocket 142. A backing plate 143 carrying a spring barrel 144 meshing with a toothed rack 145 at the bottom of the pocket presses the stack of cards forward against the front plate or wall 146 of the pocket and the spider 147. The spider is integral with the card picker 148 slidably carried on rods 149 fixedly mounted on bracket 150. A lever 151 having its fulcrum at 152 in bracket 153 is connected at 154 by pin and slot to the picker. The lower end of the lever is connected to a link 155 which is connected at its other end to a cam follower arm 156 pivoted at 157 and cooperating with a cam 158 on the shaft 50.

A spring 159 connected to arm 156 holds the latter against the cam. The shaft 50 as we have seen turns one revolution during a card feed cycle. This causes the card picker 148 to make one stroke forward with a card and back to normal position. The card is thus advanced to the position M1. The leading edge of the card is then in position to be gripped by the card clips and fed to position to be analyzed.

Master card shuttle

The master card shuttle 160 (Fig. 6a) comprises upper and lower frame members 161, 162 fastened to a yoke 163 and slidable on rods 164, 165 (Figs. 6 and 6a). The yoke is connected by a link 166 to the upper end of a lever 167 having its fulcrum at 168 and connected at its lower end to a link 169. The link 169 is connected at its other end to an arm 170 pivoted on a bracket 171 attached to the bed plate 20 (Figs. 6 and 89a). Connected at the same point to arm 170 is a link 172 the arm 170 serving as a support for the two links. Link 172 is connected to a crank 172a fixed on shaft 50. The turning of shaft 50 one revolution thus causes the card shuttle to move a full stroke to the left and back again.

At the left end of the shuttle are upper and lower card clips 173, 174 which take the card from the position M1 and move it to the position M2. A middle set of upper and lower clips 175, 176 take the card from the position M2 and move it to an idle position M3 and a set of upper and lower clips 177, 178 at the right end of the shuttle take the card from position M3 and move it to the position M4 in the discharge pocket.

The three sets of clips take the cards from the three positions during a single feeding stroke. The details of the clips are shown in Figs. 85 to 88. Figs. 85 and 86 show the clip 173 viewed from the top. An outer jaw 179 and an inner jaw 180 are pivoted at 181 to the frame 161 and are connected at their rear ends to each other by a spring 182 tending to close the jaws in the manner of a pair of shears. A bell crank arm 183 is also pivoted at 181; said arm and the jaw 179 being fixed to the short shaft 181 while the inner jaw 180 is loose thereon. A link 184 connected at one end to arm 183 has a spring 185 at its other end tending to pull it to the right and when not opposed turns arm 183 and the clip jaws to the position of Fig. 87. At the left end of the stroke of the shuttle is a bracket 186 fixed to the machine and having pivoted thereon at 187 an inclined cam arm 188. A latching arm 189 also pivoted on bracket 186 is adapted to latch the cam in the position of Fig. 86. A spring 190 connected between the cam and its latch tends to hold the latch in latching position and the cam 188 to unlatched position. The arm 183 has a cam follower roller 191 adapted to cooperate with cam 188 and a flange 192 adapted to strike a pin 193 on the latch 189. As the card shuttle nears the end of its stroke toward the left the roller 191 rides up the cam 188 and turns the arm 183 and clip jaws from the position of Fig. 87 to that of Fig. 86. This pulls link 184 to the left where a latch 194 (Fig. 85) pivoted on frame 161 and actuated by the spring 185 snaps over the end of the link. The jaw 180 is prevented from turning beyond the plane of the card by a stop 195 on frame 161.

A projection 196 on the jaw cooperates with the stop for this purpose. The outer jaw, however, has turned slightly farther so that the jaws are open as in Fig. 86. Thus as the shuttle continues toward the left the jaws pass over opposite sides of the card. The flange end 192 of arm 183 then strikes the pin 193 and rocks latch 189 to the left releasing cam 188. The latter is then pulled by spring 190 to the position of Fig. 85. The spring 185 then pulls link 184 a little toward the right taking up a slight play that had been permitted between the end of the link and the latching shoulder on latch 194. This turns arm 183 counterclockwise enough to close outer jaw 179 tightly upon the card as in Fig. 85.

In passing from the position M1 to the position M2 the card enters slots 195 in a frame 196 (Figs. 83, 84). When the leading edge of the card strikes a stop 197 it will be stripped from the clips which move slightly beyond this point. The stop is hinged at 198 on frame 196 and rocked by spring 199 into the path of the card. A finger 200 reaching through a hole 201 in the supporting plate 202 will rock the stop 197 out of the path of the card when it is time to feed the card on from this position. A second spring-pressed stop 203 on frame 196 snaps over the rear edge of the card to hold it in position in the frame. When the card shuttle reaches the end of its travel toward the right the latch 194 strikes a pin 204 in the upright 205 (Fig. 6a). This rocks latch 194 to release link 184 and spring 185 pulls the link to the right turning arm 183 and the clips to the position of Fig. 87. The clips are then out of the plane of the card and will pass the latter freely when the shuttle is again moved to the left for another card.

The movement of cards from the M2 position to the M3 position and from the M3 position to the M4 position takes place simultaneously with the movement from the M1 to the M2 position. The several sets of card feeding clips are therefore connected for simultaneous operation. This interconnection is effected through link 184. In Fig. 85 the link is shown connected to an arm 183a which is connected to the clips 177 and controls them in the same way as arm 183 is connected to and controls clips 173. Thus, when arm 183 rocks the clips to the open position of Fig. 86, link 184 will cause arm 183a to rock the clips 177 to similar position. Then when the cam 188 releases arm 183 and the clips 173 close upon the card in the M1 position the clips 177 will close upon the card in M3 position. The intermediate clips 175 are connected to link 184 at 183b (Fig. 6a) in the same way that clips 177 are connected thereto.

The lower card feed clips 174, 176, 178 are constructed and operated in the same way as the upper clips.

The cam lever 188 is restored to its latched position of Fig. 86 by a bell crank 206 (see Fig. 88) on bracket 207 and connected to a link 208 which in turn is connected at its lower end to an arm 209 (see Fig. 6) pivoted at 210 and actuated by arm 211 cooperating with pin 212 on arm 213 fixed with respect to arm 170. As the card shuttle nears the end of its travel toward the right the link 208 is pulled downwardly, rocking bell crank 206 counterclockwise in Fig. 88 to restore the cam 188 where it becomes latched by latch 189.

The operation of finger 200 (Fig. 84) to rock the card stop 197 is effected by an arm 214 (Fig. 134) fixed to the finger and pivoted on a bracket on plate 202 and connected by link 215 to arm 216 (Fig. 6a) pivoted at 217. A spring 218 attached to the arm 216 normally holds link 215 in its lowered position with the finger 200 away from the stop. During the card feed cycle, before the shuttle starts to move to the right, a pin 219 on cam 158 strikes the right end on arm 216, raising link 215 and rocking the stop out of the path of the card.

A card stop 220 (Fig. 6a) similar to stop 197 and pivotally mounted on plate 202 is provided to strip the card from the clips 175, 176 in the M3 position. The finger 200a which rocks the stop to let the card by is fixed on the rod 221 on which the stop 200 is fixed and is actuated with the latter. In the M4 position the cards are stripped from the clips by stops 222 fixed to the wall of the card pocket 223.

*Pre-reading mechanism*

When the card is advanced by the picker from the supply hopper to the M1 position (Fig. 6) the fields 224, 225 (see also Fig. 2) are in position to be analyzed by the pins 226, 227 (Fig. 4). These pins control the T-shaped lever 122 (Figs. 61, 66) to determine whether the card feed clutch or the clutch controlling the making of bills or notices shall operate. The pins 226, 227 are shown in Figs. 16 and 17. The front ends of the pins rest in the perforated plate 228 back of the card M. Springs 229 on the sensing pins are compressed between a collar 230 fixed on the pin and a fixed plate 231 through which the pins pass.

An arm 232 engaging collars 233 fixed on the pins holds them normally in retracted position. The arm 232 is pivoted at 232a with an arm 234 which, in turn, is connected to a link 235 reaching down below the bed plate 20. Here the link is connected to an arm 236 (Fig. 136) pivoted at 237 with arm 238 which is connected through link 239 to a cam follower arm 240 pivotally supported at 241 and cooperating with cam 242 on shaft 50. The cam positively moves arm 232 to the left (Fig. 17) to restore the pins and when released by the cam, one or more of springs 229 rock it to the right as the pins take their readings. When released, those of pins 226, 227 that find holes in the card M pass through and pull corresponding combination combs 243, 244 with them. The connection between the pins 226, 227 and combs 243, 244 is shown in Fig. 26. The pin passes through a flange 245 at the end of the comb. A collar 246 is fixed on the end of the pin. A second collar 247 is loose on the pin. A spring 248 presses against collar 247 at one end and against a collar 249 fixed on the pin. After the pins pass through the card, moving the combs to the right, feeler arms 250, 252, rock into notches 251, 253 in the edges of the combs to read the set up of the several combs. While the feelers are taking this reading and controlling the further operation of the machine, the pins are restored by arm 232 so that the card may be fed to the next position. A stop bail 254 prevents the return of the combs at this time and the springs 248 are compressed. Later, when the feelers are restored and bail 254 removed the springs 248 will restore the combs.

In order to understand the operation of the pre-reading pins in controlling the subsequent operation of the machine, attention is directed to Figs. 24 and 25 showing the perforations in the card for effecting this control. In Fig. 24 the perforations in the fields 224, 225 are sensed by the sensing pins 226, 227. These perforations are grouped according to the tables shown in Fig. 25. The field 224, for instance, is adapted to have one hole perforated in it in either of two positions. The lower position, according to table 255, indicates that a payment is due on the account during the first half of a month; a perforation in the second position from the bottom indicates that payment is due in the second half of a month. In field 225 a perforation in the lowermost position according to table 256 indicates that a payment is due during the first quarter of the year and is due but once a year. A hole in the second position from the bottom indicates a payment due once a year in the second quarter, etc. A perforation in the bottom position and the third position from the bottom indicates that payments are due semi-annually in the first and third quarters of the year, and perforations in the second from the bottom and in the top position indicate that payments are due semi-annually in the second and fourth quarters. Perforations in the two lower positions indicate that payments are due quarterly through the year. According to the system proposed, the cards are divided into three files as previously described and sections of the card are cut out as indicated at 2, 2a and 2b, (Fig. 2) to indicate which file a card belongs to. A cut in the position 2a indicates that the card belongs to file 1; a cut at 2 indicates that it belongs to file 2, and a cut at 2b indicates that it belongs to file 3.

As shown at Fig. 25, file 1 includes cards in which payments are due in January, April, July and October. File 2 contains cards on which payments are due in February, May, August and November. File 3 contains cards on which payments are due in March, June, September and December. In operating the machine, if bills are being made out for accounts on which payments are due in February, all of the master cards of file 2 may be placed in the machine. The machine in analyzing field 225 will, upon sensing a perforation in the lowermost position, ascertain that the card belongs to the first quarter. The cards for May, August and November will be passed through the machine and only cards on which payments are due in February will be retained to control the operation of the machine. These cards are in turn, however, divided according to the perforation in field 224 into the first and second halves of the month and if perforated as shown in field 224 indicating that the payment is due during the second half of the month, will be retained to control the operation of the machine while cards in which payments are due during the first half of the month will be passed on. By this system of eliminating all cards on which payments are not due during the current half month only those in which payments are due during the second half of the month of February will be caused to control bill making or notice writing operations.

A slide 257 (Figs. 1, 16, 17, 18, etc.) determines whether cards for the first or second half of the month shall be selected. By depressing the slide 257 to the position of Figs. 19 and 20 a projection on the lower end of the slide will cooperate with a notch 258 in the rear edge of the lower comb 243 whereas raised to the upper position, it will cooperate with a notch in the upper one of combs 243. Both of the combs 243 are provided with notches 253 which when the combs are in their normal positions lie opposite the side arms 252 of the bail 259 so that the bail is normally adapted to rock into these notches. To set the machine to operate for a particular half of the month, the comb for that half is latched by slide 257. When the comb 243 for one half of a month is latched the advancement of the other comb would be due to the fact that payment is due in the other half of the month and the machine would be prevented from making out a bill. The bail 259 acts in part to control the several feelers 250. These feelers are separately actuated by springs 262 tending to rock them into cooperation with the combs 244. The combs 244 are each adapted when in normal position to prevent a rocking operation of a particular one of the feelers 250. In Figs. 17 and 23, for instance, the lowermost of the combs 244 will prevent operation of the feeler 250 farthest to the right. If this comb moves to the right, however, by reason of a perforation in the card, it will free its feeler so that the latter can operate. A set-up comb 263 below the several combs 244 may be set manually by a slide 264 (Figs. 1, 16, 118 and 119).

The slide 264 is provided with a camming edge 265 (see Fig. 118). By adjusting the slide up and down in cooperation with an index member 266 it will through a follower 267, move the comb 263 to the left as viewed in Figs. 17, 23 and 118 so as to position the notch 268 to cooperate with one of the four feelers 250, such feeler being thus permitted to rock while the other three feelers are locked against rocking by this comb. An impositive latch 264a will hold the slide 264 in set position. A spring 269 (Fig. 17) serves to pull the comb 263 toward the right to hold the follower 267 on its cam edge. By setting the comb 263 then, the machine may be locked against operating in all except one of the quarters. If the pre-reading pins find a perforation in the card corresponding to the quarter for which the comb 263 is set, that particular pin 227 will advance with its comb 244 freeing its feeler 250 to operate and as the lower comb 263 has been set to also free this particular feeler, that feeler will operate. Operation of any one of these feelers 250 by engagement with the bail 259 is adapted to rock the latter as viewed in Fig. 21. Thus by setting the comb 263 to permit operation of the machine for a particular quarter and by the operation of the pin 227 and the comb 244 for that particular quarter, the bail 259 will be rocked, if it in turn is permitted to do so by its combs 243. When the bail 259 rocks, it will engage a projection 270 (Figs. 19 to 22) on the lower end of a stop latch 271 so that when the bail rocks clockwise as viewed in Figs. 19 to 22, it will rock the stop 271 from the position of Fig. 19 to that of Figs. 21 and 22, provided the feeler link 272 is raised to clear the projection 273.

Link 272 reaches down through the bed plate 20 (Figs. 16 and 89a) and is connected to an arm 274 (see also Fig. 132) on a rod 275, the other end of which has fixed thereto an arm 276 connected by a link 124 to the T-shaped arm 122. Once each cycle of operation of the shaft 50 (Fig. 61) a crank arm 277 strikes a cam arm 278 fixed on a rod 279 with an arm 280 and rocks the latter toward the left. The arm 280 cooperates with a pin 281 on the link 124 and thus moves the link toward the left. A spring 282 holds the arm 280 against the pin 281 but is a relatively weak spring and does not affect the action of spring 125 which serves to pull the link 124 toward the right. Thus during each card feeding cycle, the movement of the link 124 toward the left raises the feeler link 272. Assuming the parts to be in the position of Fig. 19 at the commencement of this cycle and assuming that a feeler 250 and bail 259 operate by reason of the condition of the card, the parts will be in the position of Fig. 20 just before the link 272 is raised to the dotted line position of Fig. 21. At this time the stop 271 snaps past the link 272 to the position of Fig. 21 after which the link 272 drops to the full line position of Fig. 21, being released by the crank 277. This operation takes place when the perforations in the card in conjunction with the set up of a machine indicate that a bill or notice is to be made out, and the T-shaped arm 122 of Figs. 61, 66 is rocked counterclockwise to depress the link 82 and permit link 117 to rise so that the machine will be set for a bill making series of operations as previously described.

If either of the combs 243 advances indicating that no bill is to be made out for the current half of the current month, the bail 259 cannot rock, or if the one of the four combs 244 which is rendered free by the set up comb 263 fails to advance because of the absence of a perforation corresponding thereto in the card, the particular feeler 250 will not be permitted to actuate the bail 259 and the stop latch 271 will not rock and when the link 272 is raised and dropped, it will continue to be held up by the stop 271 and the T-shaped arm 122 will be held in position to cause the machine to repeat a card feeding cycle.

So far we have considered the conditions where only one of the combs 244 (Fig. 23) advances. According to the chart 256 (Fig. 25)

there are several instances where two perforations in the field 225 may appear so that two of the combs 244 will advance. The set-up or quarter due comb 263 is set to free only one of the feelers 250 and if this particular feeler operates by reason of a movement to the right of its comb 224, it will serve to rock the bail 259. The feeler 250 corresponding to the other perforation will be prevented by the comb 263 from operating but will not prevent the rocking of the bail 259. Thus if a card is perforated corresponding to a semi-annual payment in the first and third quarters and the machine is set up to operate for the first quarter, the lowermost one of the combs 244 will operate and permit its feeler to rock; the third from the bottom of the combs 244 also operating but the feeler will not rock.

When the machine is set to operate for the third quarter and this same card appears, the third comb 244 will operate by reason of the upper perforation and its feeler will then rock and operate the bail 259 to cause the machine to make out a bill. In this instance the lower one of combs 244 will advance but its feeler will fail to rock but will not prevent the bill making operations of the machine. Thus whether the machine is set to operate in the first or third quarters of the year, a card perforated for both of these quarters will cause the machine to operate to make out a bill. Similarly if the machine is set to operate in the second or fourth quarters, a card perforated in the second from the bottom and in the top of the four positions in field 225 will cause the machine to perform billing operations. In the last column of the chart 256, if the two lower positions are perforated in field 225, the machine will be controlled to make out bills during all quarters. An additional feeler 250a normally cooperates with projections 283 on the two lower combs 244. The set up comb 263 does not in any of its set positions prevent the operation of this feeler. Thus regardless of the position of the comb 263, if the two lower ones of combs 244 advance they will free the feeler 250a to permit it to rock. It will thus rock the bail 259 and set the machine for billing operations. The restoration of the bail 259 and the feelers 250, 250a, is effected by the rocking of the shaft 284 on which the bail 259 and the feelers are loosely mounted.

A restoring bail 285 (Figs. 17, 19, etc.) is fixed on the shaft 284 to which is also fixed an arm 286 connected by a link 287 (Figs. 17 and 23) reaching down into the base of the machine (Figs. 16, 89a and 136) connected to an arm 288 fixed on a rod 289. As shown in Fig. 135 the rod 289 bears at its right end in a sleeve 290 fixed on the rod 237. Arm 291 also fixed on rod 289 is connected by a link 292 to a follower arm 293 pivoted at 241 and cooperating with a cam 294 on the shaft 50. A spring 295 may be provided to hold the arm 293 against the cam. The shaft 284 also has an arm 296 cooperating with the latching bail 254 to rock it out of cooperation with the combs 243, 244. The timing of the operation is such that the shaft 284 is in position releasing the latching bail 254 and the several feelers 250, 250a before these parts operate to take a reading. As shown in Fig. 16 by manually rocking a handle 296a pivoted at 296b, a rod 296c may be depressed. This will depress arm 286 (Fig. 23) rocking shaft 284 and actuating arm 296 and bail 259 (Fig. 17) to release the combs so that the slide 257 may be set and so that the set-up comb 263 may be set by the slide 264 of Fig. 118. After the pins have been restored and after the machine has been controlled in accordance with the operation of the feelers and the bail 259, the shaft 284 is rocked counterclockwise (as viewed in Figs. 21, 22, 23, etc.) and will restore the parts from the position of Fig. 21 to that of Fig. 22. This restoration may take place whether the link 272 is in the upper position of Figs. 19 and 20 or in the lower position of Figs. 21 and 22. If the link is in the lower position of Figs. 21 and 22, the restoration of the bail 259 and feelers 250, 250a will take place leaving the flange 270 of the stop 271 in the position of Fig. 22, the stop 271 being prevented from rocking counterclockwise by the link 272.

As long as the successive readings of master cards call for a billing operation by rocking of one or more of the feelers 250, 250a and the bail 259, the link 272 will return to its lower position of Fig. 21 upon being raised once each card feeding cycle which takes place as we have seen during the last two-thirds of the fifth cycle of the billing operations. When a card which does not call for a billing operation is presented the feelers 250, 250a and bail 259 will fail to operate as we have seen, so that when the link 272 rises during this cycle the spring 297 will rock a stop 271 counterclockwise to its normal position and the link 272 will drop down upon the stop 271 as in Fig. 19 to set the machine for another card feeding cycle.

When the master card is in the position M2 it is supported, as we have seen, by the frame 196 (Figs. 83, 84). The frame is adapted to be raised step by step to several successive elevations so that the sensing pins may read the information in the several horizontal fields 5, 10, 12, 13 (Fig. 2) during the successive billing cycles to control the type and punches for making out the slips shown in Figs. 3 and 3a. The frame 196 is slidably held on the fixed plate 202 by guides or clips 298 (Figs. 83, 84). Springs 299 serve to raise the frame, while a cam 300 on shaft 53 cooperates with a follower 301 on frame 196 to permit the frame to rise step by step and to restore the frame to normal position. Shaft 53, as we have seen, turns once during the five billing cycles and the cam 300 is designed to adjust the frame to proper position for each cycle.

*Notice and audit card feed mechanism*

The cards B of Fig. 3a which include the notice or bill and the audit card are contained in the hopper B' (Figs. 5 and 6). A spring-pressed backing plate 302 presses the cards against the fingers 303 which are fixed with respect to the picker block 304 and slidably mounted on rods 305. A link 306 connected to the picker block is also connected to the bell crank 307 pivoted at 308 and connected to a link 309 which in turn is connected to a crank 310 on shaft 311. Shaft 311 has fixed thereon a gear 312 meshing with an idler gear 313 which meshes with a pinion 314, on the shaft 37. The gear ratio between the shafts is one to five, so that the shaft 311 turns one revolution to five revolutions of the shaft 37. Thus during the five billing cycles of operation of the machine, the shaft 311 turns one revolution actuating the card picker 304 once to the right, as viewed in Fig. 6, and back. This moves one card B in the pocket to the position B2 where the clips can grip it to feed it into the machine. The clip carriage 315 is slidably mounted on rods 316 (see also Fig. 139). A set of card clips 317 is adapted to take the card from position B2 and advance it to the position B3 which is the position in which the card is perforated and printed upon. Another set of clips 318 on the carriage is adapted to take the card from the position B3 and advance it to the position B4 in the discharge hopper 319. To reciprocate the carriage back and forth it is connected by a link 320 to a lever 321 (see also Figs. 89, 90).

The lever is pivoted at 322 to a bracket 323 on the bed plate 20 and is connected at its lower end to a link 324 which in turn is connected at its right end as viewed in Fig. 90, or its left end as viewed in Fig. 89 to a crank 325 fast on shaft 49. This shaft as we have seen turns when the card feed clutch is operating and when shaft 50 turns. The construction of the clips 317, 318 is substantially similar to that of the clips which feed the master card as described. The control of the clips, however, is slightly different. The mechanism for causing the clips to close is shown in Fig. 138. Here the inclined cam lever 326 which controls the closing of the clips is held in position by a latch 327 pivoted at 328. A link 330 connects the two sets of card clips so that both sets operate simultaneously.

When a card is fed to the position B3 it is stripped from the clips 317 by a shutter or card stripper 332 (see also Fig. 117). This shutter is pivoted at 333 and is adapted to be rocked by a spring 334 into position to engage the leading edge of the card holding it in this position so that as the carriage moves slightly farther to the end of its stroke the card will be stripped from the card clips. A projection 335 is adapted to be engaged by an arm 336 pivoted at 337. An arm 338 also pivoted at 337 and resiliently connected to the arm 336 by a spring 339 is adapted when rocked counterclockwise to rock the arm 336 in a like direction to rock the shutter 332 clockwise to remove it from the path of the card. A projection 340 on the carriage 315 is adapted to strike the arm 338 as the carriage approaches the end of its stroke toward the left. This actuates the stripper to release the card.

As the carriage then starts to move toward the right and the projection 340 moves away from the arm 338, the latter rocks some distance before it engages a pin 341 on the arm 336. As the carriage continues and the projection 340 moves away from the arm 338, the spring 334 which is also connected to arm 336 then rocks the latter clockwise releasing the stripper 332 and permitting it to press against the card. The leading edge of the card, however, has now passed the edge of the shutter 332 and cannot be held thereby. When the card is completely removed, the shutter 332 snaps into position ready to stop the next card which is fed to position B3. When the card reaches the position B4 in the discharge hopper 319 the leading edge of the card will strike the wall 342 and will be stripped from the clips which move on to the end of the stroke of the carriage. After the cards have been stripped from the clips the latter rock out of the plane of the card so that the carriage may return for new cards as in the case of the master card clips. The restoration of the cams 326 (Figs. 137 and 138) to position to be latched by the latches 327, is effected by means of a bell crank 343 similar to the bell crank 206 (Fig. 88) which restores the corresponding parts of the master card clips. The actuation of the bell crank 343 is effected by a link 344 (see Fig. 5) which is similar to link 208 of Fig. 88. The link 344 has a pin 345 near its lower end adapted to be actuated by a lever 346 cooperating with a cam 347 on the shaft 311. Rocking of the lever 346 counterclockwise depresses the link 344 to restore the cams.

As the card moves to the position B2 it depresses a resilient stop 348 (Fig. 7). When the card reaches its position the stop snaps over the rear edge to hold the card in position.

The striking of the latch 327 by the member 331 permits the clips to close over the cards. The restoration of the cam 326 is effected once for each revolution of shaft 311 while the card carriage 315 is idle. On the next stroke of the carriage this cam will be tripped so that cards will be gripped and fed. If several master cards are then fed and no bill is to be made out the carriage 315 will also operate but as shaft 311 has not turned the cam 326 does not become reset and no further feeding of cards B will be effected. During these idle strokes of the carriage 315 the clips are out of the plane of the card and do not interfere with the card in the printing position B3 or the position B2.

In moving the card B to the B2 position it is drawn into upper and lower grooves in a supporting frame 349 (Figs. 7, 8). The ends 350 of the frame are vertically slidable in supports 351, 352 and are pulled downwardly by springs 353. Followers 354 on the lower ends of the ends 350 engage the top of cams 355 on shaft 311. The cams are designed to raise the card step by step during the successive billing cycles to present the several lines 356 to 363 inclusive in position for printing. The printing of lines 356 to 359 on the N section of the card is effected with type carried on the alphabet type bars 364 (Fig. 9), and the printing on the A section is effected with type carried on the numeral type bars 365 (Fig. 10). The printing of lines 356, 360 is done during the first billing cycle, lines 357, 361 during the second cycle; lines 358, 362 during the third cycle and lines 359, 363 during the fourth cycle. The perforations in the horizontal field 366 of the audit card represent the data printed on line 360 and are made during the same, that is, the first cycle. The perforations in the horizontal field 366a represent the data on line 362 and are made during the third cycle.

*Feeding mechanism for receipt slip*

In Figs. 9 and 10 the billing card is shown in its position B3 where it is printed upon and punched. The type for printing upon the card is carried by type bars 364 and 365. The type for printing upon the receipt slip is carried by the same type bars and the position of the slip when being printed upon is on the platen 367 above the card B3. The receipt slips R are carried in a supply hopper 368 (see also Fig. 12.) A weight 369 may be placed on the top of the stack of slips to press them down in the hopper. The bottom 370 closes only the left half of the hopper leaving the right half open. The slips are drawn through this opening and wrapped around the platen 367. The centre of the platen may be hollow and is provided with perforations or ducts 371 and means are provided for creating a vacuum in these ducts so as to suck the paper against the platen to hold it as the platen rotates to effect feeding. This means includes a pump 372 (Figs. 5, 89 and 90). The piston 373 is connected to a rod 374 pressed outwardly by a spring 375 and adapted to be pressed inwardly by an arm 376 pivoted at 377. This arm carries a cam follower roller 378 cooperating with the cam 379 on shaft 53. The shaft rotates counterclockwise in Fig. 90 and during the greater portion of a revolution, gradually presses the piston inwardly. The piston is released suddenly and is pressed outwardly by the spring 375 to create a vacuum in the pump cylinder. The cylinder is connected through a jointed or flexible tube 380 to the platen as shown in Figs. 7 and 13. When the vacuum is created the platen is in the position of Fig. 9 with the ducts 371 just below the leading edge of the receipt slip R. The lowermost slip is thus drawn against the platen and the latter commences to turn clockwise.

While this is taking place, the pocket 368 also feeds in the direction in which the slip is being drawn so as to aid in the feeding of the slip. Fig. 12 shows the platen turned about three-fourths of a revolution and the hopper 368 advanced its full distance toward the right. A receipt slip is shown wound about the platen and completely removed from the hopper. Near the ends of the platen are resilient bands 381 mounted on rollers 382 and pressing against the platen. The slip of paper is drawn between these bands and the platen and they hold the paper in position. The mechanism for moving the hopper includes a rack 382 (Figs. 11, 114 and 115) slidably mounted on a fixed bracket 383 and connected by a link 384 to an arm 385 pivoted at 386 and having a cam follower 387 cooperating with a cam 388 on shaft 311. A spring 389 connected at one end to the rack 382 and at the other to a bracket 390 tends to pull the rack toward the right pressing the follower 387 against its cam. A pinion 391 carried by the fixed bracket 383 meshes with the rack 382 and with an upper rack 392 slidable in the bracket 383. The rack 392 is provided with gear teeth on opposite sides. The teeth on the upper side mesh with a pinion 393 carried by a bracket 394 fixed to the hopper 368. The pinion 393 also meshes with a rack 395 carried by the fixed bracket 396. A guide roller 397 on the hopper 368 along with the stud on which the pinion 393 is mounted both reaching through a slot 398 in the bracket 396 serve to support the hopper permitting it to move back and forth. When the cam follower 387 rides down the steep incline of cam 388, the spring 389 pulls the rack 382 toward the right as viewed in Fig. 11 rotating pinion 391 counterclockwise thus moving rack 392 toward the left. This in turn rotates the pinion 393 clockwise causing it to travel, by reason of its engagement with rack 395, toward the left. This moves the hopper 368 toward the left in Fig. 11 or toward the right in Figs. 9, 10 and 12. An adjustable stop 399 cooperating with a fixed stop 400 limits the movement of the hopper 368. As the cam 388 continues to rotate the arm 385 is soon rocked counterclockwise to return the rack 382 its full distance toward the left thus restoring the hopper 368 to its normal position. The rotation of the platen is effected through a rack 401 (Figs. 11, 114, 115) slidably mounted in the fixed bracket 383 and connected by a link 402 to an arm 403 pivoted at 386 and provided with complementary cam followers 404, 405 cooperating with complementary cams 406, 407 mounted on the shaft 311. The rack 401 meshes with the pinion 408 fixed on the clutch member 409 which as shown in Fig. 7, cooperates with a similar clutch member 410 attached to the end of the platen 367. While the hopper 368 is being moved to the left in Fig. 11 the rack 401 is being moved by its cam toward the right, rotating the platen in a counterclockwise direction as viewed in this figure, or in a clockwise direction as viewed in Figs. 9, 10 and 12. This effects the turning of the platen while the hopper 368 is moving to the position shown in this figure. The platen continues to turn to the position of Fig. 12 and completely removes the paper from the hopper. The hopper then returns to the left in Fig. 12 as described, leaving the receipt slip wound about the platen. The receipt slip is now in position with the lines 411, 412 in printing position on the platen ready to receive the impressions from the type. The leading edge of the receipt slip is the lower edge (Fig. 3).

It will be seen from this that in feeding the slip into position, the lines 413, 415, 417 on the receipt portion and lines 414, 416 and 418 on the F portion will have all been fed past the printing position with respect to the type. Thus the subsequent effect of the complementary cams 406 and 407 (Fig. 11) is to rotate the platen backward step by step during the successive billing cycles so as to present lines 413, 414 for printing followed by the presentation of lines 415, 416 during the next cycle, then lines 417, 418 during the fourth cycle. For the fifth cycle the slip will be fed forward once more so as to bring line 419 on the portion F to printing position. The entire platen carriage must at this time be shifted toward the left as viewed in Fig. 7 so that the same type that printed the name on line 413 will print the name on line 419. The cams 406 and 407 cause the turning of the platen to present line 419 to the proper elevation for printing. The lateral shifting of the platen is effected by a cam 420 (Fig. 8) on shaft 311. The cam rocks a follower arm 421 pivoted at 422 and connected by spring 423 to a sector gear 424 loosely pivoted at 422 and meshing with pinion 425. On the shaft with this pinion is a bevel gear 426 (see also Fig. 7) meshing with bevel gear 427 on shaft 428. The upper end of this shaft has a bevel gear 429 meshing with bevel gear 430 on shaft 431 which also has a pinion 432 meshing with rack 433 fixed on the carriage 434 on which the platen 367 is mounted. The carriage is slidably mounted in fixed tie members 435, 436 attached between the opposite portions of bracket 396. Ball bearings 437 may be employed to effect a frictionless mounting (see also Figs. 9, 10, 12, 13).

A tape 438 attached at one end to the platen carriage and wound upon a spring rotated drum 439 on the frame or bracket 396 tends to draw the carriage to the left in Fig. 7. The rocking of follower arm 421 clockwise permits the drum 438 to shift the carriage to position line 419 in the proper column with respect to the type bars for the printing of the name. After the printing has been effected the follower 421 is rocked counterclockwise. Through spring 423 it rocks segment 425 and restores the platen carriage toward the right against the action of the spring drum 439, the spring 423 being stronger than the spring of drum 439. A pin 440 in the follower arm 421 along with spring 423 determines the proper relative positions of the follower and the segment 424, and the spring only yields when the platen carriage becomes jammed when returning to normal position. When the platen carriage moves to the left (Fig. 7) the connection between the carriage and the means for rotating it is broken by disengagement of the clutch elements 409 and 410 as seen in Fig. 13. When the carriage is restored the clutch parts should readily reengage. If, however, the platen should have been inadvertently turned and the clutch parts do not mesh, the spring 423 will yield as explained.

The diameter of the platen 367 and the receipt slip may be such that when line 419 is adjusted to printing position the platen will have turned one complete revolution from its original starting position so that the air ducts 371 will be in the position of Figs. 9 and 10. After the platen moves laterally as in Fig. 13 and the clutch members 409, 410 become disengaged, the cams of Fig. 11 return the rack 401 to normal position.

When the platen is restored laterally to the position of Fig. 7 and clutch members 409, 410 come together the parts will be in position for feeding the next receipt slip. The slip which has just been printed upon is still held by the platen and the bands 381 of Fig. 12, and will be fed out when the platen is again turned to feed in the next slip. The slip which is fed out then slides down into a discharge hopper 441.

*Perforation sensing pins*

Fig. 6 shows the master card in position M2 where it is sensed by the pins which control the billing operations of the machine. In this position the card rests between two plates 442, 443 (see also Fig. 16). The sensing pins reach through these plates which are provided with perforations, one for each of the pins. The plate 443 is made up of three sections and the two lower sections 443a, 443b (Figs. 16, 28) are supported by arms 443c, 443d pivoted at 443e. The arms are connected to toggles 443f, 443g. The toggles are connected by links 443h, 443i to an arm 443j fixed on shaft 443k (Fig. 5a) on which is also fixed an arm 443l. A link 443m is connected to arm 443l and has a cam follower stud or roller 443n cooperating with cam 443p on shaft 53 which turns once during the five billing cycles. During one of these cycles the cam will raise the links 443h, 443i. The latter link will break its toggle and swing plate 443b to the right to make room for the card frame 196 to rise a step with the card. Toggle 443f will not be broken during this cycle due to the lost motion connection with link 443h. During the next cycle the cam will raise links 443h, 443i still higher and the plate 443a will be swung out to let the card frame rise another step.

The plate 443 is shown in Fig. 4b in order that the relative positions of the perforations corresponding with the pins may be more readily visualized. The pins for sensing data contained in the upper half of the master card comprise the entire group 444. In order to understand the operation of these pins, reference is made to Figs. 92 to 96. Fig. 92 shows the sensing pins 445 at a section 92—92 of Fig. 4b and shows the pins for analyzing most of the data in fields 5, 10, 12 and 13 of Fig. 2, including numerals and the letters of the alphabet. Fig. 93 shows the sensing pins at a section 93—93 of Fig. 4b and shows four upper pins for reading the numerals relating to the premium payable and four lower pins for reading numerals relating to state, debit number, etc., on the right hand portion of the card of Fig. 2. Fig. 96 shows a section at 96—96 of Fig. 4b showing sensing pins which sometimes read perforations in the card and at other times read a set-up in the machine. In Figs. 93 and 96 all of the pins 445 have their ends resting in the perforations in the plate 442. They also project through a restoring frame 446 back of the plate 442. Collars 447 fixed on the pins cooperate with springs 448 pressing at their rear end against a fixed slotted plate 449. The springs thus tend to push the pins forward through the plate 442 and the card M2. Movement of the frame 446 toward the right permits the pins to advance through or against the card. Movement of the frame to the left thereafter restores the pins to normal position. In Fig. 92 the two upper sensing pins 445 are provided at their rear ends with stop collars 450 reaching through a flange 451 on a stop 452.

A spring 453 tends to pull the stop to normal position toward the left. This spring is weaker than the spring 448 at the opposite end of the pins and yields when a pin reaches through the card to take a reading. At an intermediate point the upper pin is provided with a block 454 and the second pin from the top is provided with a block 455. The block 455 has an upward projection 456 at its forward end adapted to be engaged by the block 454. If the second pin from the top advances through a perforation in the card, the extent of its movement will be limited by a collar 457 (Fig. 93) engaging the stop plate 449. This permits the pin to move its stop 452 one step toward the right. If the upper pin alone advances through the card, it will not be limited by a collar 457 but will strike the projection 456 on the second pin which limits its movement so that it moves the stop 452 two steps toward the right. It should be understood that the pins are loose in the flange 451 so that the stop 452 may be pulled forward by either of the pins, although the other one of the pins does not take a reading. If both pins advance through perforations in the card, the lower pin moving its one step, the upper pin is now permitted to move three steps before it is stopped between projection 456 on the lower pin and thus the stop 452 moves three steps toward the right. The two upper pins control the setting of a comb 458. The third and fourth of the pins 445, counting from the top, are controlled in the same manner as the first and second, just described, and control the setting of a stop 452a which in turn controls the setting of a comb 458a. The fifth and sixth pins 445, counting from the top, operate in the same manner controlling a stop 452b which in turn controls the setting of a comb 458b.

The combs are pulled downwardly by springs 459 and are restored to their upper position by a restoring bail 460 pivoted on a shaft 461. The bail 461 is operated as shown in Fig. 11 by a cam follower arm 462 cooperating with a cam 463 on shaft 37. The arm 462 is connected by a link 464 to an arm 465 fixed on the shaft 461. A spring 466 may be provided to hold the follower against its cam. The timing of the cam is such as to rock the shaft 461 clockwise in Fig. 92 after the pins have taken their readings and have set the stops 452. Later, after the combs have performed their functions, the shaft 461 will be rocked counterclockwise to restore the combs to their normal position.

The operation of the restoring plate 446 to permit the sensing pins to take their reading is shown in Figs. 5a and 95. The plate 446 is mounted in the frame 467 and is connected at opposite ends to arms 468, each of which forms a part of a toggle joint, the other arm of which is shown at 469 pivoted at 470 to the fixed frame 467. Springs 471 tend to break the toggle to move the restoring plate 446 to the right as viewed in Figs. 5a, 93 and 96 to permit the pins to take a reading from the card. The opening and closing of the toggle is controlled by a link 472 connected to the central portion of the toggle and also connected at its lower end by an intermediate link 473 to an arm 474 pivoted at 475. The rear end of said arm is connected by a turnbuckle joint 476 to an arm 477 pivoted at 478 (see also Fig. 5). Also pivoted at 478 and fixed with respect to arm 477 is a cam follower arm 479 cooperating with a cam 480 on shaft 37. A spring 480a holds the follower against its cam and pulls the link 472 upwardly to break the toggle while the came 480 acts to positively close the toggle.

Figure 73:
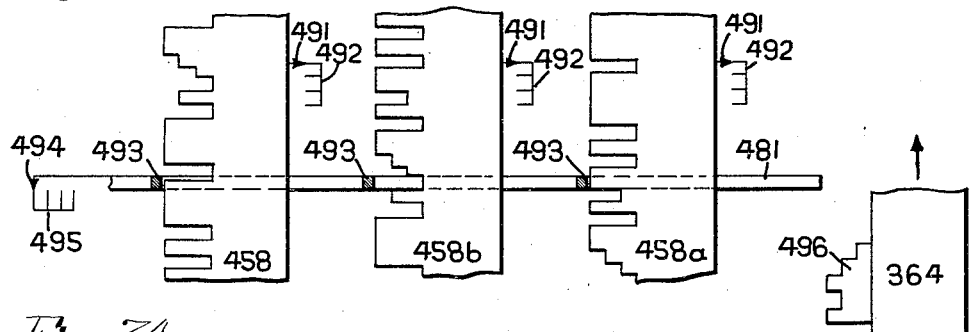

The combination combs 458 are controlled by the sensing pins. These combs in turn control the setting of stop bars 481. These bars in turn control the setting of the type carrier bars 364. After the combs 458 have been released and descend to their several positions, the stop bars 481 are released to move to the left as viewed in Fig. 92 to take readings from the combination combs. The bars 481 are slidably mounted in frames 482, 483 and are adapted to be moved toward the combs 458 by springs 484 connected at one end to the stop bar and at the other end to restoring bars 485. The bars 485 cooperate wtih notches in the stops 481. Movement of the restoring bars toward the left releases the stops and also tends to stretch the springs 484 to cause the stops to follow the movement of the restoring bars toward the left. Movement of the restoring bars back to the right positively restores any stops that may have moved to the left. The several restcring bars 485 are secured at their opposite ends to members 486 (Fig. 16) slidably mounted in supporting guides 487. An arm 488 connected at 488a to the member 486 is also connected to an arm 489 pivoted at 490 thus forming a toggle. The arm 489 is provided with two cam follower arms 489a, 489b cooperating with cams 489c and 489d on the shaft 37. The cams serve to make and break the toggles to move the slide members 486 to the left and to the right as viewed in Figs. 16 and 92 to permit the stops 481 to move against the combs 458 and to restore them. The operation of the stops 481 and the combs 458, 458a and 458b is shown in greater detail in Figs. 73 to 78 inclusive. In Fig. 73 the combination combs are shown in their upper or normal positions as indicated by index arrows 491 cooperating with scales 492 and a stop 481 is prevented from advancing toward the right by projections 493 so that the stop is in its normal position as indicated by index and scale 494, 495.

Figure 74:
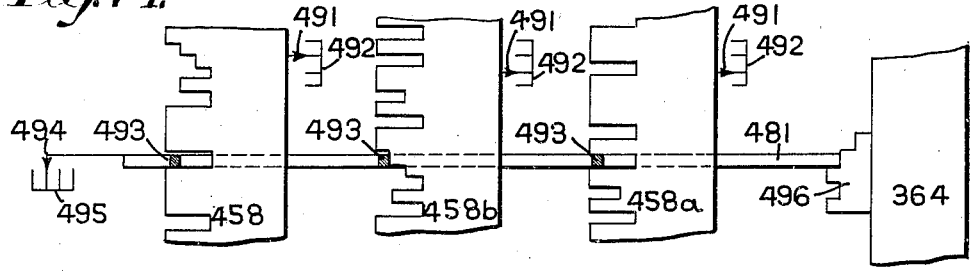
Figure 75:
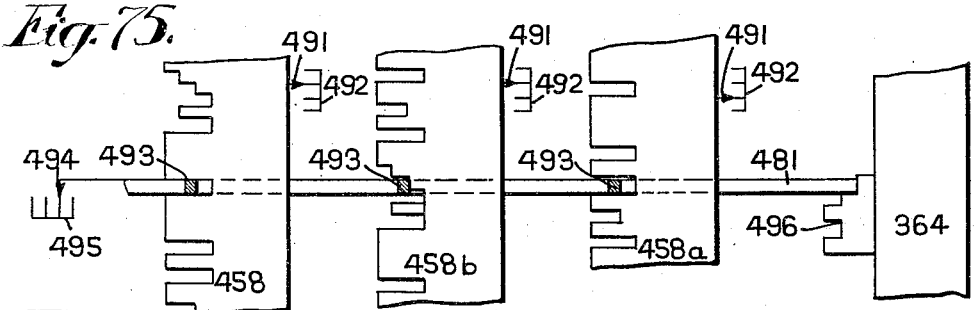
Figure 76:
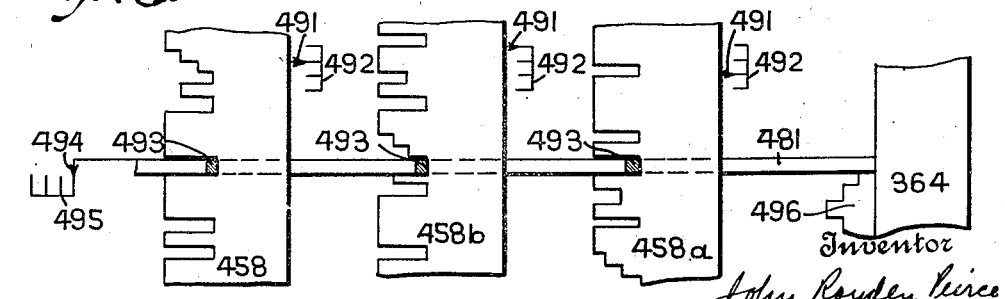

In reality it is understood that the several combs are side by side and there is but one lateral projection 493 on each stop bar 481 reaching across the notches in three combs. In Fig. 74 comb 458 has descended one step as indicated by the arrow and scale, comb 458b has descended two steps and comb 458a has descended two steps. The stop 481 has advanced into cooperation with the combs and as indicated by the scale has moved one step, being stopped by the depth of the slot in the comb 458b. In Fig. 75 the several combs have descended various distances and the stop has advanced two steps again being stopped by the depth of the notch in the comb 458b. In Fig. 76 the combs are variously positioned and the bar 481 has advanced three steps finding notches of full depth in all of the combs. The type carrier bars 364 are provided with stepped stop projections 496 adapted as the type bar rises to cooperate with and be stopped by the stops 481. In Fig. 73 the type bar is shown in its normal position. In Fig. 74 the bar has risen and is stopped by the lowermost step cooperating with the stop 481. In Fig. 75 where the stop has advanced two steps, the second step of the type bar stop has engaged the stop 481 and the type bar has risen to a position one step lower than in Fig. 74. In Fig. 76 the type bar has stopped two steps lower than in Fig. 74 by reason of the position of the stop 481. Thus each stop 481 by advancing one, two or three steps is capable of stopping the type bar in three positions to thus present three separate type characters in printing line. In Figs. 77 and 78 the parts are shown in perspective. In Fig. 77 the several combs are shown in normal position as indicated by the arrows and indexes. The stops 481 are also in normal position and the type bar 364 has not been released.

In Fig. 78 the combs have descended various distances and one of the stops 481 has advanced one step in response to the movement of the bars 485 and the action of springs 484. The setting of the combs 458 in this instant is similar to that shown diagrammatically in Fig. 74 so that the stop 481 has advanced one step and has stopped the type bar by cooperating with the lowermost step on the stop 496. The operation of these devices is shown and described in my Patent No. 1,506,382 and therefore need not be described in further detail here. When none of the stops 481 advances the combs will permit the extra stop 481a (Fig. 92) to advance into a notch in the member 496 to prevent the type bars from rising.

The type bars 364 are mounted for vertical movement and are actuated by individual springs 497 (Fig. 92) tending to raise the type bars. The restoring bar 498 cooperating with a projection 499 is shown holding the type bars down in normal position. The two ends of the restoring bars 498 are connected to links 500 (Fig. 5) which are connected to cam follower arms 501 pivoted at 502 and cooperating with cams 503 on shaft 37. Springs 501a hold the followers against the cams. After the pins have taken their reading from the card and the combs have taken their readings from the pins, the stops 481 then taking the readings from the combs, the type bars rise under control of their cams 503 to take a reading from the stops, being stopped by the lowermost stop 481 that may advance and the position of stopping being determined also by the number of steps that such stop has advanced. The type bars are thus stopped so as to present one type element of the upper set 504 (Fig. 92) in position to be struck by a plunger 505 which will cooperate with the type element, forcing it against the receipt slip mounted on the platen 367 to print a character on the slip.

A corresponding type element in the lower set of type 506 on the same bar 364 will be positioned in alinement with the plunger 507 which will impel the type element to print upon the card at B3. A platen strip 508 lies in back of the card on the printing line. The plungers 505 and 507, as shown in Fig. 9, are adapted to be struck by hammers 510 and 511. The hammers 510 are loosely mounted on a shaft 512 and the hammers 511 on shaft 513. A restoring bail 514 is provided to restore all of the hammers 510 and a bail 515 to restore all of the hammers 511. The hammers 510 are actuated by springs 516 and are latched by latches 517 which in turn are moved to latching position by springs 518. The lower end of each latch 517 is provided with a lateral projection or flange 519 adapted to be engaged by a shoulder on the hook 520 on a rod 521 which is connected at its opposite ends to arms 522. Springs 523 normally hold the hooks 520 up in the position shown in Fig. 9 so that when the hooks 520 move to the right they will miss the projections 519 and not release the hammers. If a hook 520 is depressed before it moves to the right it will then engage the projection 519 and rock the latch 517 releasing the hammer 510 so that the latter will be actuated by its spring to effect printing. The lower hammers are provided with springs 516, latches 517, springs 518, flanges 519, hooks 520 mounted on rods 521 on arms 522, all similar to the corresponding parts associated with the upper hammers. The springs 523 are not necessary in connection with the lower hooks 520 as the corresponding upper and lower hooks are interconnected by links 524 and the upper springs 523 serve to normally hold both hooks 520 in their upper position. The lower hook 520 is adapted to be rocked downwardly by an arm 525 pivoted at 526 and actuated by a spring 527.

A link 528 connected to the arm 525 and guided by a rod 529 is provided with a projection 530 cooperating with a shoulder 531 on the type bar 364. When the type bar is in the normal position of Fig. 9 it holds the link 528 down permitting the hook 520 to remain in its upper ineffective position. When a type bar 364 rises to position any type element in line for printing, it releases the link 528 permitting the spring 527 to rock the arm 525, thus depressing the lower hook 520 and through the link 524 also the upper hook 520 so that both of these hooks are now adapted to cooperate with latches 517 when the hooks move to the right. The actuation of the hooks toward the right is effected by rocking of shafts 532, 533. In Fig. 11 the shaft 532 is shown as having fixed thereon an arm 534 carrying a latch 535 adapted to cooperate with an arm 536 fixed on shaft 512, a spring being provided to hold the latch in cooperation with the arm. An arm 534a is fixed on shaft 533 and is provided with a spring-pressed latch 535a cooperating with an arm 536a fixed on shaft 513. In Fig. 8 the shafts 512 and 513 are shown as having fixed thereon arms 537, 537a connected to a link 538. A separate link 539 pivotally connected at 540 to the arm 537a and link 538 is connected at its lower end to an arm 541 pivoted at 542 and having complementary cam follower extension arms 543 cooperating with cams 544 on shaft 37. The rocking of shafts 512 and 513 does not directly affect the hammers 510, 511 mounted thereon since the latter are loosely mounted as previously stated. The rocking of these shafts, however, as shown in Fig. 11, is adapted to move the latches 535, 535a toward the right to rock the shaft 532, 533. Rocking of the latter shafts counterclockwise as viewed in Fig. 9 will move the hooks 520 toward the right.

The hooks associated with type bars 364 that have risen will actuate latches 517 to release the type bars. The hooks corresponding with type bars that have not risen will move to the right without releasing their hammers. In the fifth billing cycle, when the receipt slip carriage moves laterally to print the name at 419 (Fig. 3) only the upper set of type 504 (Fig. 9) will be actuated as nothing is to be printed at this time on either the notice or audit cards. To suppress the actuation of the lower set 506 of type, the latch 535a (Fig. 11) is connected to a link 535b which in turn, is connected to an arm 535c pivoted at 535d and adapted to be raised in the fifth billing cycle by an arm 535e on shaft 311. This will raise latch 535a so that it will not rock shaft 513 when the name is printed at 419 (Fig. 3) and the hammers for the lower set of type will not be released. The operation of the hammer restoring bails 514, 515 is effected by the rocking of the shafts 512, 513 which we have just described the bails being fixed on these shafts. The rocking of the shafts counterclockwise in Fig. 9 releases the hammers so that they may operate when unlatched. Clockwise rotation of the shafts restores the hammers to normal position where they become latched again by the latches 517. The plungers 505 and 507 are provided with springs 545 tending normally to restore the plungers. In order, however, to insure positive restoration, bails 546 cooperating with stops 547 fixed on the plungers are provided. These bails are fixed on shafts 548, 549. Arms 550, 551 fixed on shafts 548, 549 are interconnected by link 552. A cam arm 553 on shaft 548 is adapted to rock both shafts by reason of the interconnection. Cam arm 553 cooperates with a cam 554 (Figs. 9 and 11) fixed on shaft 512.

A spring 555 connected to the follower 553 holds the latter against the cam 554. This positive restoration of the plungers 505 and 507 prevents the plungers from becoming stuck and interfering with the restoration of the type bars 364. The individual type elements 504 are mounted in the type carriers 364 with springs (not shown here) tending normally to restore the type to the proper position after a printing operation has been performed. Should the spring fail to restore a type element, a plate 556 is provided having an inclined upper edge against which the type element strikes as the type bar descends. This cams the type element back into position with respect to the type bar. All of the type bars 364 are provided with ratchet teeth 557 (Fig. 92) along one edge. A spring-pressed latching pawl 558 is adapted to cooperate with these teeth after the type bars have been set in printing position so that the stops 481 may be withdrawn before the type bars are restored. After the type bars have been restored and before they again rise the pawls 558 are withdrawn by a rocking plate 559 mounted on a rod 560. In Fig. 8 the rod 560 has fixed thereon an arm 561 provided with a pin 562. A link 563 connected at its upper end to toggle 488, as more clearly shown in Fig. 16, is adapted when moved downwardly by the toggle to cooperate with the pin 562 rocking rod 560 clockwise to cause the pawls 558 to disengage the type bars. A spring 564 holds the link 563 against the pin 562. When the link 563 moves downwardly to rock the rod 560 it also rocks an arm 565 fixed on the rod 560. This permits a link 566 to be drawn downwardly by its spring 567 carrying with it a pin 568.

The movement of the pawls to disengage the type bars takes place before the type bars rise. Before the stops 481 are withdrawn, the pawls 558 must move into engagement with the type bar. This engagement is effected when the arm 541 rises, first taking up the lost motion in its connection with arm 566 and then raising it against the action of its spring 567 causing the pin 568 to engage the side of the link 563 camming the latter toward the left out of cooperation with the pin 562 releasing the arm 561 so that all of the pawls 558 may be actuated by their springs into engagement with the type bars. The type bars may be restored before the pawls are disengaged therefrom by reason of the nature of the ratchet and pawl construction.

In Figs. 9 and 92, the type bars 364 are shown as having notches 570 into which locking slide plates 571 are adapted to be moved. Springs 572 normally hold the plates out of the notches. Each plate at its rear end cooperates with a cam 573 on shaft 311 (see also Figs. 7 and 113). The various cams 573 are designed to push their respective plates 571 into cooperation with particular type bars 364 during certain of the five billing cycles of operation of the machine so that during such cycles, although the sensing pins may read perforations in the master card and may set the stops to position the type bars for printing, certain of the type bars will nevertheless be locked out during particular cycles to avoid printing the data being sensed upon the bill N and the receipt slip R. In the timing diagram, lines 3 to 10 from the bottom show which of the type bars are locked against operation during particular cycles of the machine.

Thus line 8 from the bottom indicates that type bars Nos. 25, 26 and 27 are locked against operation beginning in the early part of the first cycle and are released in the early part of the second cycle so that they cannot operate for printing during the first cycle and are again locked against operation during the fourth cycle and are released for printing during the second, third and fifth cycles.

*Transferring readings across the machine*

Thus far, in considering the sensing of data upon the master card and the controlling of type bars for printing, we have considered the group of type bars 364 of Figs. 9, 92 and 113 which carry the alphabet and digit type elements for printing upon the receipt slip R and the bill or notice N of Figs. 3 and 3a. In order to print upon the file slip F of Fig. 3 and the audit card A of Fig. 3a under control of the sensing pins simultaneously with the printing upon the cards R and N, it is necessary to transfer the readings across to the type bars 365 (Figs. 10, 94 and 113). The mechanism for transferring the reading from the sensing pins across to these type bars includes arms 574 (Fig. 92). These arms are fixed on rods 575 and cooperate with pins 576 on the blocks 454, 455. Inasmuch as the data being transferred to the type bars 365 relates to numerals and not to the alphabet, the data sensed by the four upper pins 445 is the data which is to be transferred. Thus there is an arm 574 for the two upper sensing pins 445 and a separate arm 574 for the third and fourth sensing pins 445 and none for the two lower pins.

In Fig. 92a the arm 574 for the two upper bars 454, 455 is shown on one side of the bars while the arm 574 for the third and fourth bars is shown on the opposite side to avoid interference. In the adjacent column the arms 574 are similarly arranged but are shorter to cooperate with the rods 575 arranged in higher planes. In Fig. 94 each rod 575 has fixed thereon an arm 576 provided with four steps 577 adapted to cooperate with a stop pin 578 on a link 579 connected to a stop bar 580. In its normal position the stepped stop member 576 is adapted to prevent movement of the link 579 toward the left as viewed in Fig. 94. When the arm 576 rocks one step under control of the sensing pins it will permit the link 579 to move one step to the left. Rocking of the arm 576 two or three steps will in like manner permit the link 579 to advance two or three steps toward the left. A spring 581 on each arm 576 holds the parts normally in non-reading position. The stops 580 are thus controlled in the same manner that the stops 452, 452a of Fig. 92 are controlled. The stops 580 determine the position to which combs 582 may descend. The stops 580 are provided with springs 583 tending to move them toward the left. A slotted restoring bar 584 cooperating with pins on the links 579 is adapted to release the stops for operation and to restore them during proper times in the successive cycles. The restoring bar 584 is mounted at its ends in slots in the plates 585 (Fig. 122). Studs 586 on the bar 584 cooperate with an arm 587 on shaft 588 (Figs. 91, 94) having arm 589 connected to a link 590 having cam followers 591 cooperating with cams 592 on opposite sides of the link 590. A spring 593 holds the followers against the cams. By using two cams, they may be independently adjusted to control the time of rocking of shaft 588 and the time of releasing independently.

The combination combs 582 (Fig. 94) are pulled downwardly by springs 594 and are restored by bail 460 on shaft 461 which has been described in connection with the operation of combs 458 in Fig. 92. After the combs 582 have descended to positions determined by the setting of stops 580 the stop bars 595 are released by the restoring bars 485 heretofore described to advance one, two or three steps according to the setting of the combs. The type bars 365 are provided with several stepped stop members 596 which cooperate with the stop bars 595 to differentially set the type bar to present one of the type elements 597 of the upper set of type to print the data in lines 412, 414, 416, and 418 of the file slip F of Fig. 3 and also to position one of the type elements 598 of the lower set to print the same data in lines 360, 361, 362 and 363 of the audit card A (Fig. 3a). In Fig. 9 the plungers 505a which actuate type 597 are hidden behind the plungers 505 whereas the plungers 507a for actuating type 598 are shown higher than the row of plungers 507. The bail 546 controls the plungers 505a. The plungers 507a are controlled by a bail 599 pivoted at 600 and connected by arm 600a to the link 552 for operation simultaneously with the other restoring bails. To receive the blow of the type 598 a platen strip 601 is provided. This strip is carried on arms 602 pivoted at 603 and is adapted to be lowered from the position of Fig. 10 which is its operating position to the position of Fig. 9 out of the path of movement of the card feeding clips 317 while the clips are moving across the machine to feed the cards.

The platen strip is moved into position for printing by an arm 604 (Fig. 9) connected by a link 605 to an arm 606 associated with a cam follower 607 operating on cam 608 on shaft 311 (see also Fig. 7). A spring 609 holds the follower against the cam. When the cam releases the follower, the spring 609 rocks the platen strip 601 into printing position. The plungers 507a are actuated by hammers 511a. These hammers are a continuation of the hammers 511, being mounted on the same shaft and restored by the same bail. They are controlled in the same manner and are connected to the upper hammers 510 which effect the printing on the file slip F. Springs 497 (Fig. 94) raise the numeral type bars which are restored by a restoring bar 610 cooperating with projection 611 fixed on the type bar. While the restoring bar 498 for the alphabet type bars crosses above the projection 611 of the numeral type bars it does not interfere with the operation of the latter because it rises at substantially the same time with the rising of the restoring bars 610 but rises higher than the latter. The restoring bars 610 are operated by links 612 (Fig. 5) connected at their upper ends to cam follower arms 613 pivoted at 502 and cooperating with cams 614 on shaft 37. Springs 501a similar to those on arm 501 hold the cam follower arms 613 against their cams. The numeral type bars are provided with stop plates 571 (Figs. 10, 94 and 113) controlled by cams 573 similar to the stop plates shown in Figs. 9 and 113 for controlling the alphabet type bars. Ratchet teeth 557 are also provided on the lower edge of the numeral type bars (Fig. 94) for cooperation with pawls 558 similar to the pawls 558 associated with the alphabet type bars in Fig. 92. These pawls are controlled by the same plate 559 that controls the pawls of the alphabet type bars.

The combs 582 (Fig. 94) may be provided at their lower edges with ratchet teeth 616 for cooperation with spring-pressed latching pawls 617 to hold the combs in their set positions so that the stop bars 580 may be restored before the restoration of the combs themselves. A plate 618 pivoted at 619 rocks the pawls 617 away from the combs to permit the latter to be returned to normal position. The rod 619, as shown in Fig. 92, is adapted to be rocked by a cam follower link 620 cooperating with a cam 621 on shaft 37.

*Perforation of the audit card*

Simultaneously with the printing of the data on lines 360 and 362 on the audit card A (Fig. 3a) the perforations in the two horizontal fields 366, 366a are made. The perforated data in the field 366 corresponds with the printed data in line 360. Directly below each numeral the combination of perforations representing that numeral is made in the card. The perforations in the field 366a represent the printed data in line 362, the combination of perforations directly under each of these numerals representing that numeral. The punches for making these perforations are shown at 622 (Fig. 10). There are four of these punches to each vertical row and they are mounted at one end in a plate 623 and guided at their opposite ends in a plate 624. A restoring or stripper plate 625 cooperates with shoulders on the punches. This stripper plate is moved toward the right in Fig. 10, to permit the punches to be actuated and is thereafter restored to the left to restore all of the punches that may have been moved forward for punching. The plate 625 is connected at its ends by members 626 to the bar 627. The members 626 are also connected to links 628 (Fig. 9) which in turn are connected to links 629 pivoted at a fixed point 630 thus forming operating toggles.

Links 631 connected to the toggles serve to operate the latter. These links are connected at their lower ends to arms 632 fixed on shaft 633 which as shown in Fig. 11 has fixed thereon an arm 634 cooperating in an L-shaped slot with a link 635 connected at its lower end to a complementary cam follower arm 636 cooperating with cams 637 on shaft 37. A cam 638 on shaft 311 cooperating with a pin 639 on the link 635 is adapted to control the position of the latter, rocking it counterclockwise against the action of a spring 640. In the position shown in Fig. 11 the reciprocating action of the link 635 will not rock the shaft 633 and therefore will not effect any punching operations. When the cam 638 permits the link 635 to rock clockwise about its lower pivot, it will then be in position by reason of the shape of its slot to actuate the arm 634 when it is reciprocated thus rocking the shaft 633 counterclockwise in Fig. 11 or clockwise in Fig. 9. This moves the bar 627 and the restoring plate 625 toward the right in Figs. 9 and 10. The cam 638 (Fig. 11) serves to suppress punching operations when printing is being effected in lines 361 and 363 on the audit card A (Fig. 3a) and permits punching operations while printing is being effected in lines 360 and 362. The actuation of the punches 622 (Fig. 10) is controlled by plungers 641 carried in a bar 642 mounted to slide up and down and connected by a member 643 to the numeral type bar 365. Thus as each type bar 365 rises to its position as heretofore described, it moves the punch control bar 642 a like distance, moving one or more of the plungers 641 into a position between the actuating bar 627 and the rear ends of the punches 622.

Thereafter when the bar 627 moves toward the right, it moves the plungers 641 against corresponding punches pushing the latter through the card in position B3. Springs (not shown) may be provided for holding the plungers 641 in normal position although the plungers will naturally be positively restored when the restoring plate 625 restores the punches. The arrangement of the plungers 641 is such that when the type bar 365 rises to present the uppermost type element in line for printing to print the digit "1", the uppermost plunger will be in alinement with the lowermost punch and will cause a hole to be perforated in the lowest of the four possible positions. When the type bar rises one step higher to print the digit "2" the uppermost plunger 641 rising one step will aline itself with the second punch 622 to effect a perforation representing the digit 2. When the type bar and punch bar rise three steps, the uppermost plunger will aline itself with the third punch and the next plunger will aline itself with the lowermost punch to punch holes in the bottom and third positions to represent the digit 3, etc. In Figs. 10 and 94, it will be noted that the type elements 597, 598 show a gap between the "8" type and the "9" type. This gap is an arbitrary matter which aids in conveniently arranging the plungers 641. Directly below the die plate 623 (Fig. 10) is a plate 644 and in front of the die plate and extending downwardly in a plane parallel with the plate 644 is a second plate 645. These plates form a trough into which the disks of paper punched from the card in position B3 are pushed. As shown in Fig. 116 the two plates 644, 645 are hinged at 646 and are held in their upper position by a spring 647. The two plates are closed at the bottom which is inclined as shown so that the paper disks will slide toward the opening at 648.

The card feeding carriage 315 has fixed thereon a cam projection 649 adapted to engage a pin 650 fixed to the plates as the projection moves to the left in Fig. 116. The projection cams the pin 650 downwardly rocking the plates about their pivot 646. Thus as the card carriage moves back and forth, the plates 644, 645 are constantly moved up and down shaking the paper disks so that they slide to the lower end and fall through the opening 648.

Inking ribbons

The inking ribbon associated with the platen 367 (Figs. 9 and 10) is shown at 651 and is wound upon spools 652. The mechanism for turning the spools to feed the ribbon is not shown here as any suitable typewriter ribbon feeding mechanism may be employed. A single, wide inking ribbon 653 as shown in Figs. 9, strips 508 and 601. This ribbon is wound 10 and 11, is wide enough to cover the platen upon spools 654 (see also Figs. 6 and 6a). The feeding mechanism for this ribbon is not shown.

Suppression of printing of class designation on audit card

On the master card (Fig. 2) under the heading "Policy No." the letter A is shown as included in the number. In printing the receipt slip and bill (Figs. 3 and 3a) under control of the master card, this letter A is printed on the sections R and N. On the sections F and A the letter A is shown in the policy number but in these two instances it is not printed by the present machine. It is printed in these places as part of the form and may serve after the slips have been filled out for checking purposes.

Presuming the machine to be making out bills for a certain class of customers, the class being represented by the letter A, the receipt slips and notice cards for this class are placed in the machine, the class being printed on the file and audit sections F and A of the slips. In the present instance the class is represented by the letter A. After the bills have been made out, if any of them are found to contain some other classification designation on the sections R or N it will be obvious that a wrong master card has been fed through the machine. Printing in the position on slips F and A of this classification under control of the master card is suppressed during the bill making operations. This is effected in the following manner:

In Fig. 94 the link 524a which connects the releasing latches 520 for controlling the operation of the upper and lower hammers 510 and 511 of the type bar controlled by the column on the master card representing the classification designation A, is provided with a downward continuation cooperating with a lever 655 pivoted at 656 and held in the position shown by a latching link 657. In Fig. 94 the link 524a is shown latched in its upper position so that the releasing latches 520 when moved to the right will not release the hammers for operation. This is the position of the parts during the first billing cycle of the machine when line 412 of the file slip F and line 360 of the audit card A are printed, thus during this cycle the hammers which would normally operate to effect the printing of the designation where the letter A appears, do not operate and no printing takes place.

During the second cycle, this type bar is not used but it is used during the third cycle and thus it becomes necessary to release it for operation in the third cycle. This releasing is effected by the rising of the latch member 657 (Fig. 94). For this purpose the member 657 is attached at its lower end to an arm 658 fixed on shaft 659 (see also Figs. 91, 100 and 102). In Fig. 91, the shaft 659 is shown as having an arm 660 the other end of which as shown in Fig. 16 is connected by a link 661 to an arm 662 having complementary cam followers 663 cooperating with complementary cams 664 on shaft 311. The cams are timed to rock shaft 659 at about the beginning of the third cycle. The direction of this rocking is clockwise as viewed in Fig. 94. This raises the link 657 permitting the link 524a to move downwardly with the latching hooks 520 so that the hammers may be released during this cycle. It is to be noted, of course, that the type bars 365 (Fig. 10) which carry the type for printing on the slip F and audit card A are numerical type bars and do not carry the letters of the alphabet. Also the punch plungers 641 are not arranged to punch the combination of perforations representing the letter A. Since the hammers are suppressed so that no printing takes place, the type bar may be controlled to rise to any predetermined position to control the punching of an arbitrary designation. As shown in Fig. 3a in the field 366 directly below the classification designation A, one perforation is provided in the lower one of the four positions. This designation represents the numeral "1" but may be used in the present instance to arbitrarily represent also the classification A. Other classifications may also be perforated by properly controlling the extent to which the type bars 365 and consequently the plunger bars 642 rise. This control is effected as follows:

Referring to Fig. 94, in addition to the usual stop bars 595 additional stop bars 665 are provided for cooperation with the combs 582 associated with the particular type bar 365 in question. When the reading is transferred to these combs under control of the classification designation the position of the combs will be such that if the classification letter is A, a particular one of the stops 665 will advance to permit the type bar 365 and the punch plunger bar 642 to rise to the same position that it would for the printing of the numeral "1" so that while the hammers are suppressed and the numeral is not printed, the perforation representing this value is made. Under control of these additional stops 665 other arbitrary classification designations may be employed and arbitrary perforations made in the proper column.

Storing mechanisms

In reading the perforations in the horizontal field 5 of Fig. 2 and printing this data, it will be noted that the data contained in the sub-field 9 designated plan is not printed on the receipt slip R or the notice card or bill N nor is it printed in lines 412, 360 of the file slip F and the audit card A, which lines are printed during the first billing cycle. This data, however, is printed in the sub-field designated plan on lines 416 of the slip F and line 362 of the audit card A, being also perforated in field 366a of the audit card. This printing and perforating is done during the third billing cycle. This data which is sensed during the first cycle must therefore be stored in the machine until it is used to control the entries in the third cycle.

The mechanism for storing this data and causing it to be entered later is as follows:

Figs. 79, 80, 81, and 82 show the combs 458, 458a, 458b which are controlled as shown in Fig. 92 by the pins 445 which analyze the master card. There are three combs to a set and the three sets now in question are shown here. Two of the combs 458 and 458a of each set are shown as having downward projections 668. The middle comb 458b is not provided with a projection since in analyzing numerals only two of the combs operate, the third one remaining idle. Below the projections 668 is a carriage 669 slidably mounted in a frame 670. Slidably mounted in the carriage are cross combs 671. There is one cross comb for each of the projections 668. Each cross comb has a stepped stop member 672. In Fig. 79 the cross combs 671 are shown in normal position. In Fig. 81 these combs are shown in moved position. The combs move to this position after the vertical combs 458, 458a have taken their readings. Here two of the vertical combs are shown as having descended two steps and three steps respectively, the others remaining in their upper position. The cross combs 671 on moving toward the right have all been permitted to move excepting those that were stopped by the lowered combs 458, 458a. Thus one of the combs 671 has been permitted to advance until its second step engaged the comb 458a. Another has been stopped by its first step engaging comb 458. The movement of the cross comb carriage 669 is effected by an arm 673 having pin and slot connection at 674 with the carriage. In Figs. 89 and 90 the arm 673 is shown fixed on shaft 675 on which is also fixed an arm 673a having a cam follower member 676 with follower rollers 677, 678 cooperating with cams 679, 680 on shaft 53.

These complementary cams serve to rock the arms 673 positively in both directions. According to the time chart the cross comb carriage moves one step during the first cycle. This step represents the movement from the position of Fig. 79 to that of Fig. 81. In the normal position of Fig. 79 an impositive latch 681 cooperates with the first of several notches 682 in a plate 683 fixed to the carriage 669. When the carriage is moved to the position of Fig. 81, the latch 681 engages the second of the notches 682. Individual spring pressed latches 684 pivoted on the carriage 669 are provided for each of the cross combs 671. In the position of Fig. 79 the latches 684 are held in their non-latching position by the frame 670. As the comb carriage moves toward the right and the latches are carried out of engagement with the frame 670 they are actuated by their springs into cooperation with the lower edges of the cross combs which are moving with the carriage. As any of the cross combs engage the combs 458 that have descended they will be stopped. As the carriage 669 continues to move toward the right the latches 684 will escape over the ratchet teeth 685 on the cross combs that have been stopped so that after the carriage and combs have moved to their positions as in Fig. 81 the vertical combs 658, 658a may be restored to their upper or normal positions while the cross combs 671 are locked in their relative reading positions. After the vertical combs 458 and 458a have been restored, the cross comb carriage as shown in the time chart, moves one more step during the latter part of the first cycle so that the latch 681 now engages in the third of the notches 682. This moves the projections 672 out of position with respect to the vertical combs 458, 458a so that the latter are free to operate during the second cycle when they read the field 16 on the master card (Fig. 2).

The cross combs 671 are provided with stepped stops 686 corresponding with those of the vertical combs 582 of Fig. 94 that are associated with the type bars 365 which are utilized in printing the data in the sub-field designated Plan in lines 416 and 362 of the slip F and audit card A respectively. Each of these combs is provided with a downward projection 687, one for each of the combs 671. When the comb carriage moves to its third position as in Fig. 82, the stops 686 are in position to cooperate with the combs 582. During the second cycle these combs do not control any printing. During the third cycle when the combs 582 descend they are stopped in various positions by the stepped stops 686. In this way they take the reading which was transmitted to the cross combs and control the setting of the type bars 365 to print the data taken from the sub-field designated Plan and printed on the slip F and audit card A. The perforations in the audit card in field 366a are effected as heretofore explained.

According to the time chart, after the printing has taken place in the third cycle, the cross combs are restored to their normal position. The restoration commences near the end of the third cycle and is finished during the early part of the fourth cycle. In restoring the carriage from the position of Fig. 82 to that of Fig. 79, the cross combs 671 that are locked by the latches 684 may first be carried beyond their normal positions until the latches 684 engage the frame member 670 and are rocked counterclockwise to disengage the ratchet teeth 685. The combs that have been carried beyond their normal positions will then be drawn back by their springs 688 until they are stopped by the stop bar 689.

Other readings transferred

In Figs. 3 and 3a, in lines 412, and 360 of the file slip F and audit card A, data is shown in the sub-fields designated State and Debit number. The printing of this data is done in the first cycle. Referring to the master card (Fig. 2) it will be seen that the data contained in the fields designated State and Debit number are to the right of the horizontal field designated 10 and directly below the premium payable data of field 5. In order to read this data and print it during the first cycle, a special group of sensing pins is provided. In Fig. 4b this special group is shown at 690. Directly above these pins instead of showing six pins 445 to each vertical row, only four are shown. The reason for this is that as shown in Fig. 2 only numerical data is sensed by these pins and only the four upper pins are used for sensing such data. Thus the two lower pins are dispensed with. In Fig. 93 the pins 690 are shown as controlled by the restoring plate 446. The pins are also provided with stops 457 similar to those on the upper pins 445. The pins are offset as shown at 691 and the rear ends are provided with stop members 456a similar to the members 456 on the pins 445. The pins 690 rock arms 574a similar to the arms 574 of Fig. 92. These arms are mounted on rods 57a similar to the rods 575 of Fig. 92. The operation of the pins 690 thus serves to rock the rods 575a through varying degrees depending upon the reading. In Fig. 94 the rods 575a are shown as having stepped stop arms 576a for controlling the extent of movement of stops 580a. These latter stops cooperate with those of the combination combs 582 that are associated with the type bars 365 which carry the type for printing in the fields designated State and Debit number on the slip F and audit card A (Figs. 3 and 3a).

The pins 590 thus operate in the first cycle to read this data and control the type bars to print the data during the first cycle. In Fig. 93 it will be seen that the pins 690 are cut short as shown at 692 and are not connected directly to any combination comb stops, but are connected to combination comb stops only through the cross-over rods 575a. The reason for this is that the data is not entered upon the receipt slip R or the notice card N of Figs. 3 and 3a.

In Fig. 2 referred to the field 5a on the card, the sensing pins that analyze the perforations in this column operate during the first billing cycle of the machine to control the type bar to print the data in the fields 411a and 356a on the slip R (Fig. 3) and the notice card or bill N (Fig. 3a). By cross connections it also controls the printing of the same data in the field 412a on line 412 of the slip F (Fig. 3) and the corresponding position 360a on line 360 (Fig. 3a) of the audit card A. In the second cycle these same pins read the data in the field 10a of the master card. This data is not printed upon slips R and N. It is printed on slip F of the audit card A (Figs. 3 and 3a) at the positions 693, 693a respectively. In the third cycle these pins read the last column 12a in the horizontal field 12 on the master card and print this data in the field designated Orig. debit directly below the position 393, 393a (Figs. 3 and 3a). In the fourth cycle these pins read the last column 13a in the horizontal field 13 on the master card and print the data in the Orig. debit fields of slips F and A (Figs. 3 and 3a) on lines 418 and 363 respectively.

It will be seen from this that during the first billing cycle these pins control the printing on slips R and N and in a particular column on the slips F and A and in the subsequent cycles they control printing in the next adjacent column on slips F and A. Mechanism is thus provided to shift the control of the pins from one column in one cycle and to another column in subsequent cycles. Also mechanism is provided whereby the type bar which controls the printing in the columns 412a, 360a on slips F and A in the first cycle may be controlled from other sources during subsequent cycles so that data may be printed in fields 416a and 362a of slips F and A or on other lines in these particular columns. Mechanism for effecting this shifting of the control of type bars is as follows: There are four pins in this column for reading data as shown at 694 (Fig. 4b). These pins are part of the group designated generally as 445 in Fig. 93. These pins control stops 580 which then control the setting of combs 582 which in turn, through the stops 595 (see Fig. 94), control a type bar 365 carrying the type for printing in the fields 411a, 356a on slips R and N (Figs. 3 and 3a). Through the crossover connections including arms 574 (Fig. 93) and rods 575 and the stepped stop members 576 (Fig. 94), links 579 and stops 580 are set to control the setting of additional combs 582 to control the setting of the type bars 365 which carry the type for printing at 412a, 360a on lines 412 and 360 respectively of slips F and A (Figs. 3 and 3a). Thus through the mechanisms heretofore described, the data sensed on the master card during the first billing cycle is printed in these four positions on the slips of Figs. 3 and 3a. During the second and third billing cycles, the type bar which carries the type for printing at 411a, 356a on slips R and N in Figs. 3 and 3a is locked against being set in printing position by the cam 573a and the slide 571a (Fig. 113).

The combination combs shown generally in Fig. 94 at 582 which control the printing bars for printing on the slips F and A of Figs. 3 and 3a are shown specifically at 582a in Fig. 107. The stop 595 which is controlled by the combs 582a cooperates with the steps 596 on the bar 365x. In Fig. 113 the bar 365x is shown as being mounted with the type bars 365. This particular bar 365x carries no type and is used only to control certain of the type bars. In Fig. 110, the control bar 365x is shown connected with the type bar 365 of the sixty-seventh column so that as the control bar rises the type bar of the sixty-seventh column will rise a corresponding distance under control of the control bar. The interconnection comprises a bracket 696 fastened to the sixty-seventh type bar 365. In order to understand this cross-over connection reference is made to a similar cross connection which is more fully illustrated in the drawings. The type bar 365 of the sixty-sixth column (Fig. 110) is shown as having fixed thereto a bracket 697 reaching over and cooperating with a control bar 365y in Fig. 109. The control bar 365y is shown as carrying a slide 698 attached to the bar by means of pin and slot connection 699. The slide is adapted to have two positions with respect to the control bar and may be impositively latched in either of these positions by the spring pressed pawl 700. In Figs. 109 and 110, bracket 697 is shown as located under a projection 701 on the slide 698 so that as the control bar 365 rises it will permit the bracket 697 and with it the type bar 365 of the sixty-sixth column to rise a like distance. The slide 698a on the control bar 365x is shown dotted in Fig. 109 behind the slide 698. The bracket 696 is also shown dotted in this figure.

The position of the parts shown in Figs. 109 and 110 is that for the first billing cycle. Thus during this cycle when the sensing pins read the data in the column 5a of the horizontal field 5 of Fig. 2 the type bar 365 of the sixty-seventh column (see also Fig. 113) rises to control printing on slips F and A (Figs. 3 and 3a). During this same cycle the type bar 364 of the thirty-fifth column is as we have described, controlled to print at 411a and 356a on the slips R and N (Figs. 3 and 3a). After printing during the first cycle and before the end of this cycle, the type bar 365 of the sixty-seventh column (Fig. 110) is disconnected from the control bar 365x in the following manner.

In Fig. 109 the slides 698 and 698a are shown as having depending cam projections 702 adapted to cooperate with a bifurcated arm 703 pivoted at 704 (Figs. 108 and 110) to the bracket 705 (see also Figs. 89 and 90). A lateral projection 706 on the arm 703 is connected at its outer end to a link 707 which straddles shaft 49 at one end and shaft 53 at the opposite end for support. This link carries a cam follower 708 cooperating with a cam 709 on shaft 53. A spring 710 holds the follower in cooperation with the cam. The cam and the spring serve to alternately move the link 707 to the right and to the left as viewed in Fig. 108. This moves the arm 703 to the right or left as viewed in Fig. 109 or up and down as viewed in Fig. 110. Referring to Fig. 109, if while the control bars 365x and 365y are in the upper position the arm 703 is moved to the right, when the control bars 365x and 365y descend and the projections 702 engage the arm 703, slides 698, 698a will be cammed over to the right and held in such position by the latching pawl 700.

This moves the projections 701 of the slides 698, 698a out of cooperation with the arms 696, 697 on the type bar 365 of the sixty-seventh column and bar 365 of the sixty-sixth column so that during subsequent billing cycles when the control bar 365x or 365y rises to any given position the type bars 365 of the sixty-seventh and sixty-sixth columns respectively may rise to other positions, for instance, to higher positions. As stated, type bar 365 of the sixty-seventh column is locked against rising in the second cycle. This type bar, however, is free to rise during the third cycle under control of other instrumentalities hereinafter described. Referring to Fig. 113 the type bar 365 of the sixty-eighth column is latched against rising by one of the slides 571 controlled by one of the cams 573 during the first billing cycle. During the subsequent billing cycles this type bar is released for operation. As shown in Fig. 108, the type bar 365 of the sixty-eighth column is provided with a stop 711 adapted to cooperate with a similar stop 712 on the control bar 365x. Thus when during the second billing cycle the sensing pins read the data in the column 10a in the horizontal field 10 of the master card and control the positioning of the control bar 365x this bar will in turn control the position to which the type bar 365 of the sixty-eighth column rises to print in the positions 693, 693a on the slips F and A in the fields designated Orig. debit. In the third and fourth cycles when these pins read the data in the fields 12a and 13a to control the bar 365x the type bar 365 of the sixty-eighth column will again be controlled to print on the lines 416, 418 of slip F and lines 362 and 363 of the audit card A in the fields designated Orig. debit.

The pins which read the next to the last column in the horizontal field 5 of the master card (Fig. 2) to sense the last or units column in the Premium payable field, control type bars in a manner somewhat similar to that under which the pins just described control the type bars. These pins during the first billing cycle read the data in the units column of the Premium payable and control a type bar to print this data on line 411 of the receipt slip R (Fig. 3) and line 356 of the notice card or bill (Fig. 3a). Also by the cross-over connections previously described, a type bar is controlled to print the data in proper position in line 412 of the slip F and line 360 of the audit card A. This is the type bar of the sixty-sixth column (Figs. 113 and 110). In the second billing cycle the type bar of the thirty-fourth column may be locked by cams 573a (Fig. 113) so as not to operate since no data is printed under control of this bar on the slips R and N (Figs. 3 and 3a). In the third and fourth cycles, however, this type bar is released for operation and is controlled from other sources than the sensing pins which controlled it during the first cycle. These mechanisms will be described later.

The type bar of the sixty-sixth column which prints on the slips F and A may be latched by slides 571 (Fig. 113) during the second and fourth billing cycles but may be released during the third billing cycle to be controlled from another source for printing at 416a, 362a. During the second, third and fourth cycles, the sensing pins of the next to the last column, referring to the master card (Fig. 2), sense the data in the columns containing the designations J, A, and S, respectively.

These letters constitute the initials of a salesman or writing agent and, of course, may be any letters of the alphabet. During these cycles this data is printed in the fields designated Writing agent on the slips F and A (Figs. 3 and 3a). This change from one column to another on the slips F and A is effected through the mechanisms of Figs. 108 to 112. The control bar 365y as shown in Fig. 110 is adapted through the bracket 697 to control the position to which the sixty-sixth type bar rises. After the first cycle, when the arm 703 shifts the slides 698, 698a to the right as viewed in Fig. 109, the sixty-sixth type bar will no longer be controlled by the control bar 365y. During the first cycle the bar 365y is controlled by the three combination combs 458c (Fig. 107) similar to the combs 458, 458a, 458b (Fig. 92). During the first billing cycle the type bar 365 of the seventieth column (Figs. 107, 110, 113) is locked down by its slide 571 but during the second, third and fourth cycles is free to rise. To control the position to which it rises during these subsequent cycles the three combs 458b (Fig. 107) are adapted to be controlled by cross connections from the combs 458c. Referring to Figs. 111 and 112, the third comb 458d reading from the left (Fig. 111) has fixed thereto a stop 713 reaching across to a shoulder 714 on the comb 458c farthest to the right (see also Fig. 112). The second comb 458d is provided with a lateral projecting block 713a cooperating with the similar shoulder on the second of the combs 458c and the first comb 458d is provided with a stop 713b cooperating with a shoulder on the first of the combs 458c. The second and third of the combs 458c are cut away as shown at 714a (Fig. 112) so as not to be interfered with by the stop blocks 713 and 713b respectively.

During the second, third and fourth cycles, combs 458c will be controlled by the sensing pins in the usual manner through the cross-over connection including the rods 575 and stops 576 of Fig. 94, as has been described. The comb 458d are then in turn controlled by the cross connection which is described in connection with Figs. 111 and 112. These combs then control their stops 595 to control the type bar 365 of the seventieth column. This in turn controls the printing of the characters J, A and S or other alphabetical characters in the positions shown in the field designated Writing agent on slips F and A. During the third and fourth cycles, the type bar of the thirty-fourth column which controls the printing of the units column of the premium data is used to control the printing of the units order in the dividend data on lines 415 and 358 of the receipt slip R and notice card N and also the data of the units column of the Amt. to be paid data in lines 417, 359 of these cards respectively. The type bar during the third and fourth billing cycles therefore is controlled from other sources in the later cycles.

The credit amount or dividend is taken from the master card in one of the five fields 715 (Fig. 2). These fields are analyzed by a group of pins designated generally as 716 (Fig. 4b). This group of pins is sub-divided into five sub-groups 716a to 716e (Fig. 37). Each of these sub-groups analyzes a corresponding one of the fields 715. In the operation of the machine four of the sub-groups will be locked under control of the master card against reading. That is, the card contains data indicating which of the five fields the credit or dividend for the current period is recorded in. This particular sub-group of pins is then permitted to operate while the other four sub-groups are locked against operation.

Any of these five sub-groups of pins is adapted to control the type bars of the twenty-ninth to the thirty-fourth columns (Fig. 113) which print the dividend and "amount to be paid" data in Figs. 3 and 3a including the bar for printing in the units column. The pins of the group 716 are shown in Fig. 28. These pins are provided with springs 717 for moving the pins toward the right to analyze the card M. The pins are normally held in retracted position by restoring plate or frame 718. As shown in Fig. 5a the plate 718 is attached at 719 to toggle links 720 actuated by the link 472 heretofore described. The connection between the link and the toggle includes a pin and slot to permit the link 472 to operate at times when the toggle is held against operation by a latch 721 so that at such times the pins will be reading the card. For operation in the first and third cycles, the toggle will be released by the latch 721 connected by link 721a to cam follower arm 721b cooperating with cam 721c so that the restoring plate 718 will operate when the link 472 rises and thus permit the pins 716 to read the master card. The four pins of each column are divided into two separate groups, the two upper pins comprising one group and the two lower pins the other group. One pin of each of these groups is provided with a fixed stop 722 (Fig. 28) adapted to engage the plate 723 when the pin advances through the card thus limiting the extent of movement of the pin. The other pin of each group has no such stop. The rear ends of the pins are provided with slides 724, 725 fixed thereto. Presuming the lower pin to have advanced through a perforation in the card it will move a distance determined by its stop 722.

A stud 726 fixed on the slide 725 and cooperating with an arm 727 on a rod 728 will rock the rod 728 a corresponding distance or degree. If the upper of the two pins advances without the lower one its distance of movement will be determined by a slide 724 engaging the projection 729 on the slide 725, and the stud 726a will rock the shaft 728 an extra step. If both pins advance, the upper pin will now be permitted to advance an additional step and the rod 728 will be rocked three steps. Thus the two pins of a group control the rocking of a rod 728 through one, two or three steps. If none of the pins advance then of course the rod does not rock at all. The two groups of pins in each column control the rocking in this manner of two of the rods 728, that is one of the rods in the lower row and one in the upper row at 728a.

Referring to Fig. 99 the rods 728 and 728a have fixed thereto stepped stop arms 730, 730a. The stops 730, 730a are adapted to cooperate with pins 731 on slide bars 732, 732a. Springs 733 tend to pull these bars toward the left. A projection 734 on each bar is adapted to engage a stop 735 thus determining the extreme movement of the bars to the left. The rocking of the rods 728, 728a will set the stops 730, 730a so that the pins 731 may engage one of the several steps 736 so that the bars 732, 732a will be prevented from moving toward the left or may be permitted to move one, two or three steps. Means for restoring the bars to their normal right hand position comprises a restoring plate 737 adapted to engage projections 738 on the bars. The plate 737 is connected through a bracket 739 to a bar 740 sliding in a slot 741 in the frame plate 742. The bar 740 as shown in Fig. 94 is actuated by a spring 743 tending to pull the plate toward the left in Figs. 94 and 99.

A yoke 744 at each end of the bar 740 engages the bar to move it toward the right. The arm 745 of the yoke is provided with a stud 746 cooperating with an arm 747 on shaft 748. In Fig. 94 the shaft 748 has fixed thereto an arm 749 connected by a link 750 fixed to an arm 740 which is in turn fixed on shaft 588. This shaft as heretofore stated is adapted to be rocked by cams mounted on shaft 37. When the bars 732, 732a are to take readings from the stops 730, 730a the plate 737 is thus permitted by the rocking of shaft 748 to move toward the left. The extent of this movement is transmitted to the comb stops 751, 752 by means of levers 753, 754 pivoted at 755, 756 on a plate 757 adjustably fastened by set screw 758 to the plate 742. A stud 759 serves to hold the plate 757 in proper vertical position. The levers 753, 754 have pin and slot connection at 750 with the bars 732, 732a so that the sliding of the bars will cause the levers to rock. These levers cooperate with pins 761 fixed to slides 762, 763 fixed to the stop bars 751, 752. The stop bars 751 and 752 are pulled to the left by springs 764 and cooperate with combs 765 (Fig. 93). The combs 765, (Fig. 93) are part of the group which includes combs 458, 458a, 458b of Fig. 92. The combs 765 control the type bars 364 (Fig. 93) which are adjacent to the type bars 364 of Fig. 92, and constitute the type bars 364 of the twenty-ninth to the thirty-fourth columns of Fig. 113. These are the six type bars which carry the type to print the premium, dividend and amount to be paid data in Figs. 3 and 3a. The type bars 364 of the twenty-ninth to the thirty-fourth columns are raised by the springs 497 and are restored by the restoring bar 610 described in connection with Fig. 94.

In Fig. 93, five stops 730 and five stops 730a are shown. These cooperate with the type bars of the thirtieth to the thirty-fourth columns and do not control the type bar of the twenty-ninth column.

In reading the credit data in the field 715 (Fig. 2) and printing it on lines 415, 358 (Figs. 3 and 3a) the amount represented is to be subtracted from the amount of the premium or debit pr ted above on lines 411, 356. Thus while the number found in field 715 is printed on the cards R and N the type bars 364 rising to positions to print these numbers must upon returning to normal positions apply the complements of these numbers to an accumulator, hereinafter to be described. The position to which the type bars rise is determined by the stops 481b (Fig. 93) some of which are free to operate when the premium or debit data is printed on line 411 (Fig. 3) and others of which are free to operate when a dividend or credit amount is printed on line 415 (Fig. 3).

The means for locking one or the other set of the stops 481b comprises a slide or grid 766 (Figs. 93, 101). In Fig. 103 some of the stop slides 481b are shown as having notches 767 in their upper edges and others with such notches in their lower edges. The grid 766 is provided with openings 768 through which the stops 481b project. The grid 766 is normally in the lower position and the slides 481b having notches in their lower edges are free to operate toward the left when released by the restoring bars 485. Those of the stops 481b that have slots in their upper edges are then locked by the grid 766 against operation toward the left. In the third billing cycle of the machine, when the dividend or credit amount is being printed, the grid 766 is raised to lock those of the stops 481b that were free in the first cycle and to free those that were locked in the first cycle.

Thus when in the third cycle the combs 765 are set to control the stops 481b those of the stops that are adapted to control the type bars to rise to complementary positions will operate.

In Fig. 98 the type characters on the type bars which print these numbers are shown in the table 769. The full line characters are the true numbers which rise to the printing line when a true number is being printed as in the first cycle. The dotted characters are the complementary numbers which rise to the printing line when the dividend or credit number is being printed and its complement is being added to the accumulator. The stops 481b are thus adapted to control these type bars to rise to print true numbers or complementary numbers depending upon the setting of the grid 766. The operation of the accumulator upon the return of the type bars and the accumulation of the complementary number will, of course, be described in connection with the description of the accumulator which will follow later. The manner in which the grid 766 is raised to control the stops 481b in the third cycle is as follows:

In Fig. 93, grid 766 is shown as having a pin 770 fixed thereto (see also Figs. 101 and 102). An arm 771 fixed on shaft 659, heretofore referred to, is adapted when the shaft rocks counterclockwise to depress the grid 766 and when it rocks clockwise to permit the grid to rise. A spring 772 (Fig. 101) raises the grid when arm 771 rises. We have already shown in connection with the timing diagram that the shaft 659 rocks clockwise as viewed in Fig. 93 at the end of the second cycle so that the grids which are in their lowered position during the first and second cycles rise and remain in their raised positions throughout the third, fourth and fifth cycles, being restored to their normal positions at the end of the fifth cycle.

Since the grids are down in the first and second cycles, the premium number which is printed in the first cycle is printed as a true number and as will hereinafter be shown is also accumulated as a true number. In the second cycle these type bars do not operate as will be seen from an inspection of line 413, sheet R, Fig. 3. In the third cycle, when the complementary number is accumulated, we have seen that the grids have been raised to control this. The grids remain raised during the fourth cycle. In the fifth cycle these particular type bars do not operate. They will, of course, operate again in the first cycle of the next series and the grids are therefore restored to normal position at the end of the fifth cycle so as to be in proper position at the commencement of the next series of cycles.

*Thirty-fourth column type bar control*

We have heretofore shown that the sensing pins which read the units column of the premium on the master card (Fig. 2) and control the thirty-fourth type bar to print this data on sheet R (Fig. 3) are used to sense the data in the next to the last column of the horizontal fields 10, 12, 13, which in the illustration in Fig. 2 contain the characters J, A and S and control the printing of this data in the last column on the cards F and A (Figs. 3 and 3a) designated Writing agent. We have also seen that the type bar of the thirty-fourth column which prints the units column of the premium on the card (Fig. 3) is controlled from other sensing pins in the third cycle to print the credit or dividend.

It is necessary when these type bars are being controlled from these other sensing pins to disconnect the combs 765 from the control of the sensing pins 445 (Fig. 93). This is shown in Figs. 127, 128, 129, 130. Here the pins 445 which control the type bar of the thirty-fourth column are shown as divided into two sections 445 and 445a. The members 454 and 455 are attached to the forward ends of the pins 445 and blocks 773 are fixed on the rear portions 445a. A rod 774 fixed in the member 773 is adapted to slide in the end of the member 454 or 455 to hold the forward and rear ends of the sensing pins in proper alinement. Latches 775 carried by the blocks 773 normally latch over studs 776 fixed on the stop members 454, 455 to lock the forward and rear ends of the sensing pins together so that in the first cycle when the pins 445 take their readings the rear ends 445a move with the forward ends. Before the commencement of the third cycle the latches 775 are rocked to release the rear ends 445a from the forward ends as indicated in Fig. 130. The latches 775 are provided with springs 777 normally holding them in latching positions. A slide 778 mounted in a supporting bracket 779 is provided with a lateral projection 780 reaching across the upper projections 781 of the several latches 775 and is normally held in the position of Fig. 129 by a spring 782. An arm 783 fixed on shaft 784 is adapted when rocked counterclockwise to engage the end of the slide 778 to move it from the position of Fig. 129 to that of Fig. 127 causing the lateral projection 780 to engage the latches 775 and rock them out of engagement with the studs 776 as shown in Figs. 127, 130. Now when the rear portions 445a of the pins are controlled by the levers 753, 754 of Fig. 99 they are free to operate without interference from the forward portions 445.

The arm 783 also engages studs 785 (Figs. 127, 129) fixed on the blocks 773 to hold the sections 445a of the pins in their normal positions so that when the forward ends of pins 445 read the master card in the third and later cycles, the reading will not be transmitted to the section 445a of these pins. The readings taken in these cycles by the pins 445 of this particular column are as has already been described, transferred through the arms 574 and rods 575 to control printing on the cards F and A (Figs. 3 and 3a).

Referring to Fig. 99, when the arm 783 locks the sections 445a of the pins against operation and the levers 753, 754 actuate the members 762, 763 moving them toward the right there is a relative movement between the members 762, 763 and the pine sections 445a by reason of their sliding connection at 786. In the normal operation of the machine, in the first cycle, when the pins 445 advance through a card they pull the sections 445a with them and this in turn pulls the slides 762, 763 toward the right also, but in the third cycle when the sections 445a are locked by arm 783 the members 762, 763 move to the right without affecting the position of the pin sections 445a and the pins 445 are also free to read the master card. The rocking of the shaft 784 to actuate the arm 783 is effected through an arm 787 (Figs. 93, 99) connected by a link 788 to an arm 789 fixed on shaft 659 heretofore described. This shaft rocks clockwise as viewed in Figs. 93, 99 just before the beginning of the third cycle.

*Cross-over control from the thirtieth to the thirty-fourth type bars inclusive to the fifty-second to the fifty-sixth type bars inclusive*

Referring to Fig. 99 the sensing pins 716 which read the data in field 715 (Fig. 2) and control the printing of the credit or dividend data in lines 415, 358 of cards R and N (Figs. 3 and 3a) through mechanisms which have been described are also adapted by the instrumentality of cross-over connections to control the type bars of the fifty-second to the fifty-sixth columns which print the data in the fields designated 790, 791 on lines 416, 362, respectively, of the cards F and A (Figs. 3 and 3a). The mechanism for effecting this cross-over control is shown in Figs. 94, 100 and 123. The rods 728 and 728a which carry the stop arms 730 and 730a to control the setting of the slides 732, 732a for controlling the setting of the combs and type bars in the thirtieth to the thirty-fourth columns heretofore described are also provided with stepped stop members 792, 792a.

Sliding links 793, 793a are provided with studs 794 adapted to cooperate with the steps of the stops 792, 792a after the latter have been set by the rocking of the rods 728, 728a. The sliding links 793, 793a are connected to comb stops 795, 795a which cooperate with the combs 582 to determine the positions to which they may drop when released. Springs 796 tend to move the slide links 793, 793a toward the left (Fig. 94.) Restoring plates 797, 797a cooperate with studs 798 on the slide links 793, 793a to hold the links in their normal position and are adapted to move toward the left to permit the links to take readings from the stops 792, 792a. The restoring plates 797, 797a are operated in the following manner.

In Fig. 94 the shaft 588 as we have seen rocks during each cycle of the machine. This through link 750 and arm 749 rocks shaft 748. Link and arm connections 799, 799a between the shaft 748 and shaft 800 cause the latter shaft to rock counterclockwise when the shaft 748 rocks clockwise. In Fig. 99 we have seen that the clockwise rotation of shaft 748 causes the yoke member 744 to move toward the left. This releases the restoring plate 797a to permit it to move to the left as viewed in Fig. 94 under the action of its spring 801. An arm 747a (Fig. 99) fixed on shaft 800 cooperates with a stud 802 on the yoke 744a so as to move the latter toward the left to permit the restoring plate 797 to move in a like direction under the action of its spring 803. In the first and second cycles the type bars of the fifty-second to the fifty-sixth columns operate under control of the sensing pins 445 and cross-over connections including the comb stops 580 of Fig. 94 to print data on lines 412, 414 of Fig. 3 and 360, 361 of Fig. 3a. When the dividend data is printed in lines 416, 362 (Figs. 3 and 3a) under control of other sensing pins it is necessary to prevent the sensing pins 445 from interfering with the setting of the combs 582. This is effected as follows:

The restoring bar 584 of Fig. 94 which permits the stops 580 to be set to control the combs 582 is locked against operation in the third cycle. Referring to Fig. 122 the restoring bar 584 as we have seen is released to operate by the rocking of shaft 588 and the arm 587 under the action of its spring 804. In the third cycle a slide 805 is adapted to be lowered so that its projection 806 moves into the path of the restoring bar 584, Fig. 122, thus preventing the restoring plate from moving to the left. This will prevent the stops 580 (Fig. 94) from interfering with the combs 582 while said combs are being controlled by the other stops just described.

The slide 805 as shown in Fig. 99 rests on the top of the plate 807. The plate 807 has fixed thereto a pin 808 which is engaged on opposite sides by arms 809 interconnected by a spring 810 and loosely mounted on shaft 659. An arm 811 fixed on the shaft 659 is provided with a pin 812 reaching between the arms 809 so that as the shaft 659 rocks upwardly or downwardly it will raise or lower plate 807. A spring 813 (Fig. 122) is adapted to hold the slide 805 on top of the plate 807 and to depress the slide when the plate is lowered. Thus when the shaft 659 rocks clockwise as viewed in Fig. 99 the slide 805 will rock into position to prevent operation of the restoring bar 584.

In the fourth cycle of the machine the type bars 364 that are used to print the dividend amount will again be used to print the "amount to be paid" on lines 417, 359 (Figs. 3 and 3a). During this cycle these type bars will be controlled from still another source, namely, an accumulator, to be described later. During the fourth cycle therefore the pins 716 of Fig. 28 which controlled these type bars during the third cycle will be locked against operation. This locking is effected by the latch 721 (Fig. 5a) which is timed to move into latching cooperation with the toggle link 720 to prevent operation of the toggle and thus prevent the releasing of these pins for reading.

When printing the premium amount in Figs. 3 and 3a the zeros to the left of the amount are not printed. The suppression of this printing is effected by the lowermost of the stops 481b (Fig. 93) which are free to advance to control the type bars when the combs 765 fail to drop. When the lowermost stops 481b advance they permit their type bars 364 to rise slightly until the lowermost projections 496 engage them.

The type bars rise until the blank space at the top thereof, as shown in the scale 769 (Fig. 98), is in printing line and in such position nothing will be printed. In the second cycle these type bars are not used and therefore are all locked down by the cams 573 and slides 571 (Fig. 113). On cards R and N (Figs. 3 and 3a) it will be seen that in the third cycle when the credit or dividend amount is printed the zeros are also printed to the left of the significant characters. This is brought about by the fact that in this cycle the grid 766 (Figs. 93 and 101) is in its upper position and the stops 481b which control the type bars to rise to complementary positions permit the type bars to rise to their highest position so that complementary nines will be added to the accumulator. Viewing the scale 769 (Fig. 98) the type bar rises to position of the zero at the bottom of the scale in printing line. The rising of the type bars releases the hammers so that this zero is printed whether or not there is a significant character at the left of the zeros. The credit or dividend amount printed on the cards F and A (Figs. 3 and 3a) while printed at the same time that this data is printed on cards R and N is, however, printed without the zeros. This is due to the fact that the type bars 365 (Fig. 94) which control this printing are not controlled to rise to complementary positions but rise to positions to print the true characters. Thus those of the type bars that do not rise beyond the true zero positions do not permit the members 528 (Fig. 10) to rise high enough to cause their type actuating hammers 511a to operate.

The type bar of the twenty-ninth column which controls the printing of the numerals in the highest order of the dividend or credit amount, (Figs. 3 and 3a) while controlled by the sensing pins 445 during the first cycle with the other dividend type bars, is not controlled by any of the pins 716 (Fig. 99) as these other bars are in the third cycle. This is due to the fact that the machine in the present instance is designed to take care of a credit or dividend amount which will not run above the hundreds of dollars. Thus five rows of sensing pins 716, two for the cents columns and three for the dollars columns will be sufficient to read the credit amount on the master card. Thus the position to which the type bar of the twenty-ninth column may rise during this third cycle is not controlled by any of the sensing pins. It is controlled by the stops 481b (Fig. 93). During this cycle the grid 766 is in its upper position as we have seen and an appropriate one of the stops 481b is adapted to advance to stop the type bar in the complementary zero position.

*Suppression of subtraction of credit amount from debit amount*

We have shown that the machine is adapted to subtract the credit amount contained in one of the fields 715 from the debit or premium amount printed on line 411 (Fig. 3). There are occasions where an amount will be recorded in one of the fields 715 but is not to be subtracted from the debit amount printed on line 411. In insurance records this situation occurs where a dividend is payable to the insured who, however, prefers to pay the full amount of the premium permitting the dividend to remain with the insurance company or where the dividend is paid in cash to the insured.

This condition may be indicated by a perforation in the position 810 in the field 715 which is controlling at the time. This hole causes suppression of printing as well as subtracting of the amount. In Fig. 93 the sensing pin adapted to analyze this position of the master card is the second from the bottom of the pins designated 716. In Fig. 124 the pin is designated 716f and is at the left of each of the five groups of pins 716. In Fig. 37 which is the view from the opposite side of the view shown in Fig. 124, the pin 716f is at the extreme right of each group of pins 716a to 716e, inclusive. This particular pin is hidden in Fig. 28 but a block 811 fixed to the pin is adapted when the pin moves toward the right, to rock an arm 812 fixed on a shaft 813. There is one arm 812 for each of the pins 716f in the five groups, all of these arms being fixed to shaft 813 as shown in Fig. 124. Also fixed on this shaft is a latch 814. A spring 815 connected between the latch 814 and a pin at the upper end of link 816 tends to rock the lower end of the latch into cooperation with the link 816 to cooperate with the shoulder 817 (Fig. 93) thereon to latch the link in its upper position against the action of its spring 818 which tends to pull the link downwardly. The spring 818 is attached at its lower end to guide pin 819 fixed to the frame or bracket 820 of the machine, the pin also cooperating with a slot 821 in the link 816. Link 816 as shown in Fig. 124 straddles the shaft 53 at its lower end and is provided with a cam follower 822 cooperating with a cam 823 on the shaft 53. At the proper time in the third billing cycle the cam 823 releases the link 816 and if a perforation in the position 810 on the master card has permitted the corresponding pin 716f to advance so that latch 814 releases link 816 the link will descend.

A stud 824 (Figs. 93 and 124) on the link 816 will then rock arm 825 fixed on shaft 826. Also fixed on this shaft is an arm 827 connected by a link 828 to an arm 829 fixed on a shaft 830 which carries a latching pawl or plate 831 adapted to cooperate with notches 832 in the rear edge of the type bars 364 of the twenty-ninth to the thirty-fourth columns. The latching plate 831 will permit these type bars to move to a position where the true zero which is the uppermost zero as indicated by the table 769 (Fig. 98) is in printing position. These type bars will then be in position to print all zeros under the heading of "Dividend" on cards R and N (Figs. 3 and 3a). Normally the rising of these type bars to their true zero position will not effect a release of the printing hammers. This is due to the fact that those of the links 528 specifically designated 528a in Fig. 9a which are associated with the type bars of the twenty-ninth to the thirty-fourth columns are provided with slots 833 cooperating with a pin 834 on the member 525a. A spring 835 tends to raise the link 528a. A spring 535a is connected between the members 525a and 528a and a shoulder 525b limits the counterclockwise rotation of the member 525a. Normally when these type bars rise to the true zero position the member 525a will not be rocked and the type hammers will not operate. Under control of a perforation 810 the hammers are adapted to be released for operation when the link 828 (Fig. 93) moves to the right to latch the type bars in their true zero positions. For this purpose a stud 836 fixed on the link 828 is adapted to actuate a latch 837 carried by a link 838. A spring 839 normally holds the link 838 in its lower position (Figs. 93, 126) and a spring 840 tends to hold the latch 837 in its inoperative position.

When the link 826 actuates the latch 837 the latter cooperates with the pin 841 fixed on a link 842 and reaching through a slot 843 in the link 838. The link 838 straddles the shaft 53 (Fig. 124) and is provided with a cam follower 844 cooperating with a cam 845 on the shaft 53. The spring 839 causes the link 838 to move downwardly to hold the follower 844 in cooperation with the cam. The cam, shortly after the link 828 moves to the left in Fig. 93, raises the link 838. The link 838 normally moves free with respect to the link 842 by reason of the pin and slot connection 846 between the two links and also the pin and slot 841, 843, both of which connections serve to hold the two links in proper positions with respect to each other. When the latch 837 is in cooperation with a pin 841 and the link 838 is raised it also raises the link 842. The upper end of link 842 is connected to an arm 847 on shaft 848. Also fixed on this shaft is an arm 849 (Figs. 91 and 93) substantially in the plane of the type bar 364 of the twenty-ninth column. The arm 849 as shown in Fig. 9a cooperates with a pin 850 on the link 524 connected with the latch members 520 of the twenty-ninth column. The hammer latch 517a of this column has a projection 517b reaching over to the corresponding latch of the thirtieth column to also actuate it. The thirtieth in like manner is adapted to trip the thirty-first and so on to the thirty-fourth. Thus, a perforation 810 in one of the fields 715 causes the hammers to be released to print the zeros in the dividend position on the cards R and N in the third cycle. The projection 517b also causes the zeros to the right of a significant character to be printed in these particular columns in other cycles.

*The fifty-second to the fifty-sixth type bars*

The shaft 830 of Fig. 93 which carries the latching plate 831 also carries a latching plate 851 (Fig. 94) adapted to cooperate with notches 852 on the rear edges of the type bars 365 of the fifty-second to the fifty-sixth columns. These are the type bars that control printing in the fields 790, 791 (Figs. 3 and 3a) These types bars carry type characters arranged as indicated in the scale 853 (Fig. 98.) The upper zero according to this scale is substantially on the printing line. The latching plate 851 of Fig. 94 is adapted to lock the type bars in position so that when they are released to rise they will stop with the upper zero in printing line when the play permitted between the latching plate 851 and the shoulder of notch 852 has been taken up. The hammers for these columns may be adapted to operate to print all zeros in the fields 790 and 791. For this purpose the shaft 848 (Fig. 91) may be provided with arms 849a adjacent to each of the links 524 (Fig. 10) associated with these particular type bars, to lower these links by cooperating with pins such as pins 850 of Fig. 9a. Thus while the type bars themselves do not rise high enough to release their type hammers the arms 849a will effect this release to cause the printing.

It should be noted that the type bars of the fifty-second to the fifty-sixth columns differ from those of the other columns of type bars of the group designated 365 in that an extra zero is provided at the upper end of the bars of the fifty-second to the fifty-sixth columns while as shown in scale 854 (Fig. 98) there is no such zero at the top of the rest of the type bars of this group.

The reason for this is that the normal zero is placed at the lower end of all of these type bars and the type bars of the fifty-second to the fifty-sixth columns are prevented from rising to this zero position by reason of the control of the pins by the data contained in the field 715 of the master card. In order to print a zero in the fields 790 and 791 the additional zero is placed at the top of the type bars and the type bars are locked by the mechanisms described in position to print these zeros. It should also be noticed that under these conditions the type bars do not rise high enough to cause zero perforations to be effected in the field 366 of the audit card A corresponding to the zeros printed in the field 791.

*Set up readings in the machine*

The master card (Fig. 2) at the upper left hand corner contains a date entry showing the second month, the eleventh day and the year 1917. In the present instance this data may represent the time when the account came into being. The cards of Figs. 3 and 3a also contain date entries which represent the time at which the payment is due. Thus while the date on the master card is February 11, 1917, that on the cards of Figs. 3 and 3a is May 11, 1918. In printing the date on the cards of Figs. 3 and 3a therefore it must be taken from some other source than the master card excepting the day which is taken from the master card. The month and year are taken from set up mechanisms in the machine. On the cards R and N (Figs. 3 and 3a) the month is shown as written in alphabetical characters. On the cards F and A in lines 412, 360 the month is shown as indicated by numerical characters. The reason for this is that the cards R and N are to go to the insured, the N card as a notice or bill and the card R as a receipt later.

By printing the month in alphabetical characters there is less likelihood of mistakes being made by the insured or debtor. The cards F and A on the other hand remain with the clerks and therefore the numerical indication of the data is sufficient. This numerical character indicating the month must change from time to time and is therefore also derived from a set up in the machine. As the month is printed in alphabetical characters on the cards R and N the numerical month is not printed on those cards. The year which also changes from time to time is taken from a set up in the machine and is printed on the cards R and N on one side of the machine and the cards F and A on the other side of the machine. In Fig. 95 the pins which read the alphabetical month set up are shown at 855. There are, of course, three vertical rows of these pins and they are located adjacent to the pins 445. As they do not read the master card M they are not as long as the pins 445. Fig. 95 shows the pins 445 in position to read the card by projecting against the back of it and the extra pins 855 are shown to the left of the pins 445.

The means for effecting the alphabetical month set up includes three slide members 856 (Figs. 96 and 97). The position of the slides in the machine is indicated in Fig. 1. The slides are set to control the type bars 364 of the first, second and third columns, Fig. 113. The type bars are like those of Fig. 92 and the type characters may be arranged as indicated by the scale 857 (Fig. 98). The scale shows one of the sets of type 504, 506 of Fig. 92. There are, of course, in each of the type bars two of these sets of characters. The type bars which are used to print the alphabetical months in the present instance are not used for any other purpose and therefore only the upper set 504 is necessary, and even this need not be provided with type elements other than those required for the printing of the twelve months.

In other words, the alphabetical characters indicated on the slides 856 (Fig. 97) are all that need be supplied of those indicated on the scale 857. In setting the slides to effect a printing of the month each slide is raised or lowered until the proper character appears above the index line 858 (Fig. 97).

In the present instance these slides are set to control the printing of the month of May which is the month shown on the cards (Figs. 3 and 3a). The lower portions of the slides 856 comprise notched combs 859 (Figs. 96 and 97). The notches are adapted to cooperate with studs 860 on each of the pins 855. In Fig. 96 the studs 860 are shown on the sensing pins 445 which read the numerical month set up and the year set up. The pins that read the alphabetical month set up are similar to these so far as the attachment of the studs 860 thereto is concerned. The setting of the slides 856 permits one or more of the sensing pins 855 to advance in the same manner and in the same combinations as if the pins were reading perforations in the master card. Pins 855 are not associated with the levers 574 and rods 575 (Figs. 92, 96) since the reading taken by these pins is not transferred to the cards F and A. The numerical month set up is effected by slides 856a (Fig. 97) adjacent to the slides 856. These slides are connected to additional combs 859 adapted to control the pins 455 which in turn control the setting of the type bars that print the numerical month on cards F and A. The type bars associated with these pins of the fourth and fifth columns are latched by slides 571 during the first cycle (Fig. 113) to suppress the printing of this numerical month on cards R and N.

The reading is transferred from the pins 445 that are controlled by the set up, through the levers 574 and rods 575 (Fig. 92) to the numerical type bars 365 (Fig. 94) of the thirty-sixth and thirty-seventh columns. The slides effecting the year set up are shown at 856b (Fig. 97) and they are also attached to combs 859 to control the pins 445 that control the type bars 364 (Fig. 92) of the eighth and ninth columns. The reading is transferred by the levers 574 and rods 575 to control the type bars 365 (Fig. 94) of the fortieth and forty-first columns. The pins 445 that read the day on the master card and control the setting of the type bars 364 of the sixth and seventh columns to print on the cards R and N, and the type bars 365 of the thirty-eighth and thirty-ninth columns that print on cards F and A, operate and are controlled as previously described in connection with the pins 445. While the sensing pins 445 are taking readings from the set up combs in the machine they must be free from control by the master card because pins that may be permitted to advance by the slots in the combs might not find perforations in the corresponding positions on the master card and would be prevented by the master card from advancing. The pins are therefore constructed in two sections, a forward and rearward section, and the rearward section is adapted to advance without being prevented by the forward section. These sensing pins, that is those that sense the numerical month and the year on the master card are split at 872 (Figs. 96 and 14) the pin reaching through a flange 873 on an intermediate portion 874 which in turn is fixed to the rearward portion of the pin 445.

The studs 860 which cooperate with the slotted combs 859 are carried by the intermediate sections 874 of the pins. The forward portion of the pin 445 has fixed thereto a collar 875 so that as the forward portion advances through a perforation in the card the rear portion will go with it. On the other hand the rearward portion of the pin 445 may advance without advancing the forward position. In this instance a spring 876 surrounding the forward portion of the pin will be compressed by the flange 873 urged by the rearward portion of the pin. Springs 876 engage collars 877 (Fig. 96) attached to the forward section of the pins 445. These collars in turn engage the slotted plate 878 through which the pins pass. In the first cycle of the machine when these pins are reading the set up in the machine instead of the card, the plate 878 is adapted to prevent the forward ends of the pins from advancing to take readings from the master card. Plate 878 is mounted on side plates 879 which advance to the right as viewed in Fig. 96 in all cycles except the first and thus during the first cycle they prevent the forward ends of the pins 445 from advancing against the card. The pins 855 are not provided with blocks 454, 455 (Fig. 93) nor with levers 574 or cross-over rods 575 for transferring the reading across the machine. All of the pins that take readings from the set up combs 859 are permitted by the combs to advance a given distance or are prevented from advancing at all. The pins, however, may advance one, two or three steps as heretofore explained to control the setting of the comb stops 452, 452a, 452b. The several steps of advancement of these pins may be effected by the following mechanism.

Referring to Fig. 14a, each of the sensing pins is provided with a block 880 in which is fixed a stud 881. The pins are divided in pairs as heretofore described the two pins of the upper pair controlling the stop 452, the two middle pins controlling the stop 452a and the two lower pins controlling the stop 452b. The stud 881 on the upper pin of each pair is adapted when the pin advances, to engage a hook 882 pivoted on a bracket 883. This permits the upper pin to advance two steps. The lower sensing pin of this pair is permitted by the collar 457a to advance but one step, being stopped by a notched plate 884 as in the case of the collars 457 (Fig. 93). If both the lower and upper pins advance, the stud 881b on the lower pin rocks the hook 882 downwardly against the action of its spring so that the upper pin may advance its full three steps unmolested by the hook 882. In Fig. 14a the middle stop 452a is shown as having advanced one step under control of the lower of its two sensing pins. The upper stop 452 is shown as having advanced two steps by reason of the advancement of its upper controlling sensing pin. The lower stop 452b is shown as having advanced three steps by reason of advancement of both its sensing pins. The stops 452, 452a, 452b, referring to Fig. 92, control the combs 458, 458a, 458b, which in turn control the stops 481 and the setting of the type bars 364 as heretofore described. The set up combs 859 are mounted to slide up and down in brackets 885 (Figs. 97, 121) attached to the slide plate 879 to which is also fixed the plate 878 heretofore referred to. The plate 879 as shown in Fig. 97 is slidably mounted in fixed frame members 886, 887.

A spring 888 attached to a stud 889 on the plate 879 and to a stud 890 on a fixed portion of the machine tends to hold the slide 879 against the pin restoring member 446 at 879a as shown in Figs. 96, 121, so that in each cycle when the member 446 advances to permit the pins to take the readings from the master card the slide plate 879 will tend to follow. It will be permitted to follow, however, only in the first cycle, being latched in the subsequent cycles. The latching is effected by a latch member 891 (Figs. 121, 106 and 16). This latch is adapted to engage a stud 892 fixed on the side of the slide plate 879, the latch being pivoted at 893 on the fixed frame member 887. The latch is adapted to be actuated by a link 894 connected to an arm 895 (Fig. 16) pivoted at 896. A link 897 connected to the arm 895 is also connected to an arm 898 pivoted at 899 and provided with a cam follower 900 cooperating with a cam 901 on the shaft 311 which turns one revolution for each five billing cycles of the machine. The timing is such that the latch 891 releases the slide plate 879 so that it may advance with the pin restoring member 446 during all except the first cycle. In the first cycle the plate 879 is latched in the position of Figs. 16, 96, 106. As seen in Fig. 96 when the plate is latched in this position it will hold the slotted plate 878 in position to prevent the forward ends of pins 445 of these particular columns from taking readings from the master card. It will also hold the set up combs 859 in position to control the rear ends of the sensing pins by cooperating with studs 860. In the subsequent cycles when the plate 879 advances with the restoring plate 446 the forward ends of the pins 445 will be permitted to read the master card and the set up combs 859 will be moved away from the studs 860 so as not to interfere with the reading being taken from the card.

The card reading will then be transmitted to the rear ends of the pins to control the type bars to print the name and address of the insured or debtor in the subsequent cycles. In the first cycle when the slide plate 879 is latched in position to cause the sensing pins to take readings from the set up combs the pins are caused to advance by means of a slide plate 903 mounted to slide in fixed plate 887. This plate is provided with a bracket 904 (Fig. 121). A spring 905 (Figs. 16 and 106) tends to hold the plates 903, 904 in rearward position. A stud 906 fixed to the plate 903 is adapted to be engaged by an arm 907 pivoted at 896 and having a pin 908 at its lower end cooperating with the latch 909 carried by an arm 910 fixed on shaft 911. A spring is adapted to hold the latch in cooperation with the arm 907 so that when the shaft 911 rocks counterclockwise the arm 907 will move the plate 903 toward the right as viewed in Fig. 16. A pin 912 fixed to the arm 895 is adapted during the several cycles other than the first cycle to hold the latching pawl 909 out of cooperation with the pin 908 so that the rocking of the shaft 911 will not move the slide 903. In the first cycle, however, when the latch 891 holds the plate 879 in rearward position the pin 912 permits the latching pawl 909 to rise and cooperate with the pin 908 so that during the first cycle when the shaft 911 rocks counterclockwise a plate 903 will be moved toward the right. Springs 913 (Fig. 121) cooperating with collars 914 on the pins 855 on the rear portions of the pins 445 and with the bracket 904 cause the pins to move forward when the plate 903 is advanced to the right to cause the pins to take their readings from the set up combs 859. The shaft 911 as shown in Fig. 5 is mounted on a bracket 915 and carries an arm 916 adapted to be actuated by a stud 917 fixed on the side of cam 614. A spring 918 is adapted to hold the arm 916 in normal position against a fixed stop 919.

*Commission sensing pins and associated mechanisms*

The horizontal field 920 of the master card (Fig. 2) contains perforations representing data printed in sub-fields 921 to 925, inclusive. This data represents commissions payable to the selling or writing agent. Entries are made under control of these fields on lines 416, 362 on cards F and A (Figs. 3 and 3a, respectively). These entries it will be seen are made during the third billing cycle of the machine. The third cycle as represented in the diagram (Fig. 4a) shows these entries as being included in the operations performed in this cycle. The sensing pins which read the perforations in the field 920 of the card are shown at 926. When the master card has been stepped upwardly twice so that the sensing pins 445 may sense the data contained in the horizontal field 12 it will be in position for the pins 926 to sense the data in field 920. In Fig. 96 the pins 926 are shown below the pins 445. Springs 927 similar to springs 448 on the pins 445 are adapted to press the pins 926 against the card or through perforations therein. The restoring plate 928 operates in a manner similar to the restoring plate 446. When the plate 928 moves toward the right the pins will advance to take their readings from the master card. Referring to Fig. 5a, restoring plate 928 is shown as connected to a toggle 929 similar to the toggles 469 and 720 previously described. The latch 930 normally latches the toggle in position to prevent the restoring plate from moving to the right when the link 472 rises during each cycle. Latch 930 is connected by a link 931 (see also Fig. 5) to an arm 932 pivoted at 933 and provided with a cam follower 934 cooperating with a cam 935. The cam through the link 931 operates the latch 930 to release the toggle so that the plate 928 may move to the right during the third cycle.

The pins 926 are shorter than the pins 445 as shown in Fig. 96, as they do not control any mechanism for printing on the cards R and N. For controlling the printing on the cards F and A transfer mechanism similar to the levers 574 and rods 575 are provided. In the present instance the levers are shown at 936 and the rods at 937. The sensing pins are provided with stop collars 938 similar to the collars 457 of Fig. 93, and are also provided with blocks 939 similar to the blocks 454, 455. Studs 940 are adapted to rock the levers 936 one, two or three steps. In Fig. 94 the rods 937 are shown as connected to stepped stop members 937a similar to the stops 576. These stops are adapted to control the links 941 to permit the latter to move one, two or three steps toward the left under control of their springs 942. Links 941 are connected to comb stops 943 which are adapted to control the positions to which the combs 582 may descend in order to control the setting of the type bar stops 595 to control the type bars 365. During this cycle the bar 584 prevents the stops 580 from interfering with the combs 582. The bars 740 and 944 are adapted to release and to restore the links 941 and with them the stops 943. The operation of the bar 740 has been described in connection with Fig. 99. The bar 944 is also shown in the latter figure and is adapted to be actuated by the yoke 744a previously described.

When the shaft 659 rocks in the third cycle (Figs. 101 and 102), the grid 944x will rise to permit the type bars of the sixty-sixth and sixty-seventh columns to be controlled by the stops 595 directly from the card.

The commission indicated in the field 921 (Fig. 2) is to be entered on the cards F and A when bills or notices are being made out for the first year and the commission shown in field 922 is to be omitted from these cards during this year but during the subsequent years the commission contained in the field 922 will be entered upon the cards F and A and that contained in the field 921 will be omitted. The entry upon the card F in both instances is made in the field 945 and the entry upon the card A in both instances is made in the field 946. The appropriate perforations corresponding to the entry in the field 946 are made in the field 366a. In determining whether the commission of field 921 or that of field 922 is to be entered on the cards F and A the machine must ascertain through the analysis of the posting entries on the master card whether payments for a full year have been completed or not. The posting entries for the year are contained in the four quarterly fields 947, 948, 949, 950. The entries in these fields show the day and the month on which a payment was made, the entry being perforated in the fields 947, to 950 and printed in the sub-fields 951 directly above each of the perforated fields. Perforations in field 225 on the master card indicate the manner in which payments should be made. As has been shown in connection with the table 256 (Fig. 25) various combinations of perforations in the field 225 indicate whether payments are due annually, semi-annually or quarterly and in what month. If payments are due quarterly, the machine will count the number of quarterly payments that have been made as shown by the entries in the quarterly fields 947 to 950 and if four such entries have been made the commission in the field 922 will be entered on the cards F and A. If less than four of these quarterly posting entries have been made the machine will enter the commission of field 921.

In the case of insurance, a policy may come into force during the first, second, third or fourth quarter of a year. If it comes into force during the third quarter, then, of course, no entries are made in the first and second quarters showing that payments have been made and the machine must count the number of quarterly payments beginning in the third quarter and running through the second quarter of the second year, or if the policy came into force during the fourth quarter of the year, the machine must count through the third quarter of the second year to ascertain whether four quarterly payments have been made in order to determine which of the commissions of fields 921 and 922 shall be entered. If premiums are payable semi-annually as indicated by the perforations in the field 225, then the machine is adapted to count two payments in each year in order to determine whether the commission of field 921 or that of field 922 is to be entered on the cards F and A. And if according to the perforations in field 225 payments are due once a year, then a posting entry in the appropriate quarter field will indicate a payment for the full year. The commissions shown in fields 923, 924, 925 may be special commissions payable under given circumstances or payable in certain years and not in others. Thus in the present instance the commission in field 925 is payable to the agent during the first year only and is therefore printed upon the cards F and A during the first year but is suppressed during subsequent years. Also as designed, the machine in the present instance will suppress the printing of all commissions after the completion of the fourth year of the policy. The mechanism for determining whether the commission of field 921 or that of field 922 shall be entered upon the cards F and A will be described presently.

The type bars that print the data in fields 945 and 946 (Figs. 3 and 3a) are the bars 365 (Fig. 94) of the forty-first to the forty-sixth columns as arranged in Fig. 113. These type bars must therefore be controlled by the six vertical rows of sensing pins 926 (Fig. 96) that read the perforations in the horizontal field 920 corresponding to the data in field 921 (Fig. 2), when the first year commission is being printed and by the five vertical rows of pins 926 that read the perforations in the horizontal field 920 corresponding with the data printed in field 922, when the second year commission is being printed. In order that one or the other of these groups of pins 926 may control the type bars, the connection between the pins and the bars is as shown in Fig. 96a. As shown here each rod 937 which is controlled by certain of the pins 926 reading in a particular column of field 921 through lever 936, is also controlled by the pins 926 reading in the corresponding column of field 922 through lever 936a. It will be seen that either set of pins 926 may cause the rod 937 to rock without interference from the other set. The type bar of the forty-first column, while being controlled by pins 926 when reading the data in field 921, is not controlled by the pins when reading data in field 922 since the latter field is smaller than the field 921. When data is being read in the field 922 the type bar of the forty-first column is adapted to be arbitrarily controlled to print an asterisk as indicated in Figs. 3 and 3a in fields 945 and 946. The asterisk is shown in Fig. 98 at the top of the chart 952 which shows the arrangement of type on the bar of the forty-first column.

The asterisk is normally substantially on the printing line and will be locked in this position when the second year commission is being printed under control of field 922. The manner in which this locking is effected and also the manner in which the printing hammer is released to effect the printing will be described presently.

Whether the data contained in the field 921 or field 922 (Fig. 2) shall control is determined by the position of locking plates 953, 954 (see Figs. 28, 49, 50, 96, 36 and 37). Latches 955, 956 pivoted at 957 and actuated by a link 958 are adapted to hold one or the other of the plates 953, 954 in position to prevent one or the other groups of pins 926 from reading the master card and controlling the type bars. The normal position of the parts is shown in Fig. 49. Here the plate 953 is free from the latch 955 and the pins 926 that read the data in field 921 are free to operate. In Fig. 50 the reverse condition is shown. Here the plate 953 is latched and the plate 954 which controls the pins for reading the data in field 922 is free to permit the pins to operate. The locking plates 953, 954 may be loosely pivoted at 959 so that when one of them is not latched it will be readily rocked by the operation of the pins 926 actuated by springs 927. The restoration of the plates 953, 954 is effected through a link 960 (Fig. 28) connected to an arm 961 loose on the shaft 959. A stud 962 reaching laterally from the link 960 is adapted to engage both of the plates 953, 954 (see also Figs. 36, 37) to move the plates counterclockwise as viewed in Fig. 28 to normal latching positions. When in their restored positions latches 955, 956 may be actuated to latch one or the other of the plates before the link 960 moves to the right.

The actuation of the link 960 toward the left to restore the plates is effected by the pin restoring plate 718 previously described. This plate reaches high enough to engage the link 960 as shown at 963 (Fig. 28). When the plate restores the pins 716 it thus also restores the plates 953, 954. When the plate 718 moves toward the right to permit the pins 716 to take their readings it releases the link 960 so that the latter may move to the right when the plate 953 or 954 is rocked clockwise by the reading of pins 926. While the parts are sufficiently loose to permit the pins 926 to rock the plate 953 or 954 and to move the link 960, springs 964 (Figs. 49, 50) may be provided to rock the plates 953, 954.

The latches 955, 956 are fixed with respect to each other on the shaft 957 (Figs. 28, 49 and 50). The link 958 is connected to the latches by pin and slot connection at 965 to a rearward projection 966. A spring 967 is adapted to hold the arm 966 in the lower part of the slot in the link 958 as shown. A spring 968 connected at one end to the link 958 and at the other to a fixed pin or bracket 970 tends normally to raise the link 958 to the upper position as shown in Fig. 50. Link 958 is connected at its lower end to an arm 971 loose on shaft 972. Fixed on this shaft (Fig. 16) is an arm 973 connected by a link 974 to a bell crank arm 975 pivoted at 976 and adapt- ed to be actuated by an arm 977 fixed on shaft 56. The latter shaft rotates one revolution for each five billing cycles of the machine. When the arm 977 engages the bell crank 975, rocking the latter against the action of its spring 978, the shaft 972 will be rocked counterclockwise.

This (see also Figs. 28 and 37) rocks arm 973a having a pin 973b which rocks arms 981 connected by member 995 forming a bail fixed to arm 971 and the link 958 will be pulled downwardly rocking the latches 955, 956 from the position of Fig. 50 to that of Fig. 49. The parts will then be latched in this position by a latch 979 cooperating with a projection 980 on one of arms 981. After the pin locking plates 953, 954 have been restored to their normal positions as described the bail 995 will be permitted to rock clockwise to latch the plate 953 releasing plate 954, or it will be held in the latched position of Fig. 49 to hold the plate 954 and permit plate 953 to operate according to whether the commissions of field 922 or field 921 are to control the printing in fields 945, 946. Latch 979 is loose on a shaft 982 and is provided with an extension 983 adapted to cooperate with the limit stop 984. Another extension 985 is adapted to be engaged by a bar 986 on arms 987 forming a bail to rock the latch against the action of its spring 988 to release the arms 981. Fixed on the shaft 982 with the arms 987 is an arm 988a connected to a link 989 (Fig. 28). This link as shown in Fig. 16 is connected to an arm 990 integral with the cam follower arm 991 cooperating with a cam 992 on the shaft 37. The cam 992 releases the link 989 to move to the right as viewed in Fig. 28 under action of its spring 993 once for each billing cycle. A latch 993a loose on shaft 972 cooperates with an arm 993b fixed on shaft 982 to normally prevent the shaft from being rocked by the action of spring 993. The latch is held in position by a spring 993c connected to arm 993d fixed with respect to arm 973. When the latter arm rocks counterclockwise once during the five billing cycles, a pin 993e on arm 993d will raise the latch to release shaft 982. Latch 979 will be rocked to release arm 981 at this time.

The link 958 will then be raised by its spring 968 unless one of the four lower latches 994a, 994b, 994c, 994d (see also Fig. 46) is in engagement with bail 995. The positions of the latches 994a to 994b are controlled by two conditions; first the arrangement of perforations in the field 225 (Fig. 2) which shows when payments are due, and secondly by the condition of the perforations in the quarterly fields 947 etc. which indicate whether bills have been rendered or notices sent. According to the present system a perforation at 996 in the upper middle portion of one of the fields 947 indicates that a bill or notice has been rendered for a payment due in that particular quarter. The machine is adapted to read the perforations 996 of the four quarters of the first year and the first three quarters of the second year. If payments are due commencing in the first quarter of the first year, the machine counting a perforation 996 in each of four quarters will hold all of the latches 994a, to 994d out of cooperation with the bail 995. If the account came into force after the first quarter of the first year so that the first payment became due in the second quarter the machine will then count three perforations 996 in the first year and one perforation 996 in the first quarter of the second year making four such perforations in all. Four such perforations will also serve to hold all of the latches 994a to 994d away from the bail 995 to permit it to rock. Similarly, if the first payment on an account became due in the third or fourth quarters of the first year, the machine would count two or one perforations 996 in the first year and two or three perforations 996 in the second year before it would hold all the latches 994a etc. away from the bail 995.

If the machine upon finding that four quarterly payments are due and finds that less than four bills or notices have been rendered, the latches 994a to 994d representing the payment or payments due for which bills have not been rendered will be permitted to rock into cooperation with the bail 995 so that when the latch 979 releases the arm 981 such latches 994a to 994d as have cooperated with the bail will prevent it from rocking and will thus prevent the link 958 from rising. The parts will thus remain in the position of Fig. 49, the pin latching plate 953 being free to permit its sensing pins 926 to operate to sense the data in field 921 of the master card. All of the latches 994a to 994d are loose on the shaft 982. The latch 994a is connected to an arm 997a by a cross member 998a. The latch 994a, member 998a and arm 997a thus form a bail. Similarly, the latch 994b is connected to an arm 997b by a member 998b also forming a bail, and the latch 994c is connected to an arm 997c by a member 998c forming a third bail. Loose on shaft 982 are seven feeler arms 999a to 999g, inclusive.

The feeler 999a has two upward projections, one of which is designated 1000 and lies under the bail 998a of the latch 994a. The feeler 999e is also provided with an upward projection 1000 lying below the bail 998a. In order that the latch 994a may cooperate with the bail 995 as in Fig. 49 to prevent rocking of arms 981 the feelers 999a and 999e must both rock clockwise as indicated by the position of feeler 999c in Fig. 49. The rocking of the feelers 999a etc. is controlled in part by the positions of four horizontal combs 1001a, 1001b, 1001c, 1001d. The comb 1001a is provided with upward projections 1002 (Figs. 46 and 36). Normally these projections lie just to the left of the feelers 999a, 999e.

Similarly the comb 1001b is provided with upward projections 1002 lying normally to the left of feelers 999b, 999f and comb 1001c is provided with projections 1002 lying just to the left of feelers 999c and 999g. The comb 1001d is provided with one projection 1002 to the left of the latch 994d. Thus the normal position of the combs 1001a to 1001d is such as to permit all of the feelers 999a to 999g to rock clockwise as viewed in Figs. 49, 50. Combs 1001a to 1001d are held in their normal positions as shown in Fig. 36 by springs 1003. A pin 1004 at the right end of these combs is adapted to be engaged by the lower end of the feeling arm 1005 pivoted at 1006 to the frame of the machine. The upper ends of the arms 1005 are provided with lateral projections 1007 arranged in combinations. The arms 1005 are controlled by the pins that read the data in the field 225 (Fig. 2). These pins are the four farthest to the right in the field designated 716 (Fig. 4b) and are specifically designated 1008. The rear ends of the pins 1008 are provided with blocks 1009 carrying lateral projections 1010 (Figs. 36, 47, 48) which when the pins are in normal non-reading position are out of the path of the projections 1007 on the arms 1005 and permit the arms to rock counterclockwise as viewed in Fig. 36. If the uppermost pin 1008 (Figs. 47 and 48) finds a perforation in the card and moves to the left it will prevent the arm 1005 farthest to the right from rocking counterclockwise as viewed in Fig. 36. The second pin from the top will if it finds a perforation in the card prevent the second arm 1005, counting from the right, from rocking. The third pin will prevent the third arm from rocking and the fourth pin will prevent the fourth arm from rocking. If the third and fourth pins both find perforations in the card and advance as in Fig. 47, they will permit a slide 1011 to also advance under the action of a spring 1012 by reason of pins 1013.

The slide is provided with a wide projection 1015 adapted to prevent rocking of the first and second arms 1005 counting from the right. The third and fourth pins 1008 as we have seen, prevent the third and fourth arms 1005 counting from the right, from rocking. Thus, if these two pins advance, all of the arms 1005 will be prevented from rocking. Thus the four pins 1008 controlled by various combinations of perforations in the field 225 of the master card will either prevent all of the arms 1005 from rocking counterclockwise in Fig. 36 or will permit one or more of these arms to rock. The rocking of any of these arms will move the corresponding comb 1001a to 1001d toward the right as viewed in Fig. 36 to move the upward projections 1002 under the corresponding feeler members 999a to 999g. The arms 1005 are normally held in inoperative position by a rod 1016 fixed to an arm 1017 fixed on a short shaft 1018 on which is also fixed an arm 1019 connected by a link 1020 to an arm 1021 fixed on shaft 1022 (Figs. 29 and 36). Shaft 1022 has fixed thereon an arm 1923 (Fig. 16) connected by a link 1024 to an arm 1025 fixed on a shaft 1026 with a cam follower arm 1027 cooperating with a cam 1028 on shaft 37. A spring 1029 tends to pull the link 1024 to the right when freed by the cam. Latch 993a cooperates with a pin on arm 1023 to release it for operation but once during the five billing cycles. The spring tends to rock the shaft 1022 clockwise and the cam serves to rock it counterclockwise. The cam thus positively restores the arms 1005 (Fig. 36) to their normal non-reading position while the spring rocks the rod 1016 to the right as viewed in Fig. 36, to permit the arms 1005 to take readings from the pins 1008.

Individual springs 1030 connected to the arms 1005 rock the latter into cooperation with the projections 1010 on the pins 1008 and are stronger than the spring 1003 in order to overcome the force of the latter in moving the corresponding combs 1001a to the right in Fig. 36. Fig. 2 shows two perforations in the field 225. These are in the two lower positions and represent the value "7". According to Fig. 25 chart 256, these perforations indicate that payments are due quarterly. In Fig. 47 the pins 1008 have taken this reading and have prevented all of the arms 1005 from rocking. Thus all of the combs 1001a to 1001d have remained in their normal positions. This in turn will, as far as the combs 1001a to 1001d are concerned, permit all of the feelers 999a to 999g to rock clockwise as viewed in Figs. 49, 50. Whether these feelers shall all rock, however, depends further upon whether bills have been rendered for at least four quarters. This additional control of the feelers 999a to 999g is effected by an upper projection 1031 of the feelers in cooperation with a comb 1032 adapted to be controlled by the position of the pin 716 which reads the hole 996 in the quarterly field 947 or 948, etc. There is one comb 1032 for each of the pins 716 adapted to read the perforation 996 in the four quarterly fields of each of the five year fields on the master card. Each of the pins 716 which reads the notice sent holes 966 is provided near its rear end with a projecting stop 1034 as shown in Fig. 49. The comb 1032 is normally free to rise under action of its spring 1035 when released by restoring bail 1035a on shaft 1022 but when the pin 716 finds a perforation 996 it will advance as in Fig. 50 moving the stop 1034 over the upward projection 1036 of the comb 1032. This will hold the comb down in its normal position as in Figs. 44 and 50.

The projections 1031 associated with the combs 1032 that read the perforations 996 in the fourth quarter of the first year and in the first, second and third quarters of the second year will engage the lower edge or edges 1037 of their respective combs (Fig. 44). As shown in Fig. 50 the combs 1032 controlled by the pins 716 that read the notice sent or payment due holes 996 for the first, second and third quarters of the first year have their corners cut out as shown at 1038 (Fig. 49) and are provided with a spring-pressed stop 1039 adapted to be engaged by the projection 1031 of the feelers 999a, 999b, 999c. The reason for this particular construction will appear later. Normally the member 1039 serves to cooperate with the end 1031 of the feeler as if the comb were solid instead of being cut away at 1038. Returning to the example shown in Fig. 2, where the two lower perforations appear in the field 225 indicating that payments are due quarterly and remembering that the four lower combs 1001a to 1001d will be held in position to permit the seven feelers 999a to 999g to rock clockwise as viewed in Figs. 49, 50, it will be seen that if perforations appear at 996 in the four quarterly fields of the first year the corresponding pins 716 will advance and prevent their respective combs 1032 from rising. This in turn will prevent all of the feelers 999a to 999d from rocking. This will also hold all of the latches 994a to 994d out of cooperation with the bail 995. Now when the latch 979 releases the arm 981 the latter will be permitted to turn clockwise and the link 958 will be permitted to rise to rock the latches 955, 956 and permit the plate 954 to rock to permit its pins 926 to take readings from the field 922 on the master card.

This is the operation of the parts when payments are due quarterly and four quarterly payments have been made or as in the present illustration four quarterly bills or notices have been rendered. If as in the example presumed payments are due quarterly and only three perforations 996 appear in the master card in, let us say, the first, second and third quarterly fields 947, 949, 948 (Fig. 2) but no perforation 996 appears in the field 950 representing the fourth quarter, the pin 916 finding no perforation will permit its comb 1032 to rise thus permitting the projection 1031 of the feeler 999d to rock as indicated by the dotted line position in Fig. 45. This will permit the latch 994d (Fig. 46) to rise into latching position with respect to bail 995 to prevent arms 981 from rocking. The link 958 (Fig. 49) will thus be held down and the sensing pins 926 will continue to read the data in the field 921 of the master card.

Presuming payments to be due quarterly and that the account came into being in the second quarter, there will, of course, be no payment due in the first quarter. Presuming then that there is no perforation 996 in the field 947 representing the first quarter of the first year and perforations 996 appear in the second, third and fourth quarters of the first year and bearing in mind that the lower combs 1001a to 1001d are in position to permit all of the feelers 999a to 999g to rock the comb 1032 associated with the pin 716 adapted to read the perforation 996 in the quarter field 947 will rise as shown in Fig. 49 permitting the projection 1031 of the corresponding feeler i. e. 994a, to rock to latch the bail 995 so that the link 958 will not rise and the relative positions of the rocking plates 953, 954 remain the same and the machine will be adapted to print the commission for the first year shown in field 921.

Presuming now that the machine also finds a perforation 996 in the first quarter of the second year, the comb 1032 associated with that second year sensing pin 716 will now be prevented from rising as shown in Fig. 50 by reason of the advancement of the pin 716 and the stop 1034. The projection 1031 on the feeler 999e will engage the lower corner 1037 (Fig. 44) of its comb 1032. This will prevent the feeler 999a from rocking and this in turn will prevent the bail 998a forming part of the latch 994a from rocking downwardly and the latch 994a will be prevented from rocking into cooperation with the bail 995 and the link 958 will now be permitted to move upwardly so that the reading will be taken from the second year field 922. Where the account came into being during the third quarter and therefore no payments are due in either the first or second quarters, assuming that the machine detects no perforations 996 in either of the fields 947, 949 representing the first and second quarters the corresponding combs 1032 will both be permitted to rise and the corresponding projections 1031 of feelers 999a and 999b will be free to rock. If now perforations 996 appear in the third and fourth quarters of the first year and also in the first quarter of the second year but not in the second quarter of the second year, the combs 1032 associated with the feeler pins 716 for the first and second quarters will be permitted to rise freeing their respective projections 1031 of feelers 999a and 999b. The projection 1031 associated with the feeler 999e will be stopped by its comb 1032 as the corresponding pin 716 will reach through a perforation 996. Thus the bail 998a associated with the latch 994a will be prevented from locking the bail 995 but the comb 1032 associated with the sensing pin 716 of the second quarter of the second year will be permitted to rise by reason of the absence of a perforation 996 and the corresponding projection 1031 will be free to rock to permit the feeler 999f to rock.

This in turn will permit the bail 998b associated with the latch 994b to rock to latch bail 995. If a perforation appeared in the position 996 of the second quarter of the second year then the corresponding projection 1031 would be stopped by its comb 1032 and latch 994b would be held away from the bail 995 and the arm 981 would rock to permit the machine to print under control of the second year commission in field 922. In the examples thus far given we have assumed that payments are due four times a year and the four sliding combs 1001a to 1001d have all been locked against moving to operative positions. If the perforations appearing in the field 225 (Fig. 2) were in the second and fourth positions reading from the bottom, indicating according to the scale in Fig. 25 that payments are due semi-annually in the second and fourth quarters the second and fourth of the pins 1008 counting from the bottom would advance (Figs. 36, 47 and 48) the second and fourth arms 1005 counting from the left (Fig. 47) would be prevented from rocking counterclockwise as viewed in Fig. 36 while the first and third arms 1005 would be permitted to rock, moving their corresponding combs 1001a and 1001c to the right as viewed in Figs. 36 and 46.

The feelers 999a to 999g inclusive, corresponding with the active quarters would thus be free to operate so far as the combs 1001b and 1001d are concerned so that unless bills have been rendered as indicated by perforations 996 in the active quarters to prevent their respective combs 1032 from rising the corresponding feelers 999a to 999g will rock as in Fig. 49 permitting their respective latch or latches 994a to 994d to latch the bail 995 to prevent the link 958 from rising.

The feelers 999a to 999g of the inactive quarters will be prevented by the combs 1001a to 1001d from rocking so that the corresponding latches 994a to 994d will be prevented from latching the bail 995. Thus only those latches corresponding with active quarters are permitted to operate under control of the perforations in field 225 and the bill-rendered perforations 996. If payments are due once a year, the perforations in the field 225 will be in accordance with the table in Fig. 25 indicating the quarter in which the payment is due. The combs 1001a to 1001d of the inactive quarters will now be moved to the right as viewed in Figs. 36 and 46 to prevent rocking of their respective feelers 999a to 999g so that the corresponding latches 994a to 994d will be prevented from latching the bail 995. The particular comb 1001a to 1001d corresponding to the active quarter will be prevented from moving to the right in Figs. 36 and 46 and the corresponding feeler or feelers 999a to 999g will be permitted so far as these combs are concerned to rock to latch the bail 995. So long as no perforations 996 appears in the active quarter the corresponding pin 716 (Fig. 49) will permit its vertical comb 1032 to rise and the corresponding feeler 999a to 999g will rock permitting its latch 994a to 994d to latch the bail 995 so that the first year commission will be printed. If on the other hand the perforation 996 appears in the active quarter the corresponding feeler 999a to 999g will be prevented from rocking and its latch 994a to 994d will be prevented from latching the bail 995 and the mechanism will be set for printing the second year commission.

From the foregoing description it will be seen that when payments are due quarterly, semi-annually or annually in certain quarters the combs 1001a to 1001d corresponding to the active quarters will permit the feelers 999a to 999g also corresponding to the active quarters to rock as in Fig. 49. The notice sent or bill rendered perforation 996 on the master card also controls the feelers and will determine whether or not the feeler or feelers permitted by the combs 1001a etc. to rock shall be permitted by the combs 1032 to rock. If both of these sets of combs permit the active feeler to rock this indicates that payment is due for a particular quarter but that a bill has not been rendered. But if a comb 1001a to 1001d permits its feeler to rock and that feeler is held up by the corresponding vertical comb 1032 this is an indication that a payment is due in the particular quarter and a bill has been rendered for that quarter. In Fig. 46 the feeler 999a is associated with the first quarter of the first year. The feeler 999e is associated with the first quarter of the second year. Both of these feelers control the bail 998a which in turn actuates the latch 994a. The horizontal comb 1001a controls both of the feelers 999a and 999e to permit both of them to rock or to prevent them from rocking. If both are permitted to rock by the horizontal comb and there is no perforation 996 in the first quarter of the first year, the corresponding feeler 999a will be free to rock as in Fig. 49. If there is also no perforation 996 in the first quarter of the second year the feeler 999e will also rock and this will permit the latch 994a to lock the bail 995.

If on the other hand there is no perforation 996 in the first quarter of the first year but there is a perforation in the first quarter of the second year indicating that a bill for the one payment that is due for the second year has been rendered then the feeler 999e will be prevented from rocking and although the feeler 999a has rocked the corresponding latch 994a will nevertheless be prevented from rocking to latch the bail 995 and the mechanism will be set to print the second year commission. Certain of the vertical combs 1032 are provided with stops 1039 pivotally mounted thereon and actuated by a spring 1039a to normally rock the stop into position to be engaged by the end 1031 of the feelers. This device is provided because for reasons with which we are not now concerned perforations 996 may be provided in quarters in which no payments are due. That is, in an account in which payments are due quarterly and the account came into being during say the third quarter no payments will be due for the first and second quarters. Nevertheless perforations 996 are provided in the upper middle of the fields 947, 949 as indicated in Fig. 52. These perforations will permit the corresponding sensing pins 716 (Figs. 49 and 50) to advance and prevent the corresponding vertical combs 1032 from rising so that normally the corresponding feelers would be prevented from rocking. In order therefore to free the feelers of these particular quarters so that they may rock as if no perforation 996 appeared in the particular fields, the numeral "3" is printed in the particular field as at 1040 (Fig. 52). This is done on the punching machine which also makes the perforations 1041 in the fields 947, 949.

This is an arbitrary perforation chosen because under no other circumstances in the system would the "3" perforations be provided in this column; the column being used as in Fig. 51 to indicate the tens numeral in the day of the month and never exceeding 3. The two pins 716 that sense these positions are provided as shown in Figs. 49 and 50 with studs 1042 cooperating with a lever 1043 actuated by a spring 1044. If these two pins sense perforations 1041 and advance, lever 1043 will rock clockwise and engage a pin 1045 on the stop 1039 rocking the latter about its axis 1046 and against the action of its spring 1047 to rock the stop out of the path of the upper end 1031 of the corresponding feeler 999a to 999g. Thus where no payment is due in a particular quarter and a perforation 996 nevertheless appears in such quarter, the presence of the perforations 1041 will neutralize the effect of the perforation 996 and the machine will operate as if no perforation 996 were present in the particular quarterly field or fields that are inactive and the machine will operate as heretofore described.

Asterisk denotes second year commission

In order to show whether the amount printed in the fields 945, 946 (Figs. 3 and 3a) is the commission for the first or a subsequent year, an asterisk is printed in each of these fields when the commission is for the second and subsequent years. This asterisk is carried by the type bar 365 of the forty-first column and as shown on the chart 952 (Fig. 98) is carried at the top of the type bar substantially in the printing line. The sensing pins 926 that control this type bar do not read any perforations in the field 922 since this field is only five columns wide.

Stops 580 (Fig. 94) do not advance and the combs 582 are free to drop their full distance. This will permit one of the special stops 665 to advance to the left to prevent the type bar from rising and thus hold the asterisk in printing position. As the type bar has not moved upwardly the printing hammers will normally not be released to print this asterisk and therefore special mechanism is provided to cause the release of the hammers when the machine prints the second year commission taken from the field 922. We have seen that when the machine is set to print the second year commission the arm 981 (Figs. 49 and 50) rocks clockwise to the position shown in Fig. 50. Link 1048 connected to the upper end of arm 981 is connected at its opposite end to an arm 1049 (Fig. 92) pivoted at 1050 on an arm 1051 fixed to the shaft 659 heretofore described. The upper end of the arm 1049 is provided with a projection 1052 normally lying to the right of the end of an arm 1053 fixed on shaft 1054. This shaft also carries an arm 1055 reaching over a pin on the lower end of the link 524. When the arm 981 rocks clockwise the arm 1049 is rocked counterclockwise to move the projection 1052 under the end of arm 1053. When the shaft 659 rocks as heretofore described, the arm 1049 will be raised and the shaft 1054 rocked counterclockwise rocking the arm 1055 downwardly thus moving the link 524 and the latch members 520 downwardly to operative position. This will cause the hammers 510, 511a to be released to print.

Suppression of certain commissions after the first year

Field 924 (Fig. 2) contains data representing commissions designated as 2½% commission. The field directly below contains the perforations representing the data printed in the field 924. These commissions may be printed on the cards F and A (Figs. 3 and 3a) in the fields 1056, 1057 (Figs. 3 and 3a). The machine may be adapted to print this commission during the first year of the account but to omit it in subsequent years. For this purpose the arm 981 (Figs. 29, 46, 92) may be provided with a second link 1058 connected by pin and slot to an arm 1059 (Fig. 92) adapted to rock an arm 1060 connected by a link 1061 to an arm 1062 fixed on the shaft 1063 (see also Figs. 94, 94a). Shaft 1063 has fixed thereon a stop 1064 normally resting under the end of arm 1065 loose on shaft 659 and resting at its left end on a projection 1066 (see also Figs. 101, 102), fixed in a grid 1067 which normally locks the five stops 595 at its lower end against operation. When the arm 981 rocks clockwise in Fig. 92 the shaft 1063 will be rocked counterclockwise and the stop 1064 will be moved from under the lateral projection of the end of the arm 1065. When the shaft 659 now rocks clockwise an arm 1068 will be raised releasing the arm 1065 so that the spring 1069 (Fig. 101) will raise the grid 1067 to release the stops 595. These stops will then operate to stop the particular type bars 365 in their normal inoperative position so that no type will rise to print data in the fields 1056, 1057 (Figs. 3 and 3a).

Suppression of all commissions after the fourth year

Means may be provided to suppress the printing of all the commissions contained in the fields 921 to 925 inclusive (Fig. 2) after the completion of the fourth year of the life of the policy or account so that none of these amounts will be printed on the cards F and A. This may be effected by rocking the arm 1059 (Fig. 92) another step. This is effected by a link 1070. When the arm 1059 was previously rocked by the link 1058 moving toward the right the pin and slot connection with the link 1070 permitted such operation (Fig. 29). Movement of the arm 1070 to the right now will take up the lost motion of the pin and slot connection and rock the arm 1059 farther as permitted by the pin and slot connection between the arm 1059 and the link 1058. This motion will be transmitted through link 1061 to the shaft 1063 (Figs. 92, 94, 94a) to rock the latter another step counterclockwise so that the additional stops 1064a will release their arms 1065a (Figs. 101, 102) so that when the shaft 659 rocks, raising the arms 1068a the arms 1065a will rock upwardly under the action of springs 1069a on the several grids 1067a permitting the grids to rise to release the stops 595 normally locked by the lower ends of these grids. These stops will then operate to stop all of the associated type bars 365 to prevent the printing of any commissions on the cards F and A after the fourth year of the life of the account.

Referring to Fig. 46 the bar 95a is connected at its opposite ends to arms 981a loose on a shaft 972. This forms a bail similar to the bail 995. The link 1070 is connected to one of the arms 981a in the same manner as links 1048 and 1058 are connected to the arm 981 shown in Figs. 49, 50. A spring actuated latch 979a similar to the latch 979 is provided for holding the bail 995a in its normal position corresponding with the position of the bail 995 in Fig. 49. The latch 979a is actuated by the bail 986 which as heretofore shown operates the latch 979. Additional latches 994e to 994k similar to latches 994a to 994d heretofore described are provided to latch the bail 995a. Latches 994e to 994h inclusive form parts of feelers 999h to 999k inclusive, respectively. Each of these feelers is provided with an upper projection 1031a similar to the projections 1031 (Figs. 49, 50). Projections 1031 associated with the feelers 999h to 999k are adapted to cooperate with the combs 1032 (Fig. 44) associated with the four quarterly fields 947a, 948a, 949a, 950a of the fourth year of the master card (Fig. 2). The feelers 999l to 999n are provided with projections 1031a adapted to cooperate with the combs 1032 associated with the first, second and third quarters of the fifth year of the master card. These feelers in turn cooperate with bails 998d to 998f in the same manner that feelers 999a to 999g cooperate with bails 998a to 998c. Latches 994i to 994k form parts of bails 998d to 998f in the same manner that the latches 994a to 994c form parts of the bails 998a to 998c. The feelers 999a to 999c besides having projections 1000 cooperating with bails 998a to 998c are also provided with projections 1000a (Figs. 49, 50) adapted to cooperate with bails 998d to 998f.

The horizontal combs 1001a to 1001d heretofore described are provided with upward projections 1002a (Fig. 36) similar to the projections 1002. The projections 1002a are adapted to cooperate with the feelers 999h to 999n. The purpose of the seven feelers 999h to 999n is to ascertain when the fourth year of the account is completed irrespective of which of the four quarters of the first year the account was opened. If the account was opened in the first quarter of the first year then when the feelers 999h to 999k ascertain that bills have been rendered for these four quarters they will permit the link 1070 to be actuated to suppress the printing of all commissions. The feelers 999l to 999n and the latches 994i to 994k will under these conditions be inactive. If on the other hand the account was opened during the second quarter of the first year then by reason of the projection 1031 of the first quarter of the first year being permitted to rock, the bail 998d controlled also by the feeler 999a will be permitted to rock to latch the bail 995a unless prevented from doing so by the feeler 999l associated with the first quarter of the fifth year. If the feeler 999l is permitted to rock by reason of the absence of a perforation 996 in the first quarter of the fifth year the latch 994i will be permitted to lock the bail 995a against operation and this will prevent the operation of the link 1070 so that the machine will print the commissions. When the feeler 999l is prevented from rocking by reason of the presence of a perforation 996 in the first quarter of the fifth year the bail 998d will be prevented from rocking and the latch 994i will be held away from the bail 995a so that the latter may operate to operate the link 1070.

If the account commenced in the fourth quarter of the first year then the feelers 999a to 999c will be permitted to rock releasing the bails 998d to 998f thus making it necessary for the feelers 999l to 999n to control these bails so that they may or may not latch the bail 995a. In this instance each of the projections 1031a must encounter its respective comb 1032 (Fig. 44) by reason of the presence of perforations 996 in their respective fields in order to hold their latches 994i to 994k out of latching position with respect to the bail 995a to permit the link 1070 to operate to suppress the printing of commissions. The projections 1002a on the combs 1001a to 1001c control feelers 999l to 999n in accordance with the quarter due perforations in field 225 of the master card so that if payments are due in all quarters each of these feelers will be free to operate. If, however, payments are due in one or two of the quarters then the feelers in which payments are not due will be held against operation by the projections 1002a. The feelers thus locked will then not be controlled by the condition of their respective quarterly fields as indicated by the presence or absence of a perforation 996 in such fields.

*Lapsed payments stop machine*

In Fig. 2 perforations 1072 in each of the quarterly fields 947, etc. other than the notice sent perforation 996 indicate that payment has been made for the particular quarter. This entry is made by the posting machine disclosed in my copending application Serial No. 144,661, filed October 28, 1926.

The printing in the field 951 above represents the data perforated and is the date of payment. The printing in the field 951 in the present instance indicates that payment was made on March 12 and perforations in the field 947 represent 3 and 12. The present machine is adapted to sense the perforations 1072 in the quarterly fields to ascertain whether payments have been made. If a perforation 996 appears in a given quarter and no perforations 1072 appear in that quarter, this is an indication that a payment which is due has not been made. If payments are due annually or semi-annually, the machine is adapted upon finding a lapse in a due payment to bring about a stoppage of the machine. If payments are due quarterly, the machine is adapted to permit one lapse to pass and proceed to make out a bill or notice for the next due payment, but if two lapses are found where payments are due quarterly, the machine will stop. The pins that read the perforations 1072 in the upper quarters 947, 948 are the pins 716 (Fig. 4b) and those that read the perforations 1072 in the lower quarters 949, 950 are designated 1073 (see also Fig. 29). In sensing the perforations 1072 it is not necessary to sense the three columns in a quarterly field as a perforation in any of these columns is sufficient. Thus the pins 716 are adapted to sense the perforations 1072 in the first column to the left of the fields 947, 948; the pins 1073 on the other hand are adapted to sense the perforations in the right hand column of the lower fields 949, 950. This staggering is illustrated in Figs. 42 to 45 inclusive, but as the pins read the card from the rear the upper pins 716 appear to be reading the right hand column and the lower pins 1073 appear to be reading the left hand column.

The purpose of the staggering as shown in Figs. 42 to 45 is to permit the arrangement of combs 1032, 1074 side by side. Comb 1032, as heretofore pointed out, is associated with the pin that reads the perforations 996 indicating that a notice or bill has been sent; the comb 1074 on the other hand is associated with the pins 716 and 1073 that read the perforations 1072 indicating that payment has been made. There is one comb 1032 and one comb 1074 for each of the quarterly fields making twenty such pairs in all.

We have seen that if the sensing pin adapted to read the perforation 996 finds no such perforation, it will be stopped by the card and the comb 1032 will be permitted to rise as in Figs. 45 and 49. If there is a perforation, however, the pin will advance and the comb 1032 will be prevented from rising as in Figs. 43, 44 and 50. Each of the combs 1074 is provided with a plurality of shoulders 1075 and each of the pins 716, 1073 associated therewith is provided with a block 1076. If none of the pins associated with a particular comb 1074 find perforations in the card, the comb will be permitted to rise as in Fig. 45. If any one of the pins 716 or 1073 finds a perforation in the card and advances it will prevent its comb 1074 from rising. In Fig. 43, for instance, the lowermost pin 1073 has advanced through a perforation in a card and its block 1076 has prevented the comb 1074 from rising. Also in the upper field two of the pins 716 have advanced through perforations in the card and their particular blocks 1076 have both moved over the shoulders 1075 and prevented the comb 1074 from rising.

Across the backs of all the combs 1032, 1074 are several bails, two of which are designated 1077, 1078 (see also Fig. 53), loose on shaft 1077a and actuated by springs 1077b, 1078b. Shaft 1077a is actuated by shaft 982 as shown in Fig. 16. An arm 1088a on shaft 1077a restores the bails 1077, 1078. These bails are adapted to control the stopping of the machine. Referring to Figs. 53, 56, 57 and 57a, the bail 1077 is adapted to actuate a slide 1079 and the bail 1078 is adapted to actuate a slide 1080 the movement being toward the right against the action of springs 1079a, 1080a. Between these slides is a third slide 1081. The slides are mounted on the guide rods 1082, 1083. Slide 1081 is connected to an arm 1084 fixed on rod 1085 on which is also fixed an arm 1086. An arm 1087 loose on the rod 1085 is connected by a spring 1088 to the arm 1086 (see also Fig. 53). A spring 1089 connected between the arm 1087 and a fixed bracket on the machine tends to rock the arm 1087 against the pin 1090 fixed in arm 1086 and thus tends to rock the shaft 1085 to move the slide 1081 toward the left. The arm 1087 has a flange 1091 extending across the back of projections 1092 on the two lower pins 1008 (Figs. 53 and 56) that read the quarter due perforations in field 225 on the master card. If any one of the pins 1008 advances through a perforation in the card indicating that payment is due quarterly in a particular quarter the arm 1087 will be prevented from rocking its full distance. If the first and third pins, counting from the bottom, advance through perforations indicating that semi-annual payments are due in the first and third quarters or if the second and fourth pins advance indicating payments due in the second and fourth quarters, the arm 1087 will be prevented from rocking its full distance.

If the two lower pins advance, however, indicating that payments are due in each of the four quarters, then by reason of the advancement of both of the projections 1092 the arm 1087 will rock its full distance from the position of Fig. 53 to that of Fig. 56. In all instances where the arm 1087 is prevented from rocking its full distance it will, however, rock one step as in Fig. 57. Here the lowermost pin 1008 has advanced through a perforation in the card. The other pins have moved from the dotted line position to the full line position, being stopped by the card. The projection 1092 on the second pin has permitted the arm 1087 to rock a slight distance which we may term "one step". Movement of the arm 1087 by reason of the two lower pins 1008 taking readings of perforations in the card may be termed a "three step movement." The slides 1079, 1080 (see Fig. 57a) are provided with shoulders 1093, 1094 and notches 1095. Slide 1081 is provided with shoulders 1096, 1097 and notch 1098 and a free or cut-away portion 1099. Fixed on a shaft 972 below the slides is an arm 1100 having pin and slot connection with a link 1101 and a spring 1102 tending to hold the link in its upward position. The link is provided at its upper end with a pin 1103 reaching under the slides 1079 and 1081. A second arm 1100a also fixed on shaft 972 is similarly connected with a link 1101a having a pin 1103a reaching under the slides 1080 and 1081.

The two links 1101, 1101a are connected at their upper ends to two arms 1104 pivoted on shaft 1083 and the two arms 1104 are connected to two links 1105 both of which are connected at their lower ends by pin and slot to an arm 1106 fixed on shaft 1107. Springs 1108 tend to hold the links 1105 in their upward position. Either of the links 1105 may be raised independently of the other to rock the shaft 1107. Rocking of the shaft 1107 (Fig. 63) in a counterclockwise direction will, through arms 1109 and a link 1110 rock shaft 1111 actuating arm 1112 and link 1113 connected at 63 to the bell crank 60. Rocking of the bell crank counterclockwise will cause the machine to stop as previously described. A link 1113a is connected from arm 1106 to an arm 1113b pivoted at 1113c and connected to a plate 1113d. When arm 106 is raised the plate 1113d will be raised and the designation "L" will appear above the casing 1113e to indicate the reason for the stopping of the machine. Fig. 57a shows the normal positions of the slides 1079, 1080 and 1081. Here the notches 1095 rest directly above the pins 1103, 1103a while the shoulder 1098 on the slide 1081 is directly above both of these pins. Thus neither of the links 1101, 1101a can be raised to cause the machine to stop. When the pins 1008 take a reading in which any one or more of the pins advance, except the two lower ones together, the arm 1087 will rock one step as in Fig. 57. This will move the slide 1081 (Fig. 57a) one step to the left moving the notch 1098 over the two pins 1103, 1103a. With the parts in these positions either of the links 1101 may be raised. In Fig. 45 when no perforations appear in one of the quarterly fields and the pins do not advance, the combs 1032 and 1074 both rise and bails 1077, 1078 both rock.

Should there be a hole 996 in the card a corresponding comb 1032 will be prevented from rising. This is the condition with respect to the quarterly field 949 in Fig. 44. Here the several pins 1073 are prevented from advancing by the absence of any perforations 1072. The comb 1074 is thus free to rise so far as the pins 1073 are concerned but is limited by a block 1114 attached to the comb 1074 moving into engagement with a projection 1115 on the comb 1032. In Fig. 45 when the comb 1074 rose to its full height a projection 1116 moved out of the path of the bail 1077. In Fig. 44 where the comb 1074 is limited by the block 1114 engaging the projection 1115 on the comb 1032 which is held down, the projection 1116 stands in the path of the bail 1077 and prevents the latter from rocking. In Fig. 57 the bail 1078 has rocked and moved the slide 1080 to the right. In Fig. 57a it will be seen that when this slide is moved one step to the right shoulder 1093 will rest above the pin 1103a. Then when the shaft 972 rocks clockwise as heretofore described the spring 1102 will yield and the link 1101a will not rock its arm 1104 to raise its link 1105 to stop the machine. On the other hand, the prevention of the bail 1077 from rocking due to the presence of a notice sent hole 996 and the absence of payment holes 1072 in a quarterly field and the consequent failure of the slide 1079 to move to the right, thus leaving its notch 1095 above the pin 1103, will permit the shaft 972 to raise the link 1101a rocking the corresponding arm 1104 and raising the corresponding link 1105, rocking arm 1106 and shaft 1107 to cause the machine to stop.

The bail 1077 is controlled in this manner by all of the combs 1032, 1074 associated with the upper row of quarterly fields 947, 948 and the bail 1078 is associated with all of the combs 1032, 1074 associated with the lower row of quarterly fields 949, 950. If a perforation 996 appears in one of the lower quarterly fields and there are no perforations 1072 in this same field then a projection 1116a (see Figs. 44, 45) will prevent the bail 1078 from rocking. Thus if the bail 1078 remains in normal position and the bail 1077 rocks, moving its slide 1079 to the right, the shoulder 1093 (Fig. 57a) will move over the pin 1103 so that the link 1101 cannot be raised but in this instance the pin 1103a would be permitted to rise rocking its arm 1104 and raising its link 1105 rocking arm 1106 and shaft 1107 to stop the machine. The example which we have assumed is one in which payments are due once a year or twice a year and a single instance of a payment being due and no payment being made will bring about the stoppage of the machine.

Assuming now that payments are due quarterly and it is desired to stop the machine only after two lapses, the arm 1087 (Fig. 56) will rock three steps by reason of the reading taken by the two lower pins 1008. This will move a slide 1081 three steps to the left. This in turn will place the cut-away portion 1099 (see Fig. 57a) over the pins 1103, 1103a as shown in Fig. 56. The notches 1095 in the slides 1079, 1080 both remain over their respective pins 1103, 1103a so that both pins are now free to rise. If now a lapse occurs in one of the upper quarterly fields but not in a lower field the slide 1080 will move to the right while the slide 1079 will remain stationary.

The slide 1081 is provided with a pin 1117 reaching outwardly on both sides. When the slide is moved its three steps to the left as in Fig. 56 the pin 1117 moves up to the upward projections 1118 on the slides 1079, 1080 so that now when either of these slides moves to the right it will also move the slide 1081 to the right. Thus if the slide 1079 moves to the right so that its shoulder 1093 will be above its pin 1003 it will also move the slide 1081 one step toward the right so that the shoulder 1097 will rest above both pins 1103, 1103a. In this position neither of the pins will be free to rise and the machine will not be stopped. It will be necessary now for two lapses to occur as in Fig. 44 where perforations 996 appear in two successive quarterly fields, one of which is in the upper row and the other in the lower row and where no perforations 1072 appear in either of these fields. Here both of the bails 1077 and 1078 are prevented from rocking. Both of the slides 1079, 1080 will then remain in the position in which both of the pins 1103, 1103a are free to rise. Now when shaft 972 rocks it will raise the links 1101, 1101a and cause the shaft 1107 to be rocked to stop the machine. As shown in Figs. 55 and 57 shaft 1107 has fixed thereon an arm 1119 adapted to cooperate with a pin 1120 in the link 1121. This link is connected to a bell crank 1122 which in turn is connected to a link 1123 having pin and slot and spring connection with an arm 1124 fixed with respect to a latching plate 1125 adapted to rock into notches 1126 in the rear edges of all of the type bars 364, 365. Thus when the shaft 1107 is rocked to stop the machine which stopping will take place at a subsequent period in the operation, the link 1121 will be actuated and the locking plate 1125 will latch all of the type bars against rising so that printing will not be effected prior to the stoppage of the machine.

*Pre-payment prevents printing of notice of bill*

There may be occasions where a customer or policy holder will make one or more payments which are not yet due. Means may be provided whereby when the machine is operating to make out notices or bills for such future payments, it will detect the fact that an advance payment has been made and will thus suppress the printing of the bill or notice. In Fig. 43 field 949 shows a perforation 996 indicating that a notice has been sent for the second quarter of the particular year. A perforation 1072 in this quarter indicates that a payment has been made. In the third quarter 948 there is no perforation 996 meaning that no notice or bill has been rendered for that quarter but there are perforations 1072 indicating that a pre-payment has been made. Here the comb 1074 will be stopped by the blocks 1076 on the pins which read the perforations 1072. The comb 1032 which is not stopped by its pin by reason of the absence of a perforation 996 is free to rise but is limited by the block 1114 on the comb 1074 being engaged by projection 1115 on the comb 1932. A projection 1127 on the comb 1032 will now be in position to prevent the rocking of a bail 1128. Neither of the bails 1077 or 1078 will be prevented from rocking. Bail 1128 is actuated by spring 1128a (Fig. 53) and restored by the arm 1088a. On bail 1128 as shown in Fig. 55 is a rear shoulder 1129 engaging a pin on the rear end of an arm 1130 which is loose on shaft 1077a. A spring 1132 connected between the arm 1130 and a shoulder 1129 tends to cause the arm 1130 to follow the movements of the bail 1128. A projection 1133 on the arm 1130 is adapted to cooperate with the flanged end of bell crank arm 1134 pivoted at 1135.

Arm 1134 is connected to a link 1136 which is connected by pin and slot and spring to an arm 1137 fixed on shaft 972. When the shaft rocks clockwise it rocks the arm 1134 moving the link 1121 to the right. This moves the link 1123 downwardly and rocks the latching plate 1125 out of cooperation with the type bars. Where there is no prepayment the bail 1128 rocks counterclockwise as in Fig. 55 moving the arm 1130 downwardly to permit this operation of link 1121, etc. Where, however, there is a pre-payment the bail 1128 is prevented from rocking and the shoulder 1133 will prevent the arm 1134 from being rocked. The latching plate 1125 will then remain in cooperation with the type bars and prevent them from printing. The machine, however, continues to operate and the controlling master card is fed out and a new master card fed in at which time the machine commences operations under control of the new card.

*Asterisk indicates a lapsed payment*

On the cards R and N (Figs. 3 and 3a) following the printing of the amount to be paid an asterisk is shown at 1140, 1141. We have seen that where one or two payments are due each year the lapse of a payment will cause the machine to stop and that where four payments are due each year the lapse of two payments is necessary to stop the machine and where a single lapse occurs the machine will continue to make out the next bill or notice. In this instance, however, it is desired to indicate that there has been one lapse. This is indicated by the asterisk 1140 on the receipt slip and 1141 on the notice card or bill.

The type bar that controls the printing of this asterisk is the bar 364 of the thirty-fifth column (see Fig. 113). The type on this bar are arranged as indicated at 1142 (Fig. 98). In Fig. 93 a special stop 1143 (see also Fig. 105) is normally locked against operation by a latch 1144. This latch is connected to a bell crank 1145 pivoted at 1146 and connected by a link 1147 to an arm 1148. This arm is actuated by a spring 1149 (Fig. 54) into cooperation with two stops 1150, 1151 loose on the shaft 1131. Stop 1150 is adapted to engage a pin 1152 on the extension 1153 of the bail 1077. A spring 1154 tends to hold the stop 1150 against the pin 1152. The stop 1151 is connected in the same manner as the bail 1078. We have seen that when there are no lapses, both bails 1077 and 1078 move to the right. This will depress both of the stops 1150, 1151. This will permit the spring 1149 to rock the arm 1148 clockwise pulling the link 1147 toward the right. In Figs. 93 and 105 it will be seen that the pulling of the link 1147 to the right will rock the bell crank 1145 counterclockwise, moving the latch 1144 downwardly to release the stop 1143. This stop will then project to control the setting of the type bar 364 of the thirty-fifth column with the asterisk in printing position. Referring to Fig. 93, it should be understood that the arrangement of the stop 496 on the type bar in question is such that it will come into engagement with the stop 1143 when the type bar has risen the proper distance to present the asterisk in the printing line.

*Finding location of current year's account; printing dividend or credit and making notice sent hole*

It is necessary to find out which of the five year fields contains the record of the account for the current year and also whether a dividend or other credit is due the debtor or insured for the current quarter.

Referring to Fig. 2, the perforation 996 is to be made in each of the quarterly fields as a notice or bill is made for the particular quarter. The dividend contained in the lower field 715 is to be printed on the cards of Figs. 3 and 3a not more than once for each year. If bills are rendered once a year, then as each bill is made out the dividend or credit amount will be printed. If bills are rendered twice a year or four times a year, this dividend will be printed only once for the two or four bills that are made out depending on which quarter of the year the dividend or credit amount is to be applied. Field 1155 contains perforations indicating the card year or year in which the account was opened, or in other words, the year represented in the first year field on the master card. The pins that sense the perforations in field 1155 are those of pins 1073 (Fig. 36) farthest to the right and here specifically designated 1156. Only one column of pins is used to take this reading as it is only necessary to read the perforations of the units column of the year. Each of these pins is provided with a block 1157 adapted to cooperate with a feeler finger 1158 (see also Fig. 38). Each finger 1158 is fixed on a rod 1159 to which is also fixed a depending arm 1160 actuated by a spring 1161. Each arm 1160 is adapted to engage a pin 1162 on a comb 1163.

When the pins 1156 do not reach through any perforation in the card they will stop their respective fingers 1158 but when any pin advances through the card its block 1157 will be moved away from the finger 1158 and such finger will be permitted to rock, moving its comb 1163 toward the right as viewed in Figs. 38 and 37, against the action of spring 1164. A stud 1165 fixed on an arm 1166 is adapted to restore the arms 1160 and fingers 1158 against the action of their springs 1161 and its operation is timed to release these parts after the pins have taken their readings.

The arm 1166 is mounted on shaft 1018 (Fig. 36) and is operated by the rotation of this shaft. The setting of the pins 1156 sets the combs 1163 in accordance with the card year indicated in field 1155 to indicate the year represented by the first year field on the card. The combs are adapted to be analyzed by feeler fingers 1167. Five of these fingers are shown in Fig. 38. As shown in Fig. 27 two sets of such fingers may be employed to cooperate with bails 1168 pivoted on shaft 1169 so as to press against the bail at separate points without causing twisting of the bail. When a finger in one set operates, the corresponding finger in the other set will operate but the two fingers together serve as a single finger. All of the feeler fingers 1167 are rotatably carried on the sleeve 1170 loose on shaft 1171. A setting arm 1172 attached to the sleeve 1170 cooperates with notches 1173 in a scale member 1174. By raising the arm 1172 out of the notches 1173 the fingers 1167 may be adjusted along the shaft 1171 and the arm 1172 set in any of the notches to represent the current year.

In Figs. 27 and 38 the arm is set in a notch 7 representing in the present instance the year 1917. The same notch will, of course, represent the years 1927, 1937, etc. If the pins 1156 read the card year as 7 and the arm 1172 is set at 7 indicating that the card year 1917 the record for that year will be contained in the first year field on the master card and the first one of fingers 1167 will rock as in Fig. 38. Should the card year be a "7" and the arm 1172 set at 8 the second one of the fingers 1167 would find an opening into the combs 1163 and would rock, indicating that the record for the current year is in the second year field on the master card.

Thus whatever the card may be as indicated by the perforations in field 1155 and whatever the current year may be as indicated by the setting of arm 1172 with respect to scale 1174 the finger 1167 which finds an opening in the combs 1163 and rocks will determine where the record for the current year is located on the master card to cause the machine to be set to operate under control of that particular year field. After the pins 1156 have taken their readings and the fingers 1158 have operated to set the combs 1163, the feeler fingers 1167 will be caused to operate. Loose on the sleeve 1170 are arms 1175 (Figs. 27 and 39). These arms are connected by a rod 1176. Springs 1177 are connected from the rod 1176 to the feeler fingers 1167. Rod 1178 connected to arms 1179 fixed on the shaft 1171 forms a bail engaging both arms 1175. The rocking of shaft 1171 counterclockwise as viewed in Fig. 39 will move the arms 1175 and tend to stretch the springs 1177, thus tending to rock the feeler fingers 1167 into cooperation with the combs 1163. In Fig. 39 one of the feeler fingers 1167 is shown as having found an opening in the combs 1163 and has rocked counterclockwise.

As shown in Figs. 27 and 39 the lower ends of the arms 1179 have studs 1180 cooperating with the several bails 1168 to restore them to normal position as in Fig. 29. When the arms 1179 rock to permit the feelers to cooperate with the combs 1163 the studs 1180 release the bails 1168 so that they shall be free to rock on their supporting shaft 1169. As shown in Fig. 29 there is mounted loosely on shaft 1169 a bell crank arm 1181 for each of the combs 1168. Each of these arms is provided with a projection 1182 cooperating with one of the combs 1168. Spring 1183 tends to rock the arm 1181 to cause it to move the comb 1168 after the latter is released to rock. In Fig. 39 rocking of one of the feeler fingers 1167 has permitted its bail 1168 to rock and this has permitted the corresponding arm 1181 to rock. Each of these arms is connected to a link 1184 which is connected at its opposite end to an arm 1185 pivoted at 1186 and cooperating at its upper end with the flanged end 1187 of an arm 1188 carrying a slotted plate 1189 cooperating with collars 1190 on a group of the pins 716. As shown in Fig. 29 the arm 1185 normally locks the plate 1189 against clockwise rotation under the urge of spring 1191 but when the arm 1185 rocks to the position of Fig. 39 the plate 1189 will move to the position indicated by dotted lines in this figure. Thus the pins 716 associated with this particular plate will be free to take a reading from the card.

Referring to Fig. 37 there is one latching plate 1189 for each group of pins 716a to 716e inclusive. These five groups of pins are adapted to analyze the perforations in the dividend fields 715 associated with the five year fields of the card. Thus by reading the card year on the card itself and by the manual set up in the machine, the group of pins 716 associated with the year field in which the account for the current year is contained, will be released for operation. Whether the pins thus released shall actually take a reading to control the entry of a dividend on the cards R and N depends upon whether the dividend or credit is due in the current month as the cards will be run through the machine several times a year and the credit or dividend on a card is to be applied only once in four quarters, and only during the current month. This particular control will be described presently. In Figs. 37, 28 and 29 a bail 1189a is shown extending across the front of the several plates 1189. A bar 1189b, mounted for horizontal movement is attached to one end of the bail and is adapted to be actuated by the pin restoring frame 718. A spring 1189c will keep the bar 1189b in contact with frame 718 so that the particular plate 1189 which may be selected for operation will be permitted to rock when pins 716 read the card and will be restored with the pins.

The mechanisms that determine where the dividend is to be found on the master card also determine which year field, or more particularly, which four quarter fields 947 to 950 contain the accounting record for the current year. Referring to Figs. 29 and 39, each of the arms 1181 is adapted to cooperate with a pin 1192 fixed on the lower end of link 1193. Each of these links is provided at its upper end with two horizontal slots 1194.

A spring 1195 tends to pull the link 1193 downwardly into engagement with the arm 1181. The holes 996 in the four quarterly fields 947 to 950 are made by punches 1196. Back of the four punches of each group are four actuating plungers 1197. These plungers are pivoted at 1198 on a member 1199 fixed on shaft 1200. The two upper plungers 1197 of each group are rigidly interconnected by a rod 1201 resting in the upper slot 1194. The two lower plungers of each group are similarly interconnected by a rod 1201a resting in the lower slot 1194 of the link 1193. Normally all of the links 1193 are in lowered position as in Fig. 29 and all of the plungers 1197 have their right ends raised above the punches 1196 so that as the plungers are moved toward the right they will not operate the punches. When one of the bails 1168 operates to select a particular group of mechanisms corresponding with the location of the account for the current year and permits the corresponding arm 1181 to rock, the corresponding link 1193 will be raised and will rock its plungers 1197 bringing them into alinement with the punches 1196 as in Fig. 40. In this way the four plungers associated with the card year are selected for operation. Only one of the four, however, will be used to perforate a hole 996 when a bill or a notice is made out, to indicate this fact. It is therefore necessary to make a further selection between the four plungers. In this further selection the groups of plungers of moved laterally so that two of the four may be brought into alinement with the punches 1196 as in Fig. 41. Here it will be seen that by moving the shaft 1200 along its axis the two plungers 1197 associated with the two fields 947, 949 may be brought into register with their punches 1196 while the other two plungers are moved out of register with their punches.

By moving the shaft in the opposite direction the reverse set-up may be effected to select the plungers for fields 948, 950. For setting of the shaft 1200 as shown in Fig. 119, a projection 1200a at the end of the shaft 1200 is provided with a pin 1202 reaching into a cam slot 1203 in a plate 1204 attached to the slide plate 264 heretofore described. This slide may be raised or lowered and thus set in four positions representing the four quarters as indicated by the scale. When set for the first and second quarters the upper portion of the slot 1203 is in cooperation with the pin 1202 and the shaft 1200 is in its right hand position as viewed in Fig. 119. When the plate 264 is set for the third and fourth quarters the pin 1202 will be in the lower portion of the slot 1203 and the shaft 1200 will be moved to its left hand position.

With two of the plungers 1197 now in register with their two punches 1196 the rocking of shaft 1200 in one direction or the other will cause one of the plungers to actuate its punch to perforate the card. The direction in which the shaft 1200 shall rock determines the final selection between the two plungers that are in register with their punches. The manner in which this shaft shall be rocked in one direction or the other is shown in Figs. 16 and 118. Fast on the shaft 1200 is an arm 1205 having pins 1206, 1207 at its opposite ends. A T-shaped link 1208 carried by an arm 1209 pivoted at 1210 is adapted to latch over one or the other of pins 1206, 1207 so that when the link 1208 is pulled downwardly it will rock the shaft 1200 in one direction or the other depending on which of the pins 1206, 1207 it is latched over.

Link 1208 has a pin 1211 reaching into a cam slot 1212 in the side of the setting slide plate 264 referred to. When the setting plate 264 is set for the first quarter the pin 1211 is in the upper part of the slot 1212 and the link is in cooperation with the pin 1206 and the downward movement of the link will rock the shaft 1200 clockwise as viewed in Fig. 118. When the plate 264 is set for the second quarter the pin 1211 will be at the point 1213 in the slot and the link 1208 will then cooperate with the pin 1207 to rock the shaft in a counterclockwise direction. When the plate 264 is set for the third quarter the pin 1211 will be at the point 1214 and the link will again cooperate with the pin 1206. When the plate is set for the fourth quarter the pin 1211 will be at the point 1215 and the arm 1208 will again cooperate with pin 1207. A spring 1216 normally holds the link 1208 in its upper position. The link will be pulled downwardly by a link 1217 provided with an L-shaped slot 1218 cooperating with a pin 1219 attached to the link 1208. Link 1217 (Fig. 5a) is connected at its lower end to an arm 1220 pivoted at 1221 and fixed with respect to an arm 1222 connected by a link 1223 to a cam follower 1224 cooperating with a cam 1225 on the shaft 56. The cam causes the link 1217 to raise and lower the link 1208. Whether the link 1217 shall pull the T link 1208 downwardly when it moves in that direction depends upon whether the pin 1219 (Fig. 118) is in the right hand or left hand portion of the slot 1218. If it is in the left hand portion as in Fig. 118, then the downward movement of the link 1217 will cause the link 1208 to move downwardly but if the link 1217 is rocked about its lower pivot to cause the pin 1219 to lie in the right hand portion of the slot 1218 then when the link 1217 moves downwardly it will not move the link 1208 with it and thus the shaft 1200 will not be rocked to effect punching of a hole 996.

The position of the link 1217 may be controlled by any of several conditions. One of these conditions is the presence or absence of the receipt and file slip shown in Fig. 3 upon the platen 367 (Figs. 9, 15, etc.) in position for printing. The platen 367 is provided with a groove 1226 into which the roller 1227 mounted on an arm 1228 is adapted to reach. If there is no receipt slip R on the platen the roller will lodge in the groove but when the sheet is rolled about the platen as in Fig. 15 the roller 1227 is held out of the slot as shown here. A spring 1229 attached to the lower end of the arm 1228 is adapted to rock the latter about its pivot 1230 to cause the roller to enter the groove. The lower end of the arm 1228 is provided with a roller 1231 adapted to cooperate at 1232 with a spring actuated latch 1233 carried by a plate or link 1234 slidably attached by pin and slot connection 1235 with a second plate or link 1236. A spring 1237 tends to hold the plate 1234 in its upper position. The lower end of the link or plate 1234 is provided with a pin 1238 (see Fig. 8). A cam follower arm 1239 cooperating with cam 1240 on shaft 311 reaches over the pin 1238 and once during the five billing cycles rocks to pull the link or plate 1234 downwardly against the action of its spring 1237. When the plate 1234 is in its upper position, if there is no paper on the platen 367 the arm 1228 will rock and the latch 1233 will latch over the top of a projection 1241 on the plate 1236 so that when the cam pulls the plate 1234 downwardly it will pull the plate 1236 with it. The lower end of the plate or link 1236 as shown in Fig. 8 is connected to an arm 1242 fixed on shaft 1243 with an arm 1244 which is connected by a link 1245 to the link 1217 (Figs. 5 and 5a).

When the link 1236 is pulled downwardly by reason of the absence of a slip of paper on the platen the link 1245 will be moved to the left in Figs. 5 and 5a rocking the link 1217 so that the right hand portion of the slot 1218 will cooperate with the pin 1219 and the punches will not be operated.

An arm 1246 on shaft 1243 may also, through a link 1246a, draw downwardly on a member 1247 which is pivoted at its upper end to a bracket fixed to a latch plate 1248 pivoted at 1249 (see also Figs. 92, 93, 94). The latch 1248 will be rocked into cooperation with all of the type bars to prevent them from rising to printing position.

*Anniversary control*

We have seen how the machine ascertains which of the five yearly fields contains the account for the current year. We have also seen that in the lower portion 715 of the yearly fields are perforations representing dividends or credit amounts due to the debtor and we have seen that a group of analyzing pins 716 is released to analyze these perforations in the current year field. The selected group of pins 716 may or may not analyze the perforations to control printing, however, depending upon whether the dividend is due during the current month of the current quarter. In the field 1250 of the master card (Fig. 2) are perforations representing any one of the twelve months. The pins that read these perforations are designated 1251 (Fig. 35). Beside the four pins that read the perforations there are two dummy pins 1252, 1253. The two upper pins 1251 are provided with studs 1254 adapted to cooperate with a block 1255 fixed on the dummy pin 1252. The two lower pins 1251 are similarly associated with the dummy pin 1253. Associated with the two lower pins 1251 is a comb 1256 and associated with the two upper pins is another comb 1257.

Springs 1258 are provided to raise the combs and the bail 1035a (see also Fig. 50) is adapted to restore the combs to their lowered position.

Projections 1059 on the sides of the analyzing pins are adapted to cooperate with the upper ends of the combs. If one of the two lower pins 1251 advances through a perforation in the card it will move the dummy pin 1253 with it and the comb 1256 will rise one step. If the other of these two pins advances carrying the dummy with it, the comb will rise two steps. If both pins are advanced carrying the dummy with them, the comb 1256 will rise three steps. The adjacent comb 1257 is similarly controlled to prevent it from rising when neither pin advances or to rise one, two or three steps depending upon the reading taken by the pins. Each of the combs is associated with one of two bell crank levers 1260, 1261 adapted to be actuated by springs 1262. Each of these levers is adapted to cooperate with a pin 1263. One of these pins connects two adjacent combs 1264 and the other is connected to a second pair of adjacent combs 1265 (see Figs. 30, 31, 32, 33, 35). In Fig. 33 the two combs 1265 are shown in their normal position while the two combs 1264 are shown in their advanced position having moved three steps. The several positions of the comb 1257 (Fig. 35) are adapted to cause a setting of the two combs 1264 one, two or three steps and the comb 1256 is adapted to similarly set the combs 1265 one, two or three steps. Below the combs 1264, 1265 are twelve feelers 1266 (Figs. 31, 32, 33, 34) pivoted at 1267 and provided with springs 1268 adapted to rock them into cooperation with the combs. A bail 1269 is adapted to restore the feelers 1266.

The bail is adapted to be actuated by arms 1270 and link 1271 (Fig. 30) fast to shaft 1171 which is operated as indicated in Fig. 5a through arm 1171a fixed on the shaft and connected by link 1171b to bell crank 1171c which is connected by link 1171d to follower arm 1171e cooperating with cam 1171f on shaft 56. Adjacent to the lower ends of the feelers 1266 is a finger 1272. This finger is fixed to a hub member 1272b (Fig. 34), loose on shaft 1273 and rests between a plate 1274 and an arm 1275 both of which are fixed to a hub member 1276 fixed on the shaft 1277 slidably supported in bearings 1278. The outer end of the arm 1275 rests in notches in a plate 1279 (see also Fig. 27). A plate 1280 normally holds the arm 1275 in one of the notches. By moving the plate 1280 toward the right, causing it to rise, the arm 1275 will be released and may be moved laterally so as to place the finger 1272 under any one of the twelve feelers. The arm 1275 and plate 1274 are adapted to rock about their axis 1277 and are bifurcated as indicated in Fig. 32 so as to move freely up and down with respect to the shaft 1273 when being set laterally, without releasing the finger 1272. The twelve feelers 1266 represent the twelve months of the year and the finger 1272 will be set under the finger for the current month. The anniversary perforations in field 1250 of the master card will set the combs 1264, 1265 to permit the corresponding feeler 1266 to rock from the position of Fig. 31 directly over the finger 1272, to the position of Fig. 32 so that the finger 1272 may rock upwardly as in Fig. 32. Thus if the finger 1272 is set under the feeler 1266 corresponding with the anniversary month perforated on the master card, the finger 1272 will be permitted to rock as in Fig. 32 when bail 1272a fixed on shaft 1273 rises.

Below the finger 1272 is a bail 1281 pulled upwardly by spring 1282 (Figs. 31, 34). Bail 1281 is loose on shaft 1273 which carries arms 1283 fixed thereon. These arms rest over the bail 1281 to restore it to its lower position and to release it to permit it to rise if the finger 1272 rises. The rocking of the shaft 1273 is effected by the arm 1284 (Fig. 30) fixed thereon and provided with a link 1285. This link is connected to a bell crank arm 1286 (Fig. 6a) pivoted at 217 and connected to a link 1287 straddling a shaft 53 (Fig. 6) for support and carrying a cam follower roller 1288 cooperating with a cam 1289 on the shaft 53. A spring 1290 holds the follower in cooperation with its cam. Fixed with respect to the bail 1281 is an arm 1291 (Figs. 31, 32) connected by a link 1292 to a latch 1293. Fixed with respect to the restoring bail 1189a (Fig. 30) is an arm 1294 connected to a link 1295. This link is connected by pin and slot and spring to an arm 1296 fixed on a shaft 1297 on which is also fixed an arm 1298. If, when the pins analyze the anniversary field on the card during the first cycle, the finger 1272 is permitted to rock upwardly, the latch 1293 will move into cooperation with the arm 1298 which is rocked downwardly and will lock this arm in the lower position as in Fig. 32. When, during the succeeding cycles the restoring rod 1189a restores the selected one of the pin latching plates 1189, the spring 1299 will yield and when the next reading operation is performed the rod 1189a will again be rocked by the spring 1299 to release the latching plate 1189 so that the pins may read. The pins, however, are not free to operate until the third cycle, being held by latching toggles 720 of Fig. 5a. These toggles release the pins to take their reading during the third cycle to read the commission in the field 715 and print it at 1300, 1301 on the cards R and N (Figs. 3 and 3a).

Integral with the bail 1272a is an arm 1302 (Fig. 30). This arm is connected to a link 1303 having lost motion connection with a stop 1304 adapted to cooperate with an arm 1305 fixed on the shaft 1297 with the arm 1298. A spring 1306 tends to rock the stop under the arm 1305 to prevent the latter from rocking downwardly. The operation of the latch 1293 and the stop 1304 takes place during the first cycle but after the sensing pins have taken their readings and therefore after the pin latching plate 1189 has rocked forward. Thus the arms 1298 and 1305 are in their lowered position as in Fig. 32 when the latch 1293 and stop 1304 move to the left. When the bail 1272a rises to permit the finger 1272 to rise or to be stopped by the feeler 1266, link 1303 will move to the left releasing the stop 1304 and permitting it to rest against the end of the arm 1305. If the dividend is to be printed in the third cycle the latch 1293 as we have seen latches the arm 1298 down as in Fig. 32. If the dividend is not to be printed and the latch does not lock the arm 1298 down then when the pin latching plate 1189 is restored and the arms 1298, 1305 are rocked upwardly the stop 1304 will be pulled by its spring 1306 under the arm 1305 and will be held in this position during the subsequent cycles. Thus in the third cycle although one of the pin latching plates 1189 has been selected to operate, the link 1295 and rod 1189a will be locked through the arm 1305 and stop 1304, thus preventing the selecting plate 1189 from rocking. This prevents the dividend from being read and printed.

Detecting a misfiled card and stopping the machine

Associated with the twelve feelers 1266 is a bail 1307 (Figs. 30, 31, 32, 34). This bail is loose on the shaft 1273 and is adapted to be moved along said shaft. In order to make the bail more rigid so that it will not bind and stick on the shaft when being moved, arms 1308 integral with the bail are interconnected by a rod 1309. A setting arm 1310 loose on shaft 1273 is connected by pin and slot at 1311 with the bail 1307. The pin and slot connection permits the arm 1310 to be rocked about its pivot 1273 in and out of the notches in plate 1279 (Fig. 27) without rocking the bail 1307. The arm 1310 is adapted to be moved in any of three positions as indicated by the notched plate 1279 (Fig. 27). By raising the plate 1280 and moving the arm 1310 laterally the bail 1307 may be moved laterally on the shaft 1273, the pin 1311 being provided with a head to constrain the bail to move laterally with it. The bail is provided with four upward projections 1312 (Figs. 36, 34). These projections represent the four quarters of the year and by being moved laterally each of the projections may be set under any one of the three feelers 1266 representing the three months of a particular quarter. As shown in Fig. 36, when the finger 1272 is set under the particular one of the feelers 1266 representing the current month and the bail 1307 is set to correspond with the file containing the cards which include those corresponding to the current month, a projection 1312 will register with the finger 1272. All of the feelers 1266 are forward of the bail 1307 (Figs. 30, 34) so that the bail is normally free to rock upwardly about its pivot 1273.

If the card in the machine corresponds with the anniversary setting we have seen that the feeler 1266 directly above the member 1272 will rock to the position of Fig. 32 to permit the finger to rise. That feeler will then be in position to cooperate with the projection 1312 as in Fig. 32 to prevent the bail 1307 from rising. The bail 1272a which rests above the finger 1272 to restore it and permit it to rise also reaches across the side arms of the bail 1307 to restore the latter and to release it to permit it to rise when a reading is to be taken. Passing under the side arms of the bail 1307 is another bail 1313 loose on the shaft 1273 and pulled upwardly by springs 1314. When the bail 1272a rises the pressure of the bail 1313 tends to raise the feeler bail 1307. As long as the finger 1266 corresponding to the current month rocks to the position of Fig. 32, the bail 1307 will be prevented from rising, but when the card in the machine does not correspond to the anniversary setting and the file setting the feeler 1266 which corresponds with the anniversary setting will not rock to the position of Fig. 32, and the bail 1207 will be free to rise. Also if one of the feelers 1266 rocks to the position of Fig. 32 and does not cooperate with the projection 1312 the bail 1307 will be permitted to rise. Connected at one end to the bail 1313 is a link 1315 (Figs 34, 32) reaching downwardly as indicated in Fig. 6a. The lower end of this link is supported by an arm 1315a loose on shaft 157 and has a pin 1316 resting over the top of link 1317 which straddles the shaft 53 in Fig. 6. The link is provided with a cam follower roller 1318 cooperating with a cam 1319.

The right end of the link has an L-shaped slot 1320 cooperating with a pin 1321 on an arm 1322. Spring 1323 tends to raise the link 1317 so that the pin 1321 will be in the lower portion of the slot 1320. As long as the cards are of the proper file and the link 1315 is held down by the failure of the bail 1307 to rise, link 1317 will be held down in the position of Fig. 6a and as it moves toward the right will not rock the arm 1322. But when a misfiled card causes the bail 1307 to rock and the link 1315 rises the link 1317 will also rise so that the pin 1321 will be in the lower portion of the slot 1320. Now when the link 1317 is moved to the right it will rock the arm 1322 counterclockwise.

The arm 1322 is fixed on shaft 1324 on which is also fixed an arm 1325 having pin and slot connection with a link 1326. The latter link is connected to an arm 1327 fixed on the shaft 1243. An arm 1328 fixed on this shaft is connected by a link 1329 to arm 1330 fixed on shaft 1331. Fixed on the shaft 1331 is an arm 1332 connected by link 1333 through pin and slot with an arm 1334. This arm is fixed on shaft 1335. An arm 1336 fast to shaft 1335 is connected by a spring 1337 to an arm 1338 loose on the shaft. An arm 1339 also loose on shaft 1335 is adapted to be actuated by the arm 1338 when shaft 1335 rocks in a counterclockwise direction. The spring 1337 will yield if resistance is offered by the arm 1339 so that the parts of the machine will not be broken. As shown in Fig. 64 the arm 1339 reaches under the switch toggle arms 100, 102. The raising of arm 1339 moves the toggle from the position of Fig. 64 to that of Fig. 63 to cause the machine to stop.

Thus, if the machine finds a card in the wrong file, it will stop. This stoppage takes place after the punching of the holes 996 indicating that a notice or bill has been sent. This punching must therefore be suppressed if the card then in the machine is in a wrong place and no notice is to be sent out. This suspression is effected by the rocking of shaft 1243 which as we have seen in Figs. 5, 5a, is connected by link 1245 to link 1217. The rocking of shaft 1243 to stop the machine pulls link 1217 to the left (see also Figs. 8, 16, 118) so that the T link 1208 will not rock shaft 1200 to actuate the punches of Figs. 39, 40, 41. The rocking of shaft 1243 as we have also seen, will through arm 1246 and member 1247 swing the latch stop 1248 into position to hold all the type bars against rising.

As shown in Fig. 89a the shaft 1331 has fixed thereon an arm 1340 connected by a link 1341 (see Fig. 61) to arm 1342 fixed on shaft 136. This shaft as we have seen in connection with Fig. 65 carries a stop arm 135 adapted to be rocked under the pin 91 when the parts are set to stop the machine, to prevent the restarting of the machine before it comes to an actual stop as heretofore described.

The accumulator

In printing the amount of the premium on the cards R and N (Figs. 3 and 3a) during the first billing cycle, the amount is run into an accumulator and if the dividend amount printed in the third cycle is to be subtracted from the premium amount the complements of the digit values of the dividend are applied to the accumulator during the third cycle to effect the subtracting operation.

The difference between the dividend and the premium or in other words the amount to be paid is shown at 1343, 1344 (Figs. 3, 3a). The accumulator is shown in Figs. 67, 68, 69 and 93 and is generally designated 1345. The type bars 354 of the twenty-ninth to the thirty-fourth columns as viewed in Fig. 113, are provided with toothed racks 1346 as shown in Figs. 67, 68 and 93. The accumulator is mounted adjacent to the type bars to be actuated by these racks. The racks are provided with slots 1347 cooperating with pins 1348 fixed in the type bars. A spring 1349 tends to pull the rack downwardly. A slidable stop 1350 mounted on the type bar is normally held by a spring 1351 in the position of Fig. 68 so that the rack will rest on the upper projection 1352. An arm 1353 (Fig. 67) provided with a rod 1354 reaching across the several slide stops 1350 is adapted, when rocked, to move the slide to the left so that as the type bar rises the projection 1352 will pass to the left of the lower end of the rack 1346 and the rack will rest on the lower portion 1355 of the slide. The rack will thus be a half step lower with respect to the type bar 364 when true values are to be printed and complements added. The accumulator is provided with accumulator wheels 1356 mounted on a shaft 1357 carried by arms 1358 fixed on shaft 1359. The spring 1360 tends to rock the arms to move the wheels 1356 into mesh with the racks 1346. A shaft 1359 as shown in Figs. 5 and 92 is provided with an arm 1361 connected by a link 1362 to one of four cam follower arms 1363, cooperating with one of four cams 1364 (see also Fig. 89a). The cam rocks the shaft 1359 at the proper times to permit the spring 1360 to move the accumulator wheels into mesh with the racks and also to move the wheels out of mesh with the racks.

Each of the accumulator wheels except the one of the units order has a cam tooth 1366 adapted as the wheel turns in a counterclockwise direction to engage the lower side 1367 of an arm 1368 loose on shaft 1359 and normally held in position by a spring 1369. The arm 1368 engages projection 1370 of a latch 1371 which cooperates with a carry arm 1372 to hold the latter in the position of Figs. 67, 68. A spring 1373 tends to rock the carry arm 1372 which is loose on the shaft 1359 counterclockwise. When the tooth 1366 engages the arm 1368 and rocks it to the right, it in turn rocks the latch 1371 to release the carry latch 1372. The arm will then rock out of the path of the stop projection 1374 to permit the rack to descend an extra step to add an extra "1" to the accumulator wheel of the next higher order. The carry latches 1372 are restored to normal position by a restoring arm or bail 1375 carried by shaft 1376. This shaft as shown in Fig. 5 has fixed thereon an arm 1377 connected by a link 1378 to one of the four follower arms 1363 cooperating with one of the four cams 1364. The spring 1373 is connected between the carry latches and the bail. The bail is rocked from the position of Fig. 67 to that of Fig. 67 preferably prior to the commencement of the descending stroke of the accumulator racks 1346 so that when the tooth 1366 engages arm 1368 and rocks the latch 1371 the carry latch 1372 will be free to rock away from the path of the projection 1374. A spring 1380 connected to each of the latches 1371 serves to rock the latches into cooperation with the carry latches 1372. A toothed arm 1381 is adapted to cooperate with the accumulator wheels when they are out of mesh with the racks as in Fig. 67 to prevent accidental rotation of the wheels.

During the first cycle when the amount of premium is controlling the setting of the type bars 364 to print the amount on the cards R and N the racks 1346 rest on the projection 1352 of the slide 1350 as in Fig. 68. Before the type bars descend the accumulator wheels will rock into mesh with the racks. As the type bars descend the projection 1374 on all of the racks will engage the carry latches 1372 since there is no carrying operation from any order to the next higher order during the first accumulating operation. All of the racks 1346 will thus be held in the position of Fig. 67 as the type bars continue to descend one step farther as shown in Fig. 67. In the third cycle if the amount of the dividend is to be subtracted from the amount of the premium the complements of the digits representing the dividend will be added to the accumulator to effect the subtracting. The arrangement of the type characters on the type bars in question is shown in Fig. 98 on chart 769. The full line characters are those that will be set in printing position to print the premium amount during the first cycle. The dotted characters are the complementary values that will be printed in the third cycle. To print the complementary characters the type bars will be controlled by the stops 481b (Fig. 93). The type bars in this instance rise to an intermediate position. For instance, if "2" is to be printed and subtracted, the type bar will rise to position the dotted 2 in chart 769 (Fig. 98) on printing line to be printed but the value to be run into the accumulator wheel is the "7" directly above the dotted 2. To compensate for this half step difference the accumulator rack must rise a half step less than the type bar. This is effected by rocking the arm 1353 (Fig. 67) counterclockwise to move all of the slides 1350 to the left.

The arm 1353 is fixed on a shaft 1382. Fixed on this shaft is another arm 1383 (see Figs. 5 and 92) connected by link 1384 to an arm 1385 fixed to the shaft 1386. The latter shaft has fixed thereto an arm 1387 connected to a link 1388 which is in turn connected to one of the four cam followers 1363 operated by one of the four cams 1364. The slides 1350 are thus moved to the left before the type bars commence to rise in the third cycle. As the type bars rise the projections 1352 pass to the left of the racks 1346 before they pass out of the influence of the rod 1354. Thus the slides 1350 will engage the racks at the point 1355 and the racks will be raised a half step less than when a true value is to be accumulated. When the racks are in their upper position in the third cycle the accumulator wheels are released to mesh with the racks to be actuated as the racks descend. Wherever no carrying is to be effected the racks will be stopped by the carry latches 1372 but where carrying is to be effected the appropriate carry latches 1372 will have moved out of the path of the projections 1374 and the accumulator racks 1346 will be permitted to descend one step farther, being stopped by the projection 1389 engaging a bar 1390 carried by an arm 1391 pivoted at 1392 and adapted to engage a limit stop 1393. A spring 1394 tends to hold the arm 1391 in its normal position. An arm 1385a on shaft 1386 has a stud 1386b which engages the lower end 1371a of latch 1371 to releas latch 1372 associated with the rack 1346 of the units column to permit the adding of the so-called elusive "1". Before the type bars rise to print the total in the fourth cycle, those of the racks 1346 that have descended an extra step to effect carrying must be raised again to their normal positions. The latches 1372 will then be restored to their positions under the projections 1374.

The raising of the racks is effected by the arm 1391 cooperating with the projections 1389. For this purpose the shaft 1392 on which the arm 1391 is fixed is provided with a second arm 1395 (Figs. 5 and 92) fixed thereon. The link 1396 connected to the arm 1395 is connected at its other end to one of the four cam follower arms 1363 operated by one of the four cams 1364. The arm 1391 will thus be rocked counter-clockwise, stretching the spring 1394. Having raised the racks to their normal positions the arm 1391 will resume its normal position.

We have heretofore seen that if the dividend which is found in the field 715 of the master card (Fig. 2) is not to be printed on the cards R and N the type bars 364 of these particular columns are latched against operation by a latch plate 831 (Fig. 93), this plate being actuated by a link 828. As shown in Fig. 125 the link 828 carries a pin 1397 which, when the link is moved to the right to prevent the printing of the dividend, engages an arm 1398 pivoted at 1399 and integral with a latch 1400 adapted to cooperate with a pin 1401 in arm 1358. A spring 1401a normally holds the latch 1400 out of the path of the pin 1401 so that the arm 1358 may move to the left as in Fig. 125 to cause the accumulator wheels 1356 to mesh with the racks. When the link 828 moves to the right raising the latch 1400, it will prevent the accumulator wheels from moving into mesh with the racks as nothing is to be added to the accumulators at this time. Thus when the amount to be paid is printed in the fourth cycle under control of the accumulator wheels it will be the full amount of the premium which was run into the accumulators during the first cycle.

In the fourth cycle the cam that rocks the accumulators into mesh with the racks will effect this meshing before the racks rise so that the accumulators will control the type bars.

The arrangement of the stops 481b (Fig. 93) and the cuts in the combs 765 is such that when the combs are set to control the setting of a type bar, more than one stop may advance. This is permissible where the proper stop checks the rise of the type bar before the latter reaches the second stop. But where the type bars are to be set at intermediate positions is may be necessary to prevent the movement of a stop that would interfere with the proper setting of the type bar. This may be done as shown in Figs. 93, 103 and 104. Here, the stops 481b that are to be locked out are provided with notches 1402. A three arm latch 1402a carried by a bracket 1402b has a flange 1402c adapted to engage in notch 1402 to prevent the stop from advancing. A feeler 1402d is provided with a wedge shaped block 1402e and the combs 765 of each pair are provided with corresponding cuts 1402f. These cuts are so arranged that when the combs are set to permit the stop with the notch 1402 to advance for its normal function the cuts do not register with the block 1402e. But when the combs are set to permit another stop to advance and this setting also frees the stop with notch 1402, the cuts 1402f register with block 1402e and the feeler 1402d advances under the influence of spring 1402g and the latch 1402a rocks into latching position to latch the stop 481b thus preventing it from advancing. By making the blocks 1402e and cuts 1402f wedge shape the blocks may rest constantly against the combs to drop in or be cammed out as the combs move. The feeler will thus operate in advance of the stops 481b.

*Machine stops when credit is greater than debit*

In Figs. 70, 71 and 72 mechanism is shown for causing the machine to stop when the credit amount or dividend in field 715 (Fig. 2) is greater than the debit amount or premium entered in lines 411, 356 on cards R and N, Figs. 3, 3a. During the first of the five billing cycles the amount of the premium or debit is run into the accumulator wheels 1356, Fig. 69. During the third cycle the amount of the credit or dividend is analyzed and the complements of this value run into the accumulator. When the credit amount is greater than the debit amount the operation of the type bar of the thousands order of the dollars rises to a greater height and serves to set the mechanism to stop the machine. We have seen in connection with Fig. 6a that the rocking of shaft 1331 causes the machine to stop. In Fig. 70 this shaft is shown as having an arm 1403 fixed thereon and connected by pin and slot 1404 to a link 1405 which is bifurcated at its right end and straddles a pin 1406 on a cam follower arm 1407 pivoted on a bracket 1408 and co-operating with the cam 1409 mounted on shaft 53. This shaft as we have seen turns one revolution during the five billing cycles. A spring 1410 connected between the arm 1407 and bracket 1411 holds the follower against the cam in the position of Fig. 70. Attached to the follower arm 1407 at 1406 is a link 1412 which is held in its lower position by a spring 1413 connected between the link and the follower arm. The link is provided with three notches 1414 adapted to cooperate with a pin 1415 carried by a link 1416 connected by a pin and slot at 1417 to the link 1405 and held toward the left by a spring 1418. The type bar 364 of the twenty-ninth column which is associated with the accumulator wheel 1356 of the highest order is provided with a bracket 1419 having a lateral projection 1420 adapted, when the type bar rises to the value of "7", to reach the lower edge 1421 of the link 1412.

When this type bar rises to the values of "8" it raises the link 1412 one step and when it rises to the value of 9 it raises the link two steps. If in the first cycle, the type bar rises to a value less than "8" it will not disturb the link 1412. At the end of the first cycle the cam 1409 will rock the follower 1407 and move the link 1412 one step to the right to cause the uppermost notch 1414 to engage over the pin 1415. The parts will remain in this position throughout the second and third cycles. In the fourth cycle when the type bar rises under control of the accumulator wheel to print the total, if it rises higher than it did during the first cycle, i. e. if it rises to "8" or "9", it will raise the link 1412 one step or two steps, thus raising the pin 1415. Toward the end of the fourth cycle the cam 1409 rocks the follower 1407 another step, moving the link 1412 an additional step to the right to move the pin 1415 over the projection 1422 on the link 1405 as in Fig. 72.

The parts will remain in this position as the type bar descends. During the first cycle of the next series the cam 1409 will rock the follower 1407 still another step and thus move the link 1412 a third step toward the right thus moving the link 1405 to the right. This will rock the shaft 1331 clockwise to set the clutch mechanism to stop the machine at the proper time. As shown in the timing diagram link 1405 is moved during the first cycle to set the mechanism to stop the machine. It will be seen that this takes place after the pre-reading operation on the next succeeding master card which takes place during the latter portion of the fifth cycle. This pre-reading operation controls the machine to make out the bill or notice for the card thus pre-read or passes the card on and proceeds to pre-read another master card.

Thus the pre-reading of a succeeding or several successive master cards takes precedent over the setting of the machine for stoppage by the prior card on which the dividend or credit is greater than the debit so that several pre-read master cards may be fed out of the machine following the disposal of the master card which is setting the machine to stop. However, after several cards have been pre-read and fed to the file pocket, and as soon as one has caused the machine to be set to make out a bill or notice, thus permitting the machine to pass into the first cycle of the next series, the cam 1409 having set the link 1405 to rock the shaft 1331 will cause the machine to stop. The operator will then remove the card which causes this stoppage from the file pocket so that appropriate action may be taken in connection with the account. In order that the operator may know why the machine stops a signal 1423 (Fig. 57) is provided. The signal is attached to an arm 1424 pivoted at 1425 and connected to a Bowden wire 1426 which as shown in Fig. 70 is connected at its opposite end to a block 1427 adapted to be engaged by the link 1405 when it moves to the right to stop the machine. The actuation of the Bowden wire thus raises the signal 1423 so that the character D or any other suitable designation may be visible above the case 1113e.

It will be seen that if the amount of the credit does not run above the hundreds of dollars, the type bar of the highest order to which bracket 1419 is attached will not rise. The pin 1415 will then engage in the upper notch 1414 when the link 1412 moves its first step to the right.

In the fourth cycle, when link 1412 moves the second step to the right, it will move the pin above or below the projection 1422 depending upon whether the link 1412 has been raised or not during the earlier part of the same cycle by the bracket 1419 under control of the accumulator wheel of the thousands or highest order. If the credit amount is less than the debit, the sum of the debit and the complement of the credit will cause "0" to appear in the wheel of the thousands order. The type bar and bracket 1419 will not rise and the pin 1415 will be lodged below the projection 1422. Then when the link 1412 moves its last step to the right in the first cycle of the next series, the pin 1415 will move idly in slot 1430 in the link 1405. But if the credit amount is greater than the debit, the sum of the debit and the complement of the credit will cause "9" to appear in the thousands order. The type bar with bracket 1419 will then raise link 1412 so that pin 1415 will be moved over projection 1422. Now when link 1412 moves its last step to the right it will pull link 1405 with it, rocking shaft 1331 to cause the machine to stop. If the credit amount or minuend runs into the thousands of dollars and the debit or subtrahend does not exceed the hundreds of dollars, the sum of the credit and the complement of the debit will never produce a value in the thousands order capable of raising link 1412 higher than it may have been raised by the credit amount. If the credit and debit amounts both run into the thousands of dollars but the credit is greater than the debit the link 1412 will not be raised higher by the sum of the credit and complement of the debit in the fourth cycle than it may have been raised by the credit amount in the first cycle.

Where the two figures run into the thousands of dollars and the subtrahend is greater than the minuend by a sum up to one thousand the bracket 1419 will raise link 1412 in the fourth cycle to position pin 1415 over the projection 1422 to cause the machine to stop. With the mechanism shown, if the subtrahend exceeds the minuend by large sums the device will not operate to stop the machine. In insurance work the occasions where the credit or subtrahend is greater than the debit or minuend occur where the yearly premium is payable in several installments and a dividend accruing to the insured is payable once a year. Where the amount of the dividend increases each year it may eventually become greater than the amount of one of the premium installments. The amount of this difference, however, is limited, and the mechanism shown will detect such differences and serves to illustrate the invention. By increasing the number of parts the device may be made to detect all cases where the subtrahend is greater than the minuend. For instance, by providing more accumulator wheels and associated parts than there will be places in the minuend and subtrahend, when the minuend is greater than the subtrahend the wheel of the highest order will contain "0", but when the minuend is less than the subtrahend the wheel of the highest order will contain "9". This wheel may be used to control the link 1412 to cause the machine to stop or not depending upon the relative values of the two numbers.

In my Patent No. 1,506,382 I disclosed means for stopping the machine when cards fail to feed or when cards become dislodged in the machine. Such means may be employed in the present machine. In Fig. 6a an arm 1430 is shown fixed on shaft 1331. A link 1431 connected by pin and slot to said arm is connected at its other end to an arm 1432 pivoted at 1433 and fixed with respect to an arm 1434. A link or rod 1435 associated with the card feeding clips is controlled by the presence or absence of a card in the clips. The details of the mechanism are not shown here as they are fully disclosed in the said patent. If, when the card feed carriage approaches the end of its stroke, there is no card in the clips, link 1435 will rock arms 1433, 1432, raising link 1431 and rocking shaft 1331 counterclockwise. This, as we have seen causes the machine to stop.

In order to cause one master card to control the printing or punching or printing and punching of several cards such as cards N or A of Fig. 3a, the master card may be held in the analyzing section of the machine for a number of series of billing cycles equal to the number of cards to be produced. This may be effected by latching the card feed mechanism so that it will not feed cards to or from the analyzing section, and by latching against operation, the device which stops the machine when no master card is fed. Assume that a card is in analyzing position M2 (Fig. 6) and another card is in pre-reading position M1, the latter card having perforations agreeing with the set-up in the machine so as to cause the machine to be set to perform the billing or reproducing operations.

The card picker arm 151 may be locked in its back position by a latch 1440 on the frame of the machine cooperating with a pin 1441 on the picker arm. This will suppress feeding of another card to the M1 position. Of course, if there are no other cards in the hopper the arm 151 need not be latched so that by placing only one card in the hopper at a time the latch may be omitted. In Fig. 86 a latch 1442 may cooperate with pin 1443 on the latch arm 189 to hold it in the position shown. The feed clips will then move back and forth out of the plane of the cards in the M1 and M2 positions without feeding the cards from such positions. In Fig. 6a the link 1431 may be disconnected from the arm 1432 so that the rocking of the arm due to failure of a card to feed will not stop the machine.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

I claim:

1. In a billing machine, means for reading debit and credit amounts in a perforated record card, means for ascertaining the relative values of such amounts and means for stopping the machine when the credit amount is greater than the debit amount.

2. In an automatic bill writing machine, means for sensing debit and credit amounts on a perforated record card, means for printing a bill for the difference between such amounts and means for ascertaining the relative values between the amounts and for suppressing the printing of a bill when the credit amount is greater than the debit amount.

3. In an accounting machine having an accumulator, means for entering an amount in the accumulator, means for entering complementary digit values of another amount in the accumulator, means for ascertaining the relative values of the true numbers and means controlled in accordance with such relative values for controlling the operation of the machine.

4. In a card controlled accounting machine, means controlled by a perforated record card for making out bills, means controlled by the record card after a predetermined number of bills have been made out for subtracting a credit amount from the amount of the bill and for printing the difference between the debit amount and such credit amount.

5. In a card controlled accounting machine, means controlled by perforated record cards for printing bills, means controlled by the record card after a predetermined number of bills have been printed under control thereof for analyzing a credit amount contained on the record cards and means for printing the debit and credit amounts and the difference between such amounts upon the bill.

6. In an accounting machine, means for analyzing a master record card, means controlled by said analyzing means for making entries on a separate record from a plurality of fields on the master record, means controlled by the master record after a predetermined number of entries have been made upon records under control of the master record for suppressing the entering of data from certain fields of the master record.

7. In a machine of the character described, means for analyzing debit and credit amounts on a master record, means controlled by said analyzing means for printing the debit amount on a second record, an accumulator, means for entering the debit and credit amounts in the accumulator, means for causing the accumulator to subtract the credit amount from the debit amount and means controlled by the relative values of the debit and credit amounts for preventing the credit amount from being subtracted from the debit amount.

8. In a machine of the character described, an accumulator, means controlled by a perforated record for entering amounts into the accumulator and means also controlled by the record for locking the accumulator to prevent the entry of such amounts.

9. In a machine of the character described, an accumulator, means for causing a true number and the complements of a true number to be entered into the accumulator, means controlled by the accumulator for printing the difference between the true numbers and means controlled in accordance with the difference between the true numbers for controlling the operation of the machine.

10. In a machine of the character described, a set of alphabetical type adapted to print on a record sheet, a set of numeral type adapted to print on a second record sheet and means for shifting the second record sheet for causing the alphabetical type to print thereon.

11. In a machine of the character described, means for analyzing a control record, a plurality of sets of type controlled by said analyzing means for printing on a plurality of record sheets, and a plurality of interconnected sets of type actuators for actuating said type.

12. In a machine of the character described, means for analyzing a control record, a plurality of sets of type controlled by said analyzing means for printing on a plurality of record sheets, a plurality of interconnected sets of type actuators for actuating said type and means for rendering one of the sets of type actuators inoperative.

13. In a machine of the character described, means for analyzing a control record during several successive cycles of operation of the machine, means for printing under control of the record during such successive cycles of operation and means for locking certain of the printing means during predetermined cycles of operation.

14. In a machine of the character described, a type bar, a plurality of sets of type mounted on said bar for simultaneously printing upon a plurality of record sheets, a plurality of interconnected type actuators for causing the type to print upon the several sheets and means for disconnecting one of the actuators to prevent printing on one of the sheets.

15. In a machine of the character described, a type bar, a plurality of sets of type mounted on the bar, means for setting the type bar, a plurality of interconnected actuators for actuating the type and means controlled by the type bar for causing the actuators to operate.

16. In a machine of the character described, a type carrier having type mounted thereon, means controlled by a record card for controlling the setting of the carrier, means controlled by the carrier for actuating the type to effect printing and means independent of the control of the carrier for alternatively actuating the type to effect printing.

17. In a machine of the character described, a type carrier, a plurality of stops adapted to control the setting of the carrier, means for selecting the stops for operation, a latch, and means controlled by the stops for latching one of the stops against operation when a predetermined group of stops is selected for operation.

18. In a machine adapted to be controlled by a control record having a plurality of major fields each divided into a plurality of minor fields, means controlled by the record for determining which major field shall control the operation of the machine, means for determining which minor field within the selected major field shall control the operation of the machine and means controlled by the selected minor field within the selected major field for controlling the operation of the machine.

19. In a machine adapted to be controlled by a control record having a plurality of major fields each divided into a plurality of minor fields, means controlled by the record for determining which major field shall control the operation of the machine, means adapted to determine which minor field within the selected major field shall control the operation of the machine, means for printing bills, and means controlled by the selected minor field for controlling the operation of said printing means.

20. In a machine of the character described, record sensing means adapted to analyze a plurality of fields on a perforated record, separate means for sensing data in a plurality of other fields on the control record said first named means being adapted to cause said separate means to selectively analyze said other fields and means controlled by said analyzing and said sensing means for effecting printing on a separate record.

21. In a machine adapted to analyze columns of perforated data on a control record during successive cycles of operation of the machine, printing means adapted to print in a plurality of columns on a separate record, sensing means controlled by a column of perforations on the control record adapted to control the printing means to print in a predetermined column on the second record during one cycle of operation and means controlled by the same sensing means for causing the printing means to effect printing in a different column on the second record during a subsequent cycle of operation.

22. In a perforated record controlled machine, a plurality of perforation sensing pins, a latch controlled by one of the pins and adapted to control the extent of operation of another of the pins and means controlled by the pins conjointly for controlling the operation of the machine.

23. In a perforated record controlled machine, a plurality of groups of perforation sensing elements, means for causing the elements to operate to sense perforations in a record and means controlled by the record being sensed for locking certain of the groups of elements against operation.

24. In a perforated record controlled machine, means for sensing perforations in a plurality of fields on a record, means controlled by the sensing means for printing bills and means controlled by the perforated record for determining which field thereon the sensing means shall be controlled by in printing bills.

25. In a bill printing machine, means for analyzing a plurality of fields on a perforated control record, means controlled by the analyzing means for printing a bill, means controlled by the control record for determining which field thereon shall be analyzed for controlling the printing means and means controlled by the control record for indicating when an advance payment has been recorded in the selected field.

26. In a bill printing machine, means for analyzing a plurality of fields on a perforated control record, means controlled by the analyzing means for printing a bill, means controlled by the control record for determining which field thereon shall be analyzed for controlling the printing means and means controlled by the control record for indicating when an advance payment has been recorded in the selected field, and means controlled by said last named means for suppressing the printing of a bill.

27. In a machine of the character described, means for sensing a plurality of fields on a perforated record adapted to indicate long and short term payments due, means controlled by the sensing means for printing a bill, means controlled by the control record for indicating unpaid payments that are due and means for stopping the machine when a predetermined number of long term due payments are unpaid and when a different predetermined number of short term due payments are unpaid.

28. In a machine adapted to be controlled by a perforated record, means for printing data under control of one field of a control record a plurality of times, means for printing data under control of another field of the control record a different predetermined number of times and means for suppressing printing under control of all of said fields during subsequent operations of the machine.

29. In a perforated record controlled machine, a record supply hopper, a picker adapted to advance records one at a time from said hopper, additional feeding means for continuing the feeding of the records, and pre-reading elements adapted to analyze a record after it has been advanced by said picker and before it has been advanced by said other feeding means for determining the subsequent operation of the machine.

30. In a perforated card controlled machine, perforation sensing elements, a plurality of type carriers, means for causing a reading taken by certain of said elements to control one of said type carriers and means for causing a subsequent reading taken by the same elements to subsequently control another of said type carriers.

31. In a machine of the character described, a group of type carriers, a plurality of groups of sensing elements, means for causing one group of said elements to control the type carriers and means for automatically causing another group of said elements to control the same group of type carriers during a subsequent operation.

32. In a machine of the class described, means for successively analyzing a plurality of fields on a record card, means for entering items on a separate record under control of said analyzing means and means for causing the analyzing means to re-analyze a previously analyzed field for controlling the entering of data upon a separate record.

33. In a perforated card controlled machine, means controlled by variable conditions of the control card for stopping the machine and means adapted to indicate the reason for the stoppage of the machine.

34. In a machine of the class described, a platen, means for feeding a record sheet to be printed upon the platen and means for moving the platen out of the path of the feeding means.

35. In a machine of the class described, a type carrier adapted to be differentially set for printing numerals, a control element adapted to be set by the type carrier during successive settings of the type carrier and means controlled by the control element for stopping the machine when the type carrier is set for the printing of a higher numeral during one setting than during a previous setting.

36. In a machine of the class described, a type carrier adapted to be raised to varying positions for printing numerals, control elements adapted to be set by the type carrier during successive settings and means controlled by the control element for stopping the machine when the type carrier rises a greater distance on one setting than on the previous setting.

37. In an accounting machine, an accumulator, a combined type carrier and accumulator actuator, means for moving the actuator for actuating the accumulator, means for causing the actuator to be moved under control of the accumulator and means operative when the actuator moves further under control of the accumulator than it moves when controlling the accumulator for controlling the operation of the machine.

38. In a machine of the class described, means for sensing perforations on a record card indicating payments due, means for ascertaining from the record card when payment has been made, and means also controlled by the card for effecting a printed record indicating when a payment that is due has not been made.

39. In a machine of the class described, means for sensing perforations on a control record indicating payments due, means for ascertaining from the control record when a payment has been made, means for indicating when a payment that is due has not been made, and means controlled by said indicating means for suppressing the operation of the machine.

40. In a machine of the class described, means for sensing perforations on a record card indicating payments due, means for ascertaining from the record card when a payment has been made, means controlled by the card for indicating when payments due have not been made and means controlled by said indicating means for stopping the machine when a pre-determined number of due payments have not been made.

41. In a machine adapted to be controlled by a perforated record having a plurality of fields representing periods of time, means controlled by the record for determining the period of time represented in one of the fields and means controlled by said determining means for selecting the field that represents another period of time and means controlled by perforations in the selected field for controlling subsequent operations of the machine.

42. In a machine adapted to be controlled by a perforated record having a plurality of major fields representing periods of time each field being divided into minor fields representing subdivisions of said periods of time, means controlled by the record for determining the period of time represented in one of the major fields, means controlled by said determining means for selecting the major field that represents another predetermined period of time, means for selecting a minor field within the selected major field and means controlled by perforations in the selected minor field for controlling operations of the machine.

43. In a machine of the class described, means for selectively analyzing a plurality of subdivided fields on a record, means for rendering the analyzing means operative to analyze one of the subdivisions in any of the fields, means controlled by the record for determining which field shall be analyzed, and means controlled by perforations in the selected subdivision of the selected field for controlling operations of the machine.

44. In a machine of the character described, a type carrier, a plurality of stops for controlling the setting of the carrier, means for selecting the stops for operation and means controlled by said selecting means when certain of said stops are selected for preventing operation of one of the stops.

45. In a machine of the class described, means for successively reading separate fields on a master perforated record, means for entering data thus read upon another record and means for repeating the operations under control of the same master record.

46. In a machine of the class described, means for sensing perforated data on record cards, means for presenting successive fields on a master control card to said sensing means, means controlled by said sensing means for entering data on a separate record, means for causing said presenting means to repeat its operation with the same control card and means for presenting successive records to receive data under control of the master card.

47. In a machine of the character described, a set of type adapted to print upon a record, a second set of type adapted to print upon a second record, means for shifting the records to cause the first set of type to print upon the second record and means for suppressing the printing operations of the second set of type when the first set prints upon the second record.

JOHN ROYDEN PEIRCE.